Jan. 12, 1954

W. A. CORNELL ET AL
ELECTRONIC DISCHARGE-TUBE CONTROLLED
TELEPHONE SWITCHING SYSTEM 2,666,096

Filed Sept. 7, 1949

| FIG.24 | FIG.25 | FIG.32 | FIG.43 |
|---|---|---|---|
| FIG.26 | FIG.27 | FIG.33 | FIG.44 |
| FIG.28 | FIG.31 | FIG.34 | FIG.45 |
| FIG.29 | FIG.35 | FIG.36 | FIG.46 |
| FIG.30 | FIG.37 | FIG.38 | FIG.47 |
| FIG.21 | FIG.39 | FIG.40 | FIG.48 |
| FIG.23 | FIG.41 | FIG.42 | FIG.49 |

(arrangement of figures 1–50 sheet index)

INVENTORS
W. A. CORNELL
N. I. HALL
G. HECHT
C. D. KOECHLING
F. A. KORN
H. E. POWELL

BY
*J. W. Schmid*
ATTORNEY

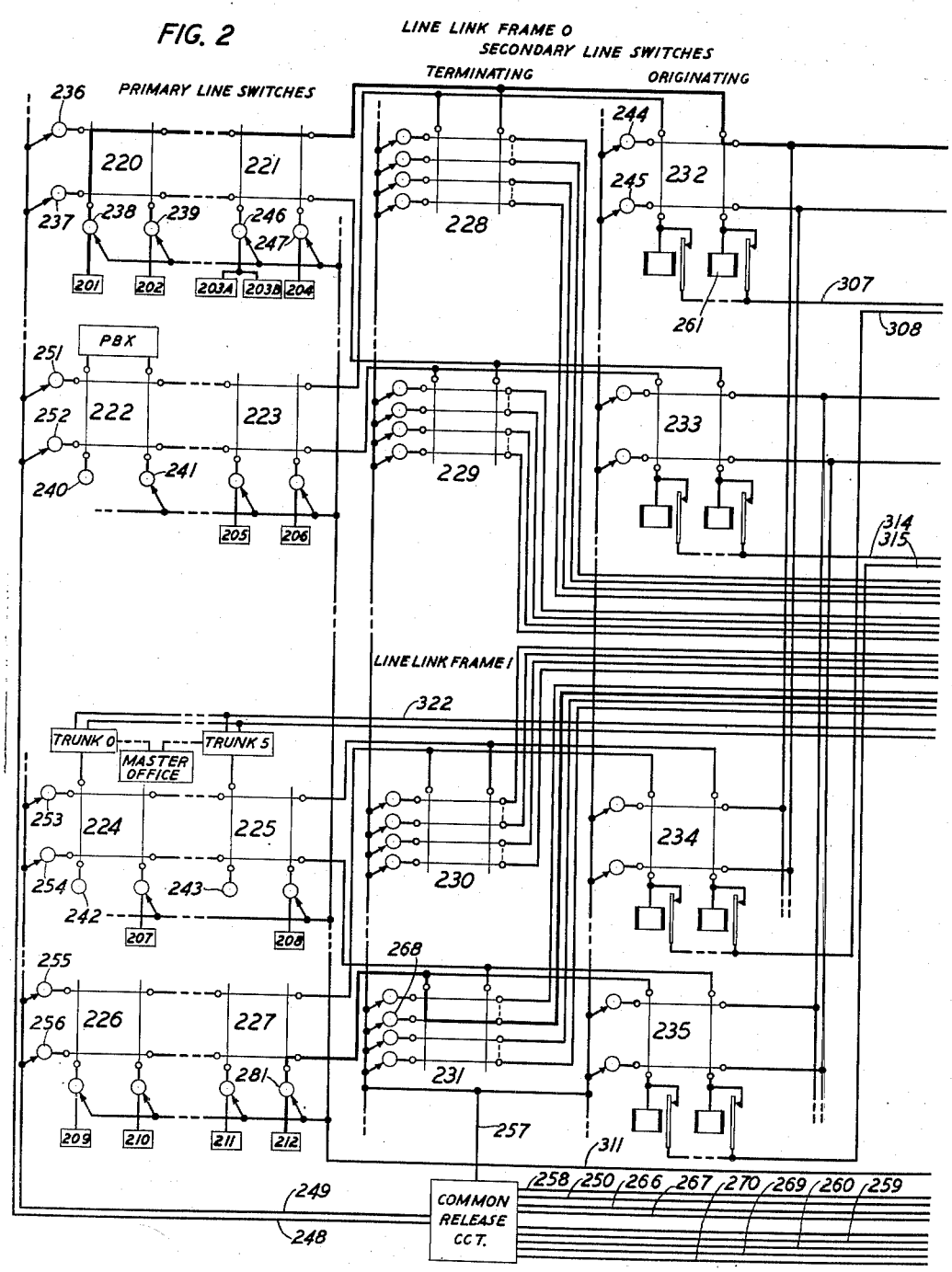

INVENTORS
W. A. CORNELL
N. I. HALL
G. HECHT
C. D. KOECHLING
F. A. KORN
H. E. POWELL
BY
J. W. Schmied
ATTORNEY INVENTORS
W. A. CORNELL
N. I. HALL
G. HECHT
C. D. KOECHLING
F. A. KORN
H. E. POWELL BY
J. W. Schmued
ATTORNEY

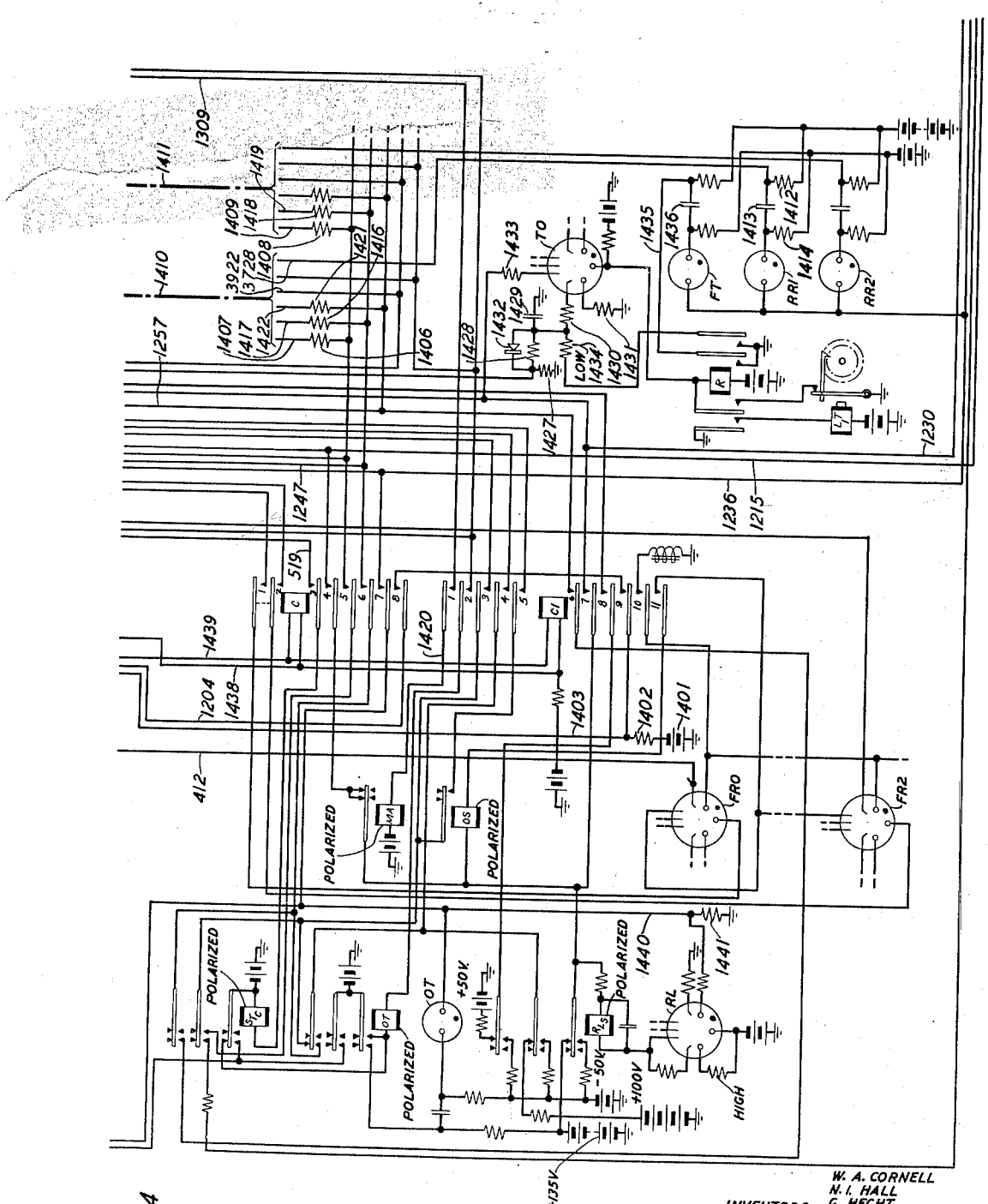
FIG. 14
INVENTORS
W. A. CORNELL
N. I. HALL
G. HECHT
C. D. KOECHLING
F. A. KORN
H. E. POWELL
BY 
ATTORNEY Jan. 12, 1954

W. A. CORNELL ET AL
ELECTRONIC DISCHARGE-TUBE CONTROLLED
TELEPHONE SWITCHING SYSTEM 2,666,096

Filed Sept. 7, 1949

INVENTORS
W. A. CORNELL
N. I. HALL
G. HECHT
C. D. KOECHLING
F. A. KORN
H. E. POWELL

BY J. W. Schmied
ATTORNEY

FIG. 44

INVENTORS
W.A. CORNELL
N.I. HALL
G. HECHT
C.D. KOECHLING
F.A. KORN
H.E. POWELL

BY
ATTORNEY

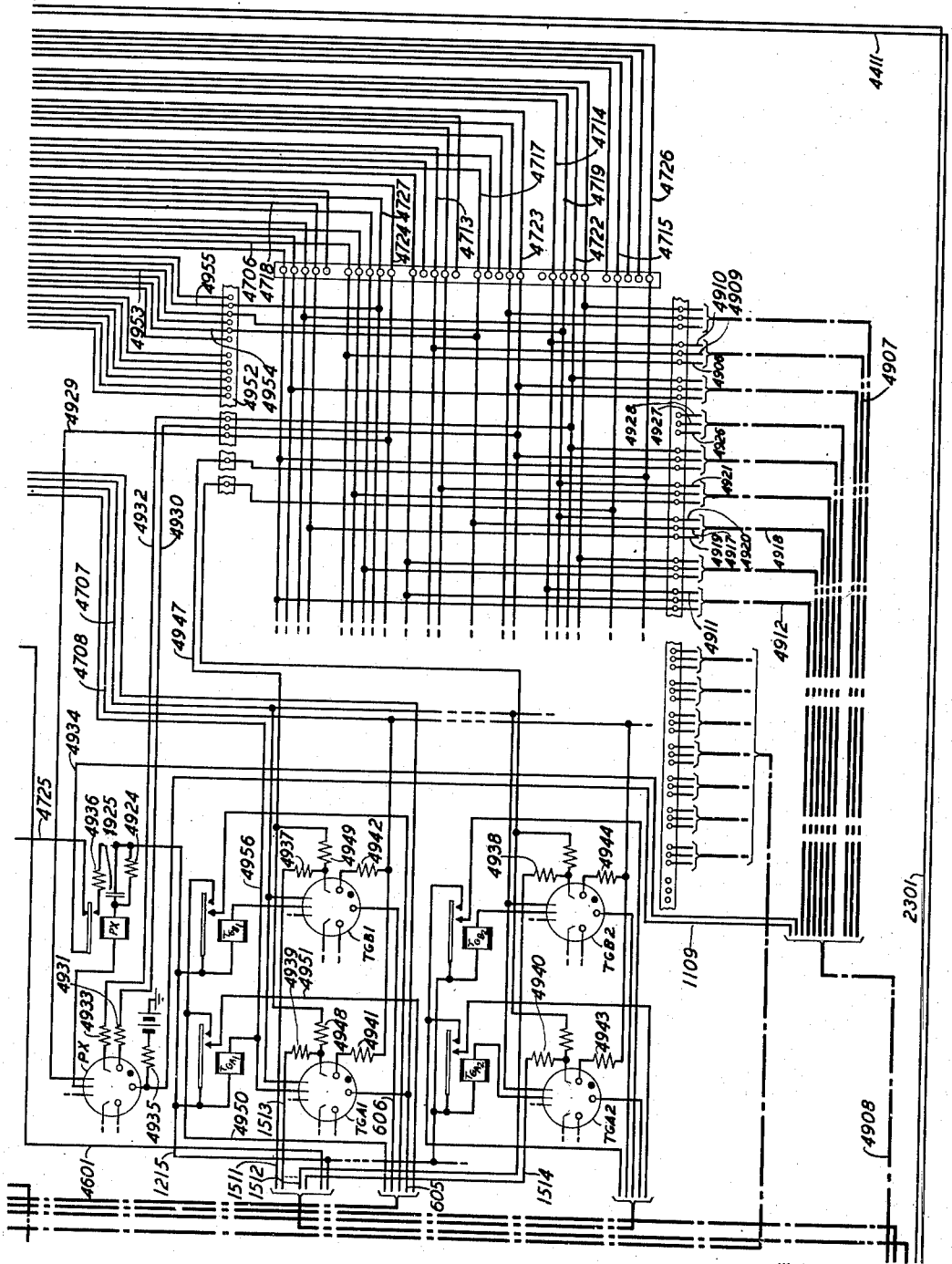

FIG. 51

| SECONDS | 1 | | 2 | | 3 | | 4 | | 5 | | 6 | | 7 | | 8 | |
|---|---|---|---|---|---|---|---|---|---|---|---|---|---|---|---|---|
| NO. OF ½ SEC. INTERVALS | 1 | 2 | 3 | 4 | 5 | 6 | 7 | 8 | 9 | 10 | 11 | 12 | 13 | 14 | 15 | 16 |
| RELAY X (32) | OP. | REL. | OP. | REL. | OP. | REL. | OP. | REL. | OP. | REL. | OP. | REL. | OP. | REL. | OP. | REL. |
| RELAY Z (32) | REL. | | OP. | | REL. | | OP. | | REL. | | OP. | | REL. | | OP. | REL. |
| COND. 3261 | | + | | + | | + | | + | | + | | + | | + | | + |
| COND. 3262 | | | + | | | | + | | | | + | | | | + | |
| COND. 3263 | | + | | + | | + | | + | | + | | + | | + | | + |
| COND. 3264 | + | | | | + | | | | + | | | | + | | | |
| COND. 3331 | + | | | | | | | | | | | | | | | |
| COND. 3332 | | + | | | | | | | | | | | | | | |
| COND. 3333 | | | + | | | | | | | | | + | | | | |
| COND. 3334 | | | | + | + | + | | | | | | | | | | |
| COND. 3335 | | | | + | | + | | | | | | | | | | |
| COND. 3336 | | | | | | | + | | | | | | | | | |
| COND. 3337 | | | | | | | | + | + | + | | | | | | |
| COND. 3338 | | | | | | | | | + | + | | | | | | |
| COND. 3339 | | | | | | | | | + | | | | | | | |
| COND. 3340 | | | | | | | | | | | | + | | | | |

RINGING CODES

PICKUP, CODE 1 through CODE 20, REVERTIVE SIGNAL

INVENTORS
W. A. CORNELL
N. I. HALL
G. HECHT
C. D. KOECHLING
F. A. KORN
H. E. ROWELL

BY J. W. Schmiel
ATTORNEY

Patented Jan. 12, 1954

2,666,096

UNITED STATES PATENT OFFICE 2,666,096

ELECTRONIC DISCHARGE-TUBE CONTROLLED TELEPHONE SWITCHING SYSTEM

Warren A. Cornell, Beechhurst, N. Y., Nathan I. Hall, West Los Angeles, Calif., George Hecht, Astoria, and Charles D. Koechling, Floral Park, N. Y., and Franklin A. Korn, Westfield, and Harold E. Powell, Clifton, N. J., assignors to Bell Telephone Laboratories, Incorporated, New York, N. Y., a corporation of New York Application September 7, 1949, Serial No. 114,392

62 Claims. (Cl. 179—18)

1

This invention relates to a communication system and more particularly to an automatic switching system wherein trunks or subscribers' stations are automatically interconnected under control of signals transmitted from calling subscribers' stations to a central switching station.

An object of the present invention is to provide a switching system of improved efficiency and rapidity of operation with the capability of properly handling a plurality of diverse normal and abnormal conditions.

A feature of this invention relates to the use of electron discharge tubes having one or more control discharge gaps to control switches and circuits.

Another feature of this invention relates to the use of electron discharge tubes having a plurality of electrodes, certain of those electrodes being employed to control switches and circuits when a call is originated at a line associated with that tube, and others of those electrodes being employed to control switches and circuits when a call is terminated at a line associated with that tube.

Another feature of this invention relates to the use of a plurality of electron discharge tubes each having a plurality of electrodes adapted to control switches and circuits, and apparatus operative to select any one of those tubes by applying suitable potentials to certain of the electrodes thereof.

Another feature of this invention relates to the use of electron discharge tubes having a plurality of electrodes, certain of which are employed to control apparatus and circuits determining the associated line's class of service.

Another feature of this invention relates to the use of electron discharge tubes controlling switches and circuits, and apparatus responsive to the condition of a selected one of those tubes to indicate the busy, idle, or vacant condition of the associated subscriber's line.

Another feature of this invention relates to the use of electron discharge tubes controlling switches and circuits, and apparatus responsive to a busy condition of a selected one of those tubes operative to perform a revertive test on that selected tube to ascertain whether the calling and called lines are identical.

Another feature of this invention relates to the use of electron discharge tubes controlling switches and circuits, and apparatus operable to verify the busy condition of any line associated with any of those tubes and to establish a monitoring connection.

2

Another feature of this invention relates to the grouping of the subscribers' lines and associated switching equipment into frames, to the associating of an electron discharge tube with each of the subscribers' lines, and to the associating of an electron discharge tube with each of the frames, with all of the electron discharge tubes associated with the subscribers' lines in each frame being arranged in lock-out and with the electron discharge tubes associated with the frames also being arranged in lock-out whereby it is insured not only that but one subscriber's line in each frame can control circuits and switches for the establishing of a connection, but also that but one frame can function at any one time.

Another feature of this invention relates to the use of a plurality of common release circuits for restoring the controlling circuits and tubes to their normal or idle condition at certain stages of each call, and apparatus operative automatically to render these common release circuits alternately or sequentially operative on succeeding major phases of each call and to lock the operative circuit in use for the duration of that phase.

Another feature of this invention relates to the use of a plurality of common release circuits for restoring the controlling circuits and tubes to their normal or idle condition at certain stages of each call, and apparatus responsive to a time-out condition in one of those common release circuits to render another of those common release circuits operative and to lock that other common release circuit in use.

Another feature of this invention relates to the use of a plurality of outgoing trunk circuits, apparatus for testing the busy, idle, or vacant condition of those trunks as a group, and apparatus and circuits for automatically hunting those trunks to locate an idle one thereof.

Another feature of this invention relates to the use of a plurality of outgoing trunk circuits, and apparatus and circuits for establishing a certain order of preference in which those trunks are selected for use at one time, and a different order of preference in which those trunks are selected for use at another time.

Another feature of this invention relates to the use of a plurality of lines as private branch exchange trunks, and apparatus for testing the busy, idle, or vacant condition of those trunks as a group, and apparatus and circuits for automatically hunting those trunks to locate an idle one thereof.

Another feature of this invention relates to apparatus and circuits for intercepting calls to certain lines so that when an attempt is made to establish a connection to an intercepted line, this apparatus becomes operative to divert the connection to an outgoing trunk to an operator.

A further feature of this invention relates to methods and equipment for equalizing the load through the switches and circuits by establishing an automatically changing preference for certain of the circuits on succeeding calls, and apparatus for cancelling this preference when a predetermined number of those circuits become busy.

Further objects and features of this invention will become apparent in the following description of an exemplary embodiment thereof.

Although the principles of this invention may be employed in a variety of applications and embodiments, the exemplary system herein disclosed comprises an unattended automatic telephone switching system adapted to handle expeditiously a plurality of diverse normal and abnormal conditions. The illustrative embodiment is a modification of an improvement upon the selecting system disclosed in Patent 2,582,959, granted January 22, 1952, to E. Bruce and N. I. Hall.

Fig. 1 shows the arrangement of Figs. 4 to 49, inclusive, of the drawings;

Figs. 2 and 3 represent, in outline form, the various major elements of an exemplary system embodying the invention;

Figure 3:
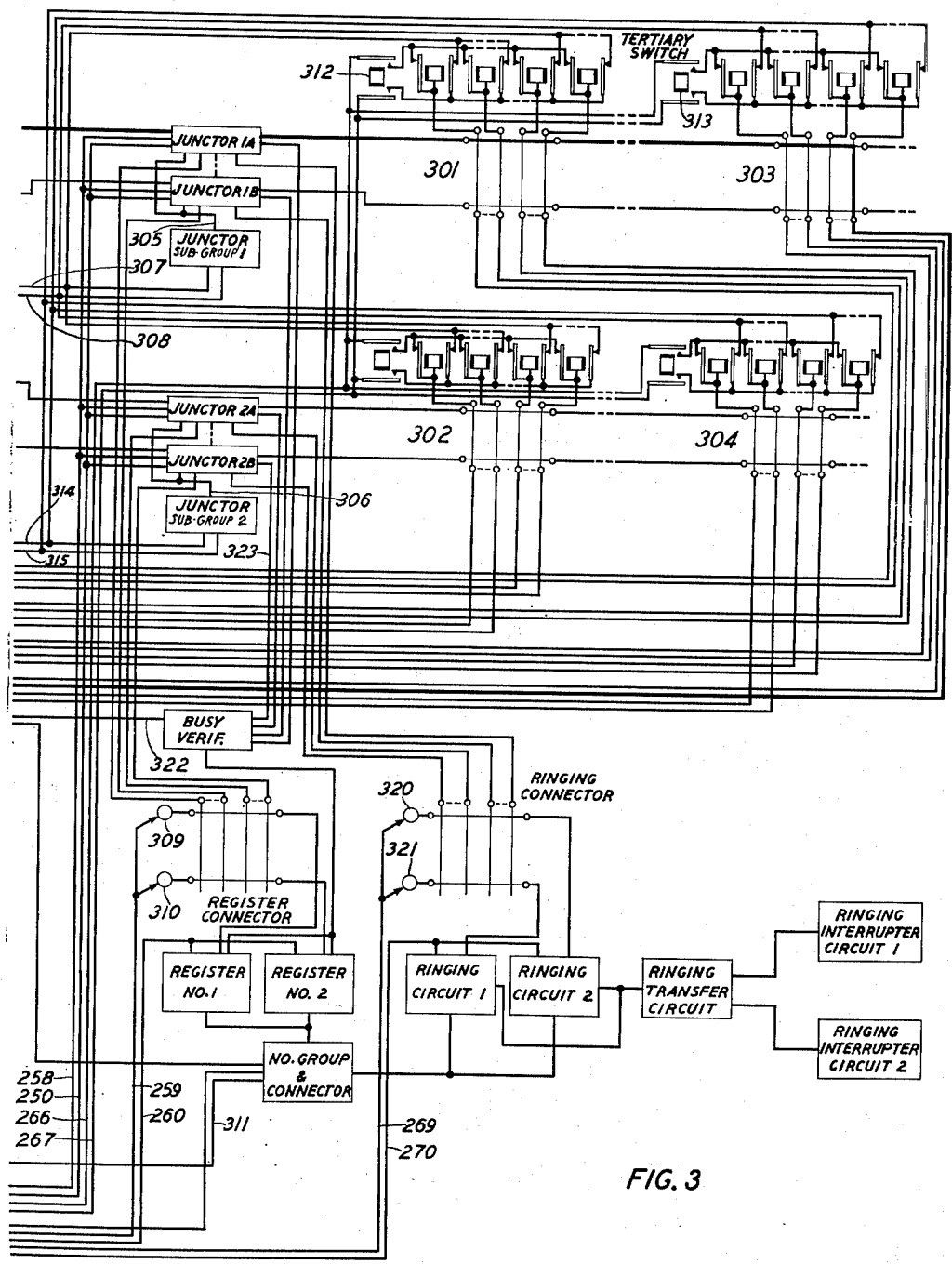
Figure 6:
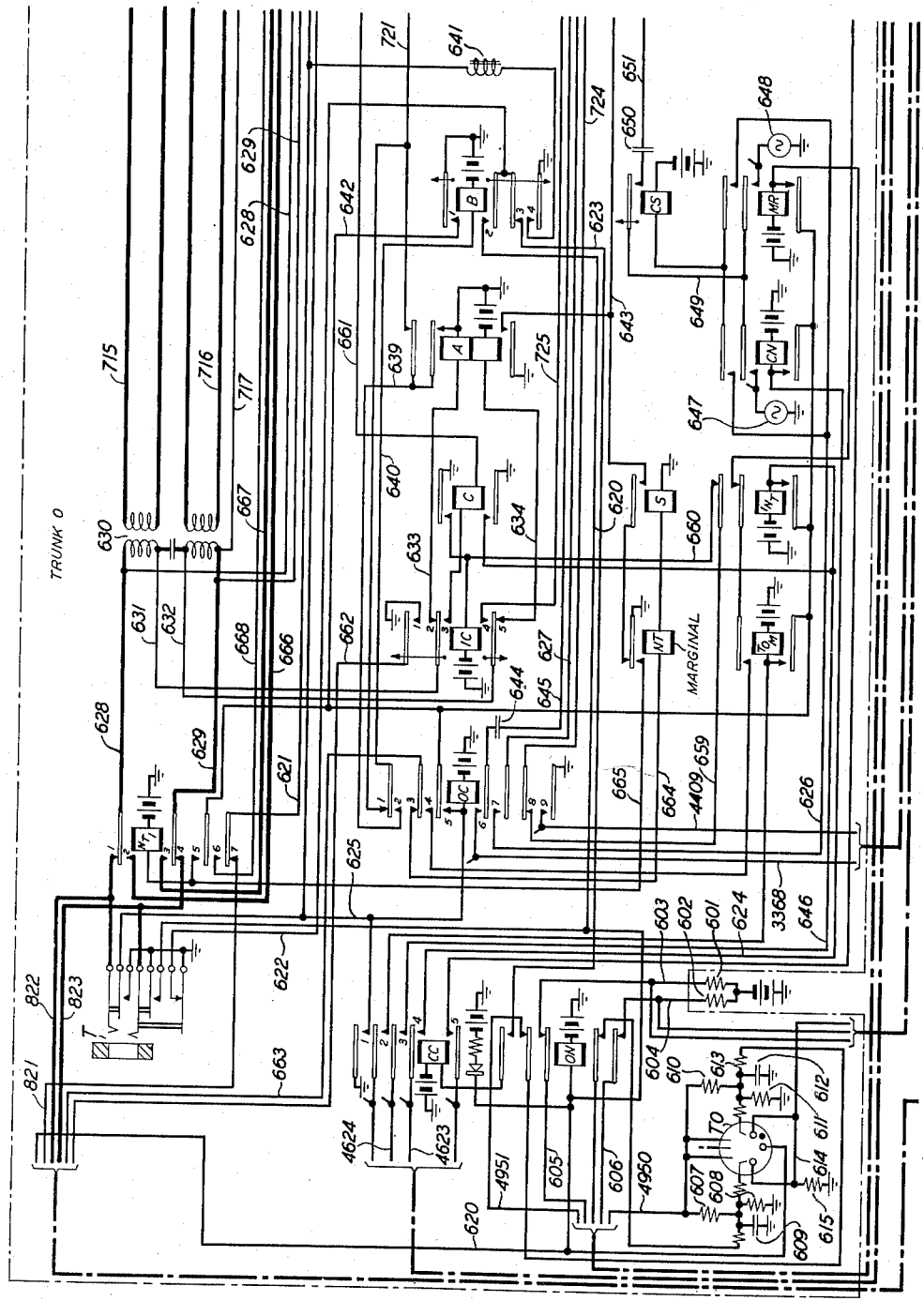
Figure 7:
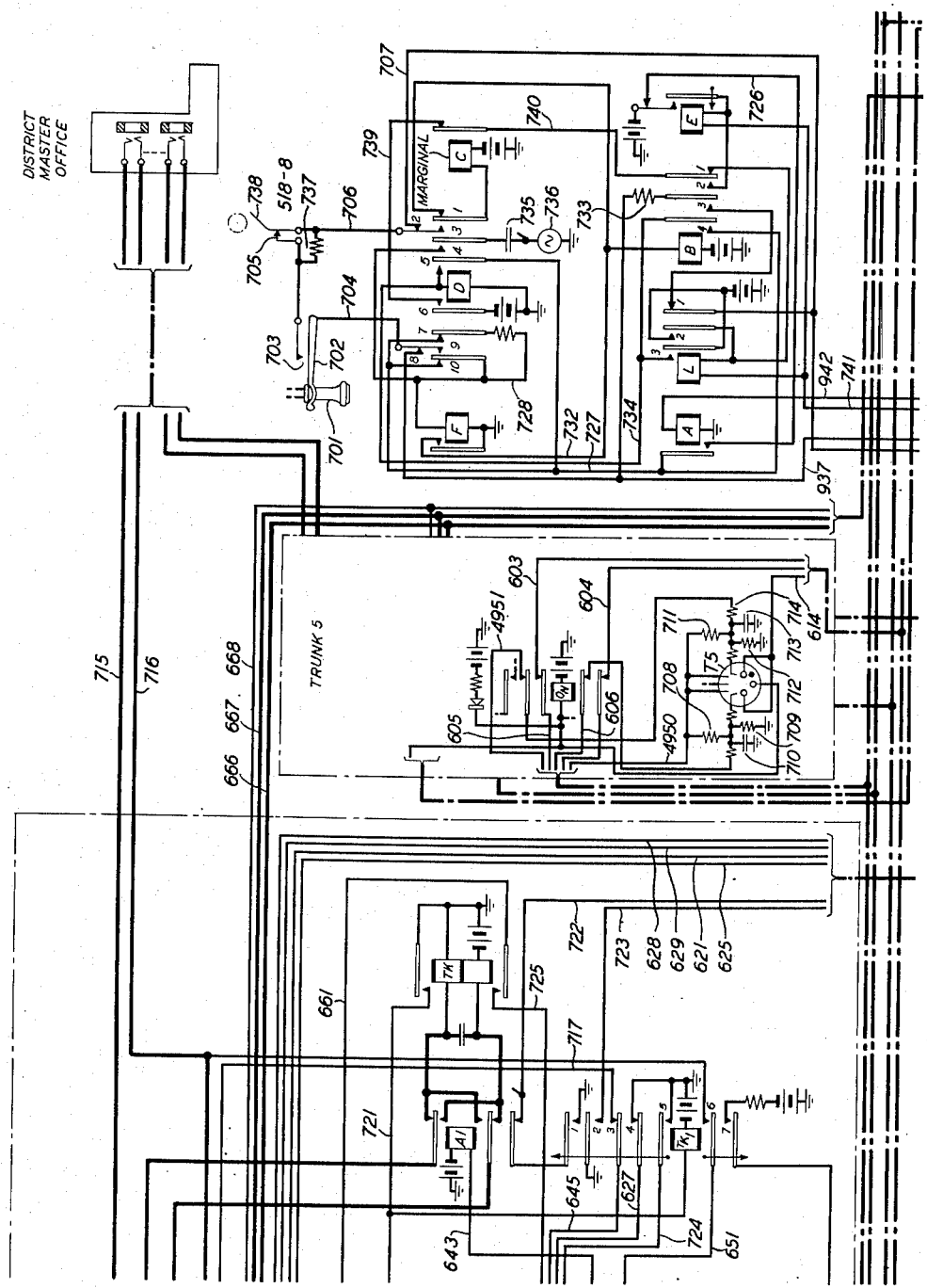
Figure 16:
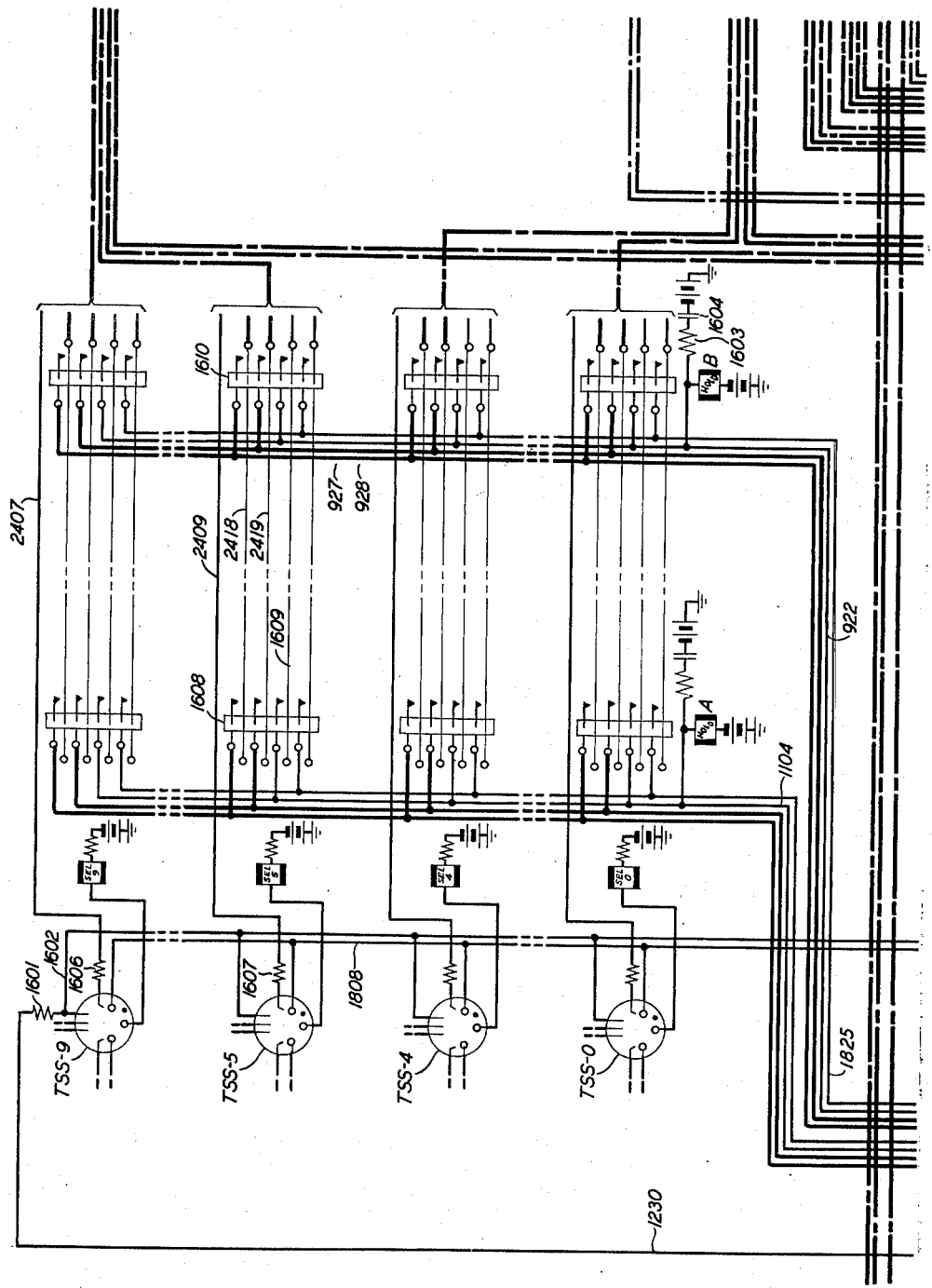
Figure 17:
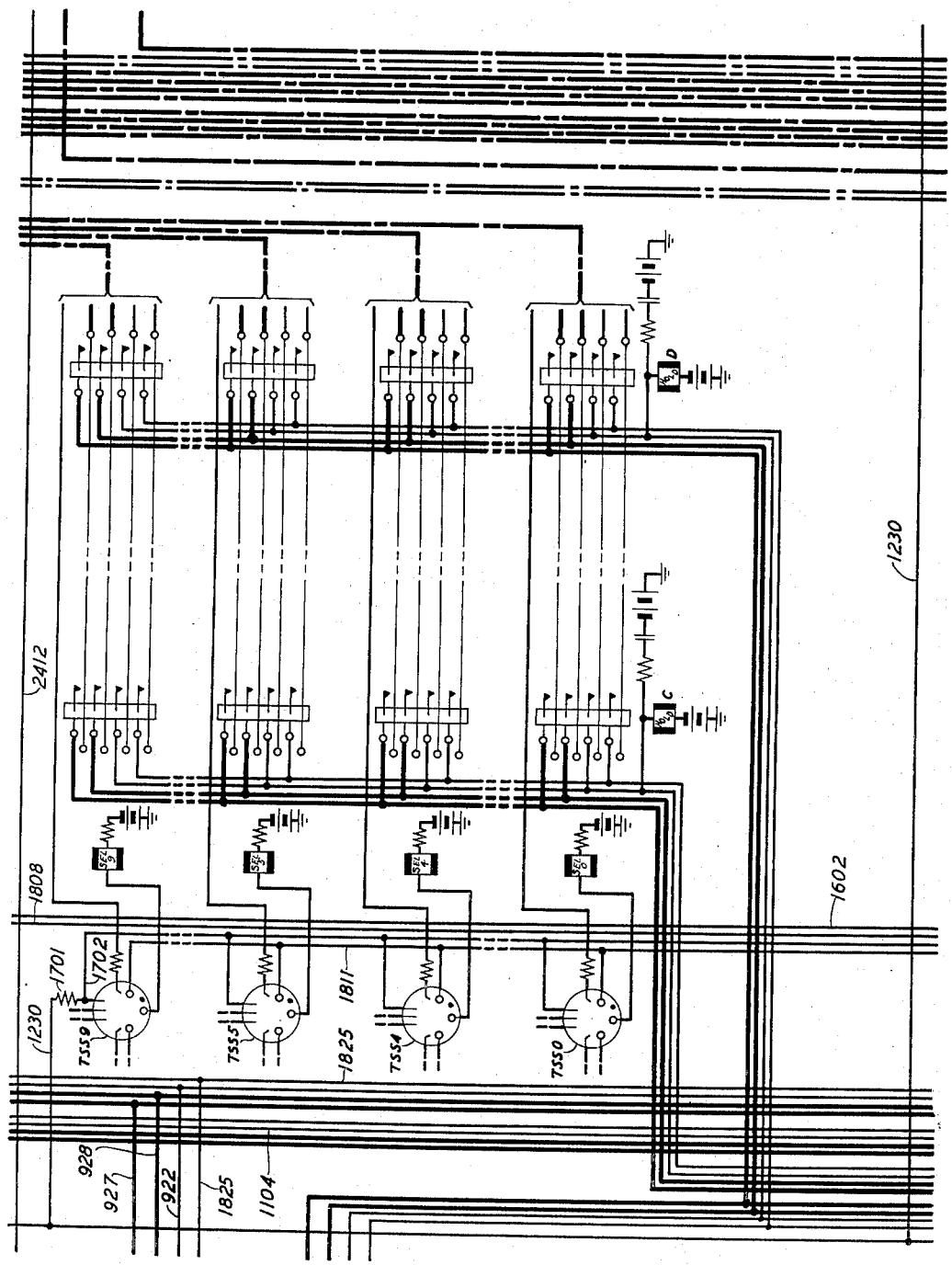
Figure 18:
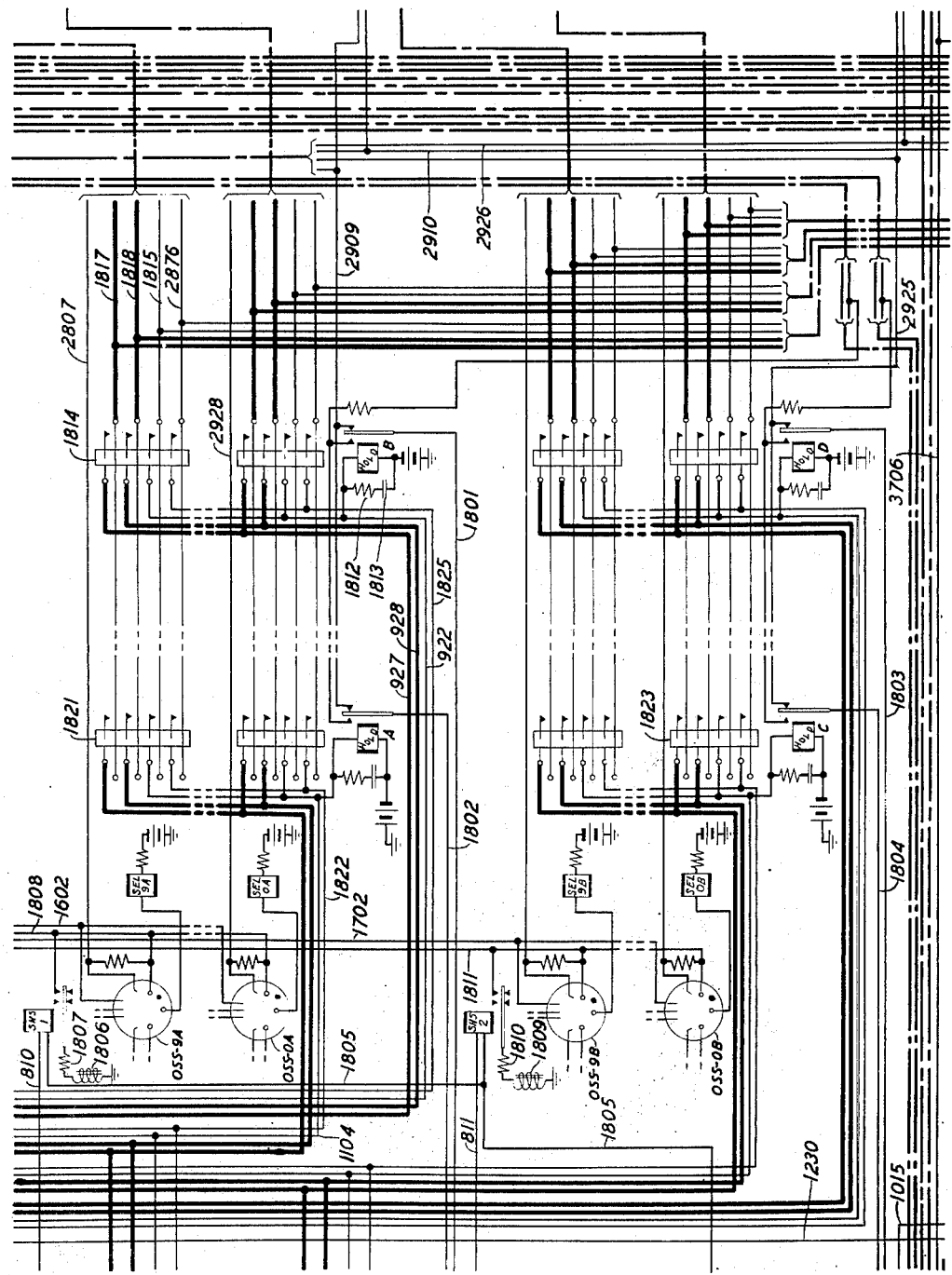
Figure 19:
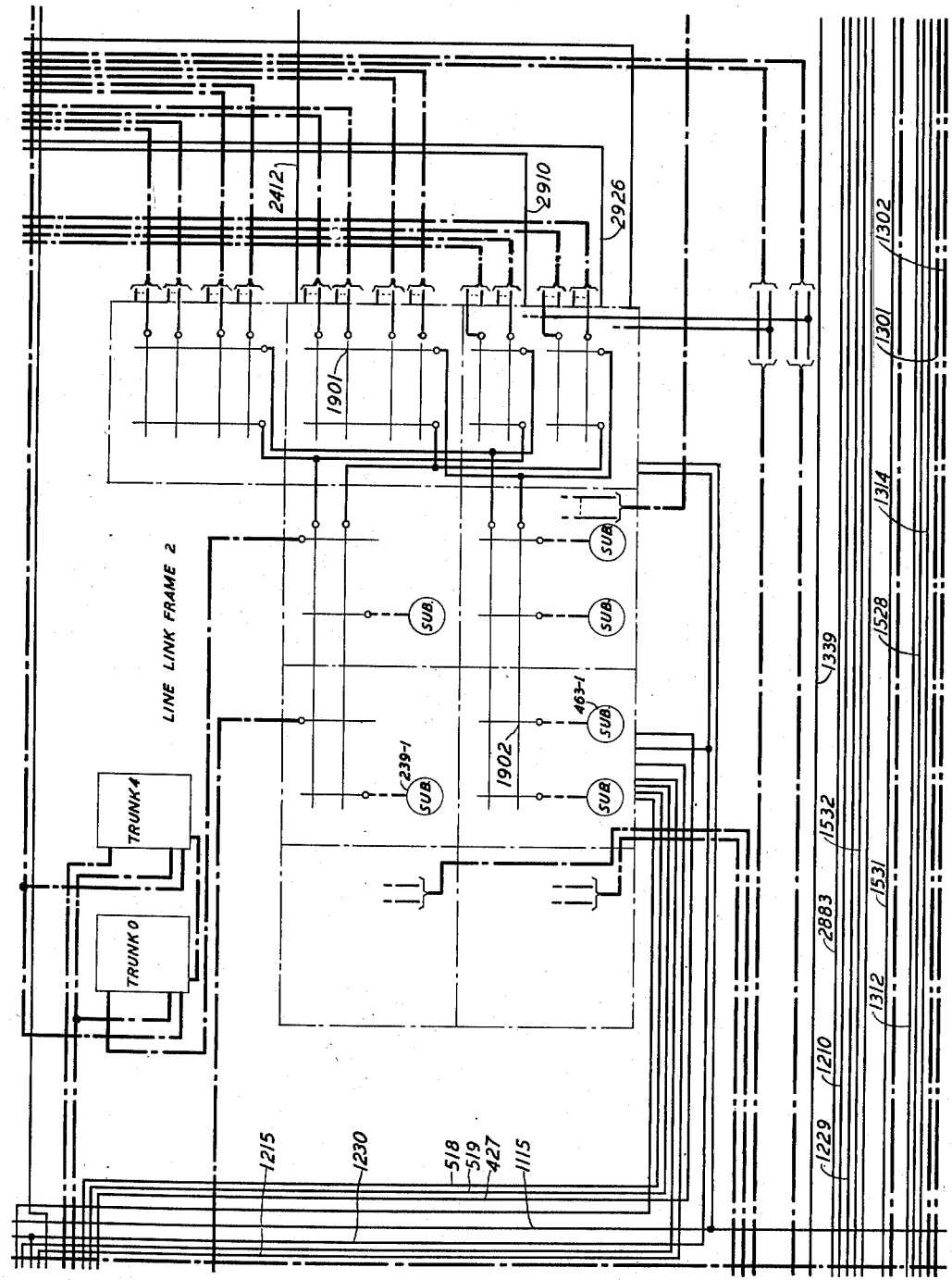
Figure 20:
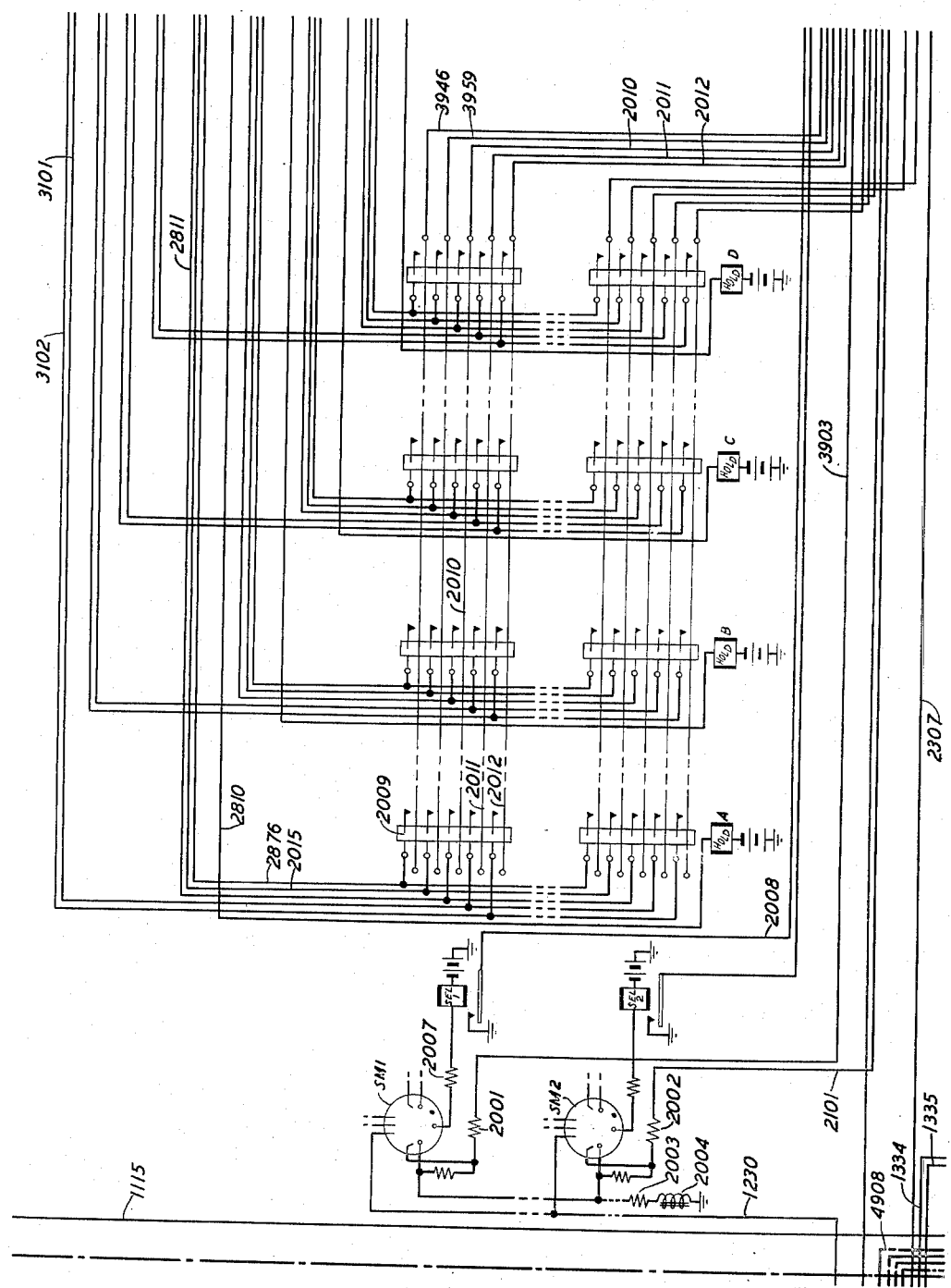
Figure 21:
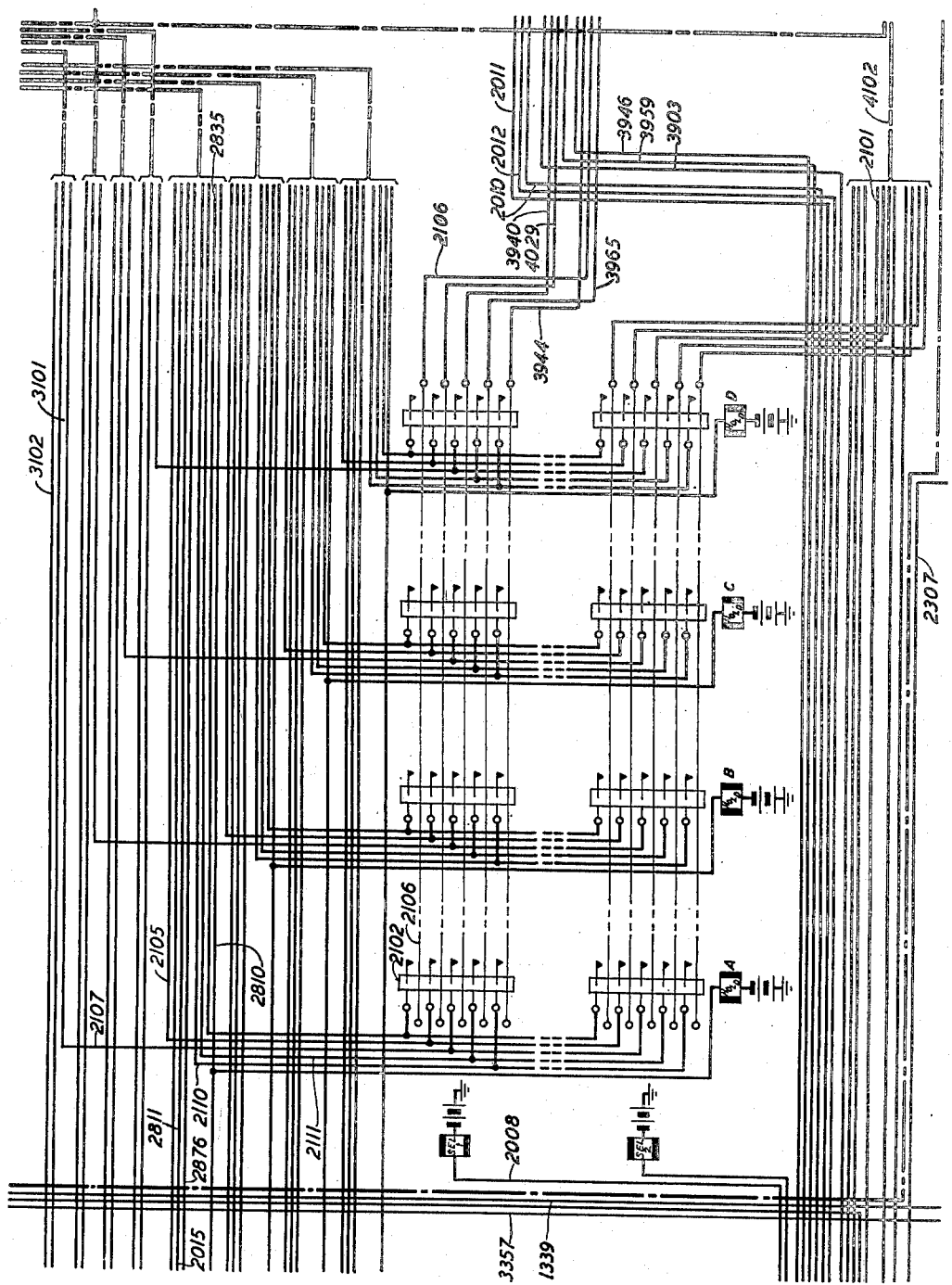
Figure 22:
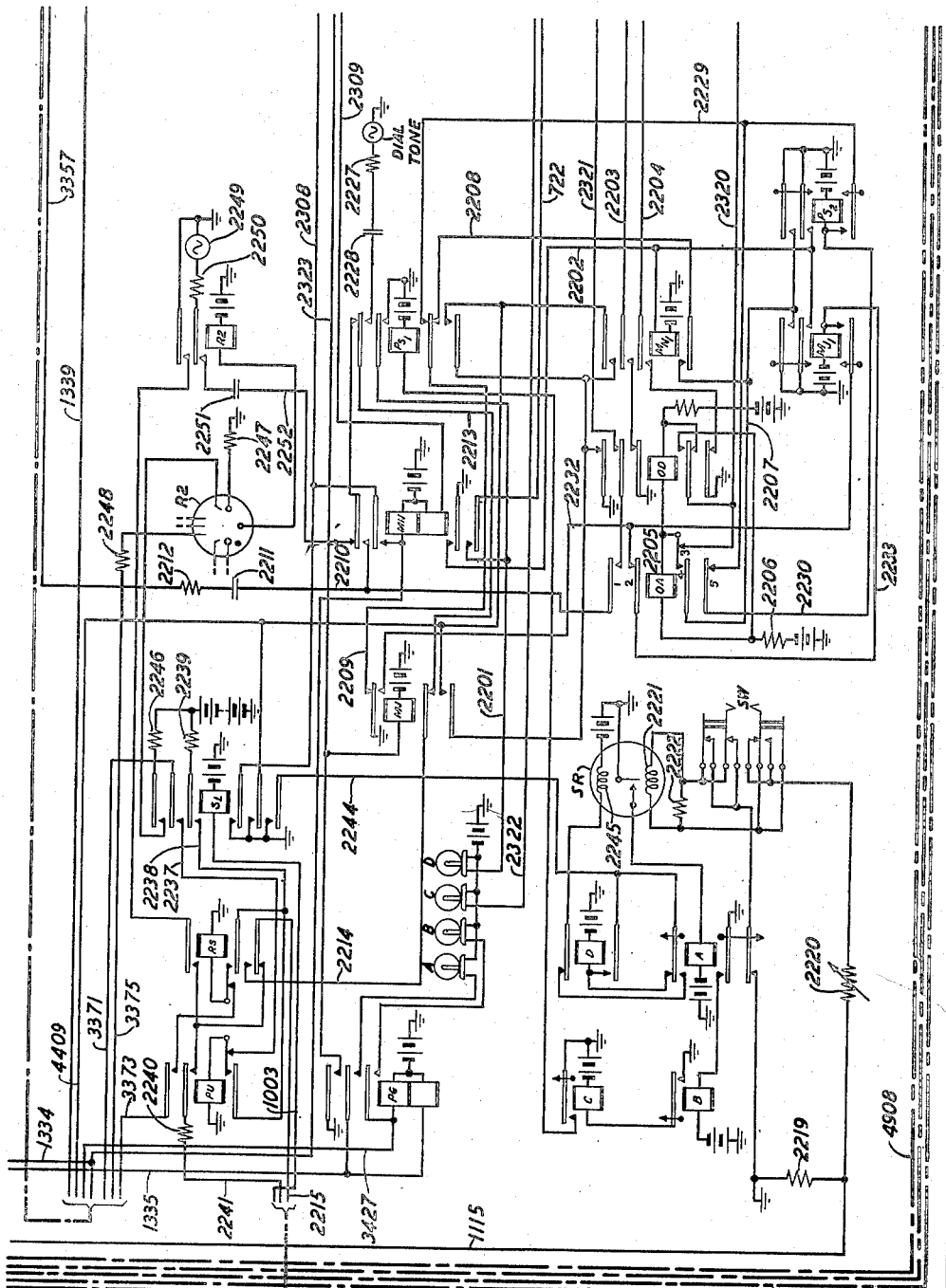
Figure 23:
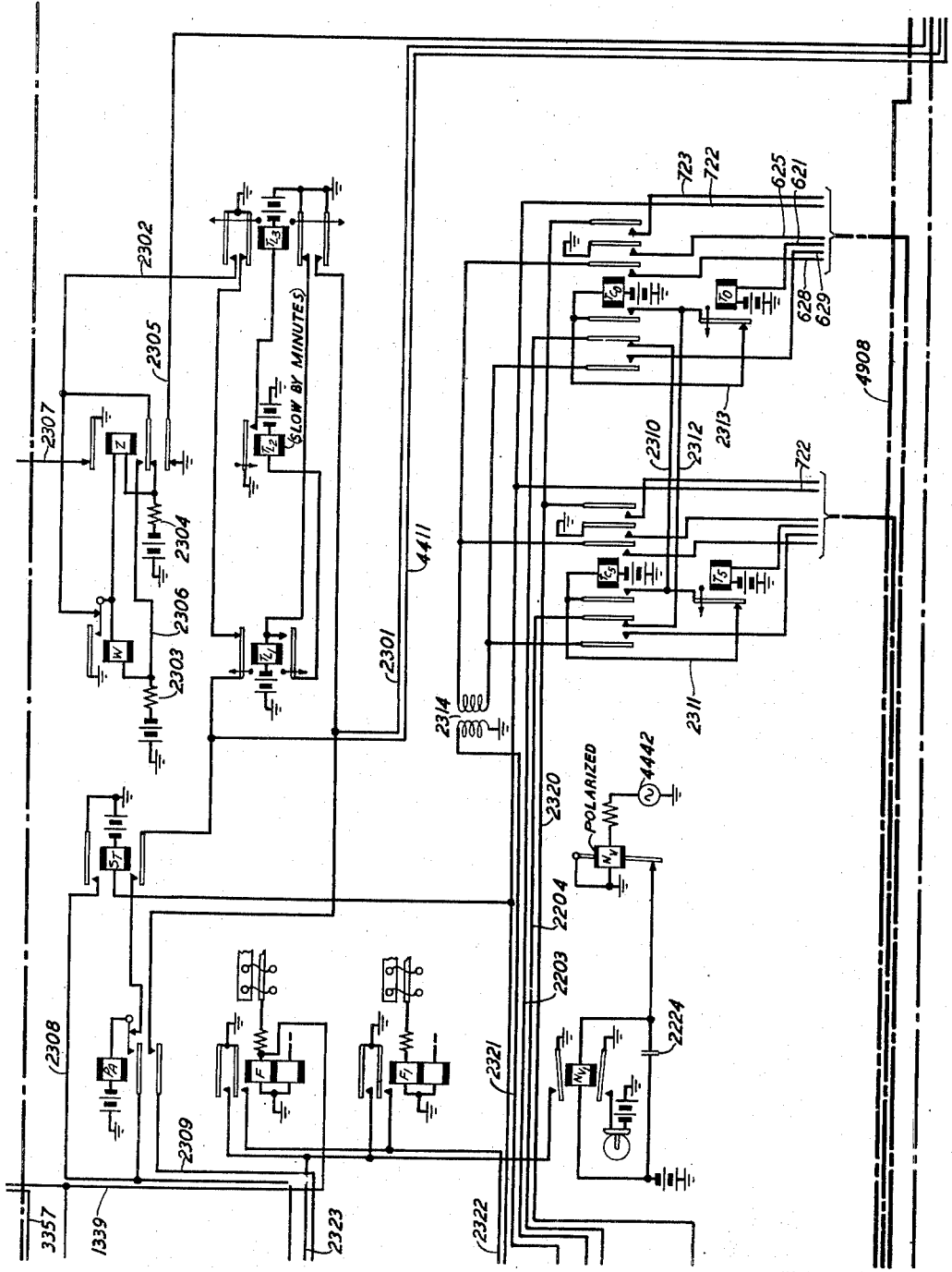
Figure 24:
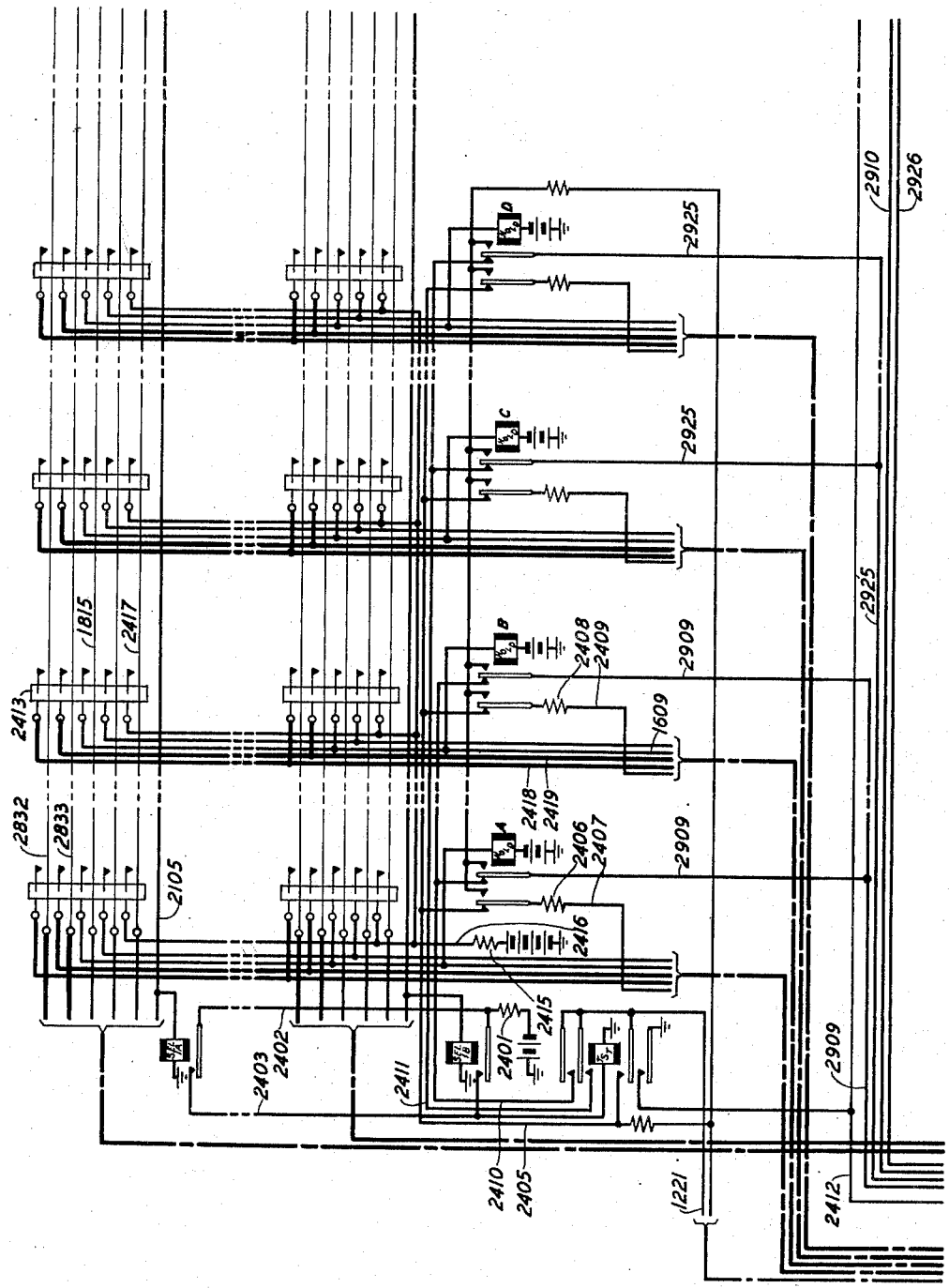
Figure 25:
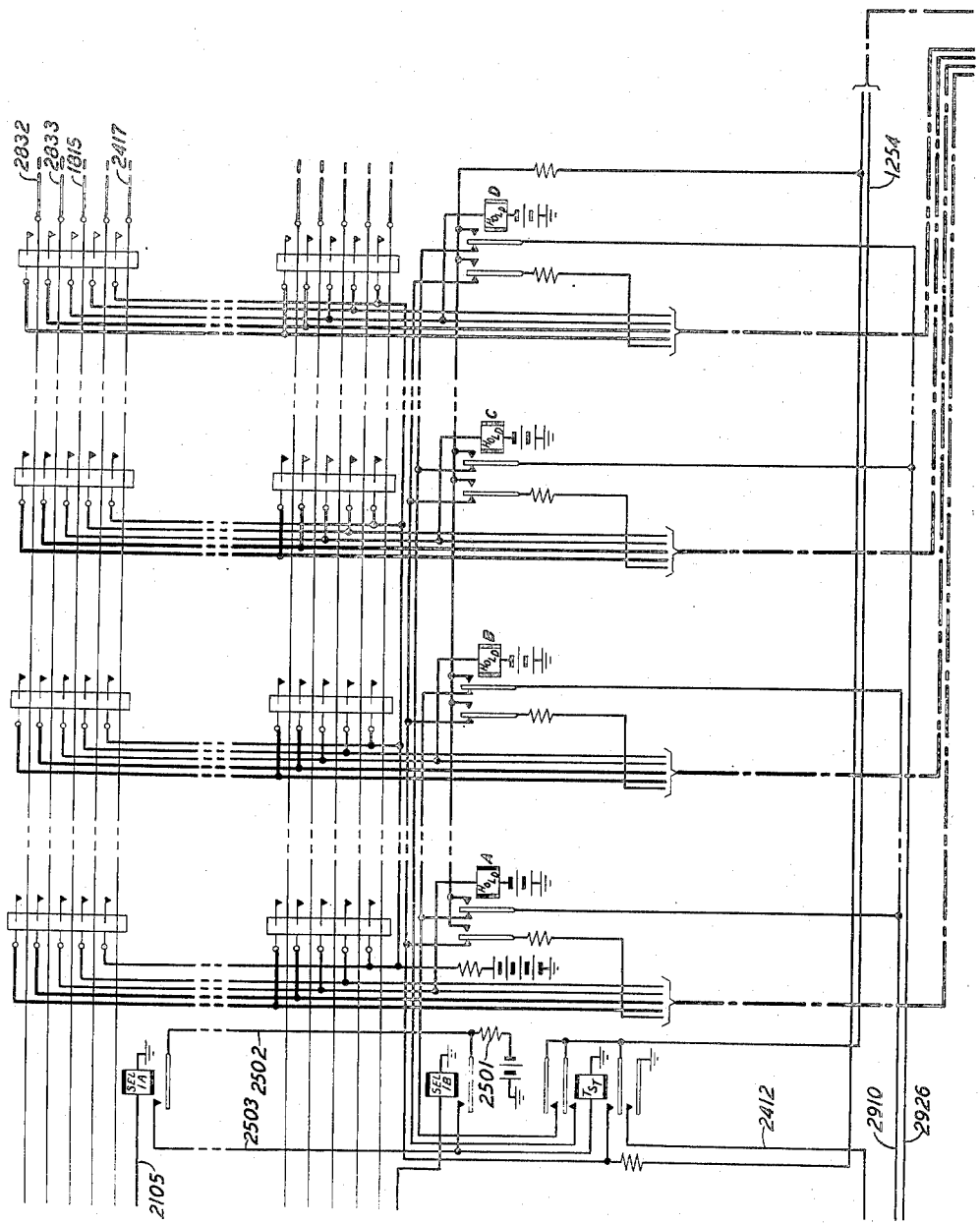
Figure 26:
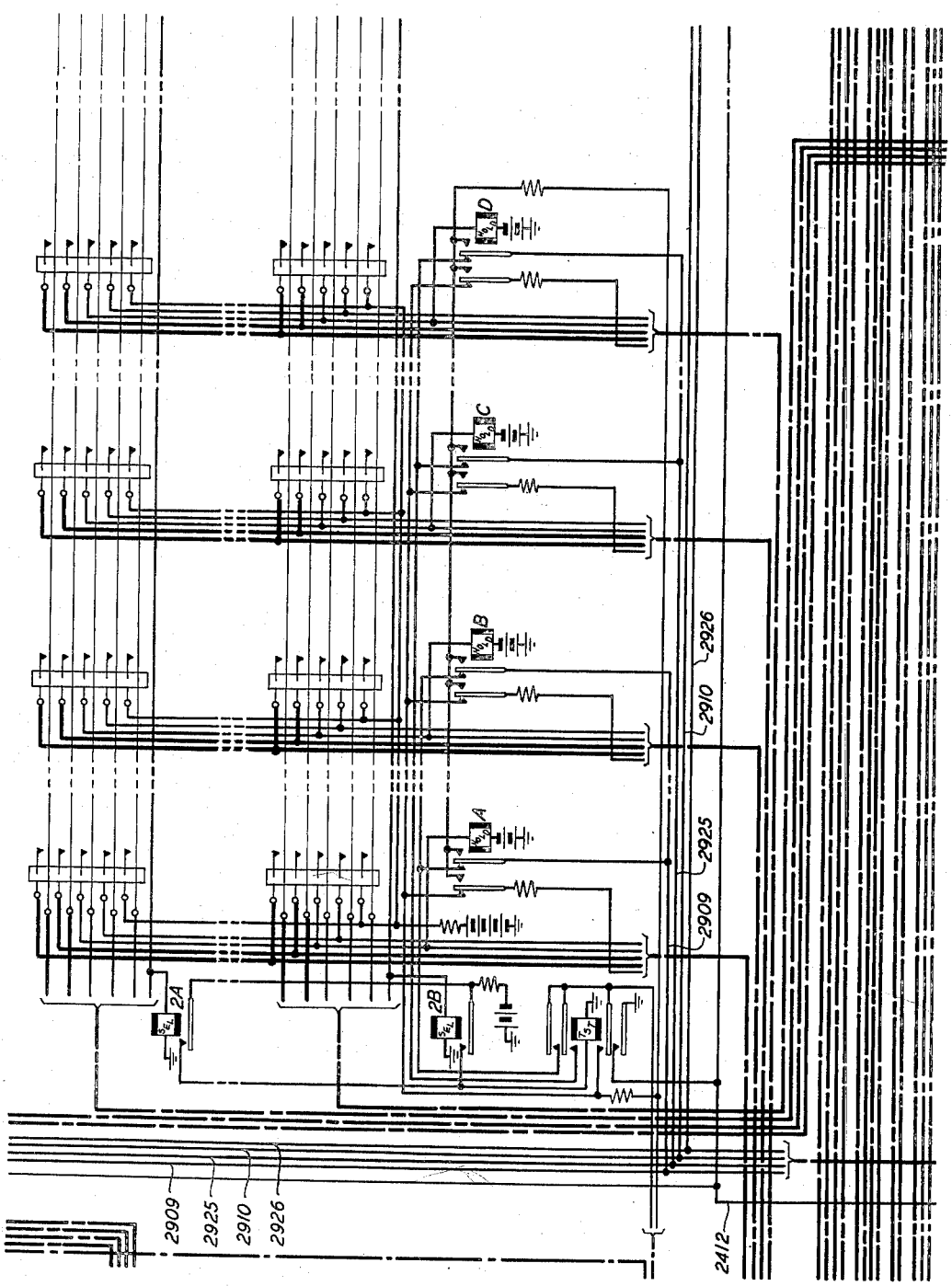
Figure 27:
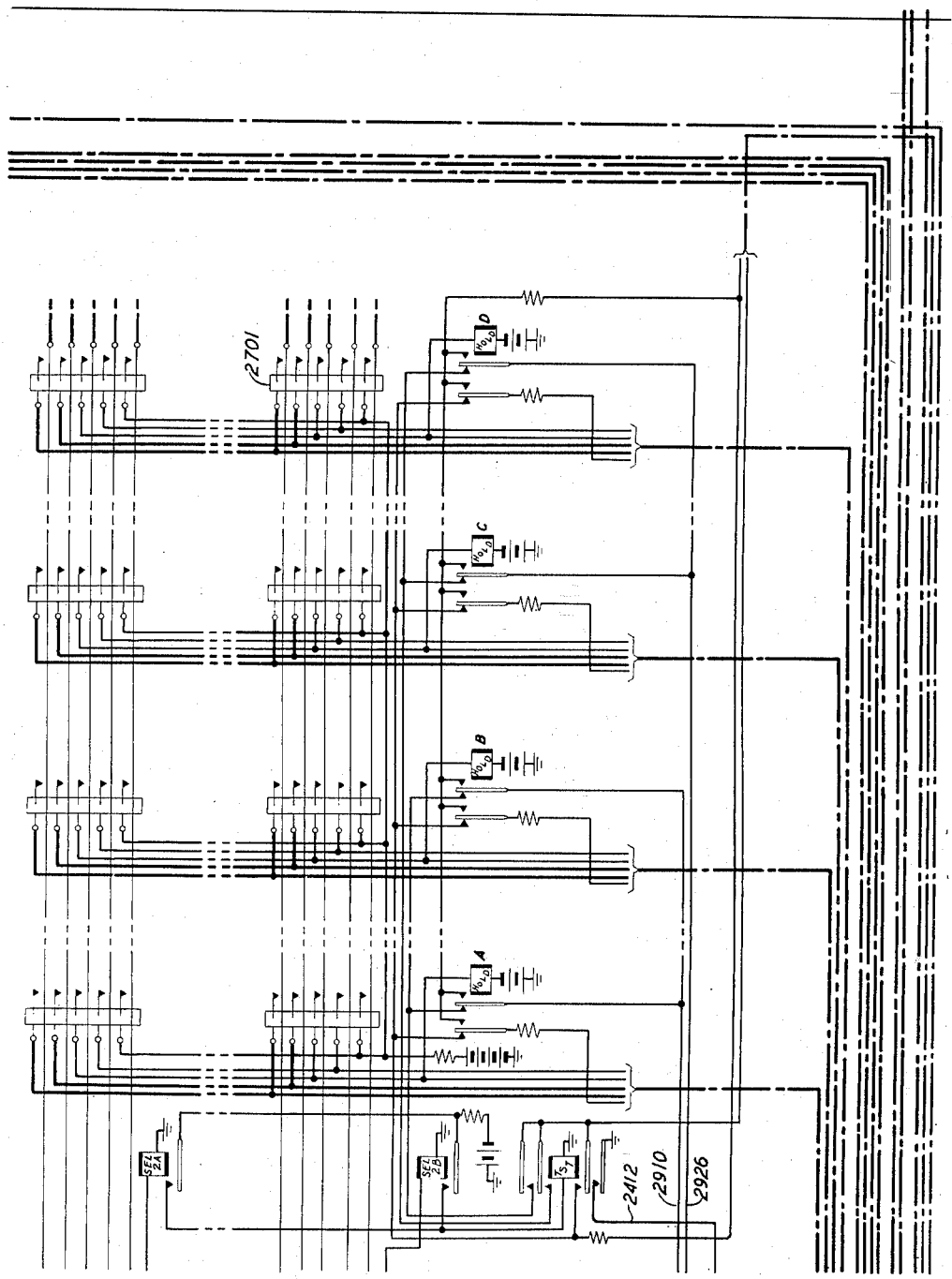
Figure 28:
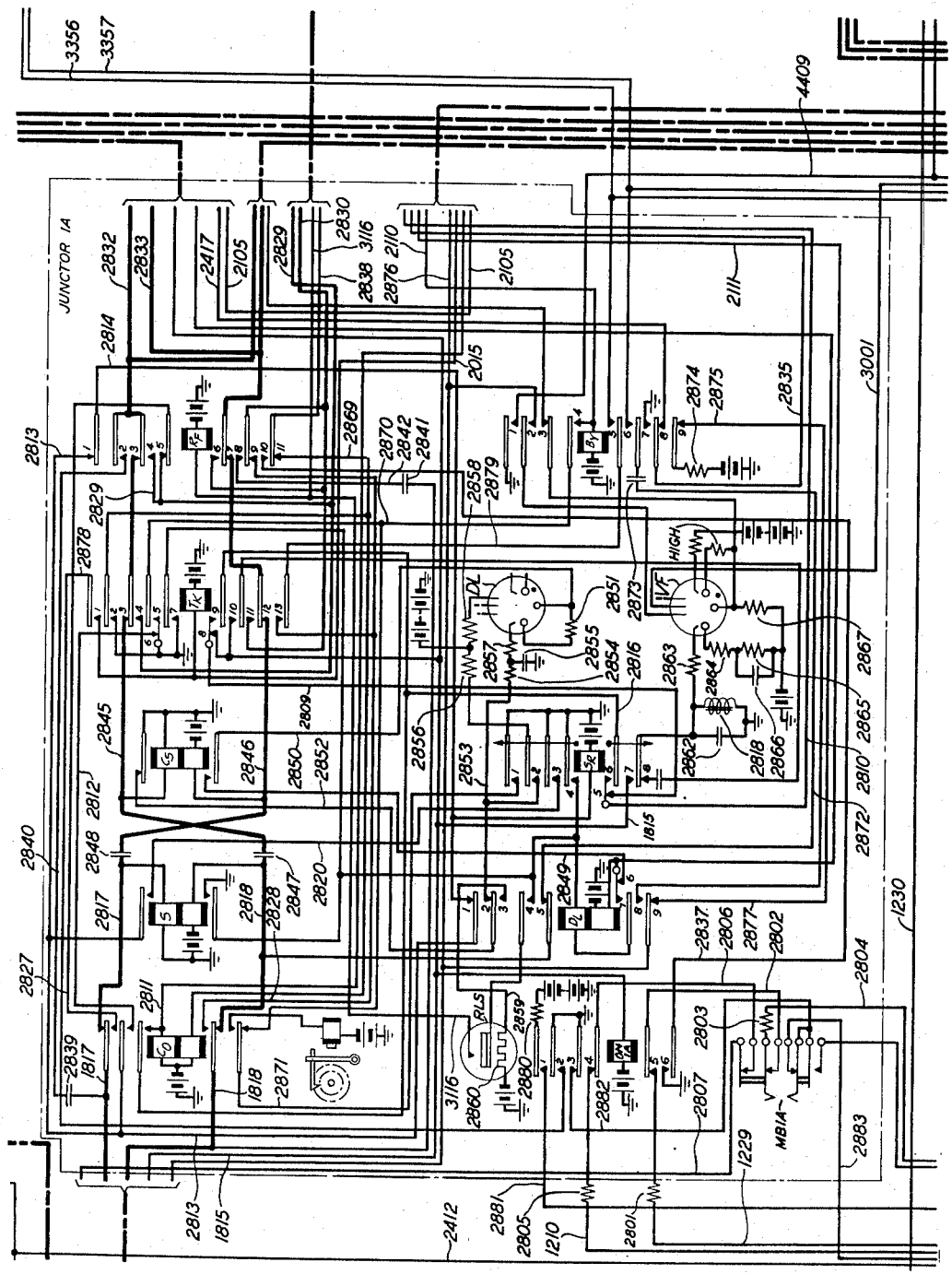
Figure 29:
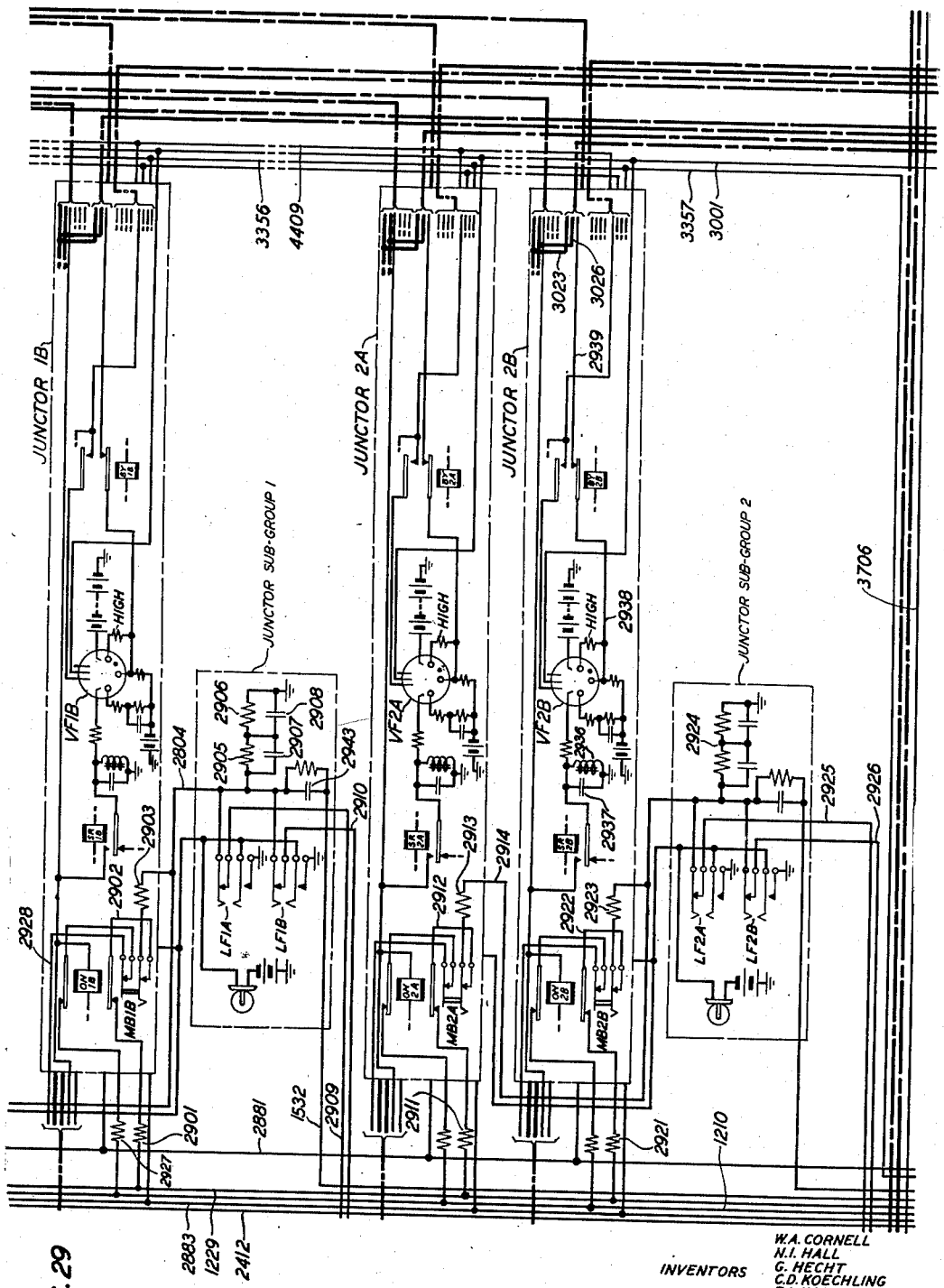
Figure 30:
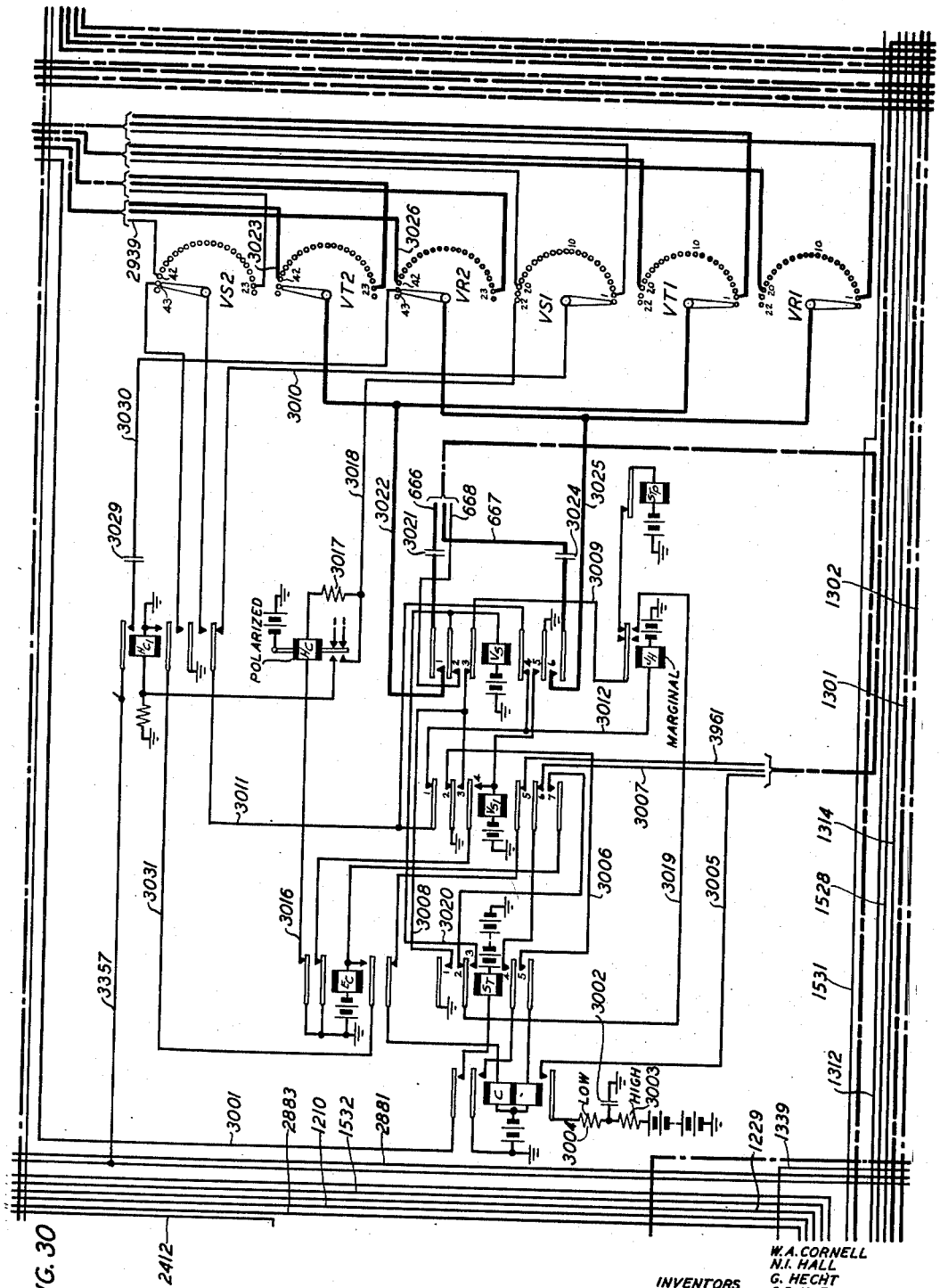
Figure 31:
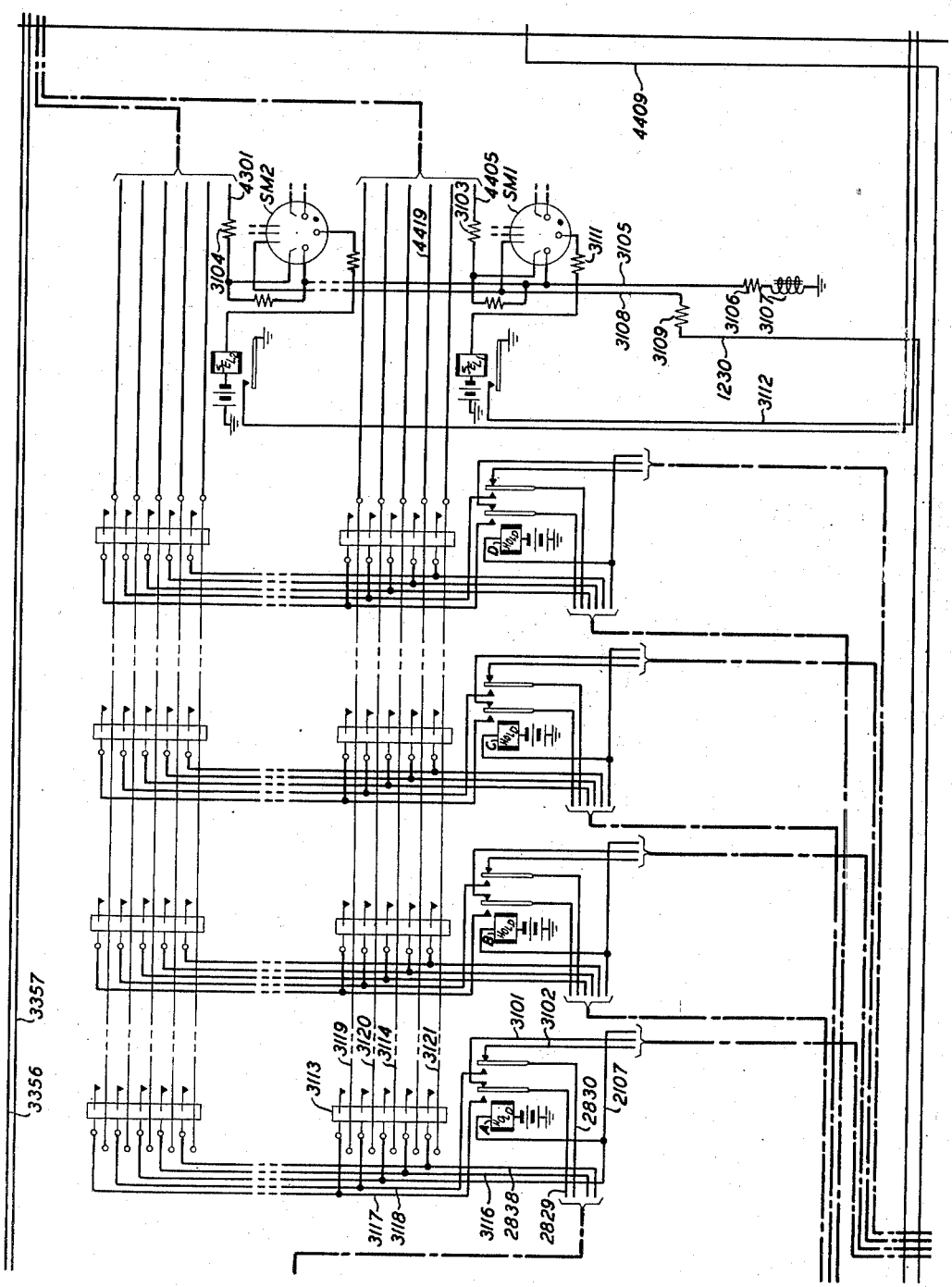
Figure 32:
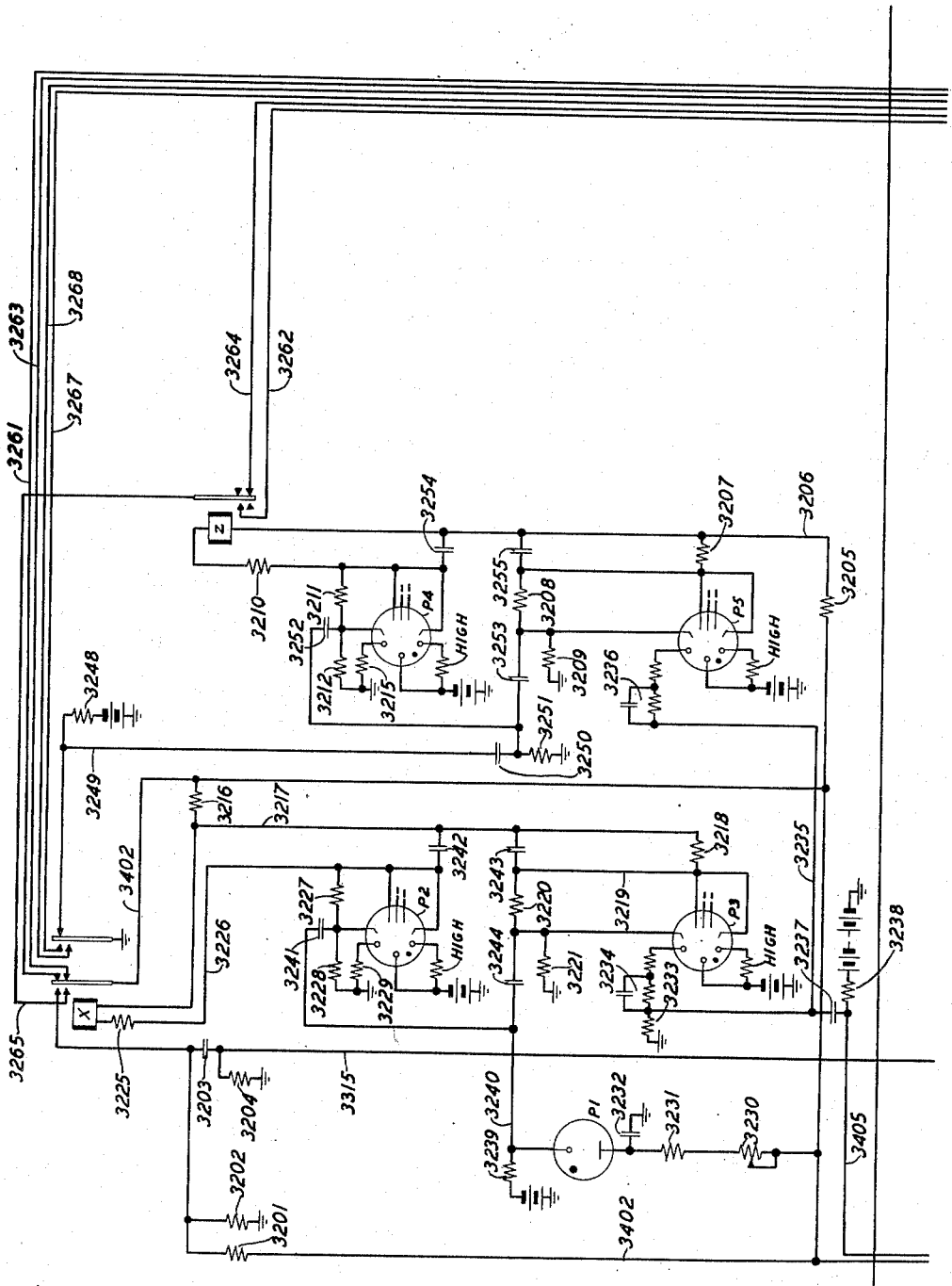
Figure 33:
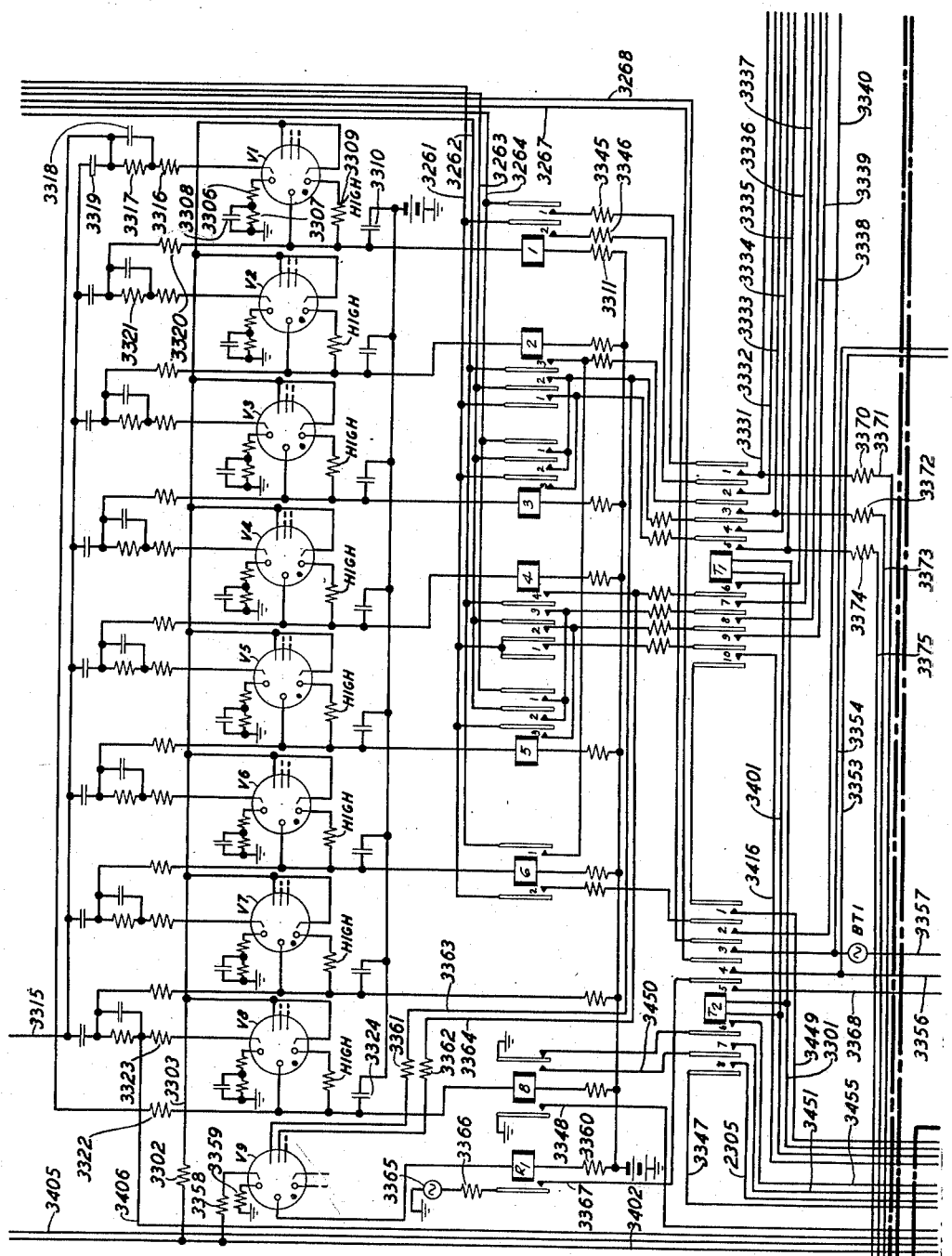
Figure 34:
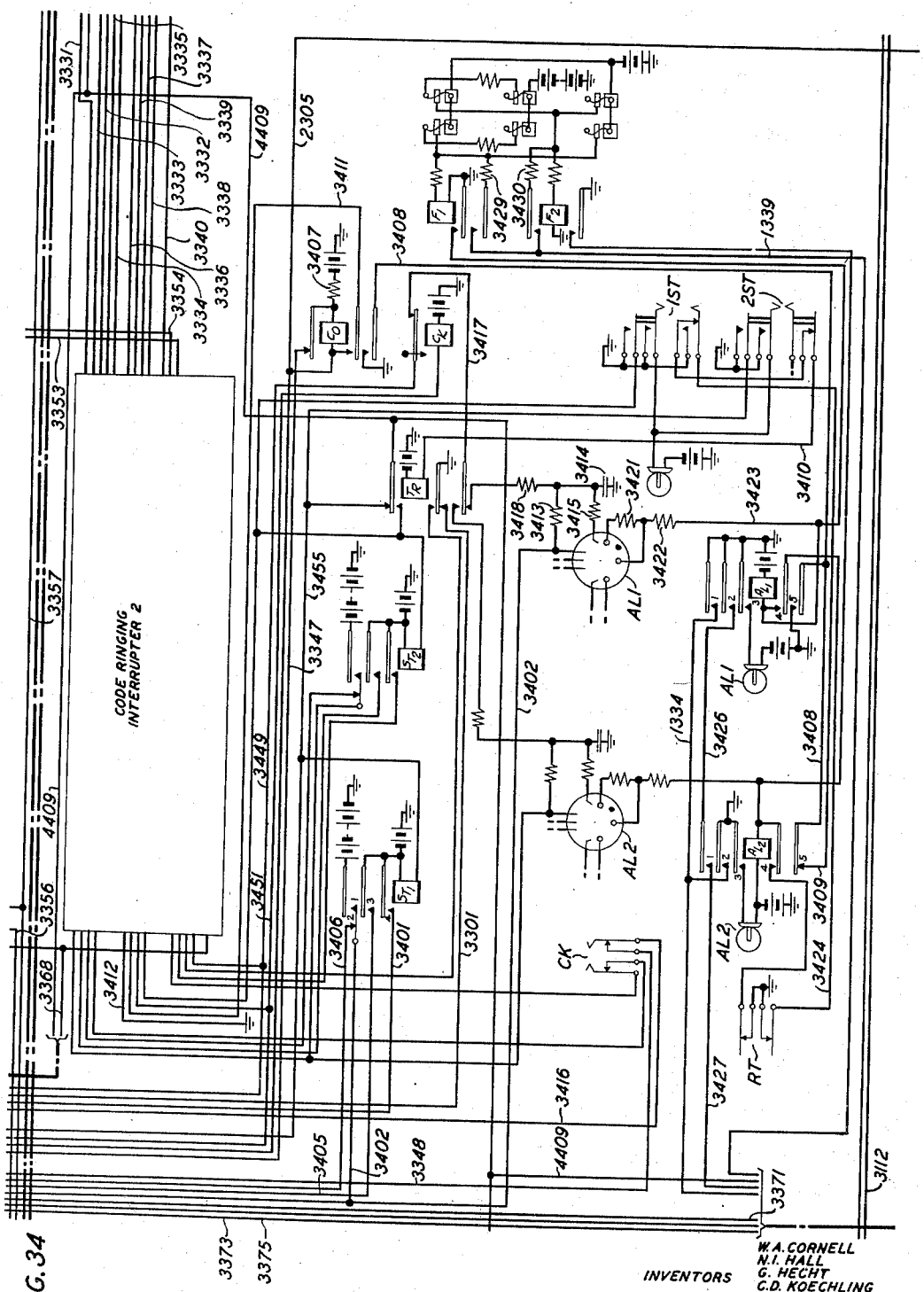
Figure 41:
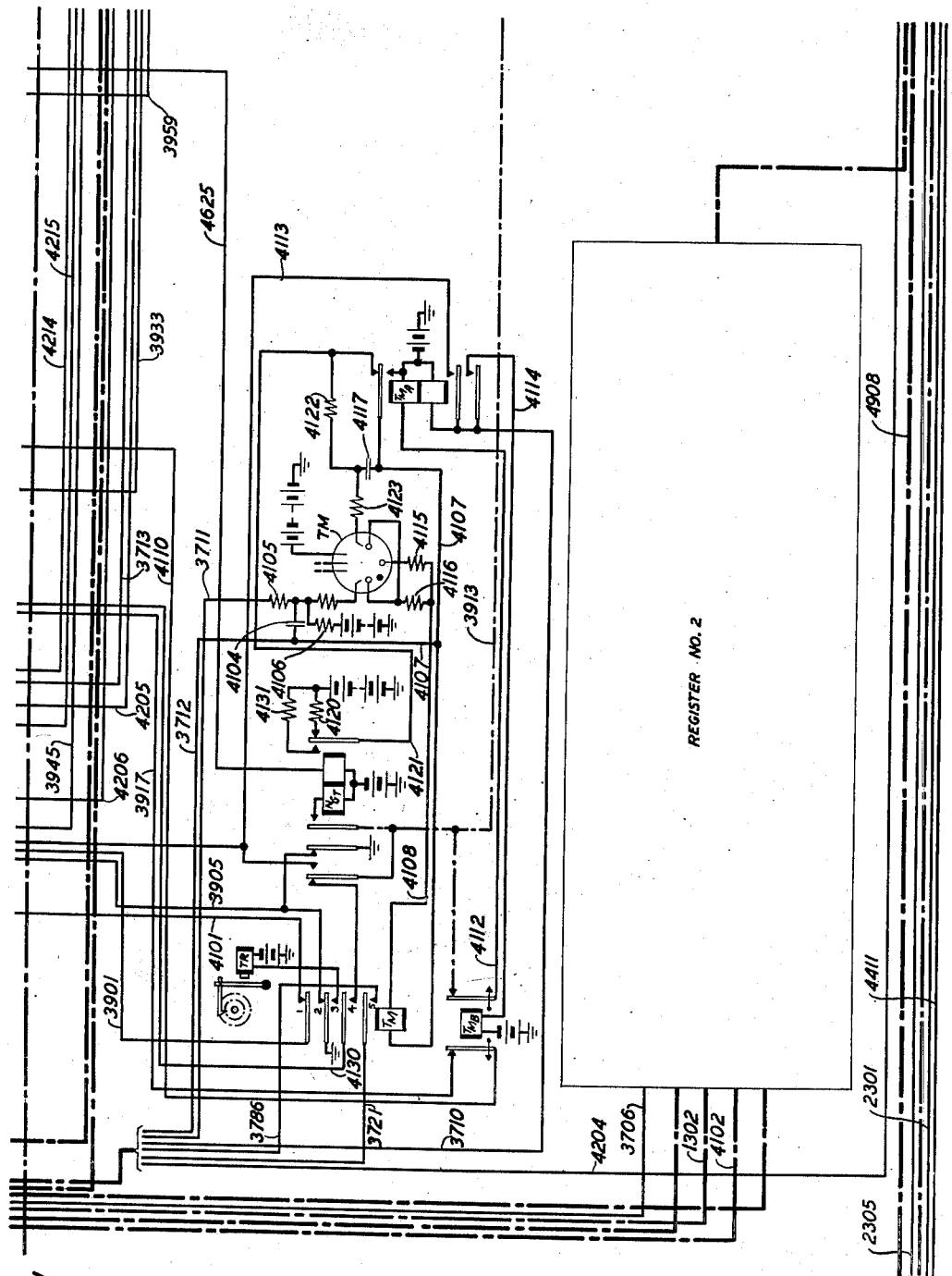
Figure 43:
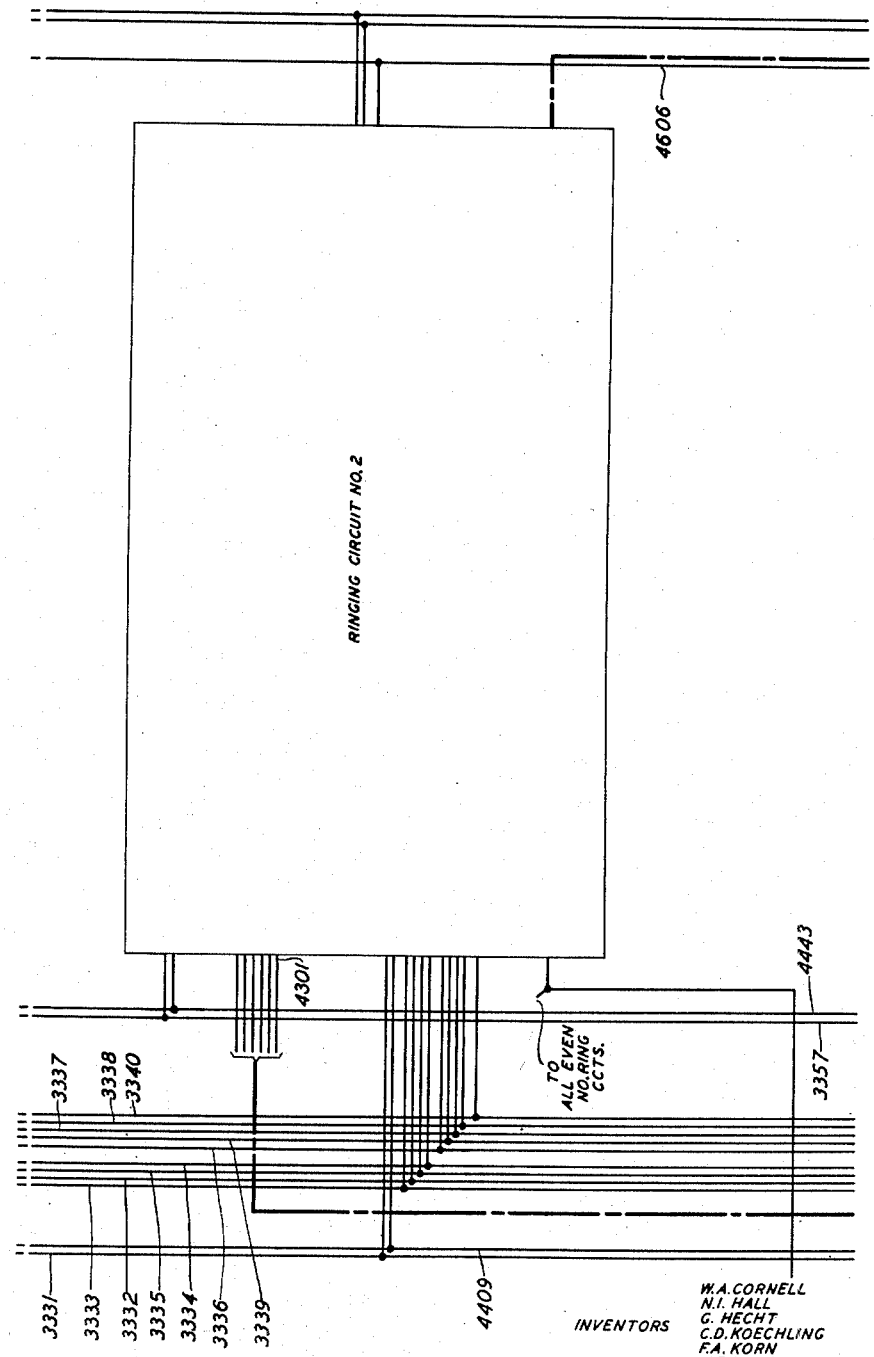
Figure 45:
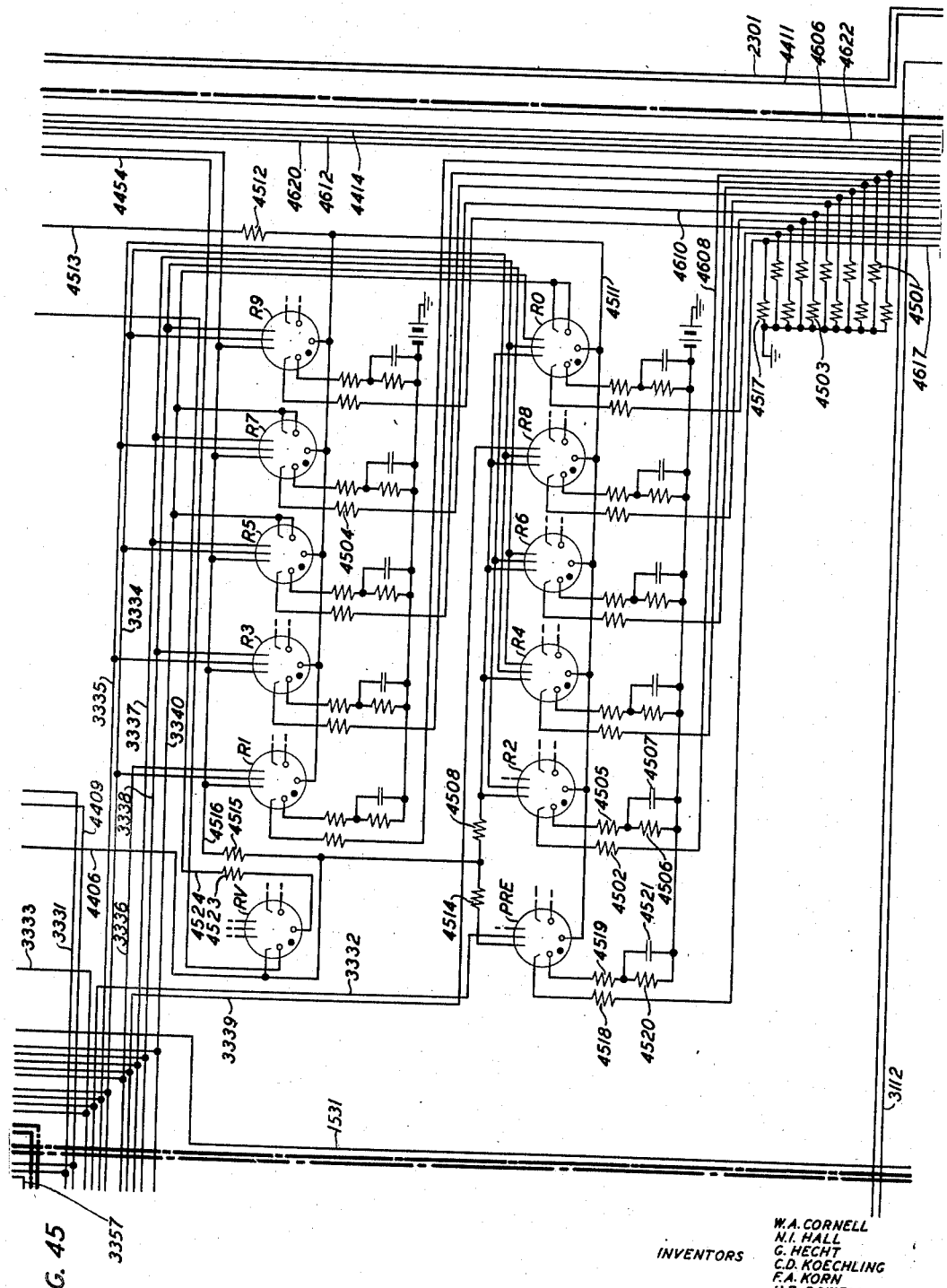

Figs. 6 and 7 disclose two-way operators' trunks, with Fig. 7 also showing an auxiliary portion of one of the line circuits;

Figs. 8 to 11, inclusive, show another portion of the first line-link frame;

Figs. 12 to 15, inclusive, show common release and time-out circuits;

Figs. 16 to 18, inclusive, show another portion of the first line-link frame;

Fig. 19 represents a portion of another line-link frame;

Figs. 20 and 21 disclose register connectors;

Figs. 22 and 23 show alarm, timing and miscellaneous circuits;

Fig. 24 shows another portion of the first line-link frame;

Fig. 25 shows a portion of the tertiary switches associated with and comprising a part of the second line-link frame;

Fig. 26 represents another portion of the first line-link frame;

Fig. 27 shows another portion of the tertiary switches shown in Fig. 25;

Figs. 28 and 29 show two groups of junctor circuits;

Fig. 30 discloses a busy-verification circuit;

Fig. 31 discloses a ringing connector;

Figs. 32 and 33 disclose a first ringing-interrupter circuit;

Fig. 34 is a representation of a second ringing-interrupter circuit embodying apparatus similar to that shown in Figs. 32 and 33, and also discloses a common ringing-interrupter transfer circuit;

Figs. 35 to 42, inclusive, show a register circuit, with Fig. 41 additionally containing a representation of a second register circuit;

Fig. 43 is a general representation of a ringing circuit;

Figure 44:
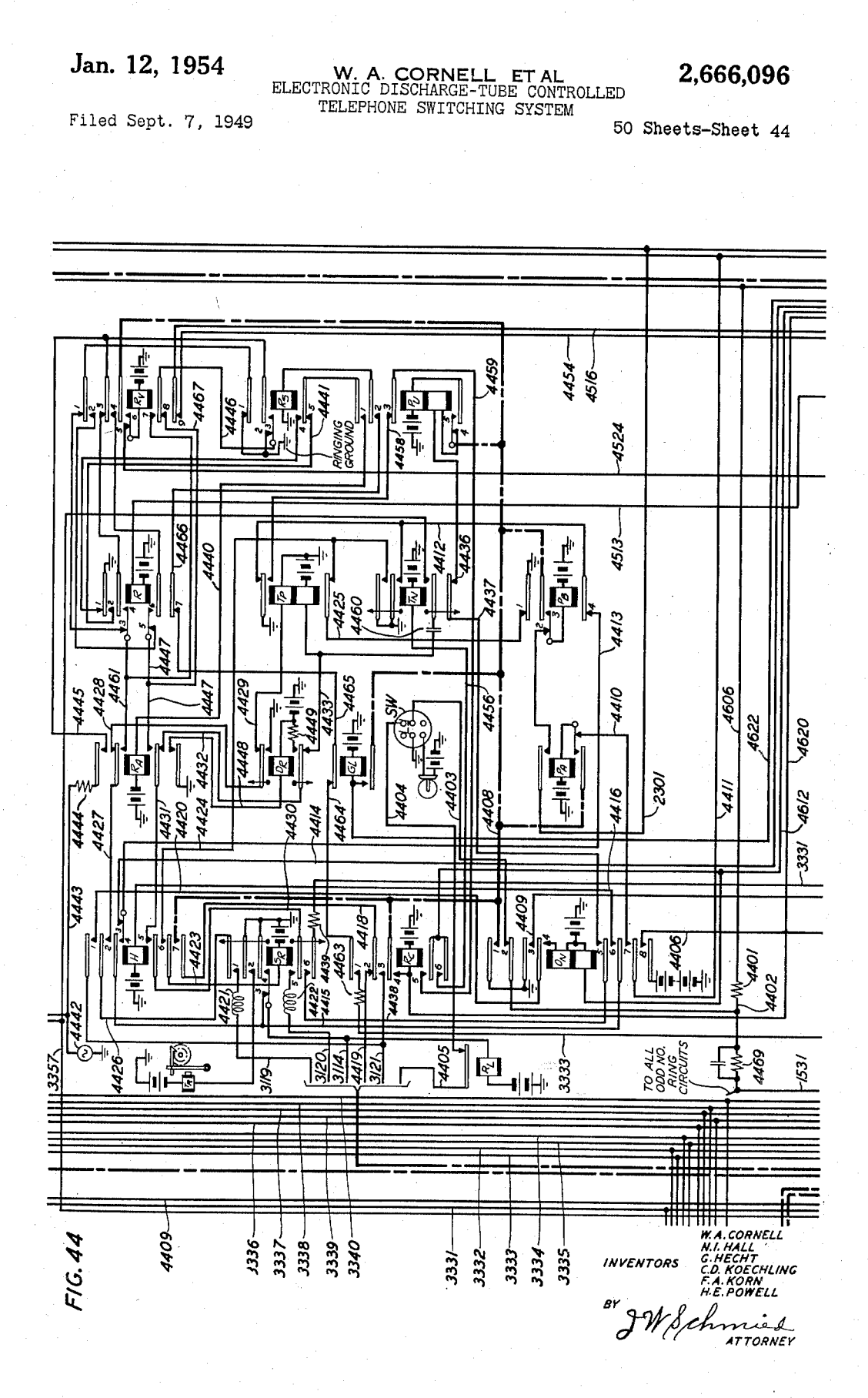

Figs. 44 and 45 show another ringing circuit in detail;

Figs. 46 to 49, inclusive, show a number group and connector circuit;

Fig. 50 demonstrates the manner in which Figs. 2 and 3 of the drawings should be arranged; and Fig. 51 is a chart showing exemplary ringing codes and the operation of the ringing-interrupter and ringing circuits.

GENERAL DESCRIPTION

Refer now to Figs. 2 and 3, arranged as shown in Fig. 50, which represent, in outline form, the various major elements of an exemplary system embodying the invention, and indicate the manner in which these elements cooperate to provide an automatic switching system operative automatically to interconnect the subscriber's lines associated therewith.

In the exemplary embodiment, certain of the switching operations are performed under the control of multielement gaseous discharge tubes. In addition to other utilizations thereof, one of these tubes is associated with each subscriber's line and with each trunk. A specific type of tube has been disclosed herein, although other types may be employed. The disclosed tube is provided with eight electrodes comprising a left-hand pair of control electrodes, a right-hand pair of control electrodes, three main anodes, and a main cathode. Normally, in the case of a tube associated with a subscriber's line, the left-hand control electrodes, the main cathode, and one of the main anodes are employed in the process of originating a call, the right-hand control electrodes, a different main anode, and the main cathode are employed in the process of terminating a call, and the main cathode and the remaining main anode are employed in controlling and determining the class of service of the associated subscriber's line.

In general, one or more line-link frames are provided, line-link frame No. 0 and line-link frame No. 1 being shown in Fig. 2. Each line-link frame comprises one or more horizontal groups, an upper and a lower horizontal group being shown for each line-link frame in Fig. 2. Each horizontal group comprises a primary switch, an originating secondary switch, a terminating secondary switch and a tertiary switch. Thus, line-link frame No. 0 is illustrated as having two horizontal groups, and comprises primary switches 220, 221, 222 and 223, terminating secondary switches 228 and 229, originating secondary switches 232 and 233, and tertiary switches 301 and 302. Line-link frame No. 1 is also illustrated as having two horizontal groups, and comprises primary switches 224 to 227, terminating secondary switches 230 and 231, originating secondary switches 234 and 235, and tertiary switches 303 and 304. It is to be understood that this equipment may be expanded as desired to meet particular requirements.

The switches employed as primary, secondary, and tertiary switches, and elsewhere in the system, are cross-bar or other form of coordinate switches. Details of a specific type or form of cross-bar switch mechanism suitable for use in the exemplary embodiment set forth herein are presented in United States Patent 2,021,329 granted to Reynolds on November 19, 1935.

The primary cross-bar switches such as 220 and 221 comprise a plurality of horizontal levels of contacts, conventionally ten, and a plurality of vertical rows of contacts, conventionally ten or twenty per switch, with any number of primary switches being provided intermediate the switches 220 and 221, 222 and 223, etc. A select magnet is associated with each horizontal level of contacts on each switch, and the select magnets associated with each horizontal level of all the primary switches in a horizontal group are controlled by a primary select gaseous discharge tube such as tube 236 or 237. A hold magnet is associated with each vertical row of contacts on each switch, and the hold magnet associated with each vertical level of each primary switch is controlled, in part, by a primary line tube such as tube 238 or 239. Each primary switch vertical row and the associated primary line tube is individual to a subscriber's line, to a trunk, or to a plurality of other types of ultimate equipment as will be seen. For example, the first and last vertical rows of contacts in primary switch 220 and the associated primary line tubes 238 and 239 are individual to the subscribers' lines 201 and 202, respectively, the first and last vertical rows of contacts in primary switch 222 and the associated primary line tubes 240 and 241 are individual to lines extending to a private branch exchange switchboard, and the first vertical rows of contacts in primary switches 224 and 225 and the associated primary line tubes 242 and 243 are individual to lines extending to trunk circuit No. 0 and to trunk circuit No. 5, respectively. There is no necessary correlation between the lines and the position at which they appear on the primary switches within the system, and the above-described association is merely representative.

The horizontal levels of contacts of each group of primary line switches and the vertical rows of contacts in the originating secondary and terminating secondary switches are interconnected by conductors customarily called "line links." These primary-secondary line links provide paths for establishing connections between the subscribers or trunks and the secondary switches and are distributed over the vertical rows of both the originating secondary and terminating secondary switches, as shown in Fig. 2.

A select magnet is associated with each horizontal level of contacts of each originating secondary switch, and these originating secondary select magnets are controlled by individual originating secondary select tubes such as tube 244 or tube 245. The horizontal levels of each of the originating secondary line switches are multipled to the corresponding horizontal levels of corresponding originating secondary line switches in other line-link frames. For example, the upper and lower horizontal levels of originating secondary switch 232 in line-link frame No. 0 are multipled, respectively, to the upper and lower horizontal levels of the corresponding originating secondary line switch 234 in line-link frame No. 1. These multipled originating secondary switch horizontal levels are then connected to individual junctors, e. g., the multipled upper horizontal levels of originating secondary switches 232 and 234 are connected to junctor 1A in Fig. 3, the multipled lower horizontal levels of originating secondary switches 233 and 235 are connected to junctor 2B in Fig. 3, and so on. Thus, the originating secondary select tubes such as 244 and 245 in effect control the selection of a particular associated junctor.

The junctors are divided into two groups with junctors 1A and 1B being a part of junctor subgroup No. 1 and associated with junctor subgroup circuit No. 1, and with junctors 2A and 2B being a part of junctor subgroup No. 2 and associated with junctor subgroup circuit No. 2. It is to be understood that a junctor subgroup comprises a plurality of individual junctors and that more than two subgroups of junctors may be provided.

The terminating end of each junctor is linked to a horizontal level of contacts of one of the tertiary switches, and this horizontal level is multipled to the corresponding horizontal levels of contacts in the corresponding tertiary switches in the other line-link frames. For example, junctor 1A is linked to the upper horizontal level of contacts of tertiary switch 301 which is a part of line-link frame No. 0, and this horizontal level is multipled to the corresponding horizontal level of contacts of tertiary switch 303 which is a part of line-link frame No. 1.

The tertiary switches are of the cross-bar or coordinate type and are accordingly provided with select and hold magnets associated with their horizontal levels and vertical rows of contacts, respectively.

The horizontal levels of contacts of the terminating secondary switches in each line-link frame are linked to and distributed over the vertical rows of contacts of the tertiary switches in the same line-link frame. Thus, as an exemplary arrangement, the upper group of horizontal levels of contacts in the terminating secondary switches 228 and 229 in the line-link frame No. 0 are linked to the vertical rows of contacts of tertiary switch 301 in line-link frame No. 0, the lower group of horizontal levels of contacts in the terminating secondary switches 228 and 229 in line-link frame No. 0 are linked to the vertical rows of contacts of tertiary switch 302 in line-link frame No. 0, and the upper and lower groups of horizontal levels, respectively, of contacts in the terminating secondary switches 230 and 231 in line-link frame No. 1 are linked to the vertical rows of contacts of tertiary switches 303 and 304, respectively, in line-link frame No. 1. The terminating secondary switches are provided with hold magnets associated with the vertical rows of contacts and with select magnets associated with the horizontal levels of contacts. A terminating secondary select tube is provided to control each terminating secondary select magnet.

A plurality of registers are provided and, normally, but one number group and number group connector circuit. The register circuits record the dial pulses, cooperate with the number group circuit to select and test the condition of the terminating line or trunk, and perform a plurality of additional control functions. Any junctor may be associated with any of the registers which are idle through the medium of the register connector which also comprises an electronically controlled cross-bar switch.

A plurality of ringing-interruptor circuits are provided, normally arranged to be sequentially operable on a time basis under control of a ringing-interrupter transfer circuit. A plurality of ringing circuits are also provided which, in cooperation with the ringing-interrupter circuits, transmit a variety of types of signals. Each of the junctor circuits may be associated with any of the ringing circuits which are idle through the medium of the ringing connector which also comprises an electronically controlled cross-bar switch. Responsive to the selection of a particular ringing circuit, the number group and connector circuit associates the selected register circuit with the selected ringing circuit.

The common release circuit shown in Fig. 2 performs manifold controlling functions comprising, in general, the supplying of suitable potentials to the several circuits during the functioning of those circuits in attempting to establish a connection, and the removal of those potentials from the several circuits at certain times in the normal operation thereof to restore those circuits to their normal or idle condition, and at certain times under abnormal operation of those circuits to perform a similar function.

Let it now be assumed that the subscriber at station 201 desires to communicate with the subscribed at station 212. Subscriber 201 will therefore lift the receiver or remove the handset from its cradle to close the switchhook contacts which causes a discharge to be initiated in the associated line tube 238. This line tube is arranged in lock-out with the other line tubes in the same horizontal group, such as line tubes 239, 246, and 247 whereby none of these other line tubes may be discharged as long as line tube 238 remains conductive. The initiation of a discharge through line tube 238 sets the common release circuit into operation. Responsive to which line-link frame includes the discharged line tube, the common release circuit connects positive main anode battery to conductor 248 or 249, the circuits by which this is accomplished being also arranged in lock-out whereby only one frame is rendered operative at any one time. Under the assumed conditions, this battery will be applied via conductor 248 to all of the primary select tubes in line-link frame No. 0, including tubes 236 and 237 and to the tubes intermediate tubes 236 and 237.

The common release circuit also transmits a positive potential via conductor 250 and through an individual impedance and through a back contact of an off-normal relay in each of the junctors which is idle. Assuming all junctors are idle, this potential is transmitted through each of those junctors, and through conductors 305 and 306, respectively, to the associated junctor subgroup circuit. The junctor subgroup circuits are provided with delay networks functioning to establish certain preferences in accordance with the number of idle junctors in each junctor subgroup and in accordance with a prearranged sequentially changing preference for purposes of traffic equalization. The junctor subgroup circuits then transmit a positive potential to mark all of the available idle paths between all of the subscribers' stations and all of the junctors. Thus, junctor subgroup circuit No. 1 transmits a positive potential via conductor 307, through back contacts of all of the idle hold magnets in originating secondary switch 232 and to a control element of each of the primary select tubes which is associated with a primary switch horizontal level associated with one of the vertical rows of contacts of originating secondary switch 232, as, for example, to primary select tubes 236 and 251. Similarly, junctor subgroup circuit No. 1 transmits a positive potential via conductor 308, through the back contacts of all of the idle hold magnets in originating secondary switch 234 and to a control element of each of the primary select tubes which is associated with a primary switch horizontal level associated with one of the vertical rows of contacts of originating secondary switch 234, as, for example, to primary select tubes 253 and 255. Similarly, junctor subgroup circuit No. 2 transmits a positive potential through a back contact of all of the unoperated hold magnets in originating secondary switches 233 and 235 and to the associated primary select tubes.

In this manner, assuming all paths to be idle, primary select tubes 236 and 237, and all of the primary select tubes intermediate those tubes, will have suitable potentials applied to the proper electrodes thereof and one of those tubes, assume tube 236, will be discharged, locking out the remaining primary select tubes in that horizontal group. It will be noted that suitable potentials are not applied to all of the necessary electrodes of the remaining primary select tubes in the system so none of those other tubes will be rendered conductive.

The primary select tube 236, in discharging, operates its associated primary switch select magnet, and applies a suitable potential to one of the electrodes of each of the originating secondary select tubes in the associated originating secondary switch 232. It may be noted that had another primary select tube been discharged, such as tube 237, this potential would or may have been applied to a different originating secondary switch, such as switch 233. The primary select tube, in discharging, also initiates the operation of the common release circuit. The common release circuit transmits positive battery via conductor 257 to another of the electrodes of the originating secondary select tubes, and transmits positive battery via conductor 258, through a back contact of an off-normal relay in each of the junctor circuits which is idle, and to another electrode of the originating secondary select tubes. Thus all of the originating secondary select tubes 244 to 245 associated with originating secondary switch horizontal levels which are associated with idle junctors will have suitable potentials applied to each of the necessary electrodes thereof and one of those tubes, assume tube 244, will fire in lock-out, operating its associated select magnet.

The common release circuit also functions at this time to connect a suitable positive potential via conductor 259 to certain of the electrodes of the register-connector select tubes such as tubes 309 and 310 and the tubes intermediate those tubes, and also connects positive battery via conductor 260, through a back contact of an off-normal relay in each of the idle registers and to another electrode of the register-connector select tubes associated with those register-connector horizontal levels which are associated with idle registers. One of these select tubes, assume tube 310, therefore fires in lock-out whereby an idle register, assume register No. 2, is selected for use in this call.

The primary select tube, in firing, also performs certain functions whereby the current through the subscriber's line tube 238 is increased so that the associated primary switch hold magnet is operated which causes the closure of the selected cross-point of the primary line switch 220. The closure of this cross-point causes the operation of the originating secondary hold magnet associated with the selected primary switch horizontal level, i. e., under the assumed conditions, originating secondary hold magnet 261. Thus, the selected originating secondary cross-point will be operated which will complete the establishment of a metallic path from the calling subscriber's line to the selected junctor, in this case junctor 1A. The operation of the originating-secondary switch cross-point also completes a circuit for the operation of the off-normal relay in junctor 1A thereby rendering that junctor busy to future calls, and completes a circuit through junctor 1A to operate the register-connector hold magnet associated with the register-connector vertical row of contacts which is associated with junctor 1A. The closure of the selected register-connector cross-point associates the selected junctor with the selected register, and extends the calling party's line to the selected register.

When the register is seized in this fashion, a discharge occurs across the subscriber's line tube from the main anode thereof to which the class-of-service function has been assigned to the main cathode. This discharge is employed as an indication to the register of the class-of-service to which the calling party has subscribed and the subsequent operations of the register are governed accordingly.

The register, upon being seized, transmits an indication to the common release circuit of this fact, upon the receipt of which the common release circuit functions to remove the potentials from conductors 248 or 249, 250, 257, 258, 259 and 260 thereby extinguishing any existing discharges in the primary select tubes, in the originating secondary select tubes, and in the register-connector select tubes, and also extinguishes the discharge in the subscriber's line tube. The select magnets associated with the select tubes are thereby released, but the established metallic path through the several cross-bar switches is undisturbed since in the suitable types of cross-bar switches, the cross-points remain closed under the control of the hold magnet when the select magnet is released. This operation of the common release circuit restores the control circuits to their normal idle condition whereby another call may be originated or terminated at this time, while the operations incident to the placing of the described call proceed.

The register transmits dial tone to the calling subscriber and dialing ensues, the received digits being recorded in the register. Upon the completion of dialing, the register signals the common release circuit. If that circuit is busy on another originating or terminating call, the register waits until that call is completed at which time the signal is received from the register and the common release circuit is conditioned for handling a terminating call. The common release circuit locks out originating calls, removes the potentials from the several conductors as before to insure that the line circuits are restored to normal, and establishes a condition whereby no subscriber's line tube can be fired on an originating call. Register No. 2, assumed to be utilized in this call, then competes with all other registers in condition at this time to terminate a call for the use of the number group circuit by signaling the common release circuit. A lockout arrangement in the common release circuit selects one of the registers and locks out the remainder so that only one register can function on the terminating phase of a call at any given time. When register No. 2 is selected, the common release circuit calls in the number group circuit, associating that circuit with the selected register, here register No. 2.

The number group is associated with the terminating electrodes of the several line tubes by means of a plurality of conductors represented in Figs. 2 and 3 as conductor 311. In the specific embodiment herein disclosed, the lines have been designated by a three-digit number and a code ringing digit, although it will be understood that it is contemplated that designations comprising a greater number of digits may be employed in certain applications of the invention. Therefore, in the disclosed embodiment, a terminating main anode, a terminating control anode and a terminating control cathode are provided in each line tube. In the exemplary arrangement, the terminating control anodes of all of the line tubes having the same hundreds digit in their designations are multipled to or in the number group circuit, the terminating control cathodes of all of the line tubes having the same tens digit in their designations are multipled to or in the number group circuit, and the terminating main anodes of all of the line tubes having the same units digit in their designations are similarly multipled. The register transmits the called party's line designation to the number group by applying suitable potentials to the proper hundreds, tens, and units conductors extending from the register to the number group. The number group then extends these potentials to the corresponding hundreds, tens, and units conductors extending to the line tube electrodes. Assuming for explanatory purposes that one thousand line tubes are provided, a suitable potential will be applied to the terminating control anodes of those one hundred line tubes having the proper hundreds digit in their designations, a suitable potential will be applied to the terminating control cathodes of those one hundred line tubes having the proper tens digit in their designations, and a suitable potential will be applied to the terminating main anodes of those one hundred line tubes having the proper units digit in their designations. It will be apparent that in only one of the one thousand line tubes will a suitable potential be applied to each of these three terminating electrodes whereby the desired one of the one thousand line tubes will be selected. In the assumed case, for example, only line tube 281 associated with subscriber's station 212 will have suitable potentials applied to all of its terminating electrodes.

If no line tube is present, no discharge will occur, and control means in the register will respond to this condition to indicate a vacant line. If the called line is busy, the line tube is in a condition whereby full discharge across the main gap thereof cannot occur at this time, and control means in the register will respond to this condition to cause busy tone to be returned to the calling subscriber and to cause the register to be dismissed. If the called line is idle, full conduction will occur in the called subscriber's line tube and control means in the register will respond to this condition to indicate that the establishment of the connection may proceed. It will therefore be seen that the register and number group cooperate to test the condition of the called line before any metallic connection is established between the called line and the junctor.

If the line is found to be idle, the register signals the common release circuit which causes a modification of the condition of the called party's line tube whereby the line tube and associated circuits are placed in a condition similar to that which exists when a call is originated from this line. The register at this time also completes a circuit through the register-connector, through the selected junctor, here assumed to be junctor 1A, and to the tertiary switch select magnets associated with those tertiary switch horizontal levels which are associated with the selected junctor, i. e., in the assumed case, the tertiary switch select magnet associated with the upper horizontal level of contacts in tertiary switches 301 and 303 will be operated.

When any of the tertiary switch select magnets are operated, an associated tertiary start relay is operated, as, under the assumed conditions, relays 312 and 313. These relays, in operating, connect a positive potential from the common release circuit via conductor 266, through back contacts of all of the idle hold magnets in the associated tertiary switches and to a control electrode of the terminating secondary switch select tubes associated with those terminating secondary switch horizontal levels which are associated with the vertical rows of contacts in the utilized tertiary switches. Thus, the positive potential on conductor 266 will be conducted through a front contact of relay 312 and, assuming all hold magnets associated with tertiary switch 301 are idle, through back contacts of all of those hold magnets to a control electrode in a plurality of terminating secondary select tubes in terminating secondary switches 228 and 229. Similarly, the positive potential on conductor 266 will be conducted through a front contact of relay 313 and through back contacts of all the idle hold magnets in tertiary switch 303 to a control electrode in a plurality of terminating secondary select tubes in terminating secondary switches 230 and 231.

The tertiary start relays, in operating, also connect a positive potential from the common release circuit via conductor 267, through a back contact of each of the idle hold magnets in those tertiary switches, through a back contact of each of the idle originating secondary switch hold magnets (which, for this purpose, are the equivalents of the terminating secondary hold magnets since each terminating secondary hold magnet operates simultaneously with its corresponding originating secondary hold magnet) and to a control electrode in each of the primary select tubes associated with those primary switch horizontal levels which are associated with idle secondary switch vertical rows. Thus, as an example, the positive potential on conductor 267 is conducted through a front contact of relay 313, through a back contact of each idle hold magnet in tertiary switch 303, via conductors 314 and 315, through a back contact of each idle secondary switch hold magnet in secondary switches 229—233 in line-link frame No. 0 and 231—235 in line-link frame No. 1, and to a control electrode in each of the primary select tubes 237 and 252 and 254 and 256 which are associated with primary switch horizontal levels which are associated with idle secondary switch vertical rows. It may be noted that this marking of idle paths is similar to the marking of idle paths on the originating phase of the call and certain of the same paths are employed. It will therefore be seen that by the application of suitable positive potentials to a control electrode of each of the primary select tubes associated with an idle path, and to a control electrode of each of the terminating secondary select tubes associated with an idle path through the off-normal or back contacts of the idle tertiary and secondary hold magnets, all available primary-secondary-tertiary paths are marked.

Since the called subscriber's line tube has been fired, frame lock-out occurs as on an originating call, the common release circuit connects a source of positive potential to conductor 249, and one of the primary select tubes 255 to 256 fires in lock-out. Let it be assumed that tube 256 first fires, operating the associated primary select magnet. Similar to the originating phase of the call, the concurrence of the operation of the primary select magnets, the application of a suitable positive potential to conductor 257 by the common release circuit, and the application of a suitable potential to a control electrode of the several terminating secondary select tubes through the back contacts of the idle tertiary switch hold magnets causes one of the select tubes in terminating secondary switch 231 to fire. Let it be assumed that tube 268 first fires, operating its associated terminating secondary select magnet.

The primary switch select magnets, in operating, also cause the subscriber's line tube 281 to be placed in a condition whereby the associated primary switch hold magnet is operated to close the selected primary switch cross-point. At the closure of this cross-point, a suitable potential is extended therethrough via the sleeve lead to operate the associated secondary switch hold magnets. The secondary switch hold magnets, in operating, close the selected secondary switch cross-points, thereby extending the potential on the sleeve lead or conductor through to operate the associated tertiary switch hold magnet to close the associated tertiary switch cross-point.

It may be seen that, as an exemplary path, a metallic connection now exists from the called subscriber 212, through the operated primary switch cross-point, through the operated terminating secondary switch cross-point, through the operated tertiary switch cross-point, and to the selected junctor 1A.

Upon the firing of one of the primary select tubes 255 to 256, a signal is transmitted to the common release circuit which applies a suitable potential via conductor 269 to the several ringing-connector select tubes 320 to 321, and also applies a suitable potential via conductor 270 through each of the idle ringing circuits and to a control electrode in each of the ringing-connector select tubes. One of these tubes will fire in lockout, assume tube 321, operating its associated select magnet, thereby selecting an idle ringing circuit to be employed in this call, here ringing circuit No. 1. The ringing-connector select magnet, in operating, signals the number group circuit which establishes a connection from the utilized register No. 2 to the selected ringing circuit No. 1 by means of which the ringing data are transmitted to the ringing circuit. Depending upon the present condition of the ringing transfer circuit, either ringing-interrupter circuit No. 1 or ringing-interrupter circuit No. 2 will then be set into operation, and the ringing-connector hold magnet associated with the utilized junctor 1A will be operated. The closure of the ringing-connector cross-point associates the calling and called subscribers' lines with the ringing circuit so that by the conjoint action of the ringing-interrupter circuit and the ringing circuit the called subscriber may be signaled and the calling subscriber informed of the fact that the signal is being transmitted.

The operation of the ringing-connector hold magnet is indicative that ringing may proceed and that the functions of the register are complete, and the register and register-connector are released. The register, in releasing, releases the operated tertiary switch select magnets which, in turn, release the tertiary switch start relays 312 and 313. The register, in releasing, also signals the common release circuit which removes the previously applied potentials to extinguish all fired select tubes thereby releasing all operated select magnets, releases the number group circuit, extinguishes the called subscriber's line tube 261, and restores the control circuits to normal so that another call may be originated or terminated while ringing proceeds.

When the called subscriber answers, ringing is tripped, the ringing connector, ringing circuit and ringing-interrupter circuit are restored to normal, and a talking connection is established between the calling and called subscribers through the selected junctor. Upon the termination of the call, the circuits are restored to their normal, idle condition so that they may be used on subsequent calls.

Since each of the lines may be a multiparty line if desired, i. e., since each line may have a plurality of subscribers' stations associated therewith as, for example, stations 203A to 203B, a line that tests busy during the terminating phase of a call may be busy as a result of this call originating from this same line, that is, a revertive call. If the designation of the called party as received by the register is such that the possibility of a revertive call exists, the register, upon receiving a busy indication in response to the busy-idle-vacant test, will automatically perform a revertive test. Since the busy indication is transmitted to the register by virtue of the fact that full conduction has not occurred across the main terminating gap in the called subscriber's line tube, the exemplary test comprises the transmitting of a pulse of suitable polarity from the register, through the number group, and to the called subscriber's line tube. Momentary main-gap conduction will occur in that tube as a result of the receipt of this pulse. This momentary conduction will cause an indication to be transmitted to the junctor with which the tested line tube is associated. If this indication is not received in the junctor with which the present calling party and present register are associated, the called line is busy on another call and busy tone is transmitted to the calling party. If this indication is received in the junctor with which the present calling party and present register are associated, the call is revertive. In this event, there is no necessity of establishing an additional metallic path since both the calling and called parties are associated with the same line. Therefore, a ringing circuit and ringing-interrupter circuit are seized, signaling proceeds, and the common control equipment is restored to normal, only the single metallic path from the common calling-called subscribers' line to the utilized junctor remaining intact after ringing has been tripped.

Upon receiving a complaint from a subscriber that a line has tested busy an undue length of time, an operator may initiate a busy verification test by means of which she may monitor the called line to ascertain if that line is busy in another conversation. In order to do this, the operator establishes a connection from her switchboard in the master office (Fig. 2), through a trunk circuit, assumed to be trunk circuit No. 0, and to a junctor and register in the normal fashion. The operator then dials the called party's number prefixed by a busy-verification digit. The receipt of the busy-verification digit by the register conditions the register for the performance of the busy-verification test. The busy-idle-vacant test is performed in the normal fashion. If the line tests idle or vacant, the operator so informs the complaining subscriber. If the line tests busy, the register seizes the busy-verification circuit (represented in Fig. 3) and associates that circuit with the operator's trunk, in this case trunk No. 0 via conductor 322. The busy-verification circuit then transmits a pulse of suitable polarity through the register and number group to the called subscriber's line tube. As in the case of a revertive test, the receipt of this pulse results in momentary main-gap conduction in this line tube which causes an indication to be transmitted to the junctor with which that line tube is presently associated, assume junctor 2B. Each of the junctors is associated with the busy-verification circuit, and that junctor which receives the indication from the called subscriber's line tube will transmit an identifying indication to the busy-verification circuit. Thus, in the assumed case, junctor 2B will transmit an indication via conductor 323 to the busy-verification circuit. The busy-verification circuit then performs a hunting function to locate the indication from the junctors, thereby identifying which junctor is being employed in the existing conversation in which the presently called subscriber is one of the parties. Upon locating the sought junctor, the busy-verification circuit associates the operator's trunk as extended via conductor 322 with the located junctor, thereby establishing a monitoring connection whereby the operator may audit the existing conversation and report to the complaining subscriber that the party he desires to call is presently engaged in conversation and that the equipment has not malfunctioned.

When the operator's trunk is associated with the busy-verification circuit, the functions of the control equipment utilized in establishing this connection are completed and the register and register-connector are released, the common release circuit is signaled to restore the number group circuit and the line circuits to normal, and the junctor employed by the operator in establishing a connection to the busy-verification circuit is released. When that junctor releases, the primary and secondary switches which established the metallic connection from the operator to that junctor are also released so that this equipment as well as the common control equipment may be utilized on further calls.

A plurality of lines may be employed as lines to private branch exchange switchboards if desired. Thus, as is shown in Fig. 2, the lines associated with line tubes 240 and 241 are shown associated with a private branch exchange switchboard, although it is to be understood that additional lines may be associated with each of the private branch exchange switchboards and that these lines may be distributed among the primary switches. The designation of one of the lines, such as the line associated with the line tube 240, may be selected as the private branch exchange number, and the terminating control electrodes of the line tube associated with that line are not connected to the number group in the normal fashion, but, rather, a master private branch exchange tube is provided in the number group circuit which is tested for an idle or vacant condition of the associated private branch exchange trunks as a group. If all of the trunks in a private branch exchange group are busy, a circuit is completed through a contact of an operated relay in each of the line circuits associated with private branch exchange trunks so that the master private branch exchange tube tests busy and the circuits respond to this condition as on a regular call. If one or more of the trunks are idle, this circuit is not completed and the master private branch exchange tube will test idle. A potential is then transmitted from the number group to the several line circuits associated with the private branch exchange trunks in series. If the first trunk is idle, this potential will be applied to the associated line tube, as, for example, line tube 240, and a connection will be established to the private branch exchange switchboard via this trunk. If the first trunk is busy, this potential will be extended through a contact of an operated relay therein and to the second trunk in this private branch exchange group. If that trunk is also busy, the potential will be successively extended through the series of private branch exchange trunk line circuits until an idle trunk is located. Thus, if any one or more of the trunks to the private branch exchange switchboard is idle, the trunks may be successively hunted until an idle trunk is located whereby a connection will then be established from the calling party to the private branch exchange switchboard.

A plurality of line circuits may also be individually associated with a plurality of trunk circuits providing access to a master office or to other offices which it is found desirable to have associated with this office by direct trunking means. These trunk circuits are preferably arranged in groups in accordance with the destination of the trunks leading therefrom. Thus, a group of trunk circuits such as trunk circuits No. 0 to No. 5 (Fig. 2) may be provided, the trunks therefrom having the common destination of a master office which may be signaled if a subscriber desires an operator's assistance. Each trunk group may comprise a plurality of trunk circuits, and the line circuits at which these trunk circuits appear may be located in any primary switch in any line-link frame. It is to be understood that a plurality of such trunk groups may be provided.

In the exemplary embodiment, individual trunk control means are provided in each trunk comprising a multielement gaseous discharge tube, and individual trunk group control means are provided for each trunk group in the number group circuit comprising a pair of multielement gaseous discharge tubes. On an outgoing call from this office via one of the trunks in a trunk group, the busy-idle-vacant test is performed on the trunk group control means in the number group circuit. If none of the trunk circuits in the trunk group is idle, the trunk group control means is thereby conditioned to test busy and if one or more of the trunk circuits in the trunk group are idle the trunk group control means is conditioned to transmit an idle indication to the register.

If the trunk group tests idle, the several trunk cicuits in the trunk group are hunted to locate an idle trunk. In order to distribute the traffic load on the equipment, means are provided to establish variable degrees of relative preference for each of the trunk circuits and to vary this preference on successive calls. In the exemplary embodiment of the invention, the individual trunk circuit control means comprise individual electron discharge tubes which are effectively bilateral, and time delay networks associated with each side of each of these tubes. The application of suitable potentials to these individual trunk circuit control means through the individual time delay networks is controlled by the trunk group control means in the number group circuit. As previously indicated, this trunk group control means may comprise a pair of electron discharge tubes, one of which is operative to control the application of potentials to one side of each of the idle trunk circuit control tubes, and the other of which is operative to control the application of potentials to the other side of each of the idle trunk circuit control tubes. The trunk group control tubes may be alternately disabled on successive calls under the control of the common release circuit. Therefore, on a first call, one of the trunk group control tubes will control the application of potentials to one side of each of the idle trunk circuit control tubes through the individual time delay networks associated therewith, and the time constants of those networks may be adjusted to establish a desired sequence of preferences among the several trunk circuits within the trunk group. On the next succeeding call or during a subsequent period of time, the other of the trunk group control tubes will control the application of potentials to the other side of each of the idle trunk circuit control tubes through the individual time delay networks associated therewith, and the time constants of those networks may be adjusted to establish a different sequence of preferences among the several trunk circuits within the trunk group. The particular sequences of preferences employed may vary in each installation. The system is flexible in this manner and may readily be varied to meet different requirements and differing traffic conditions.

When any one of the trunk circuit control tubes is discharged, that trunk circuit is selected and the remaining trunk circuits within the trunk group are locked out.

Means may also be provided to intercept calls when a subscriber's designation is changed. In the exemplary embodiment of the invention, this means comprises a series of intercept tubes in the number group circuit. When it is desired to place a certain designation on intercept, one of these intercept tubes, or a section of one of these tubes, is cross-connected in the number group circuit just as if it were a subscriber's line tube having that designation. Therefore, when that intercepted designation is dialed, the busy-idle-vacant test is performed on the intercept tube. Each intercept tube is operative to perform the same functions as did one of the trunk group control tubes as above described except that the intercept tubes are not subject to disablement by the common release circuit. Therefore, when one of the intercept tubes is fired, if any one of the trunk circuits within the trunk group associated with the master office is idle, trunk hunting will proceed and a connection will be established from the calling party to an operator whereby that subscriber may be informed of the changed designation of the station he desires to call.

To provide for the exigency of a malfunctioning of one of the essential circuits, and to provide for a distribution of the load through a common control circuit in order to avoid excessive use of a portion of the circuits in the system whereby they may or will have an expected service life substantially shorter than other circuits of the system, more than one of each common control circuit may be provided. For example, the common release circuit is utilized on both the originating and terminating phases of each call, and would disable the entire office if it became inoperative. Therefore, two or more substantially identical common release circuits may be provided with means operative automatically to transfer between these circuits on a time basis. During a certain period of time, one of these common release circuits is rendered operative to function in the origination and termination of all calls placed during that interval. At the end of a suitable interval, if the common release circuits are idle, the transfer means functions automatically to render the other common release circuit operative. If the common release circuit is functioning on an originating or terminating phase of a call at the end of this interval, the transfer circuit is operative at the completion of that phase to perform the transfer, i. e., during the processing of a call the common release circuits are locked in their operative condition whereby transfer cannot occur until the circuits become idle. In the event that the operative common release circuit malfunctions, a time-out will occur, and the transfer circuit immediately functions to transfer the control to the other common release circuit. The transfer circuit is then locked in this condition so that no subsequent retransfer to the malfunctioning circuit will occur until the inoperativeness is rectified.

As above described, provision is made whereby in an originating phase of a call the subgroups of junctors are given an order of preference relative one to the other in accordance with the number of idle junctors in each of the junctor subgroups. Provision is also made to establish an additional sequentially changing preference among the junctor subgroups by means of a junctor subgroup preference circuit in the common release circuit. This preference circuit is arranged, in the illustrative embodiment, to establish a preference in favor of one of the subgroups of junctors on one call, and to establish a preference in favor of the other junctor subgroup on the next originating call. However, when a certain number of the junctors become busy, it may be desirable to cancel this automatic preference feature, and therefore means are provided in the common release circuit responsive to a preselected number of junctors becoming busy automatically to disable this alternating junctor subgroup preference.

A more complete understanding of the above-mentioned and other features of the invention may be obtained from the following specific description of the functioning of an illustrative embodiment of the invention.

DETAILED DESCRIPTION

Throughout the remainder of this specification, the circuit elements will be identified by functional designations followed by a number in parentheses representing the figure of the drawing upon which that element appears. For example, the class-of-service connector relay in Fig. 4 of the drawing will hereinafter be designated "relay CSC(4)."

The electron discharge devices utilized in the disclosed preferred embodiment of the invention are eight-element cold-cathode gas-filled tubes preferably of the type more fully disclosed in Patent 2,549,064, granted April 17, 1951, to W. A. Depp. As shown, for example, in Fig. 9 herein, subscriber's line tube L2(9) comprises an originating-discharge control gap between control anode 901 and control cathode 902, a terminating-discharge control gap between control anode 903 and control cathode 904, a main cathode 905, and three main anodes 906, 907, and 908. In such subscriber's line tubes, main anode 906 is employed when the subscriber originates a call, main anode 907 is employed to indicate or control the "class-of-service" to which the subscriber is entitled, and main anode 908 is employed when a call terminates at the subscriber's line associated with that tube, i. e., when that subscriber is the called party. A modified arrangement is used in the case of private-branch-exchange line tubes as will be discussed in detail hereinafter.

In general, the application of a suitable potential difference across the electrodes 901 and 902 will cause a discharge to occur across the control gap therebetween. With a suitable voltage applied to the main anode 906, the control-gap discharge will be transferred so as to exist between the control cathode 902 and the main anode 906. If the main cathode 905 is at a voltage sufficiently negative in respect to the control cathode 902, the discharge will then transfer to the main gap so as to exist between the main anode 906 and the main cathode 905. This sequence will hereinafter be referred to as a control-gap discharge followed by first and second transfers. A similar chain of transfers may occur upon the application of suitable voltages to electrodes 903, 904, 905, and 908.

In the automatic telephone switching system disclosed herein, crossbar switches are employed as the primary, secondary and tertiary switches, and as the register and ringing connectors. In general, these switches comprise a plurality of groups of contacts which are selectively operable by the conjoint but successive operation of a selected horizontal or select magnet and of a selected vertical or hold magnet. The switches are arranged so that the operated contacts at the selected cross-point may be maintained operated under the sole control of the hold magnet, thereby permitting the select magnet to be released without disturbing the established connection through the closed contacts. For example, operation of select magnet SEL9(8) followed by the operation of hold magnet HOLDA(8) will result in the closure of cross-points 801 on the crossbar switch represented in Fig. 8. Select magnet SEL9(8) may then be released and cross-point 801 will remain operated until hold magnet HOLDA(8) is released. The crossbar switch as disclosed in Fig. 8, for example, is provided with cross-points 801, 802, 803, and 804. Persons skilled in the art will readily recognize that numerous other horizontal and vertical rows of cross-points may be provided. In the usual case, there will be ten horizontal rows and ten to twenty vertical rows. For further details of the construction of crossbar switches of a suitable type, reference is made to United States Patent 2,021,329, granted to J. N. Reynolds on November 19, 1935, the disclosure of which patent is hereby made a part of the present application as if fully included herein.

Subscriber initiates a call

With power applied to the system as shown, the circuits will be in their normal condition with relays C(12) and C1(12) operated in parallel from battery 1401, resistor 1402, conductor 1403, through the winding of relay C1(12) to conductor 1204 and through the winding of relay C(12) to conductor 1204, back contact of relay T(13), and to ground.

Figure 8:
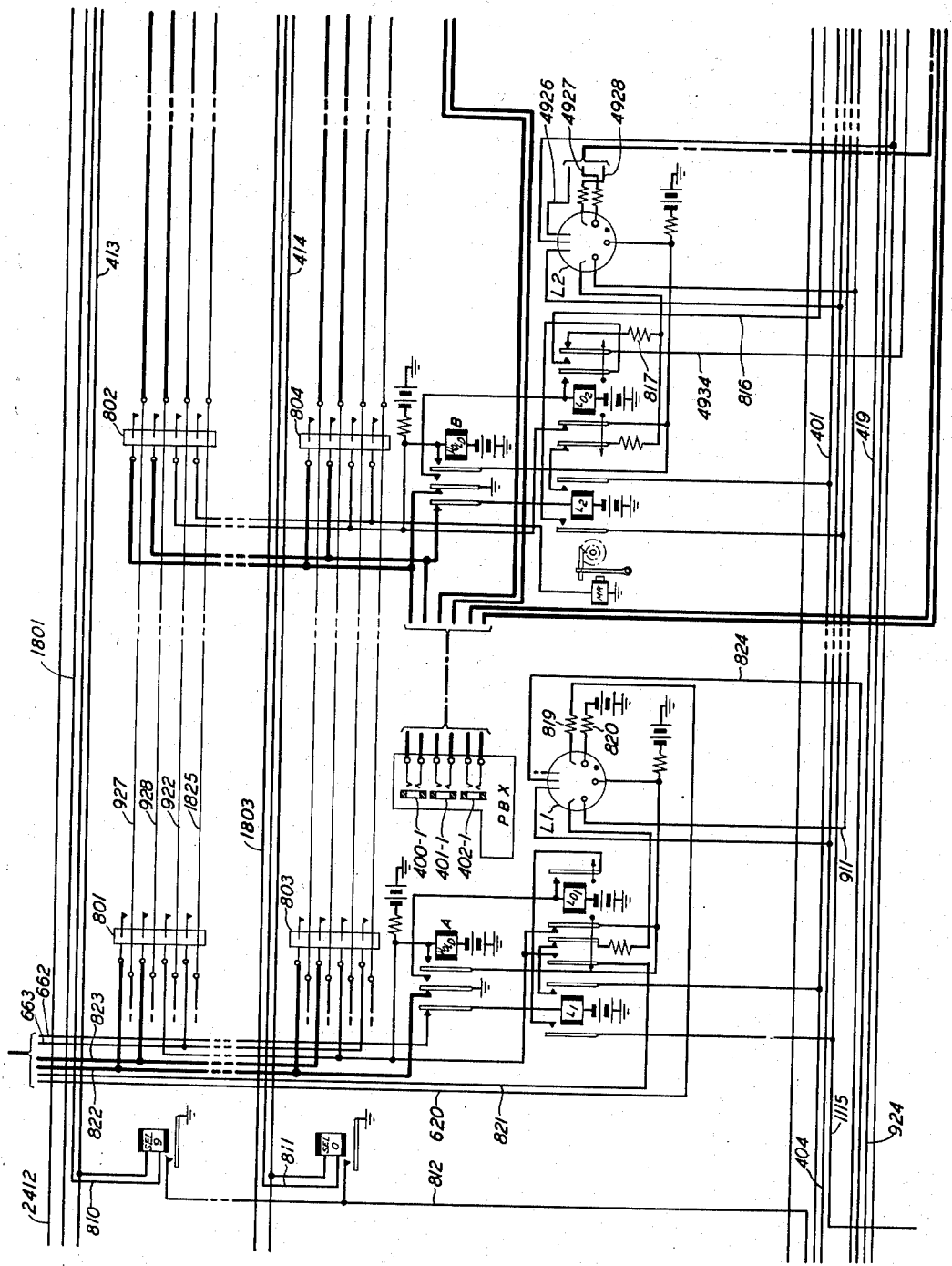
Figure 9:
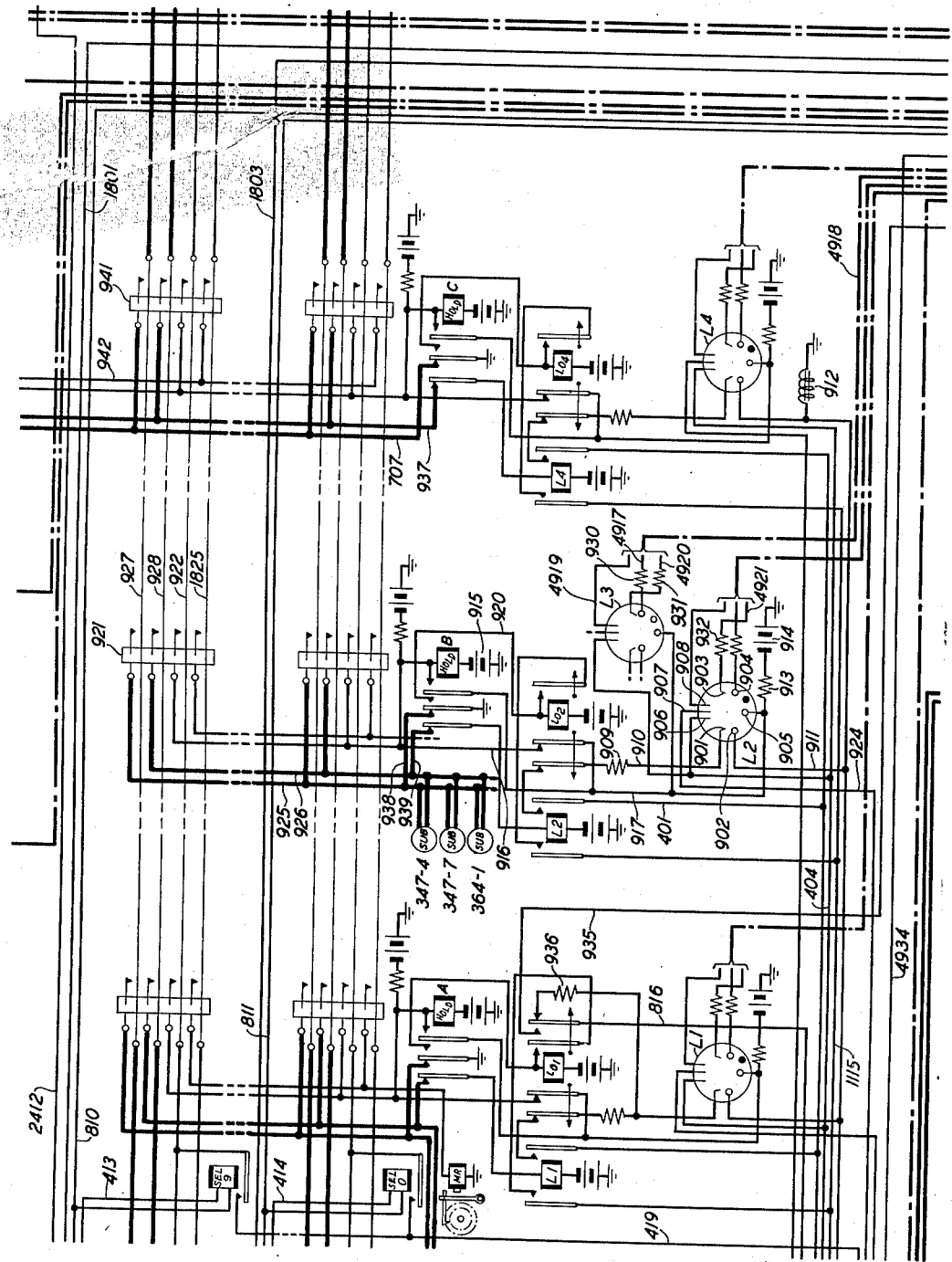
Figure 10:
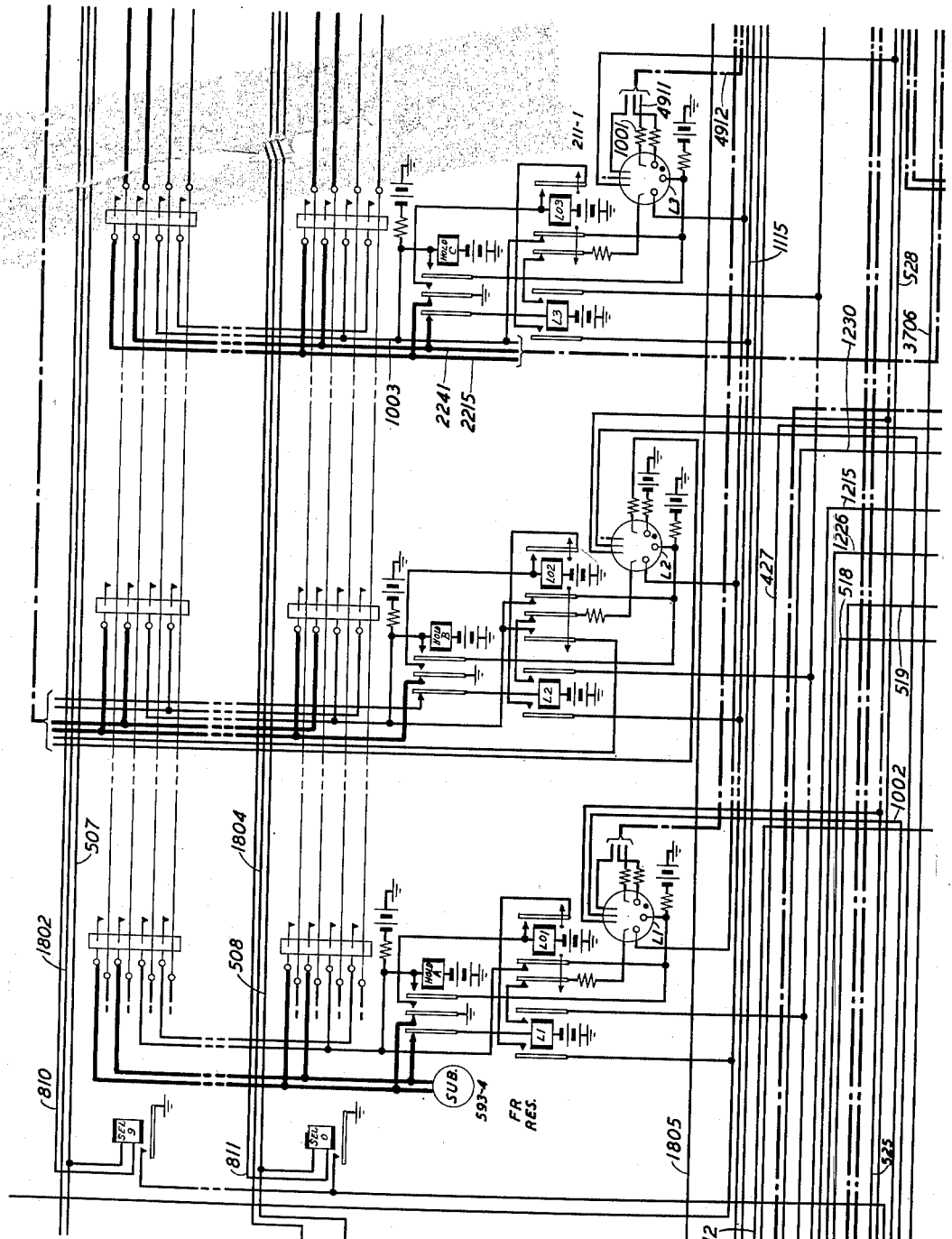
Figure 11:
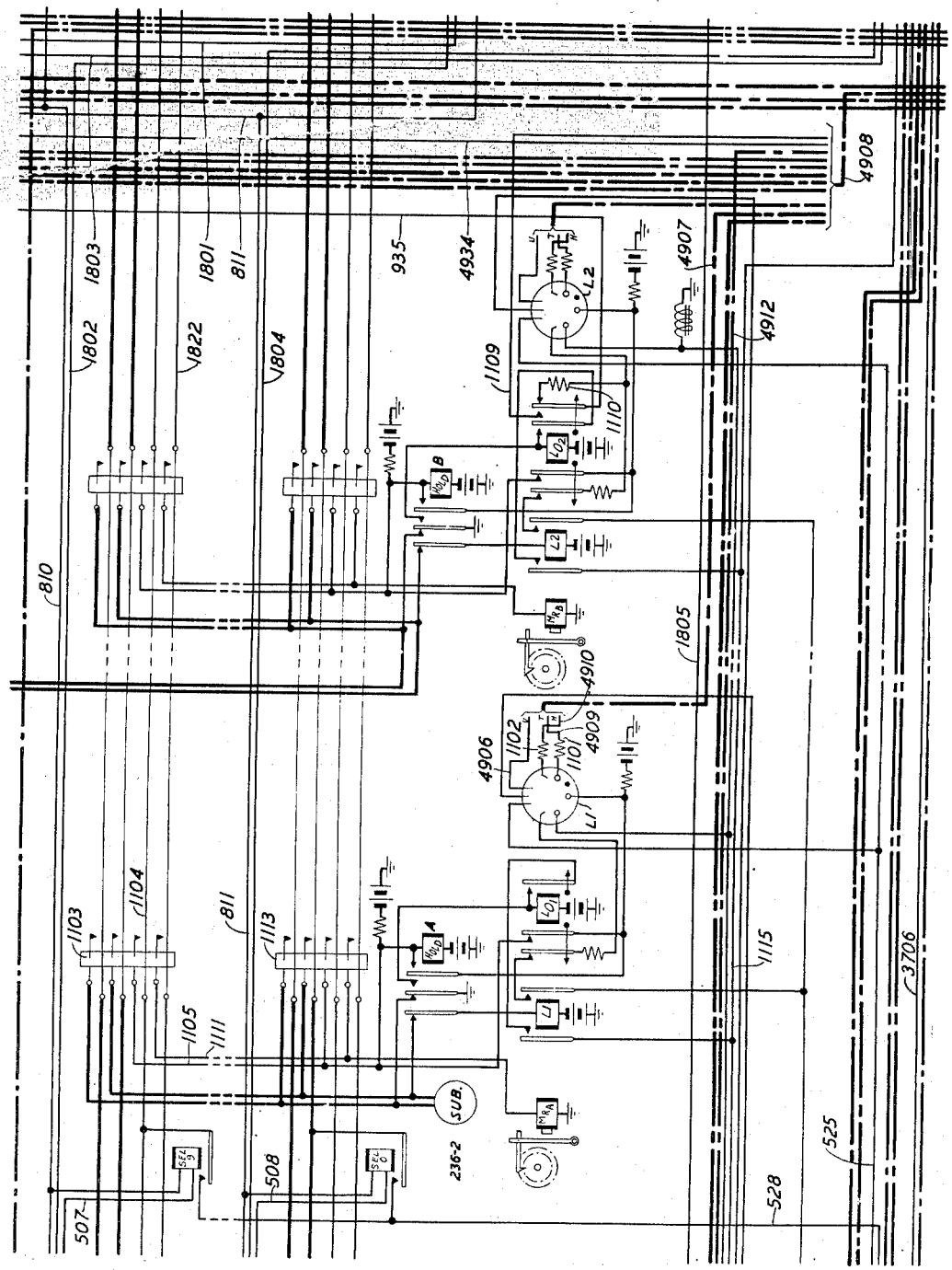

Assme now, for purposes of illustration, that the subscriber at station 347-7, shown in Fig. 9, desires to communicate with the subscriber's station 236-2, shown in Fig. 11. The subscriber at station 347-7 will initiate the call in the customary fashion by removing the receiver or handset from its cradle to close the line loop through the switchhook contacts. Thus a path is closed from ground, middle left-hand back contact of hold magnet HOLDB(9), conductor 938, through the subscriber's line and switchhook contacts, conductor 939, outer left-hand back contact of hold magnet HOLDB(9), winding of the subscriber's line relay L2(9), and to battery. Operation of line relay L2(9) connects a suitable voltage, herein disclosed as positive 100 volts, to control anode 901 of the subscriber's line tube L2(9) over a path from the positive 100-volt battery shown at the left of Fig. 12, resistor 1207, middle upper back contact of relay RLS(12), conductor 1208, back contact of relay OT(12), conductor 1209, No. 3 contact of operated relay C1(12), conductor 1210, resistor 1211, conductor 1212 which is cabled through Figs. 10 and 5 to Fig. 4, back contact of relay GP(4), conductor 401 through Figs. 8 and 9, right-hand front contact of relay L2(9), outer left-hand back contact of relay LO2(9), resistor 909, conductor 910 to control anode 901 of line tube L2(9). Control cathode 902 of line tube L2(9) is connected to ground through conductor 911 and retardation coil 912, and a discharge will therefore be initiated across this control gap of the line tube L2(9). Main anode battery is supplied to the main anode 906 of line tube L2(9) from the positive 135-volt battery at the left of Fig. 12, inner upper back contact of relay RLS(12), conductor 1213, back contact of relay MA(12), conductor 1214, No. 4 contact of relay C(12), conductor 1215 through Figs. 10 and 5 to Fig. 4, through the back contacts and upper winding of relay LS(4), conductor 404 through Fig. 8 to main anode 906 of line tube L2(9). The characteristics of the tubes are such that upon the application of these potential differences, a first transfer will occur so that conduction exists through the tube between the control cathode 902 and the main anode 906. It will be noted that all line tubes in the same horizontal group are supplied main anode battery from a common source through the common impedance, in the case of the horizontal group shown in part in Figs. 8 and 9, comprising the winding of relay LS(4). It will be further noted that all line tubes in the same horizontal group have their left-hand control cathodes connected to ground through a common impedance, comprising, in the upper horizontal group, retardation coil 912. As a result, a first transfer in one of the line tubes will raise the potential applied to the control cathodes of all of the other line tubes in the same horizontal group to such a point that any control-gap discharges that may have occurred will be extinguished and no further discharges or transfers may occur as long as that one tube is conducting.

Therefore, all the line tubes in the same horizontal group are in lockout, and if two or more line relays in the same horizontal group operate simultaneously, only one line tube will make the first transfer to the main anode. Thus, all future calls originating in that horizontal group are locked out as long as any one line tube remains conducting.

Since the main cathode 905 of line tube L2(9) is connected through resistor 913 to negative battery 914, it has a voltage impressed upon it which is sufficiently negative in respect to the voltage at control cathode 902 to result in a second transfer immediately occurring whereby conduction will now exist between the main anode 906 and the main cathode 905. This current is sufficient to operate relay LS(4) which is fast operating and opens its back contacts to interrupt the previously traced path for providing anode voltage and energizing this relay, and immediately reestablishes this path through resistor 402, high resistance 403 to the winding of relay LS(4). The placing of these resistors in the anode circuit of tube L2(9) reduces the current through that tube so that the potential difference between the main cathode 905 and negative battery 915 is insufficient to cause the operation of hold magnet HOLDB(9) over a path from negative battery 915, winding of hold magnet HOLDB(9), conductor 916, inner left-hand back contact of relay LO2(9), and conductor 917 to the main cathode 905. The additional impedance in the main anode circuit prolongs the life of the conducting line tube and also provides an additional common impedance to further reduce the potential applied to the left-hand main anodes of the other line tubes in the same horizontal group to further insure lock-out if an attempt is made to establish conduction in another subscriber's line tube in the same horizontal group.

Figure 12:
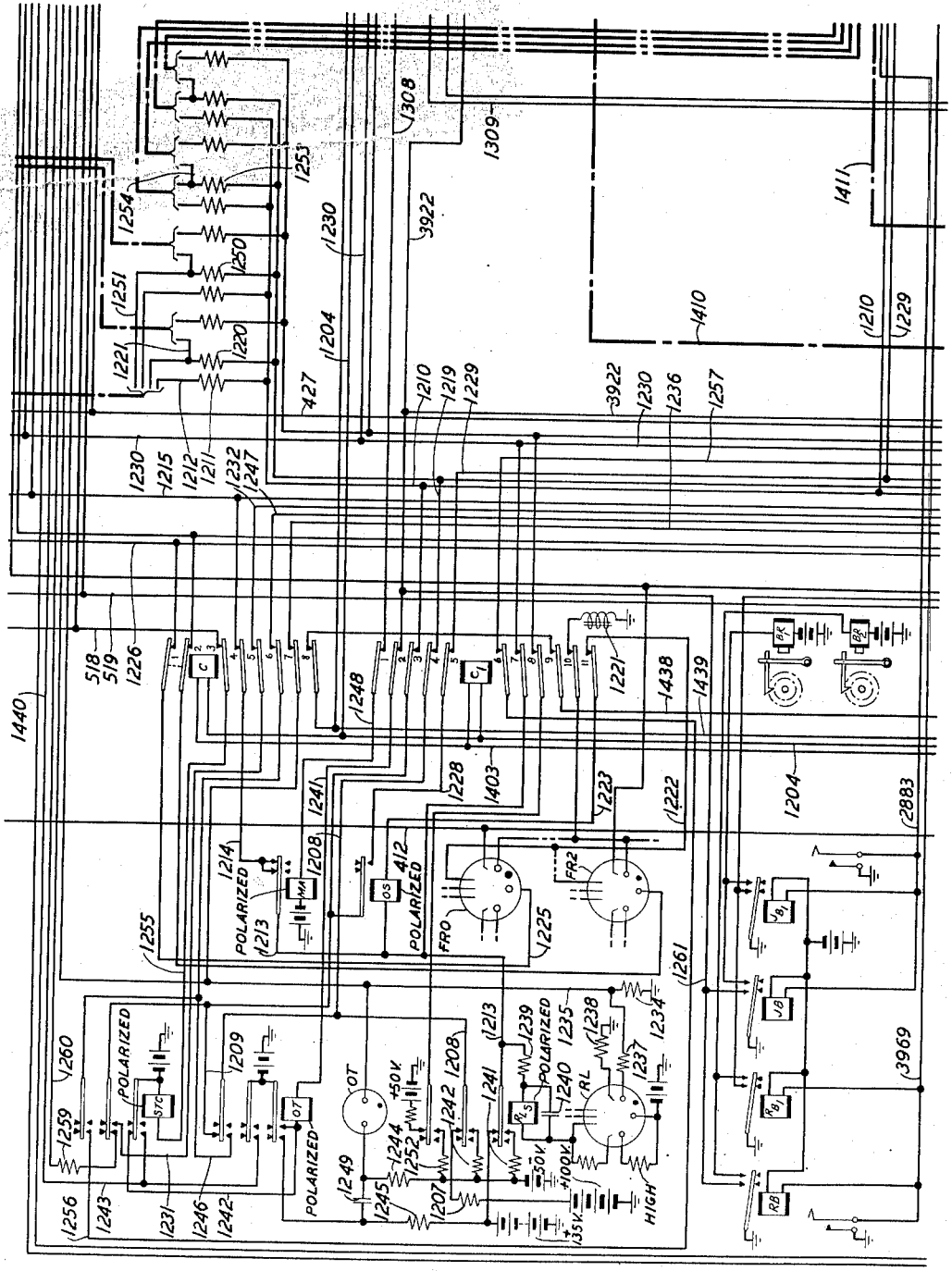

Relay LS(4), in operating, locks operated over the previously traced path from the 135-volt battery in Fig. 12, through the front contact of relay LS(4), lower winding of relay LS(4), conductor 408, winding of relay PHS(4), resistor 409, to ground. Relay PHS(4) is thereby operated. Operation of relay LS(4) also connects positive 135-volt battery through its right-hand front contact, resistor 410, conductor 427 and through a delay network to the control anode of tube T0(14) to start a time-out circuit as will be described hereinafter.

Figure 4:
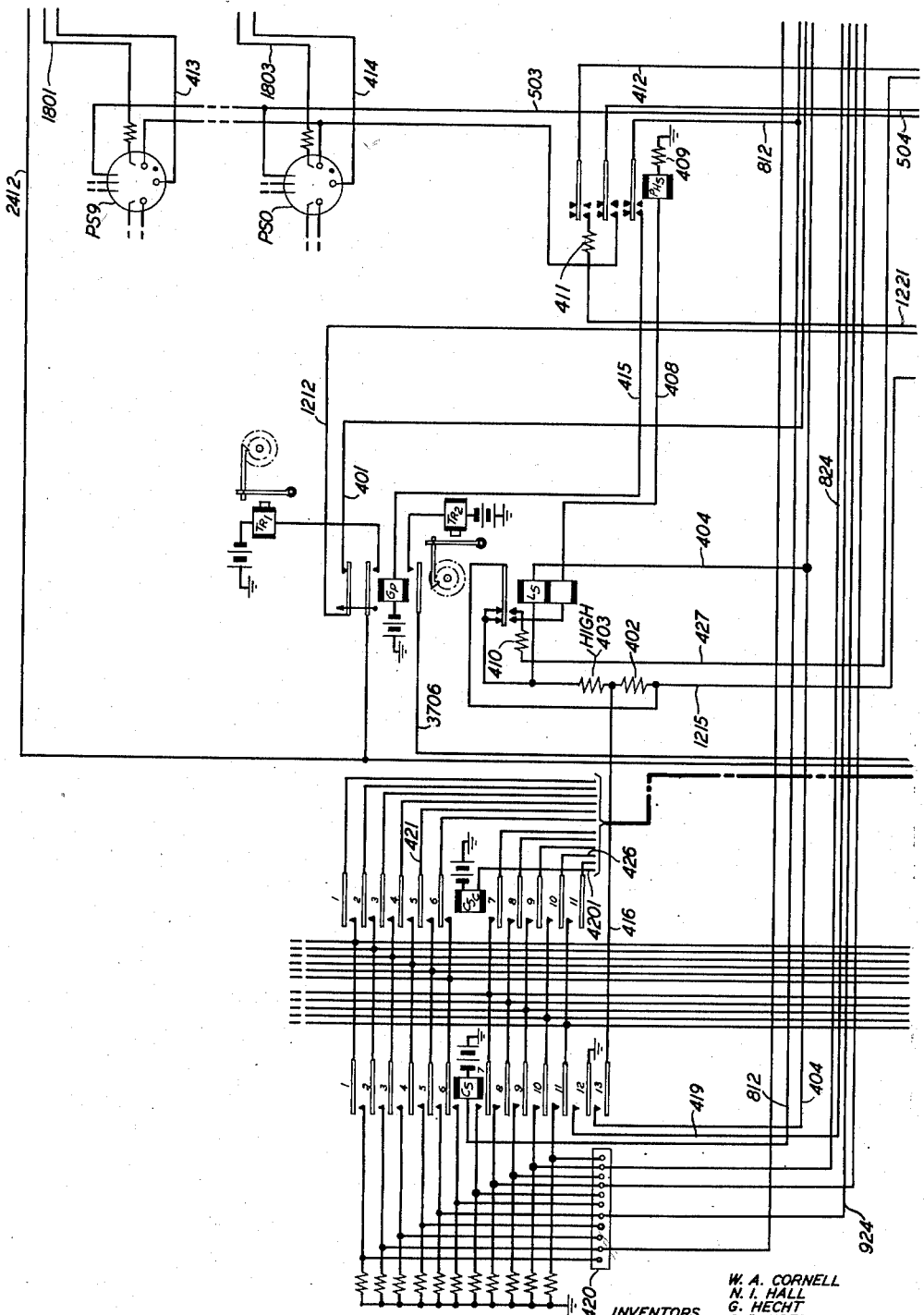
Figs. 4 and 5 show two horizontal group circuits and two class-of-service circuits, which are elements of a first line-link frame, with Fig. 5 additionally showing a frame connector circuit.
Figure 5:
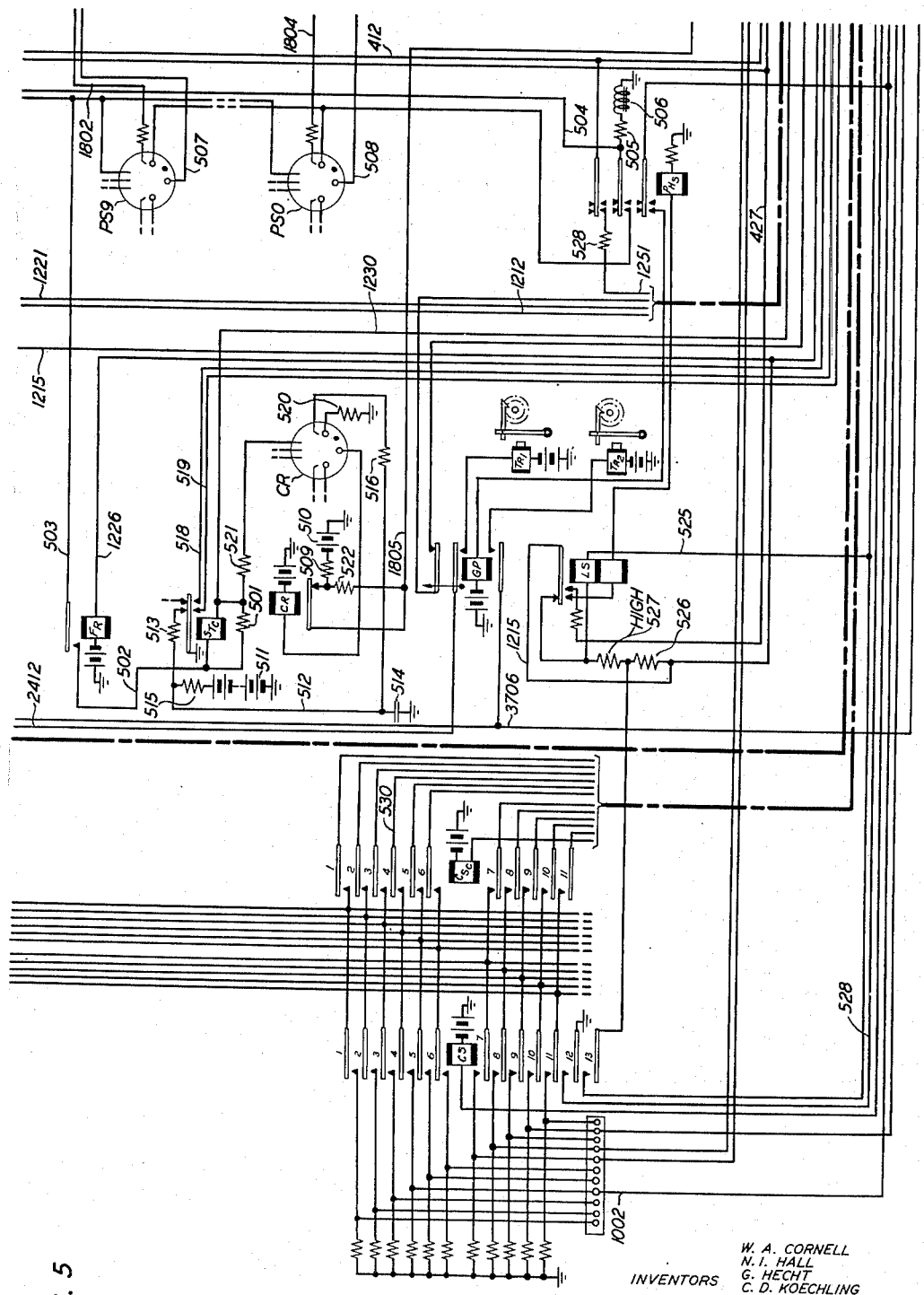

The operation of the primary horizontal start relay PHS(4) closes a circuit from the positive 100-volt battery at the left of Fig. 12, resistor 1207, middle upper back contact of relay RLS(12), conductor 1208, No. 4 contact of relay C1(12), conductor 1219, resistor 1220, conductor 1221 which is cabled through Fig. 10 to Fig. 4, resistor 411, outer upper front contact of relay PHS(4), conductor 412 through Figs. 4, 5, and 10, to the control anode of the frame lock-out tube FR0(12) which is associated with the frame in which the calling subscriber's line appears. It is to be noted that conductor 412 also extends to the control anode of tube FR0(14) whereby the frame lock-out function may be performed by that portion of the common release and time-out circuit shown in Fig. 14 in the event that that circuit is in service, rather than the circuit of Fig. 12, under the control of the transfer relay T(13) as will be described hereinafter. The control cathode of tube FR0(12) is connected to ground through retardation coil 1221 and the No. 10 contact of relay C1(12), and the main anode of tube FR0(12) is connected to the positive 135-volt supply through conductor 1222, No. 11 contact of relay C1(12), conductor 1223, winding of relay OS(12), conductor 1213, inner upper back contact of relay RLS(12), and to battery. Therefore, a discharge will occur across the control gap of tube FR0(12) which will transfer so as to occur between the control cathode and the main anode of that tube. Tube FR0(12) is connected in lock-out with all other frame lock-out tubes associated with other line-link frames, such as the exemplary tube FR2(12) which is associated with the No. 2 line-link frame represented in Fig. 19. It is to be understood that there is to be one frame lock-out tube in each of the circuits represented in Fig. 12 and in Fig. 14 for each line-link frame, and it is to be understood further that the showing of Fig. 19 represents but one of a plurality of additional line-link frames which may be provided. The lock-out between the several frame lock-out tubes such as tubes FR0(12) and FR2(12) is accomplished by employing therewith a common main-anode impedance comprising the winding of relay OS(12), and a common control-cathode impedance comprising retardation coil 1221. The occurrence of the first transfer in one of the frame lock-out tubes will therefore raise the potential applied to the control cathodes of all associated frame lock-out tubes so that a first transfer cannot occur in those other tubes. The parameters may be arranged such that this rise of control cathode potential is also sufficient to extinguish the control-gap discharges which may have occurred in any of the other frame lock-out tubes as the result of the initiation of a call in any other line-link frame. Thus, if two or more line-link frames originate calls simultaneously, one of the frame lock-out tubes will have conduction therein transferred to the main anode thereof, and all other frame lock-out tubes will be prevented from transferring.

Since the main cathode of tube FR0(12) is connected to negative battery over a circuit including conductor 1225, No. 1 contact of relay C(12), conductor 1226, and winding of relay FR(5), a second transfer will immediately occur in tube FR0(12) whereby conduction will now exist therein between the main anode and the main cathode and sufficient current will flow to cause the operation of relays OS(12) and FR(5).

*Marking idle paths*

Relay OS(12), in operating, closes a circuit from positive 100-volt battery at the left of Fig. 12, resistor 1207, middle upper back contact of relay RLS(12), conductor 1208, outer upper back contact of relay OT(12), conductor 1209, front contact of relay OS(12), conductor 1228, No. 5 contact of relay C1(12), to conductor 1229 which extends through Figs. 12, 13, 19, and 30 to Figs. 29 and 28. This positive potential is then conducted over parallel paths to a plurality of junctors as shown in Figs. 28 and 29. Two subgroups of junctors have been disclosed, each of those subgroups comprising a junctor subgroup circuit with each of which a plurality of junctors may be associated. For purposes of clarity, but two junctors have been shown in each subgroup, although it is to be understood that additional junctors may be provided in each junctor subgroup. Junctor subgroup circuit No. 1(29) has associated therewith junctor 1A shown in detail in Fig. 28 and junctor 1B represented in Fig. 29, and may have additional junctors provided as required. Junctor subgroup circuit No. 2(29) has associated therewith junctor 2A(29) and junctor 2B(29) in addition to other junctors not shown on the drawings. As will be hereinafter described, when a junctor is busy, relay ON therein will be operated. Thus if junctor 1B(29) is in service, relay ON1B(29) will be operated. Therefore, the positive potential on conductor 1229 will be conducted through the several resistors 2801, 2901, 2911, 2921, and others not shown, and through the back contacts of all those relays ON in all of the junctor circuits which are not busy. Thus, if junctor 1A(28) is idle, the positive voltage on conductor 1229 will be conducted through resistor 2801, No. 5 contact of relay ON1A(28), conductor 2802, back contact of the make-busy switch MB1A(28), resistor 2803, conductor 2804, and to ground in the junctor subgroup circuit No. 1(29) through the network comprising resistors 2905 and 2906 and capacitors 2907 and 2908. Similarly, if junctor 1B(29) is idle, the potential will be conducted through resistor 2901, back contact of relay ON1B(29), conductor 2902, back contact of switch MB1B(29), resistor 2903, conductor 2804, and to ground through the same network in junctor subgroup circuit No. 1(29). In a like fashion, the potential on conductor 1229 will be conducted through the resistors and back contacts of the ON relays in all of the idle junctors in the second junctor subgroup to ground through network 2924 in junctor subgroup circuit No. 2(29). Capacitors 2907 and 2908 in junctor subgroup circuit No. 1(29) will therefore commence to charge if any junctor in that subgroup is idle; and since resistors 2901 and 2903 in junctor 1B(29) are in parallel with the corresponding resistors in all other junctors in that subgroup, it may be seen that the time of charging of the capacitors 2907 and 2908 will vary inversely with the number of junctors in that subgroup which are idle. Similarly, the time required to charge the capacitors in network 2924 in junctor subgroup circuit No. 2(29) to a given potential will increase with an increased number of busy junctors in that subgroup. As will be seen immediately hereinafter, these junctor and junctor subgroup circuits provide traffic equalization whereby a call is preferably routed through those groups of links that at the time have the least traffic therethrough.

As the capacitors in the junctor subgroup circuits charge, the rising potential is transmitted through elements of the originating secondary switches of Fig. 18 to the control anodes of the several primary select tubes PS0 to PS9 of which tubes PS0 and PS9 have been represented in Figs. 4 and 5, and through elements of the corresponding originating-secondary switches of other line-link frames to the control anodes of the primary-select tubes associated therewith, as, for example, in line-link frame 2 shown in Fig. 19.

The rising potential on capacitors 2907 and 2908 in junctor subgroup circuit 1(29) is applied through the back contact of switch LF1A(29), conductor 2909, through the back contacts of all the unoperated hold magnets in the upper originating-secondary switch in Fig. 18, as, for example, through the back contacts of hold magnets HOLDA(18) and HOLDB(18) to conductors 1802 and 1801, respectively, over which the rising potential is conducted through Figs. 18, 11, and 10, and through Figs. 18, 11, 9, and 8, respectively, to the control anodes of the associated primary-select tubes PS9(5) and PS9(4) respectively. The rising potential on capacitors 2907 and 2908 is also applied through the back contact of switch LF1B(29), conductor 2910 through Fig. 18 to Fig. 19, through the back contacts of all the unoperated hold magnets in the associated originating-secondary switch in line-link frame 2, to the control anodes of the associated primary-select tubes in that line-link frame.

The rising potential on the capacitors in network 2924 is conducted through the back contact of switch LF2A(29), conductor 2925, through the back contacts of all the unoperated hold magnets in the lower originating-secondary switch of Fig. 18, as, for example, through the back contacts of hold magnets HOLDC(18) and HOLDD(18), to conductors 1804 and 1803 over which the rising potential is conducted through Figs. 18, 11, and 10 and through Figs. 18, 9, and 8, respectively, to the control anodes of primary-select tubes PS0(5) and PS0(4), respectively. The rising potential on the capacitors of network 2924 in junctor subgroup circuit 2 is also conducted through the back contact of switch LF2B(29), over conductor 2926 to similar apparatus in line-link frame 2 shown in Fig. 19. The primary-select tubes PS0 and PS9 shown in each horizontal group are but representative of a plurality of such tubes associated with each of the primary switches, and it is to be understood that the control anode potential for those tubes not shown is conducted through the junctor circuits and junctor subgroup circuits as hereinbefore described, and through the back contacts of unoperated hold magnets in the originating-secondary switches of Fig. 18, although, for purposes of clarity, these additional hold magnets have not been shown on the drawing.

The operation of relay FR(5), upon the rendering of tube RR0(12) conductive, completes a circuit over which a suitable positive potential is applied to the right-hand main anodes of the several primary-select tubes shown in Figs. 4 and 5. This circuit may be traced from the positive 135-volt battery at the left of Fig. 12, inner upper back contact of relay RLS(12), conductor 1213, No. 7 contact of relay C1(12), conductor 1230 through Fig. 10 to the winding of relay STC(5) and resistor 501 in parallel, conductor 502, front contact of relay FR(5), to conductor 503 which is connected to the main anodes of tubes PS0(4), PS9(4), PS0(5), PS9(5), and of the other primary-select tubes not shown.

Relay PHS(4), in operating, connects the right-hand control cathodes of all of the tubes PS0 to PS9 in Fig. 4 to ground through its middle front contact, over conductor 504 and through resistor 505 and retardation coil 506. Therefore, when the rising potential applied to the start anodes of the several primary-select tubes PS0 to PS9 in Fig. 4 becomes sufficiently greater than the ground potential of the control cathodes thereof, each of these tubes will undergo a control-gap discharge. One of these tubes will have that discharge occur first in point of time, both because certain of those tubes are given a momentary preference by the delay networks in the junctor subgroup circuits as hereinbefore described, and also because of minute variations in the characteristics of the tubes. Since a suitable positive potential has been applied to the right-hand anodes of all of these tubes, that tube which first undergoes a discharge in the control gap will immediately transfer whereby the discharge will exist between the main anode and the control cathode thereof. In so transferring, this tube will lock out all of the remaining primary-select tubes in that line-link frame associated with the operated PHS relay, i. e., all of the other tubes PS0 to PS9 in Fig. 4 in the assumed case. This lock-out occurs since a common control-cathode impedance comprising resistor 505 and retardation coil 506 is provided and since a common main-anode impedance comprising the winding of relay STC(5) and resistor 501 in parallel, is provided. Let it be assumed that tube PS9(4) first transfers and thereby locks out the remaining primary select tubes in the upper horizontal group of this line-link frame, i. e., the remaining tubes in Fig. 4.

The main cathodes of the several primary-select tubes are connected, through their associated primary-select magnets and through a secondary-horizontal-start relay, to a source of negative battery common to all the primary-select tubes in the same line-link frame. The main cathode of primary-select tube PS9(4) is connected through conductor 413 to the windings of primary-select magnets SEL9(8) and SEL9(9), the other terminals of those windings being connected to conductor 810 whereby these primary-select magnets are connected in parallel, over conductor 810 to the winding of secondary-horizontal-start relay SHS1(18) and to conductor 1805. The main cathode of tube PS9(5) is connected through conductor 507 to the windings of its associated select magnets SEL9(10) and SEL9(11) in parallel, over conductor 810 which, as just described, is connected through the winding of relay SHS1(18) to conductor 1805. Primary-select tube PS0(4) has its main cathode connected through its associated select magnets SEL0(8) and SEL0(9), in parallel, to conductor 811 which is connected through the winding of relay SHS2(18) to the aforesaid conductor 1805, and, similarly, tube PS0(5) has its main cathode connected through its associated select magnets SEL0(10) and SEL0(11), in parallel, to conductor 811 which is connected through the winding of secondary-horizontal-start relay SHS2(18) to conductor 1805. Conductor 1805 extends through Figs. 11, 10 and 5 to the back contact of relay CR(5), resistor 509 and negative battery 510. It is to be understood that intermediate primary-select tubes PS1 to PS8 may be provided in each horizontal group as hereinbefore stated. In both horizontal groups, additional primary-select tubes PS5 to PS8 (not shown) will have their main cathodes connected through associated primary-select magnets (not shown) to the winding of relay SHS1(18), while additional primary-select tubes PS1 to PS4 (not shown) will have their main cathodes connected through associated primary-select magnets (not shown) to the winding of relay SHS2(18).

Since the initial transfer of discharge has been assumed to occur in tube PS9(4), and since a suitable negative potential is applied to the main cathode of that tube, a second transfer will immediately occur whereby conduction will now exist between the main anode and the main cathode of tube PS9(4). This full conduction in the primary-select tube initiates a plurality of operations which proceed concurrently.

As previously described, relay STC(5) is in the main anode circuit of the primary start tubes. Therefore, when tube PS9(4) fires, relay STC(5) will be operated. Relay STC(5), in operating, removes ground from resistor 513, conductor 512, and capacitor 514 thereby permitting capacitor 514 to charge over a path from positive battery 511, resistor 515, capacitor 514, to ground. This rising potential is applied through resistor 516 to the control anode of current-reducing tube CR(5), the control cathode of which is connected to ground through resistor 520. The time constant of the network comprising resistor 515 and capacitor 514 is such that a control-gap discharge will not occur in tube CR(5) until the primary-select magnets have had time to operate. After this interval, a discharge will occur across the control gap of tube CR(5), and, since the main anode is connected to positive 135-volt battery through resistor 521 and the previously traced path via conductor 1230, a first transfer will immediately occur. The main cathode of tube CR(5) is connected to negative battery through the winding of relay CR(5) so the second transfer will take place and relay CR(5) will be operated. The operation of that relay removes the shunt from resistor 522 thereby increasing the impedance in the main-cathode circuit of the conducting primary-select tube PS9(4) thus reducing the current through the tube and prolonging its life.

Relay STC(5), in operating, also connects ground through its front contacts to conductors 518 and 519 which extend through Fig. 10 to Figs. 12 and 14, respectively. Since under the assumed conditions relays C(12) and CI(12) are operated rather than relays C(14) and CI(14), the ground will be conducted over conductor 518, No. 3 contact of relay C(12), winding of relay STC(12), and to battery. Relay STC(12), in operating, removes, at its lower back contact, battery from the winding of relay OT(12) thereby locking out terminating calls as will hereinafter be described. The operation of relay STC(12) also closes a circuit from the positive 100-volt battery at the left of Fig. 12, resistor 1207, middle upper back contact of relay RLS(12), conductor 1208, upper back contact of relay OT(12), conductor 1209, middle front contact of relay STC(12), conductor 1231, No. 5 contact of relay C(12), conductor 1232, to resistor 1406 and conductor 1407, and, in parallel, therewith, to resistor 1408 and conductor 1409, as well as to other similar resistor-conductor combinations, not shown. Conductor 1407 extends through cable 1410 to Fig. 13, and through cable 1301 through Figs. 19, 30 and 37 to Fig. 39. The positive potential on conductor 1407 is then extended through the No. 6 contact of relay ON1(39), assumed to be unoperated, conductor 3901, upper back contact of relay TM(41), conductor 4101, through the closed contacts of switch 3902, conductor 3903, resistor 2001, to the left-hand control anode of the register-connector select-magnet tube SM1(20). Similarly, assuming register No. 2(41) is idle and therefore that its ON relay is released as will hereinafter be seen, the positive potential applied through resistor 1408 will be conducted by conductor 1409, through cables 1411 and 1302, through a similar path in register No. 2(41) including the back contact of the unoperated ON relay, cable 4102 to conductor 2101, resistor 2002 to the control anode of the register-connector select-magnet tube SM2(20). In a similar fashion, this positive potential is applied to the control anodes of all of the other register-connector select-magnet tubes SM- (not shown) which are associated with other idle registers (not shown). The left-hand control cathodes are connected, in common, to ground through resistor 2003 and retardation coil 2004. The left-hand main anodes of all of the register-connector select-magnet tubes are connected, in common, to a source of positive potential over a circuit which may be traced over conductor 1230 through Figs. 20, 15, 14, and 12, No. 7 contact of relay CI(12), conductor 1213, inner upper back contact of relay RLS(12) to positive 135-volt battery. Therefore, one of the register-connector select-magnet tubes will discharge across its control gap, and that discharge will immediately transfer so as to occur between the control cathode and the main anode thereof.

It will be assumed that tube SM1(20), associated with the register shown in detail and assumed to be presently idle, first discharges and transfers. Since the entire appreciable external impedance in this first transfer path comprises the common resistor 2003 and retardation coil 2004, the control cathode of the remaining register-connector select-magnet tubes SM- will be raised to a potential such that any control-gap discharge which may have occurred in any of those other tubes will be extinguished, and thereafter neither a control-gap discharge nor a first transfer can occur in any of the other SM- tubes as long as one of those tubes such as, as assumed, tube SM1(20) is conducting.

Since the main cathode of tube SM1(20) is connected to negative battery through resistor 2007 and the winding of select magnet SEL1(20), a second transfer will immediately occur whereby conduction will exist between the main anode and the main cathode of tube SM1(20). Select magnet SEL1(20) will thereby be operated and will connect ground through its front contact to lead 2008 to operate the associated select magnet SEL1(21).

In accordance with the previously traced circuit, conduction in primary-select tube PS9(4) will result in the operation of relay SHS1(18) which is preferably of a sensitive, low-inductance type so that it will operate prior to the hereinafter-to-be-described operation of the primary-select magnets. Relay SHS1(18), in operating, will connect, through its front contact, ground through inductor 1806 and resistor 1807 to conductor 1808 which is connected to the right-hand control cathodes of the upper group of originating-secondary-select tubes OSS0A(18) to OSS9A(18) and to the control cathodes of the upper group of terminating-secondary-select tubes TSS0(16) to TSS9(16). It may be noted that had secondary-horizontal-select relay SHS2(18) been operated as previously described, it would have connected ground through inductor 1809 and resistor 1810 to conductor 1811 which extends to the right-hand control cathode of originating-secondary-select tubes OSS0B(18) to OSS9B(18), inclusive, and of terminating-secondary-select tubes TSS0(17) to TSS9(17). No suitable voltage is applied to the control anodes of the terminating-secondary-select tubes during an originating call, so no discharge occurs therein. A suitable voltage is applied to the control anodes of those originating-secondary-select tubes OSS0A(18) to OSS9A(18) which are a part of the originating-secondary switches associated with junctors which are idle at the time. These paths may be traced from positive 100-volt battery at the left of Fig. 12 in the common release and time-out circuit, resistor 1207, middle upper back contact of relay RLS(12), conductor 1208, upper back contact of relay OT(12), conductor 1209, No. 3 contact of relay CI(12), to conductor 1210 which extends through Figs. 12, 13, 19, and 30 to Figs. 29 and 28. Assuming junctor 1A(28) to be idle, and, therefore, that relay ON1A(28) is released, the potential on conductor 1210 is extended through resistor 2805, inner upper back contact of relay ON1A(28), conductor 2806, upper back contact of switch MB1A(28), conductor 2807 which is cabled through Fig. 17, and to the right-hand control anode of tube OSS9A(18). Similarly, if junctor 1B(29) be assumed idle, the potential on conductor 1210 is extended through resistor 2927, through the back contacts of the unoperated relay ON1B(29), through the back contact of switch MB1B(29), to conductor 2928 which extends to the right-hand control anode of tube OSS0A(18). Similarly, intermediate tubes OSS1A(18) to OSS8A(18) which may be provided but which have not been shown have a suitable positive potential applied to their control anodes if they are associated with junctors which are idle. It may be noted that this potential on conductor 1210 is also extended, in a similar fashion, through the junctors in the second junctor subgroup to the control anodes of the tubes OSS0B(18) to OSS9B(18), but under the assumed conditions whereby relay SHS1(18) rather than relay SHS2(18) operated, these tubes are not supplied with a suitable control cathode potential.

Main anode voltage is applied to the tubes of Figs. 16, 17, and 18 over a path from positive 135-volt battery at the left of of Fig. 12, inner upper back contact of relay RLS(12), conductor 1213, No. 7 contact of relay C1(12), to conductor 1230 which extends through Figs. 12, 13, 19, and 18 to Figs. 16 and 17. The potential applied to conductor 1230 is extended through resistor 1601 to conductor 1602 which is connected to the main anodes of tubes TSS0(16) to TSS9(16) and to the main anodes of tubes OSS0A(18) to OSS9A(18). This potential is also extended through resistor 1701 to conductor 1702 which is connected to the main anodes of tubes TSS0(17) to TSS9(17) and to the main anodes of tubes OSS0B(18) to OSS9B(18). It may be noted that conductor 1230 also conducts this main anode potential to the corresponding tubes in line-link frame No. 2(19). Since suitable potentials are applied to the control anodes, the control cathodes, and to the main anodes of the originating-secondary-select tubes OSS0A(18) to OSS9A(18), one of those tubes will undergo a control-gap discharge and immediately transfer so that a discharge exists between the control cathode and the main anode thereof. Since the control cathodes of all of these tubes are connected to the common impedance comprising the resistor 1807 and the retardation coil 1806, and since the main anodes are connected to the common impedance comprising resistor 1601, these tubes will fire in lockout whereby when one tube undergoes a first transfer, the control cathodes of the remaining tubes OSS0A(18) to OSS9A(18) will be raised to such a potential that any control-gap discharges that may have occurred will be extinguished and no further discharges or transfers may occur as long as that one tube is conducting. The reduced main anode potentials resulting from the drop across the common main anode impedance will also insure that all other tubes in the group will be locked out. Let it be assumed that originating - secondary - select tube OSS9A(18) first discharges and transfers. Since the main cathode of that tube is connected to a suitable negative potential through the associated select magnet, a second transfer will immediately occur so that conduction exists between the main anode and main cathode thereof and select magnet SEL9A(18) will be operated.

Since primary-select magnets SEL9(8) and SEL9(9) are in the main-cathode circuit of the primary-select tube PS9(4) as before described, when that tube conducts, those select magnets will be operated. Select magnet SEL9(8), in operating, will connect ground over conductor 812, inner front contact of relay PHS(4), conductor 415, winding of relay GP(4), and to battery. The operation of relay GP(4) will disconnect conductor 401 from conductor 1212 at its back contact and will therefore remove the positive potential from the left-hand control anodes of the several line tubes in that horizontal group thereby extinguishing the control-gap discharge in tube L2(9), thereby insuring that other line tubes will be locked out while tube L2(9) is conducting across its main gap.

Select magnet SEL9(8), in operating, will also connect ground over conductor 812, through the winding of relay CS(4), and to battery. Relay CS(4), in operating, connects the class leads from the line tubes of its horizontal group to all class-of-service connector relays, such as relays CSC(4) and CSC(5), for a purpose to be described hereinafter. Relay CS(4), in operating, also closes, at its No. 13 contact, conductor 404 to conductor 416 which serves to place a shunt around high resistor 403 and the upper winding of relay LS(4) in the previously traced main anode circuit of conducting line tube L2(9). The current through tube L2(9) therefore increases whereby the current from negative battery, winding of hold magnet HOLDB(9), conductor 916, inner left-hand back contact of relay LO2(9), conductor 917, cathode 905 of line tube L2(9), through the tube and over the previously traced anode circuit thereof is now sufficient to operate primary hold magnet HOLDB(9). The operation of this primary hold magnet connects the main cathode 905 of line tube L2(9) through the inner make contact of magnet HOLDB(9) to conductor 916, which is the sleeve lead, preparatory to making the tube busy to terminating calls as will be described in detail hereinafter. Magnet HOLDB(9) also removes ground, at its middle back contact, from the tip lead 927, and interrupts, at its outer left-hand back contact, the energizing path for relay L2(9) whereby that relay releases. Primary hold magnet HOLDB(9), in operating, also closes, through its middle front contact, ground over conductor 920 to operate relay LO2(9). Since primary select magnet SEL9(9) has been operated, operation of primary hold magnet HOLDB(9) will also close the primary-switch-cross-points 921 in accordance with the normal functioning of crossbar switches of a suitable type as hereinbefore referenced.

When primary-select magnet SEL9(9) is operated as a result of full conduction in primary-select tube PS9(4), ground is connected from the No. 12 contact of relay CS(4), conductor 419 to Fig. 9, front contact of select magnet SEL9(9), to the sleeve conductor 922 which extends through Figs. 9 and 17 to Figs. 16 and 18. The ground on sleeve conductor 922 is conducted through the winding of terminating-secondary hold magnet HOLDB(16) to battery, and, in parallel, through the time-delay network comprising resistor 1603 and capacitor 1604 to battery. The operation of this terminating-secondary hold magnet is of no importance on an originating call inasmuch as none of the associated select magnets are operated. The ground on sleeve conductor 922 is also conducted through the winding of originating-secondary hold magnet HOLDB (18) to battery, and, in parallel, through the surge-absorbing network comprising resistor 1812 and capacitor 1813 to battery, whereby hold magnet HOLDB(18) is operated.

*Seizing the junctor*

Since the originating-secondary select magnet SEL9A(18) was previously operated, the operation of originating - secondary hold magnet HOLDB(18) will result in the closure of the upper set of cross-points 1814 of the originating-secondary crossbar switch. The subscriber's tip and ring conductors 925 and 926 will now be connected through the operated cross-points 921 in the primary switch to conductors 927 and 928. These conductors are connected through the operated cross-points 1814 to conductors 1817 and 1818, respectively, through the outer upper back contact and inner lower back contact, respectively, of relay C0(28), to conductors 2817 and 2818, to the windings of relay S(28), and to ground and battery, respectively. Therefore, supervisory relay S(28), in the junctor, operates under the control of the subscriber's switchhook contacts.

Upon the closure of the cross-point 1814, the ground on sleeve conductor 922 will be conducted through the operated cross-point to conductor 1815, which, it may be noted, is multiplied, along with the other horizontal conductors of the originating-secondary switches of the line-link frame shown in detail, to the corresponding horizontal conductors of the originating-secondary switches of line-link frame No. 2 represented in Fig. 19. The ground on sleeve conductor 1815, which is cabled to Fig. 28, is conducted through the winding of relay ON1A(28) to battery. Relay ON1A(28) operates and indicates that junctor 1A(28) is busy as hereinbefore mentioned. The ground on conductor 1815 is also conducted through the No. 8 contact of relay TK(28), conductor 2809, through the No. 5 contact of relay SR(28), conductor 2810 which is cabled to Fig. 21, and, in parallel, to the winding of register-connector hold magnet HOLDA(20) to battery, and to the winding of hold magnet HOLDA(21) to battery. Since the register-connector select magnets SEL1(20) and SEL1(21) were previously operated, the operation of these hold magnets will result in the closure of cross-points 2009 and 2102, respectively.

*Seizing the register*

It may be noted that at this time both an idle junctor and an idle register have been selected, viz., junctor 1A(28) and the register shown in detail in Figs. 35 through 42. Upon the closure of the selected cross-points in the register connector of Figs. 20 and 21, the selected junctor and the selected register are interconnected. This interconnection completes an operating path for the register start relay ST(37), which path may be traced from battery, upper winding of relay C0(28) in the junctor, conductor 2811 which is cabled to Fig. 21 and extends to Fig. 20, through the operated cross-points 2009, conductor 2010, winding of relay ST(37), resistor 3701, conductor 3702, No. 5 contact of relay ON1(39), conductor 3905 and to ground through either the No. 2 contact of relay TM(41) or the middle left-hand back contact of relay NGT(41). The resistance in this circuit is such that insufficient current flows to operate relay C0(28), but relay ST(37) is operated.

Relay ST(37), in operating, connects, at its inner upper front contact, ground to conductor 3703, resistor 3704, conductor 3705, to the biasing winding of relay L(37) and to battery, to insure that relay L(37) is unoperated before being closed to the line, as will be described hereinafter. Relay ST(37), in operating, also closes ground, through its outer lower front contact, to conductor 3706 through Figs. 35, 29, 18, 11, 10, and 5, through the lower front contact of relay GP(4), winding of traffic register TR2(4) and to battery. This traffic register operates to indicate that this equipment has been employed in originating a call. Relay ST(37), in operating, also closes ground, through its outer upper contact, conductor 3708, winding of relay ST1(37), and to battery. Relay ST1(37) operates and locks through its inner upper front contact, conductor 3709, to ground through the No. 2 contact of relay SR(37).

Relay ST1(37), in operating, closes ground through its outer lower front contact to conductor 3710 which is cabled to Fig. 41, lower winding of relay TMA(41), and to battery. The operation of relay TMA(41) closes the ground on conductor 3710 through its outer lower front contact to conductor 4114 to operate relay TMB(41). Since the operation of relay ST1(37) interrupts, at its inner lower back contact, the resistance-shunt around capacitor 4104 comprising conductors 3711 and 3712 and resistor 4105, the operation of relay TMA(41) will close a charging path for capacitor 4104 which may be traced from positive battery, resistor 4106, across the capacitor, conductor 4107, upper front contact of relay TMA(41), to negative battery. The rising potential on capacitor 4104 is applied to the left-hand control anode of tube TM(41). The control cathodes of this tube, as well as the main cathode thereof, are connected by conductor 4108, winding of relay TM(41), conductor 4107, upper front contact of relay TMA(41), to negative battery. Therefore, at the lapse of a measured interval, a discharge will occur across the left-hand control gap of tube TM(41) unless prior to that time relay ST1(37) has released to release relays TMA(41) and TMB(41) and to reestablish the resistance shunting path around capacitor 4104. A time-out is thereby obtained whereby if the circuit functions by means of which relay ST1(37) is released do not immediately occur, the circuits will be released as will be described in detail hereinafter.

Figure 42:
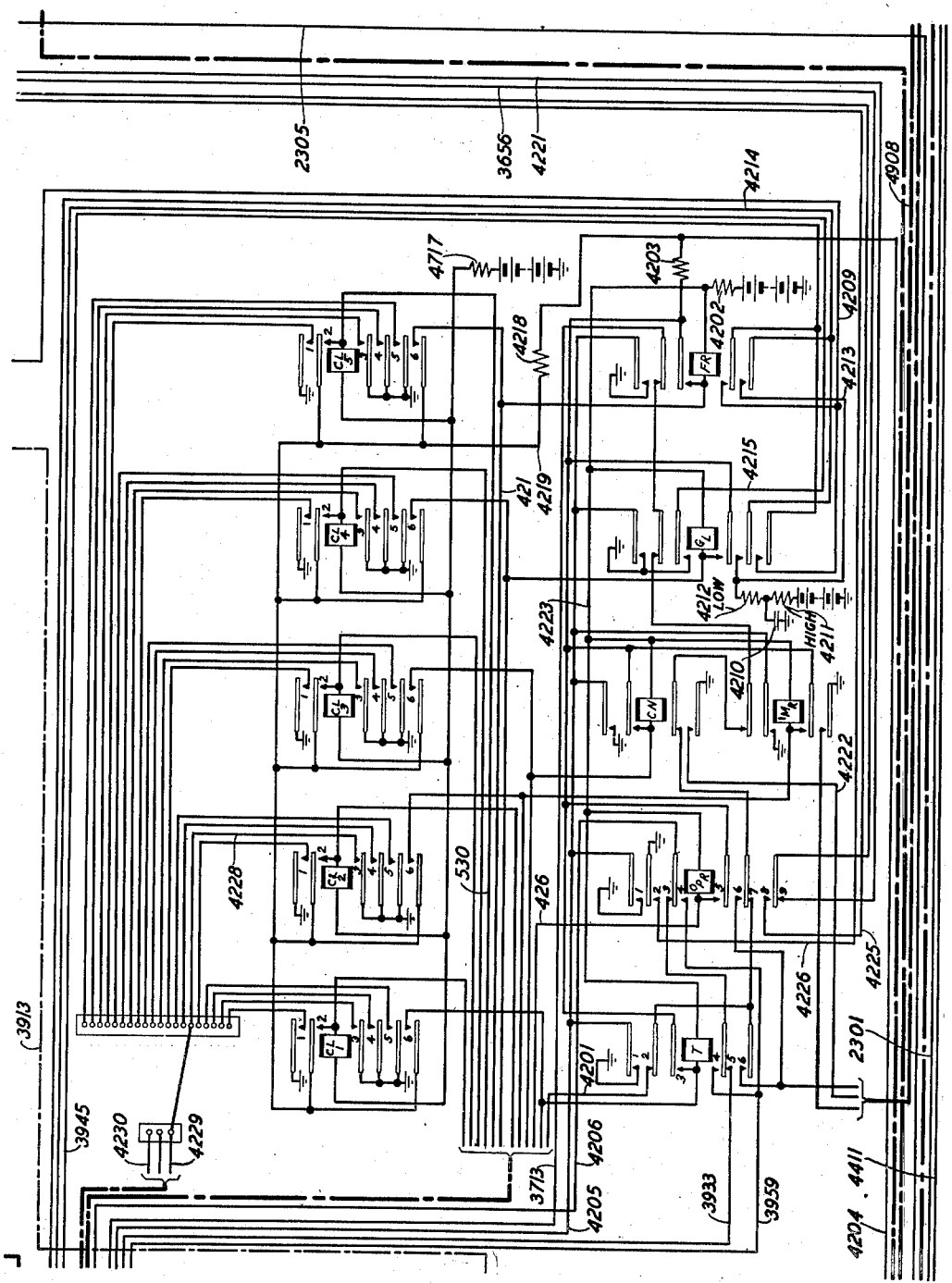

Relay ST1(37), in operating, also closes ground through its middle upper front contact to operate relay ON(37). Relay ON(37), in operating, completes a circuit for the operation of the class-of-service connector relay CSC(4) over a path from ground, No. 4 contact of relay ON(37), conductor 3713 through Figs. 39 and 41 to Fig. 42, through the middle upper back contact of relay FR(42), middle upper back contact of relay GL(42), outer upper back contact of relay IMR(42), inner lower back contact of relay CN(42), No. 7 contact of relay OPR(42), No. 2 contact of relay T(42), conductor 4201 which is cabled to Fig. 4, winding of relay CSC(4), and to battery. Relay CSC(4), in operating, connects the center or class-of-service main anodes of the line tubes in the associated horizontal group to their associated class-of-service relays in the register (Fig. 42). This call has been assumed to have originated from the subscriber designated 347-7 in Fig. 9. It is assumed that this subscriber is entitled to non-restricted service to be paid for on a flat-rate basis. Since this subscriber's line tube L2(9) is conducting, upon the operation of relay CSC(4), conduction in that tube will also occur between the main cathode of line tube L2(9), the middle main or class-of-service anode, conductor 924 which has been associated with the proper terminal for this class of service at terminal strip 420, through the No. 5 contacts of relays CS(4) and CSC(4), to conductor 421 which is cabled to Fig. 42, through the winding of relay FR(42), resistor 4202, to positive battery. It may be recalled that since the subscriber's line tubes in the same horizontal group are connected in lock-out, only tube L2(9) in this horizontal group is conducting, and therefore current flows only through the above-described path and only relay FR(42) of the class-of-service relays in the register will be operated at this time. Relay FR(42), in operating, will lock operated through its inner upper front contact, resistor 4203, conductor 4204 to Fig. 37, No. 8 contact of relay ON(37), and to ground. The operation of relay FR(42) will interrupt, at its middle upper back contact, the previously traced energizing path for relay CSC(4), that relay will therefore be released, and conduction between the main cathode and the middle main anode of line tube L2(9) will cease.

The operation of relay ON(37) causes a shunt to be placed around the winding of relay ST(37) comprising conductor 2010 at the left of the winding of relay ST(37), No. 7 contact of relay ON(37), conductor 3715, inner upper back contact of relay CK(39) to conductor 3905, No. 5 contact of relay ON1(39), to conductor 3702 which extends to the winding of relay ST(37) completing the shunt. It may be noted that this shunt may be traced over an additional path in that conductor 3715 also extends to the outer upper back contact of relay PS(39), and from there the shunting path may be traced over conductor 3906, No. 8 contact of relay TK0(39), conductor 3907, No. 5 contact of relay VAC(40), conductor 4001, No. 8 contact of relay BY1(39), and again to conductor 3905 which extends as previously traced. The shunting of the winding of relay ST(37) and of resistor 3701 reduces the resistance in the previously traced energizing path for relay ST(37) which included the winding of relay C0(28) in the junctor, and relay C0(28) operates.

Relay C0(28), in operating, completes a circuit from ground at the No. 6 contact of relay TK(28), conductor 2812, middle upper front contact of relay C0(28), conductor 2813, No. 1 contact of relay DL(28), conductor 2814, winding of relay SR(28), and to battery.

It will be recalled that the register-connector hold magnets HOLDA(20) and HOLDA(21) have been held operated under the control of relay CS(4) and primary-select magnet SEL9(9) through the inner lower back contact of relay SR(28). Relay SR(28), in operating, places these register-connector hold magnets under the control of the same relays in the register that hold relay C0(28) operated, i. e., it transfers conductor 2010, which is connected to the windings of those hold magnets, through the No. 6 contact of relay SR(28) to conductor 2816 which is connected through the inner upper front contact of relay C0(28), to conductor 2811 which extends to ground in the register as above described. Relay SR(28), in operating, also connects ground through retard coil 2818, No. 7 contact of relay SR(28), to conductor 1815 which is the sleeve lead, and thereby provides a holding path for relay ON1A(28) in the junctor and for the originating-secondary hold magnet HOLDB(18) and for the primary hold magnet HOLDB(9).

Relay C0(28), in operating, transfers the subscriber's tip and ring conductors from relay S(28) in the junctor to the register. The subscriber's tip conductor enters the junctor as conductor 1817, and is connected through the outer upper front contact of relay C0(28), to conductor 2827, and through the No. 5 contact of relay RF(28) to conductor 2829. The subscriber's ring conductor enters the junctor as conductor 1818, and is connected through the inner lower front contact of relay C0(28), to conductor 2828, and through the No. 9 contact of relay RF(28) to conductor 2830. Conductors 2829 and 2830 are cabled to Fig. 31, and are connected through the right-hand back contacts of hold magnet HOLDA(31) to conductors 3101 and 3102, respectively. These conductors are cabled to Fig. 21 and extend to Fig. 20 where they are connected to conductors 2011 and 2012, respectively, through the operated register-connector crosspoint 2009. These continuations of the subscriber's tip and ring conductors then extend to Fig. 37 where the tip conductor 2011 is connected to ground through winding 3717 of the repeat coil, and the ring conductor 2012 is connected through winding 3718 of the repeat coil, and through the lower winding of relay L(37) to battery, thereby operating relay L(37).

Relay L(37), in operating, closes an energizing path for relay SR(37) which may be traced from ground at the No. 2 contact of relay ON(37), conductor 3719, front contact of relay L(37), conductor 3720, No. 3 contact of relay ON(37), conductor 3721, resistor 3722, winding of relay SR(37), and to battery. It may be noted that the ground on conductor 3721 is also extended through the outer upper back contact of relay CK(39), resistor 3908, capacitor 3909, and to negative battery. Capacitor 3909 thereby receives a charge which serves to delay the release of relay SR(37) as will be seen hereinafter. Relay SR(37), in operating, opens the previously traced locking path for relay ST1(37) through the No. 2 contact of relay SR(37), and therefore when relay ST(37) releases as a result of the described shunting thereof, the energizing circuit for relay ST1(37) will be interrupted and relay ST1(37) will be released. Relay ST1(37), in releasing, will interrupt the previously traced energizing paths for relays TMA(41) and TMB(41) and those relays will release, interrupting the time-out. Relay ST1(37), in releasing, also opens the previously traced energizing path for relay ON(37), but that relay is held operated by the ground through the No. 4 contact of operated relay SR(37). Relay ST1(37), in releasing, also completes a path from ground, outer upper back contact of relay ST1(37), conductor 3723, No. 5 contact of relay SR(37), conductor 3724, winding of relay ON1(39), and to battery. Relay ON1(39) operates and locks through its No. 4 contact and conductor 3719 to ground at the No. 2 contact of relay ON(37). Relay ON1(39), in operating, connects the source of dial tone, comprising alternator 1310, through capacitor 1311, No. 9 contact of relay ON1(39), conductor 3912, No. 4 contact of relay AD(37), conductor 3726, to ground through winding 3727 of the repeat coil. Since the calling subscriber's tip and ring conductors are connected through the windings 3717 and 3718, respectively, of the repeat coil as before described, this signal is transmitted to the subscriber to indicate that dialing may proceed. Relay ON1(39), in operating, also closes, through its No. 3 contact, ground to the off-normal ground conductor 3913 which extends to various control relays in the register and which is represented by a dot-dash line.

*Operation of the release circuit*

The operation of relay ON1(39) also causes the operation of the common release and time-out circuit in order that the circuits may be prepared for additional calls. Since the present calling subscriber has been assumed to have subscribed to flat-rate service, and since, therefore, relay FR(42) is operated as hereinbefore described, the operation of relay ON1(39) will complete a circuit from ground at the outer upper contact of relay FR(42), conductor 4205, No. 7 contact of relay ON1(39), conductor 3915, No. 2 contact of relay DC(37), conductor 3728 which is cabled to Fig. 14, through resistor 1412, to positive battery which may be approximately 135-volts positive. It may be noted that prior to that grounding of conductor 3728 through the operation of relay ON1(39), capacitor 1413 has a positive 135 volt potential impressed on its right-hand electrode through resistor 1412 and has approximately a negative 50 volt potential impressed on its left-hand electrode through resistor 1414. When ground is connected to the right-hand electrode of capacitor 1413 through conductor 3728, the voltage on both sides of capacitor 1413 is reduced. This increased negative potential applied to the right-hand electrode of gas diode RR1(14) causes a discharge to be initiated across the gas diode over a path from ground, resistor 1234, conductor 1235, No. 7 contact of relay C(12), conductor 1236 to the left-hand electrode of gas diode RR1(14), and across that diode. Conduction in the gas diode reduces the voltage applied through resistor 1237 to the right-hand control cathode of tube RL(12) to approximately negative 100 volts, and, since the right-hand control anode of tube RL(12) is connected to ground through resistor 1238, a discharge will be initiated across the right-hand control gap of tube RL(12). It may be noted that had relays C(14) and C1(14) been operated rather than the assumed relays C(12) and C1(12), a discharge would have been initiated across the control gap of tube RL(14). Capacitor 1413 immediately charges through resistor 1414 thereby extinguishing gas diode RR1(14). The left-hand main anode of tube RL(12) is connected to positive 135-volt battery through the inner back contact of relay RLS(12), resistor 1239, and, in parallel, through the winding of relay RLS(12) and through capacitor 1240. The main cathode of tube RL(12) is connected to a source of negative voltage. Therefore a first and a second transfer will immediately occur, as described in connection with other tubes of the same type, and relay RLS(12) will be operated. Relay RLS(12), in operating, interrupts those control circuits which were employed in the establishing of the originating call. It may be noted that the circuits used in maintaining the connections from the calling subscriber's line through the primary and secondary cross-bar switches and to the junctor and register are not disturbed by the operation of relay RLS(12). Relay RLS(12) in operating disconnects the positive 50-volt battery from the circuit including the outer back contact of relay RLS(12), disconnects the positive 100-volt battery from the circuit including its middle back contact, and disconnects the positive 135-volt battery from the circuit including its inner back contact. The removal of these potentials interrupts the energizing or holding paths, as previously traced, for the following relays and tubes: the subscriber's line tube L2(9), relay LS(9), relay PHS(4) which releases slow-to-release relay GP(4), frame lockout tube FR0(12), relay FR(5), relay OS(12), primary-select tube PS9(4), primary-select magnets SEL9(8) and SEL9(9) which release relay CS(4), relay SHS1(18), relay STC(5) which releases relay STC(12), originating-secondary select tube OSS9A(18) and originating-secondary select magnet SEL9A(18), tube CR(5) and relay CR(5), and register-connector select tube SM1(20) and register-connector select magnets SEL1(20) and SEL1(21). These relays release and the tubes begin to deionize. To decrease the deionization time of the tubes, negative 50-volt battery may be connected through resistors 1241, 1242, and 1252, respectively and through the front contacts of operated relay RLS(12) to the positive voltage leads. It may be reiterated that the established connection to the junctor and register is maintained through the cross-bar switches under the control of the several hold magnets even though the select magnets are released, which is in accordance with the normal operation of crossbar switches of suitable types as above discussed.

Relay RLS(12), in operating, also interrupts, at its inner back contact, the energizing path for itself and the source of main anode battery for tube RL(12). Tube RL(12) is extinguished and relay RLS(12) starts to release. Capacitor 1240 renders relay RLS(12) slow-to-release to allow ample time for the above-noted tubes and relays, except relay GP(4), to be released. When relay RLS(12) releases, the positive 50-volt, the positive 100-volt and the positive 135-volt batteries are reconnected to their circuits and the apparatus of the common circuit is again conditioned to handle another originating or terminating call.

It may be noted at this time that provision may be made for horizontal group preference for originating calls. As previously described, the originating or left-hand control anodes of the subscriber's line tubes are connected through a back contact of their associated relay GP(4) or GP(5). Therefore, even though the subscriber's line tube L2(9) is now extinguished so that the remaining line tubes in the same horizontal group (i. e., those shown in Figs. 8 and 9) are no longer locked out, no other line tube in that horizontal group can have a discharge initiated therein until slow-to-release relay GP(4) has released. If a subscriber whose line tube is located in the same horizontal group as was the line tube just served has lifted the receiver or handset in preparation for placing a call, and if a subscriber whose line tube is located in another horizontal group is also awaiting service, the latter subscriber will be given preference during the time required for relay GP(4) to release. Similarly, if one of the subscribers in another horizontal group, such as a subscriber at one of the stations represented in Figs. 10 and 11 has just been connected to a junctor and register and if relay GP(5) is in the process of releasing, a subscriber whose line tube is located in the horizontal group shown in Figs. 8 and 9 will be given preference on the next call. If, however, no calls are waiting when the line-link circuit returns to normal, the release of the GP relay permits the associated horizontal group to compete on an equal basis with other horizontal groups for future calls.

*Dialing*

PULSING

As hereinbefore described, relay L(37) operates on its lower winding over the subscriber's loop. Consequently, this relay will release in response to the dial pulses or momentary openings of the subscriber's loop. The middle winding of the relay L(37) is a biasing winding which opposes the lower or operating winding sufficiently to force the relay to release when the loop is opened. The energizing path for this winding was previously traced. The upper winding of the pulsing relay L(37) functions as an aiding winding, assisting in both the operation and release of the relay. When relay L(37) is operated, capacitor 3730 is charged over a path from negative battery, upper winding of relay L(37), capacitor 3730, conductor 3731, No. 5 contact of relay ON(37), conductor 3732, front contact of relay L(37), conductor 3719, No. 2 contact of relay ON(37) and to ground. When the subscriber's loop is opened, as by a breaking of the dial contacts, relay L(37) will release thereby interrupting the charging path for capacitor 3730 and permitting that capacitor to discharge through resistor 3733 to negative battery. The current flow through the upper winding of relay L(37), as a result of the discharging of capacitor 3730, is in a direction to aid the release and insures the closure of the back contacts under adverse line conditions where the biasing winding alone might be insufficient. When the subscriber's loop is again closed, relay L(37) again operates to complete the charging circuit for capacitor 3730 and the current flowing through the upper winding of relay L(37) as a result of the charging of that capacitor aids the operation of the relay thereby insuring a steady front contact closure.

As previously described, relay L(37), in operating, closes parallel paths for the operation of relay SR(37) and for the charging of capacitor 3909. During the momentary release periods of relay L(37), as a result of the momentary opening of the subscriber's loop, the main energizing path for relay SR(37) is interrupted, but the discharging of capacitor 3909 through resistor 3908, resistor 3722, and through the winding of relay SR(37) sufficiently delays the decay of energy in relay SR(37) so that that relay remains operated during these interruptions. On each operation of relay L(37), capacitor 3909 again becomes fully charged so that relay SR(37) will remain operated regardless of the number of dial pulse interruptions that occur.

Immediately prior to dialing, while relay L(37) is operated, capacitor 3735 becomes charged over a path from ground, winding 3736 of the retard coil, capacitor 3735, conductor 3737, No. 6 contact of relay ON(37), resistor 3738, and to negative battery. At the receipt of the first dial pulse, comprising a momentary interruption of the subscriber's loop, relay L(37) will momentarily release, closing its back contacts. Capacitor 3735 will therefore be discharged through the back contact of relay L(37), conductor 3719, No. 2 contact of relay ON(37), and to ground. The retard coil acts as an auto-transformer with the windings 3736 and 3739 in series aiding. The negative portion of the stepped-up voltage oscillation is suppressed through rectifying element or varistor 3740, and the positive portion is applied to conductor 3741. The positive pulse on conductor 3741 is conducted through the inner upper contact of relay RAI(37) and through the No. 4 contact of relay DC(37), in parallel, to conductor 3742 over which it is employed to fire the counting chain tubes of Fig. 36 as will hereinafter be described. The positive pulse on conductor 3742 is also conducted through the inner lower contact of relay RA(37), resistor 3743, No. 2 contact of relay AD(37), conductor 3744, resistor 3501 to ground, thereby applying a positive potential to the left-hand control anodes of tubes RA(37) and PI(35). The left-hand control cathode of tube RA(37) is connected to negative battery through the winding of relay RA(37), and therefore a discharge will be initiated across the control gap of that tube. The left-hand main anode of tube RA(37) is connected to a source of positive potential through the No. 8 contact of relay SR(37), conductor 3746, through the inner upper contact of relay NT(40) and through the No. 5 contact of relay NTI(40), in parallel, conductor 4002, resistor 3747, inner lower back contact of relay RAI(37), resistor 3748, and to the main anode of tube RA(37). The main cathode of tube RA(37) is connected to negative battery through the winding of relay RA(37). Therefore, upon the initiation of a control-gap discharge in tube RA(37), first and second transfers will occur and relay RA(37) will be operated. Relay RA(37) is operated at the first pulse of each digit to indicate the beginning of each digit.

Since rapidity of operation is an object in this telephone switching system, it may here be noted that provision is made to decrease the ionization time of certain of the critical gas tubes employed in the system herein disclosed. For example, the circuit of tube RA(37) is arranged so that a minute "keep-alive" current flows across the right-hand control gap thereof while that tube is in its non-conducting state. Prior to the time that a suitable positive potential is applied to the left-hand control anode of this tube as hereinbefore described, a suitable main anode potential, such as a positive 135 volts, is applied to the left-hand main anode thereof over the previously traced path. This potential is also applied to the right-hand control anode of the tube. The right-hand control cathode of tube RA(37) is connected to negative battery through the winding of relay RA(37) and through a resistor having a high value of resistance. In the disclosed embodiment, with the potentials applied and with the characteristics of the particular tube employed, resistor 3749 has been found to best serve its function if its resistance is approximately 22 megohms. With these applied potentials and with high resistor 3749 in the external circuit, a current of a few microamperes flows across the right-hand control gap of the tube. This current is maintained at a value below the threshold current of this tube, but is such that upon the application of a suitable voltage across the left-hand control gap of the tube and the consequent current flow between the left-hand control anode and the left-hand control cathode, break-down will occur considerably more rapidly than would otherwise be the case. This keep-alive current is interrupted when the main anode voltage is removed as will be described hereinafter.

It will be recalled that prior to the receipt of the first dial pulse, relays L(37), ON(37), and SR(37) were operated and relay RA(37) was unoperated. Under this conditon, capacitor 3750 is in a discharged condition, its discharging circuit being traced from ground, capacitor 3750, resistor 3751, conductor 3752, outer lower contact of unoperated relay RA(37), conductor 3719, No. 2 contact of relay ON(37), and to ground. At the receipt of the first dial pulse, relay RA(37) is operated, as above described, to interrupt this path, but capacitor 3750 continues to be shunted to ground through the back contact of released relay L(37), conductor 3719, No. 2 contact of relay ON(37), and to ground. At the termination of the first dial pulse, relay L(37) again operates, removing this shunt, and permitting capacitor 3750 to charge over a path from positive battery, resistor 3753, No. 6 contact of relay SR(37), conductor 3752, resistor 3751, capacitor 3750, and to ground. This rising positive potential is applied through resistor 3754 to the left-hand control anode of tube RAI(37). The left-hand control cathode of tube RAI(37) is connected through resistor 3755, and the main cathode thereof is connected directly, through conductor 3756, winding of relay RAI(37), to negative battery. The left-hand main anode of tube RAI(37) is connected via conductor 3757, upper back contact of relay EX(37), and resistor 3758 to conductor 4002 which is connected to positive battery as before described. Therefore, when capacitor 3750 has charged to a sufficient value, tube RAI(37) will discharge and undergo first and second transfers. The time constant of the network comprising capacitor 3750, resistor 3751 and resistor 3753 is such, however, that capacitor 3750 will not be charged to the critical value during any of the intervals between the pulses representing any one digit. Therefore, if another pulse is immediately received in the course of the dialing of a digit greater than "1," relay L(37) will again release to reestablish the shunting or discharging path for capacitor 3750. If the digit dialed be "1," or, in any event, at the termination of the final dial pulse of the series representing any one digit, an appreciably longer delay will occur before the receipt of the next dial pulse. During this inter-digital time, capacitor 3750 will charge to the critical value, tube RAI(37) will discharge and transfer, and relay RAI(37) will be operated. Relay RAI(37), in operating, interrupts, at its inner lower contact, the circuit supplying main anode battery to tube RA(37), that tube is extinguished, and relay RA(37) is released.

Relay RAI(37), in operating, also closes a circuit from battery, winding of relay EX(37), outer upper front contact of relay RAI(37), No. 7 contact of relay DC(37), to off-normal ground conductor 3913 which is grounded through the No. 3 contact of relay ONI(39) as hereinbefore described. It may be noted that capacitor 3759 is charged through resistor 3760 in parallel with the winding of relay EX(37) over this same path, the discharge of this capacitor upon the interruption of the energizing path for relay EX(37) rendering that relay slow-to-release.

Relay EX(37), in operating, interrupts, at its upper contact, the circuit for supplying main anode voltage to tube RAI(37), that tube is extinguished, and relay RAI(37) is released. Relay RAI(37), in releasing, interrupts the previously traced energizing path for relay EX(37), and that relay releases. These operations occur during the inter-digital time to restore the pulsing circuit and prepare it for the receipt of the next digit. The storing of the received digit and the restoring of the counting chain also occur at this time as will be described hereinafter.

REGISTERING THE DIGITS

Figure 35:
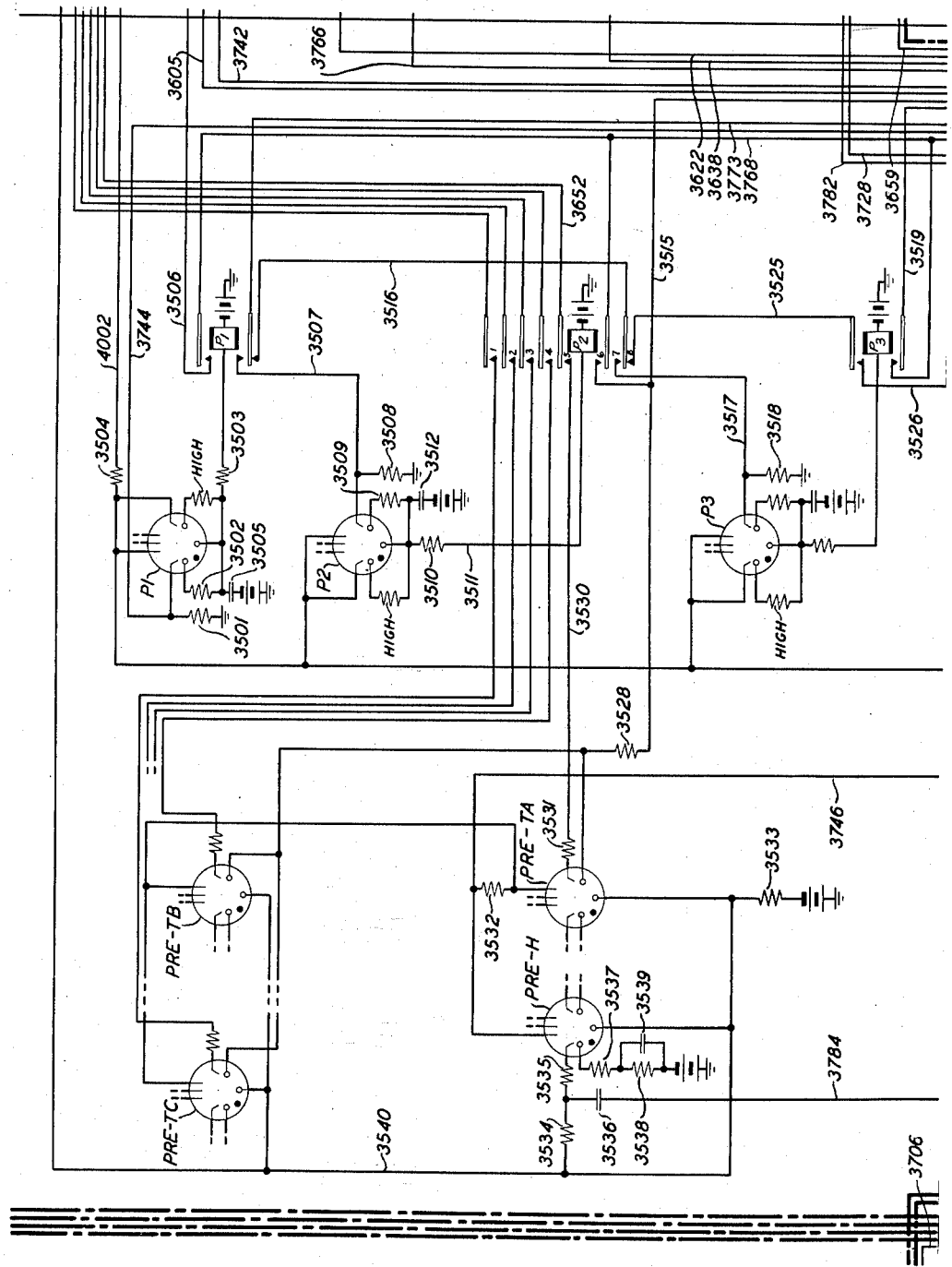
Figure 36:
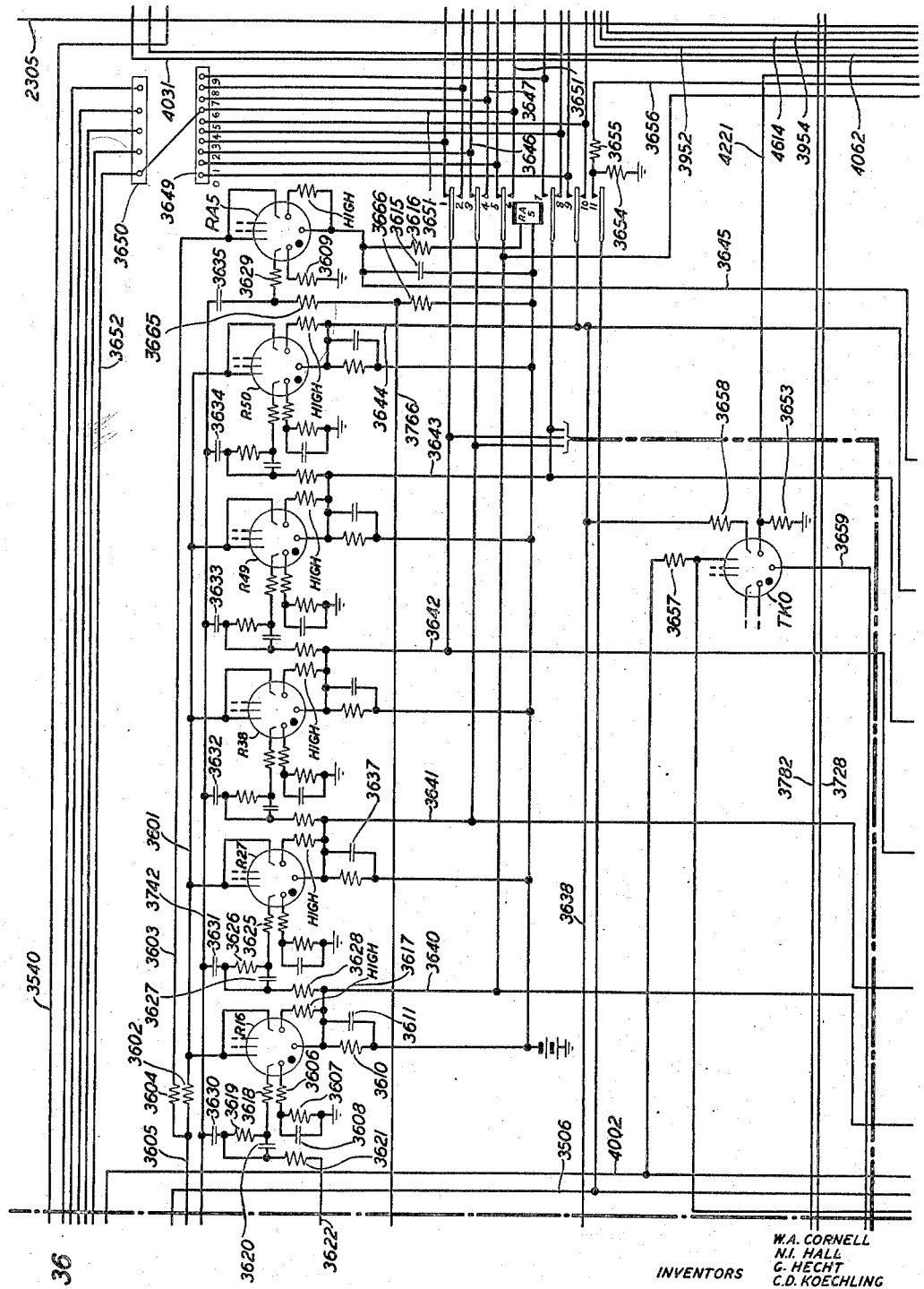
Figure 37:
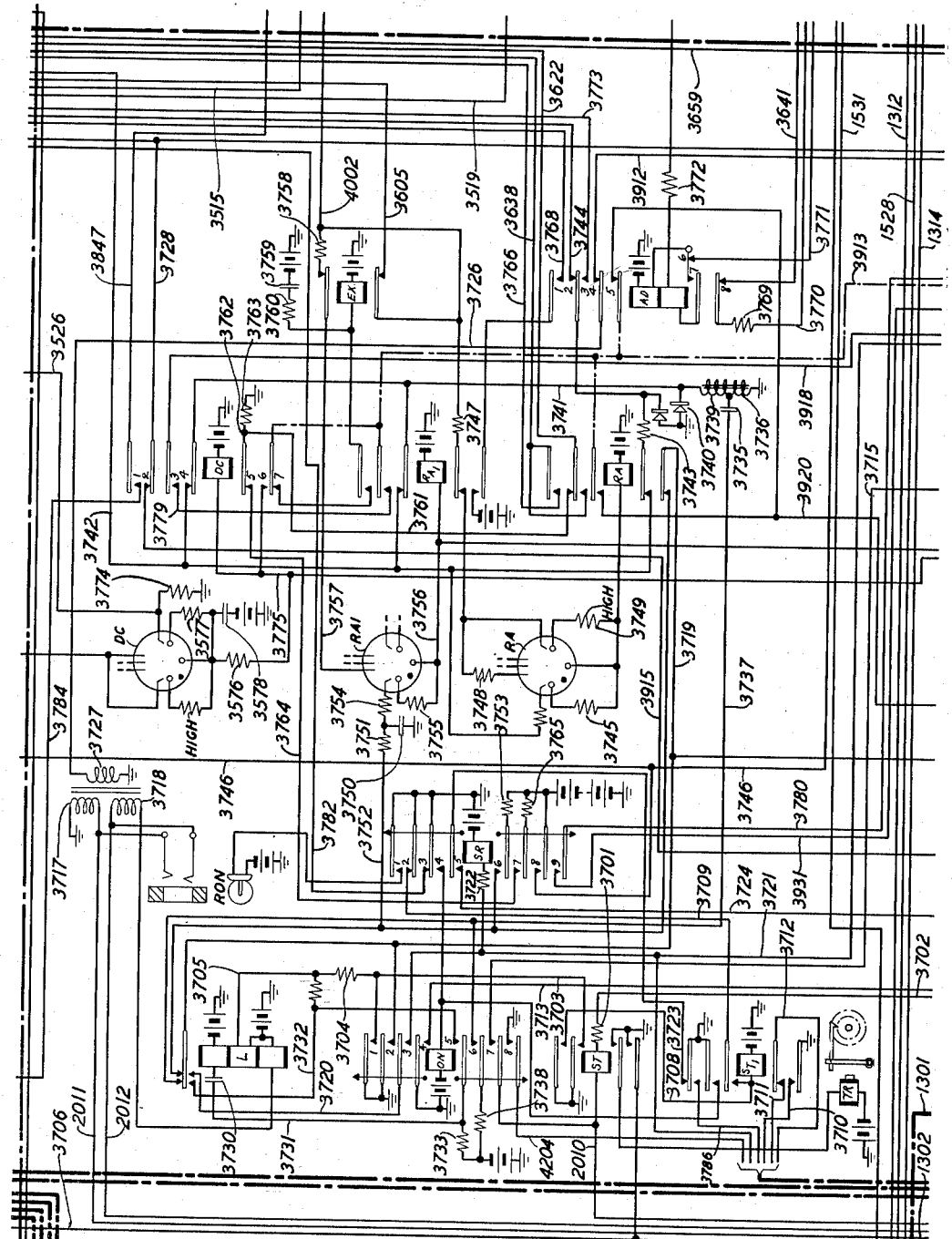
Figure 38:
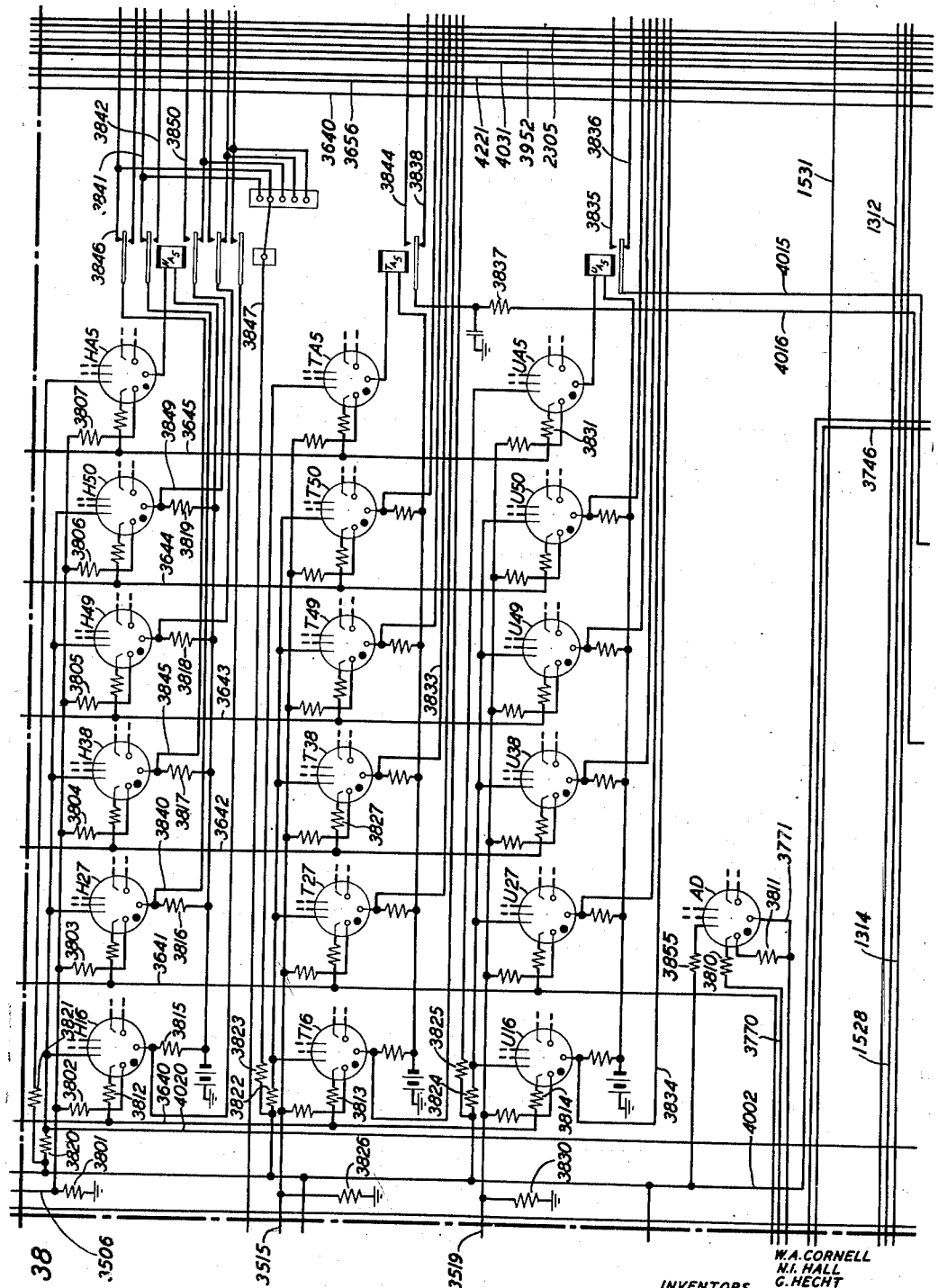

The incoming pulses of each digit are first counted by means of the counting chain shown in Fig. 36, the first three digits are successively stored in the hundreds, tens, and units storing tubes, respectively, of Fig. 38, under the control of the steering circuit of Fig. 35, and the fourth digit, assuming a four-digit subscriber number, is retained and stored in the counting chain of Fig. 36. One skilled in the art will be able readily to modify the disclosed and described circuits to provide for subscriber's codes having a greater or fewer number of digits.

The counting chain comprises six tubes, viz., RI6(36), R27(36), R38(36), R49(36), R50(36), and RA5(36). The left-hand main anodes and the right-hand control anodes of the counting tubes RI6(36) to R50(36), inclusive, are connected by conductor 3601 and resistor 3602, and the left-hand main anode and the right-hand control anode of tube RA5(36) is connected by conductor 3603 and resistor 3604, to conductor 3605. Conductor 3605 is connected through the lower back contact of relay EX(37) to conductor 4002 which is supplied with 135-volt positive battery as before described. The left-hand control cathode of tube RI6(36) is connected to ground through a resistance-capacitance network comprising resistors 3606 and 3607 and capacitor 3608, and the left-hand control cathodes of the counting tubes R27(36) to R50(36) are connected to ground through similar individual networks. The left-hand control cathode of "add-five" tube RA5(36) is connected to ground through resistor 3609. The main cathode of tube RI6(36) is connected through the network comprising resistor 3610 and capacitor 3611 to negative battery, and the main cathodes of the tubes R27(36) to R50(36), inclusive, are connected to negative battery through similar individual resistance-capacitance networks. The main cathode of tube RA5(36) is connected to negative battery through capacitor 3615 and, in parallel therewith, resistor 3616 and the winding of relay RA5(36). It may be noted that the right-hand control cathode of each of the tubes in the counting chain is connected to its associated main cathode through a resistor having a high value of resistance. For example, the right-hand control cathode of tube RI6(36) is connected to the main cathode of that tube, and thereby to negative battery, through high resistance 3617. Thus, the tubes in this counting chain are provided with "keep-alive" circuits to insure rapid operation thereof.

Prior to the receipt of the first dial pulse of any digit, the left-hand control anode of tube RI6(36) is connected through resistor 3618, through the network comprising resistor 3619 and capacitor 3620, through resistor 3621, conductor 3622, middle upper contact of unoperated relay RA(37), and conductor 3761 which is connected to point 3762 on the voltage divider comprising ground, resistor 3763, No. 5 contact of relay DC(37), conductor 3764, No. 7 contact of relay SR(37), resistor 3765, and positive battery. Therefore there is an approximately 50-volt positive bias on the left-hand control anode of tube RI6(36) before any dial pulse interruptions occur for any one digit. This potential is insufficient to create a control-gap discharge in the tube. The left-hand control anodes of the tubes R27(36) to R50(36), inclusive, are connected through similar networks and resistances to the main cathodes of the immediately preceding tubes in the series. For example, the left-hand control anode of tube R27(36) is connected through resistor 3625, through resistor 3626 and capacitor 3627 in parallel, and through resistor 3628 to the main cathode of tube RI6(36). By these connections, the left-hand control anodes of tubes R27(36), R38(36), R49(36) and R50(36) are connected to negative battery. The left-hand control anode of tube RA5(36) is also connected to negative battery through resistor 3629, resistor 3665 and resistor 3666.

As previously described, upon the receipt of the first dial pulse, a high positive pulse is transmitted over conductor 3742 to the counting chain tubes. This positive pulse is applied through capacitors 3630, 3631, 3632, 3633, 3634, and 3635 and through the associated networks to the left-hand control anodes of tubes R16(36), R27(36), R38(36), R49(36), R50(36), and RA5(36), respectively. The left-hand control anode of tube R16(36) has been biased positively, as previously described, and the left-hand control anodes of the remaining tubes R27(36) to RA5(36), inclusive, have all been biased negatively. Therefore, upon the receipt of the first dial pulse, a discharge will occur across the left-hand control gap of tube R16(36) only, and first and second transfers will immediately occur whereby conduction will exist between the main anode and the main cathode of tube R16(36). When relay RA(37) operates, also in response to the receipt of the first pulse of the digit, the previously traced path for applying a positive bias to the left-hand control anode of tube R16(36) is interrupted, and this electrode is then connected to the main cathode of tube R50(36) for purposes of recycling as will be described hereinafter.

Conduction across the main gap of tube R16(36) will result in an appreciable rise in potential at the main cathode thereof, as for example, from negative 48 volts to positive 50 volts. This rise in potential is applied through resistor 3628, through the network, and through resistor 3625 to the left-hand control anode of the next succeeding counting tube, R27(36). This rise in potential is delayed, however, to the extent of the charging time of capacitor 3611 to permit the pulse on the control anodes to disappear to obviate the possibility of tube R27(36) being fired falsely. At the receipt of the next dial pulse, a positive pulse will be applied through capacitors 3630, 3631, 3632, 3633, 3634, and 3635 to the left-hand control anodes of the several counting chain tubes, and since tube R27(36) is the only one thereof having a suitable priming potential applied to its left-hand control anode, that tube will undergo a discharge across its left-hand control gap, and a first and second transfer will occur whereby conduction will exist across the main gap thereof.

At the instant of conduction in tube R27(36), its main cathode will remain at approximately 48-volts negative due to the presence of capacitor 3637, but the potential at the main cathode of tube R16(36) will be at approximately 50-volts positive as previously described. The additional drop across the common anode resistor 3602 as a result of the conduction through tube R27(36) will lower the potential at the main anodes of tubes R16(36) and R27(36) to a point where the potential difference across the main gap of tube R16(36) is insufficient to sustain conduction, and tube R16(36) will be extinguished.

As capacitor 3637 becomes charged, a positive priming potential will be applied to the left-hand control anode of tube R38(36) whereby that tube will be fired on the next dial pulse, extinguishing tube R27(36). Similarly, tubes R49(36) and R50(36) are successively rendered conductive, extinguishing the previously conducting tube. When tube R50(36) becomes conducting as a result of five pulses having been received, the rise in main cathode potential thereof will be applied through conductor 3638, through the middle upper and outer upper contacts of relay RA(37), and to conductors 3622 and 3766, respectively. This positive potential is applied over conductor 3622, through resistor 3621, through the network, and through resistor 3618 to the left-hand control anode of tube R16(36). This positive potential is also applied over conductor 3766, through resistor 3665 and resistor 3629 to the left-hand control anode of tube RA5(36). Therefore, on the sixth pulse, both tubes RA5(36) and R16(36) will fire. Conduction in tube R16(36) will cause tube R50(36) to be extinguished, but it may be noted that tube RA5(36) is provided with an individual main anode impedance comprising resistor 3604 and will not, therefore, be extinguished as a result of conduction in any of the other counting chain tubes. Subsequent dial pulses will be counted as before, with conduction continuing in tube RA5(36) to indicate that conduction through tube R27(36) now represents the digit "7," that conduction through tube R38(36) now represents the digit "8," and so forth. Since relay RA5(36) is in the main cathode circuit of tube RA5(36), as previously described, conduction across the main gap of that tube will result in the operation of relay RA5(36).

STORING AND PRELIMINARY PULSE ABSORBING

As each of the digits of the assumed four-digit subscriber's number is received, the pulses representing each digit are counted in the counting chain of Fig. 36 as above described, with relay RA(36) operating at the beginning of each digit, and relay RAI(36) operating at the end of each digit. As the first or hundreds digit is received and counted, it will be stored in the hundreds storing tubes H16(38) to HA5(38), inclusive, and the counting chain is reset in preparation for the counting of the next digit. The second or tens digit is counted by means of the counting chain tubes R16(36) to RA5(36), inclusive, and is then stored in the tens storing tubes T16(38) to TA5(38), inclusive, and the counting chain is reset. The third or units digit is counted, and is then stored in the units storing tubes U16(38) to UA5(38), inclusive. The fourth digit, representing the ringing code, is both counted and stored in the counting chain tubes R16(36) to RA5(36), inclusive. The successive transfer of the counted digits to their respective series of storing tubes is accomplished under the control of the steering tubes P1(35), P2(35) and P3(35) and the associated steering relays P1(35), P2(35) and P3(35).

As previously noted, the positive pulse on conductor 3741, resulting from the receipt of the first dial pulse of the pulses representing the first digit to be transmitted, is conducted through the No. 4 contact of relay DC(37) and through the inner upper back contact of relay RA1(37) in parallel, to conductor 3742, through the inner lower contact of relay RA(37), resistor 3743, No. 2 contact of relay AD(37), conductor 3744, and through resistor 3501 to ground whereby this positive pulse is applied to the left-hand control anode of steering tube P1(35). The left-hand control cathode of tube P1(35) is connected to negative battery through resistors 3502 and 3503 and the winding of relay P1(35). Therefore, a discharge will be initiated across the left-hand control gap of that tube. Since the left-hand main anode of tube P1(35) is connected through resistor 3504 to conductor 4002 which provides a positive main anode battery supply as previously described, tube P1(35) will undergo a first transfer whereby conduction will exist between the main anode and the left-hand control cathode thereof. Since the main cathode of that tube is connected to negative battery through resistor 3503 and the winding of relay PI(35), a second transfer will occur, conduction will exist across the main gap of the tube, and relay PI(35) will be operated. It may be noted that the right-hand control electrodes of this tube are connected as a "keep-alive" circuit similar to that previously described in order to expedite a discharge in the tube.

The operation of relay PI(35) prepares a circuit whereby upon the operation of relay AD(37) a suitable negative potential will be applied to the control cathodes of the hundreds storing tubes over a path from negative battery, outer lower front contact of relay RAI(37), which operates at the end of the digit, No. 1 contact of relay AD(37), the operation of which has not as yet been described, conductor 3768, upper front contact of relay PI(35), conductor 3506, and through resistor 3801 to ground whereby a negative voltage is applied through resistors 3802, 3803, 3804, 3805, 3806 and 3807 to the left-hand control cathodes of the hundreds storing tubes HI6(38), H27(38), H38(38), H49(38), H50(38), and HA5(38), respectively. Until relay AD(37) is operated, however, this path is not complete, and the first or hundreds digit cannot be transferred from the counting chain tubes to the hundreds storing tubes.

Relay AD(37) is provided so that any preliminary pulse transmitted by an inadvertent fumble of the switchhook, for example, may be absorbed. If, after the first pulse is received and counted by tube RI6(36), a sufficient delay ensues so that relay RAI(37) is operated, this pulse will represent that the first digit transmitted is "1." The operation of relay RAI(37) will cause the operation of relay EX(37) as previously described. The operation of relay EX(37) will remove main anode battery from the counting chain tubes and tube RI6(36) will be extinguished. Therefore, the circuits are returned to their normal condition as if no pulse had been received. It may be noted that since such a preliminary pulse is thus absorbed, a subscriber's number must have, as its first digit, a number other than "1."

If the first digit received is "2" or greater, tube R27(36) will be or will have been rendered conductive during the counting of the pulses representing that digit. When that tube becomes conducting, the rise in cathode potential thereof is transmitted over conductor 3641, through the No. 8 contact of relay AD(37), resistor 3769, conductor 3770, resistor 3810, and to the left-hand control anode of tube AD(38). Negative battery is supplied through the upper winding of relay AD(37), No. 6 contact of relay AD(37), and conductor 3771 to the main cathode of tube AD(38), and through resistor 3811 to the left-hand control cathode of that tube. The left-hand main anode of tube AD(38) is connected through resistor 3855 to conductor 4002 over which main anode battery is supplied as before mentioned. Therefore, tube AD(38) will undergo a control-gap discharge, first and second transfers, and relay AD(37) will be operated.

Relay AD(37) locks over a path from negative battery, upper winding of relay AD(37), No. 7 contact of that relay, lower winding of that relay, resistor 3772 to conductor 4002 through which the positive battery at relay SR(37) is supplied as before explained. Relay AD(37) will thereby remain operated under the control of relay SR(37). Relay AD(37), in operating and locking, interrupts the supply of negative voltage to the cathodes of tube AD(38) thereby extinguishing that tube.

With relay AD(37) operated, as a result of the receipt of a first or hundreds digit greater than "2," the above-described path for the supplying of negative battery to the left-hand control cathodes of the hundreds storing tubes through the upper contact of relay PI(35) will be completed. It may be noted that since relay AD(37) is locked operated, "1" may be used as the tens, units, or ringing code digit. Relay AD(37), in operating, also interrupts, at its No. 4 contact, the circuit over which dial tone was supplied to the calling subscriber.

The main cathodes of the counting chain tubes are connected to the left-hand control anodes of their associated and respective hundreds, tens and units storing tubes. Thus, the main cathode of counting chain tube RI6(36) is connected by conductor 3640 and through resistors 3812, 3813 and 3814 to the left-hand control anodes of the hundreds storing tube HI6(38), of the tens storing tube TI6(38), and of the units storing tube UI6(38), respectively. Similarly, the main cathode of counting chain tube R27(36) is connected by conductor 3641 through individual resistors to the left-hand control anodes of tubes H27(38), T27(38) and U27(38). The other associated tubes are similarly interconnected, including the main cathode of the "add-five" counting chain tube RA5(36) being connected by conductor 3645 through individual resistances to the left-hand control anodes of tubes HA5(38), TA5(38) and UA5(38).

The main cathodes of tubes HI6(38), H27(38), H38(38), H49(38), and H50(38) are connected to a source of negative voltage through resistors 3815, 3816, 3817, 3818, and 3819, respectively, and the main cathode of tube HA5(38) is connected to negative battery through the winding of relay HA5(38). Similarly, the main cathodes of the tens storing tubes TI6(38) to T50(38), inclusive, are connected to negative battery through individual resistors, and the main cathode of tube TA5(38) is connected to negative battery through the winding of relay TA5(38). And in a similar fashion the main cathodes of the units storing tubes UI6(38) to U50(38) are supplied with negative battery, with tube UA5(38) having the winding of relay UA5(38) in its main cathode circuit.

It will be recalled that a positive voltage from the positive battery at relay SR(37) is supplied to conductor 4002. This positive, main anode voltage is thereby connected through common resistor 3820 to the left-hand main anodes of tubes HI6(38), H27(38), H38(38), H49(38), and H50(38), and through individual resistor 3821 to the main anode of tube HA5(38). Similarly, main anode voltage is supplied to tubes TI6(38) to T50(38), inclusive, through the common resistor 3822, and to tube TA5(38) through the individual resistor 3823. In a similar fashion, the main anodes of tubes UI6(38) to U50(38), inclusive, are connected to positive battery through resistor 3824, and the main anode of tube UA5(38) is connected to positive battery through resistor 3825.

It may therefore be seen that upon the receipt and counting of dial pulses representing a first or hundreds digit greater than "1," and upon the operation of relay RAI(37) during the interdigital delay period following the transmission of those pulses, proper potentials are applied to the electrodes of the hundreds storing tubes which are associated with conducting counting chain tubes. Since it has been assumed that the called subscriber's numerical designation is "236-2," the first or hundreds digit is "2," and counting chain tube R27(36), only, will be conducting. The rise in main cathode potential of that tube will be transmitted to the left-hand control anode of hundreds storing tube H27(38), and since the left-hand control cathode of that tube is connected to a source of suitable negative voltage through contacts of relays P1(35), AD(37), and RA1(37) as above described, a control-gap discharge will be initiated in tube H27(38), and first and second transfers will immediately occur, whereby conduction will exist across the main gap thereof.

This transfer of the counted digit to the storing tubes occurs during the period after relay RA1(37) is operated, and before relay EX(37) operates. When relay EX(37) operates, the previously traced circuit for the supply of main anode voltage to the counting chain tubes R16(36) to RA5(36), inclusive, is interrupted, and the conducting counting chain tubes will be extinguished. Under the assumed conditions, tube R27(36) is the only counting chain tube which is conducting, and it will be extinguished. Since relay EX(37), in operating, causes the release of relay RA1(37) which, in turn, interrupts the energizing path for relay EX(37), the counting chain tubes must be extinguished before relay EX(37) again releases to reestablish the main anode supply. The charge on capacitor 3759 insures that relay EX(37) will be sufficiently slow-to-release for the counting chain tubes to become deionized to the required degree.

As previously mentioned, the release of relay RA1(37) releases relay RA(37) which results in the discharge of capacitor 3750 at the control anode of tube RA1(37), and the circuit is prepared for the receipt of the second or tens digit.

At the first dial pulse of the second or tens digit, a positive pulse is transmitted from the retard coil over conductor 3741, through the inner upper back contact of relay RA1(37) and through the No. 4 contact of relay DC(37) in parallel, conductor 3742, inner lower back contact of relay RA(37), resistor 3743, No. 3 contact of operated relay AD(37), conductor 3773, lower front contact of operated relay P1(35), conductor 3507, and through resistor 3508 to ground, whereby this positive pulse is applied to the right-hand control anode of tube P2(35). Negative battery is supplied through the winding of relay P2(35), conductor 3511 and resistor 3510 to the main cathode, and through the additional resistor 3509 to the right-hand control cathode of tube P2(35). It may be noted that negative battery is also connected through capacitor 3512 to the cathodes of this tube. The main anode of tube P2(35) is connected to main anode battery through resistor 3504 which is common to tubes P1(35), P2(35), P3(35), and DC(37). When the positive pulse is applied to the right-hand control anode of tube P2(35), a control-gap discharge and first and second transfers will immediately occur. The main cathode of tube P2(35) will be momentarily held at approximately negative battery potential by capacitor 3512, while the main cathode of previously conducting tube P1(35) will be at a considerably higher voltage since capacitor 3505 will have become fully charged. Therefore, in a manner similar to that in which the counting chain tubes operate and commutate, the additional drop across resistor 3504 resulting from the conduction through tube P2(35) will drop the potential at the main anodes to a point that the potential difference between the main anode and main cathode of tube P1(35) will be below sustaining voltage, and that tube will be extinguished. As tube P2(35) continues to conduct, capacitor 3512 charges whereby the main cathode potential of tube P2(35) rises so that tube P2(35) may be extinguished upon the rendering of tube P3(35) conductive subsequently, and relay P2(35) is operated. The extinguishing of tube P1(35) will release relay P1(35), which will interrupt the circuit over which negative battery had previously been supplied to the control cathodes of the hundreds storing tubes H16(38) to HA5(38), inclusive.

The first dial pulse of the second digit also operates relay RA(37) as before and fires the counting chain tube R16(36). Since "3" is the tens digit of the assumed called subscriber's number, two additional dial pulses will be received which will result in counting chain tube R38(36), only, being conductive. During the interdigital delay, capacitor 3750 will charge, and tube RA1(37) will be fired operating relay RA1(37) as previously described. Relay RA1(37), in operating, will complete a circuit from negative battery through the outer lower contact of relay RA1(37), No. 1 contact of locked operated relay AD(37), conductor 3768, No. 6 contact of operated relay P2(35), conductor 3515, and through resistor 3826 to ground, whereby this negative potential is applied to the left-hand control cathodes of the tens storing tubes T16(38) to TA5(38), inclusive. Since counting chain tube R38(36) is conducting, a positive voltage will be applied over conductor 3642 and through resistor 3827 to the left-hand control anode of tube T38(38). Tube T38(38) will therefore be rendered conductive to store the digit "3" as the tens digit of the called subscriber's number. Relay EX(37) will be operated and released, relays RA1(37) and RA(37) will be released and the counting chain tubes will be extinguished in preparation for the receipt of the next digit.

At the first dial pulse of the third or units digit, a positive pulse is again transmitted to conductor 3773 from which that pulse is passed through the lower back contact of released relay P1(35), conductor 3516, No. 7 contact of operated relay P2(35), conductor 3517, and through resistor 3518 to ground whereby the pulse is applied to the right-hand control anode of tube P3(35). This tube fires, transfers, extinguishes tube P2(35) thereby releasing relay P2(35), and operates relay P3(35) in its main cathode circuit in a manner similar to that previously described in relation to the firing of tube P2(35) at the beginning of the second digit. The release of relay P2(35) interrupts the circuit over which negative battery had previously been applied to the control cathodes of the tens storing tubes T16(38) to TA5(38), inclusive. The operation of relay P3(35) prepares a circuit whereby upon the operation of relay RA1(37) at the end of the third digit negative battery will be connected through the lower front contact of operated relay P3(35), conductor 3519, and through resistor 3830 to ground whereby the negative potential will be applied through individual resistors to the left-hand control cathodes of the units storing tubes U16(38), U27(38), U38(38), U49(38), U50(38), and UA5(38).

Since the units digit of the assumed called subscriber's number 236-2 is "6," six dial pulses will be received and counted by means of the counting chain. The sixth pulse will render both tubes RA5(36) and R16(36) conductive as hereinbefore described. Full conduction in tube RA5(36) will cause the operation of relay RA5(36) which is in the main cathode circuit of that tube. The rise in main cathode potential of tube R16(36) will be transmitted over conductor 3640 and through resistor 3814 to the left-hand control anode of tube U16(38). The rise in main cathode potential of tube RA5(36) will be transmitted over conductor 3645 and through resistor 3831 to the left-hand control anode of tube UA5(38). Therefore, upon the elapse of the requisite portion of the interdigital time and the resultant operation of relay RAI(37), tubes U16(38) and UA5(38) will be rendered conductive to store the digit "6." Relay EX(37) will operate and release, the counting chain tubes will be extinguished, and tubes and relays RAI(37) and RA(37) will be released in preparation for the receipt of the next digit.

Upon the receipt of the first dial pulse of the fourth or ringing code digit, a positive pulse is transmitted over conductor 3773, through the lower back contact of released relay PI(35), conductor 3516, No. 8 contact of released relay P2(35), conductor 3525, upper front contact of operated relay P3(35), conductor 3526, and through resistor 3774 to ground, whereby the positive pulse is applied to the right-hand control anode of tube DC(37). Since negative battery is connected through the winding of relay DC(37), conductor 3775, through resistor 3576 to the main cathode of tube DC(37) and through resistor 3577 to the right-hand control cathode of that tube, as well as through capacitor 3578 to these cathodes, a discharge will occur across the right-hand control gap of tube DC(37), first and second transfers will occur, tube P3(35) will be extinguished due to the additional drop across resistors 3504 and the presence of capacitor 3578, relay P3(35) will be released, and relay DC(37) will be operated. The release of relay P3(35) will interrupt the circuit over which negative battery had previously been supplied to the control cathodes of the units storing tubes U16(38) to UA5(38), inclusive.

Since the fourth or ringing code digit of the assumed subscriber's number 236-2 is "2," counting chain tube R27(36) will be rendered conductive, and will remain conductive to store this ringing code digit. At the pause following the last dial pulse of this digit, tube RAI(37) will fire and relay RAI(37) will be operated. The operation of relay RAI(37) will cause the extinction of conduction through tube RA(37) and relay RA(37) will be released. Relay EX(37), however, will not operate since its previously traced energizing path is interrupted at the No. 7 contact of relay DC(37) as a result of the operation of relay DC(37). Since relay EX(37) does not operate, the main anode circuits for tube RAI(37) and for the counting chain tubes will not be interrupted. Therefore tube R27(36) will remain conducting to store the ringing code digit "2" and relay RAI(37) will not be released. It may be noted that any further dialing will be ineffective in that the pulse output circuit from the retard coil comprising windings 3736 and 3739 is interrupted by the opening of inner upper contact of relay RAI(37) and by the opening of the No. 4 contact of relay DC(37).

The conjoint operation of relays RAI(37) and DC(37) closes an energizing circuit for relay DCI(39) which may be traced from negative battery, winding of relay DCI(39), conductor 3917, left-hand back contact of relay TMB(41), conductor 4110, inner lower back contact of relay CK(39), conductor 3918, No. 3 contact of operated relay DC(37), conductor 3779, middle upper front contact of operated relay RAI(37) to off-normal ground conductor 3913 which is grounded through the No. 3 contact of relay ONI(39). Relay DCI(39) will therefore be operated.

As hereinbefore mentioned, provision is made for time-out in the event that relay STI(37) fails to release within a prescribed time. Provision is also made for the circuits to time out if the subscriber fails to start dialing within another, and preferably considerably longer, prescribed time, or if a series of digits none of which are greater than "1" are received, or if an extended delay period occurs during the dialing.

If, at the time relay ONI(39) operates at the seizure of the register, relay STI(37) has released to release relay TMA(41) which, in turn, has released relay TMB(41), the operation of relay ONI(39) will close an operating circuit for relay TMA(41) which may be traced from ground through the No. 3 contact of relay ONI(39), off-normal ground conductor 3913, through the right-hand back contact of relay TMB(41), conductor 4112, upper winding of relay TMA(41), and to negative battery. Relay TMA(41), in operating, will lock operated over a path from negative battery, lower winding and inner lower front contact of relay TMA(41), conductor 4113, No. 8 contact of relay ONI(39), conductor 3929, No. 5 contact of unoperated relay AD(37) to off-normal ground conductor 3913. This ground is also extended through the inner lower front contact and through the outer lower front contact of operated relay TMA(41) to conductor 4114, through the winding of relay TMB(41) to negative battery. Relay TMB(41) operates to interrupt the original operating path for relay TMA(41). Relay TMA(41), in operating, connects negative battery through its upper front contact to conductor 4107, through the winding of relay TM(41), conductor 4108, and through resistors 4115 and 4116 to the main and control cathodes, respectively, of tube TM(41). This negative battery on conductor 4107 is also applied to the lower electrode of capacitor 4117. Positive battery is connected through resistor 4120, right-hand back contact of relay NGT(41), conductor 4121, resistor 4122 to the upper electrode of capacitor 4117. This capacitor will begin to charge, with the rising potential thereon being applied through resistor 4123 to the right-hand control anode of tube TM(41). As indicated, the time constant of the network including capacitor 4117 is preferably considerably greater than the time constant of the network including capacitor 4104. If relay TMA(41) is not released within this time, a discharge will be initiated across the right-hand control gap of tube TM(41). It may be noted that if, upon seizure of the register, relay ONI(39) is operated prior to the time that relay TMA(41) is completely released as a result of the release of relay STI(37), relay TMA(37) will immediately lock over the above-traced locking circuit.

If dialing commences before capacitor 4117 has charged to the critical potential, relay AD(37) will be operated at the second dial pulse of the first digit, but the locking path for relay TMA(41) will be maintained during the dialing of that digit since conductor 3920 is connected to off-normal ground conductor 3913 through the inner-upper front contact of relay RA(37) which is operated at the beginning of each digit. At the end of the first digit, relay RA(37) releases thereby releasing relay TMA(41). The release of relay TMA(41) interrupts the energizing circuit for relay TMB(41). The release of relay TMB(41) again closes the energizing circuit for relay TMA(41) to off-normal ground conductor 3913, but relay TMB(41) is slow-to-release so that capacitor 4117 may completely discharge through the circuit including resistor 4122 and the upper back contact of relay TMA(41). At the beginning of the second digit, relay RA(37) operates to provide a locking path for relay TMA(41) and an operating path for relay TMB(41); and at the end of that digit relay RA(37) releases to release relay TMA(41) which releases relay TMB(41), which, in turn, reoperates relay TMA(41). This cycle repeats as each digit is received. At the completion of the last digit, relay TMA(41) is released at the release of relay RA(37). Relay TMA(41) releases relay TMB(41) which again closes the circuit for the operation of relay TMA(41) to restart timing. The operation of the circuits in the event that time-out occurs will be discussed hereinafter.

Busy-idle-vacant test
TRAFFIC LOCKOUT

When relay DC1(39) is operated, a circuit is closed from ground, inner upper back contact of relay RS(39), conductor 3921, inner upper front contact of relay DC1(39), conductor 3922 which extends via cables 1410 and 1301 through Fig. 14 to Fig. 12, No. 2 contact of operated relay C1(12), conductor 1241, winding of relay OT(12), conductor 1242, inner upper back contact of relay STC(12), to negative battery. If relay STC(12) is released, as above described, or, otherwise when relay STC(12) releases, relay OT(12) will operate and lock to negative battery through its inner upper front contact. This locking path is provided so that relay OT(12) will not release if relay STC(12) is subsequently operated. Relay OT(12), in operating, interrupts, at its outer upper back contact the previously traced circuit over which positive 100-volt battery is applied to the left-hand control anodes of the subscribers' line tubes as shown in Figs. 8, 9, 10, 11 and 19. It is thereby provided that if any other subscriber has just attempted to originate a call whereby his line relay is operated, the associated line tube may not be fired. Relay OT(12), in operating, also connects negative battery through its middle upper front contact to conductor 1243, winding of relay G1(13) to ground, whereby relay G1(13) is operated for a purpose to be described hereinafter.

Prior to the operation of relay OT(12), the right-hand electrode of gas diode OT(12) is connected to ground over conductor 1235 and through resistor 1234. The left-hand electrode of tube OT(12) and the right-hand electrode of capacitor 1249 are connected to negative 50-volt battery through resistor 1244. The left-hand electrode of capacitor 1249 is connected to positive 135-volt battery through resistor 1245. Upon the operation of relay OT(12), negative battery is connected through the inner upper front contact of that relay to the left-hand electrode of capacitor 1249 dropping the potential on both sides of capacitor 1249, thereby rendering tube OT(12) conductive. The drop across resistor 1234 as a result of conduction through tube OT(12) will cause a negative potential to be applied through resistor 1237 to the right-hand control cathode of tube RL(12) which will render that tube conductive as before described. Capacitor 1249 immediately discharges through resistor 1244 thereby extinguishing gas diode OT(12). As hereinbefore described, tube RL(12) in firing will operate relay RLS(12) which interrupts the circuits of the positive 50, 100 and 135-volt batteries, for the purpose, at this time, of releasing any control circuits which may have been set up by an originating call which has not as yet operated relay STC(12). As before, relay RLS(12), in operating, interrupts its own energizing circuit and, after a delay interval, releases. When relay RLS(12) releases, positive 100-volt battery is connected through resistor 1207, middle upper back contact of relay RLS(12), conductor 1208, outer upper front contact of operated relay OT(12), conductor 1246, No. 6 contact of relay C(12), conductor 1247, resistor 1416, conductor 1417 which is carried through cables 1410 and 1301 to Fig. 39, inner lower back contact of relay RS(39), conductor 3925, outer lower front contact of operated relay DC1(39), conductor 3926 which is carried through cable 1301 to Fig. 13, and to the right-hand control anode of tube LO1(13). It may be noted that the positive 100-volt battery on conductor 1247 is also connected to resistor 1418 and conductor 1419 which is carried through cables 1411 and 1302 to register No. 2 in Fig. 41, and this positive potential may also be connected to additional registers, not shown, in a similar fashion. Any of these registers which are attempting to terminate a call will connect this potential back to its associated lockout tube in Fig. 13 of the common release and time-out circuit. If, for example, register No. 2 is attempting to terminate a call at this time, relay DC(1) therein will be operated and the positive potential will be carried back through a conductor in cable 1302 to the right-hand control anode of tube LO2(13). The right-hand control cathodes of the lockout tubes, such as LO1(13) and LO2(13) shown, are connected to ground through the common resistor 1305 and retard coil 1306. Therefore, these tubes are connected in lockout, and the first one thereof to fire will lock out all others. It will be assumed that a discharge is first initiated across the right-hand control gap of tube LO1(13). The right-hand main anode of tube LO1(13), as well as the right-hand main anodes of the other associated lockout tubes such as LO2(13), is connected through conductor 1239, No. 7 contact of relay C1(12), conductor 1213, inner upper back contact of relay RLS(12) to positive 135-volt main anode battery. The main cathode of tube LO1(13) is connected to negative battery through resistor 1397 and the winding of relay LO1(13). Therefore tube LO1(13) will undergo first and second transfers and relay LO1(13) will be operated. The operation of relay LO1(13) completes a circuit from ground at the No. 5 contact of relay ID(40), conductor 4005 which is extended through cable 1301 to Fig. 13, No. 1 contact of relay LO1(13), conductor 1308, No. 1 contact of relay C1(12), conductor 1248, winding of relay MA(12), and to negative battery. The operation of relay MA(12) interrupts the previously traced circuit over which positive 135-volt main anode battery is supplied to the subscribers' line tubes, and thereby prepares these tubes for line selection by the register as will be described hereinafter. It may be noted that had relays C(14) and C1(14) in the common release and time-out circuit been operated rather than relays C(12) and C1(12), the operation of relay LO1(13) would have completed a circuit from ground at the No. 6 contact of relay ID(40), conductor 4006 which is extended through cable 1301 to Fig. 13, No. 2 contact of relay LO1(13), conductor 1309, No. 1 contact of relay C1(14), conductor 1420, winding of relay MA(14), and to negative battery. In this event, relay MA(14) would have been operated to perform the same function as relay MA(12). Relay LO1(13), in operating, also connects ground through its No. 6 contact to conductor 1316, back contact of relay TMB(15), upper winding of relay TMA(15), to battery. Relay TMA(15) operates over this path to commence timing as will be described hereinafter.

SEIZING THE NUMBER GROUP

Relay LO1(13), in operating, also connects negative battery through resistor 1311, No. 7 contact of relay LO1(13), conductor 1312, winding of number-group connector relay NGCB(47) to ground. Relay NGCB(47), in operating closes a circuit from ground through its No. 1 contact, conductor 4701, winding of relay NGCA(46), to battery whereby relay NGCA(46) is operated. It may be noted that when register No. 2 controls the termination of a call in which event relay LO2(13) will be operated, negative battery is connected through resistor 1313, No. 7 contact of relay LO2(13), conductor 1314, winding of relay NGCB(48) to ground whereby relay NGCB(48) will be operated to, in turn, operate relay NGCA(48).

Figure 15:
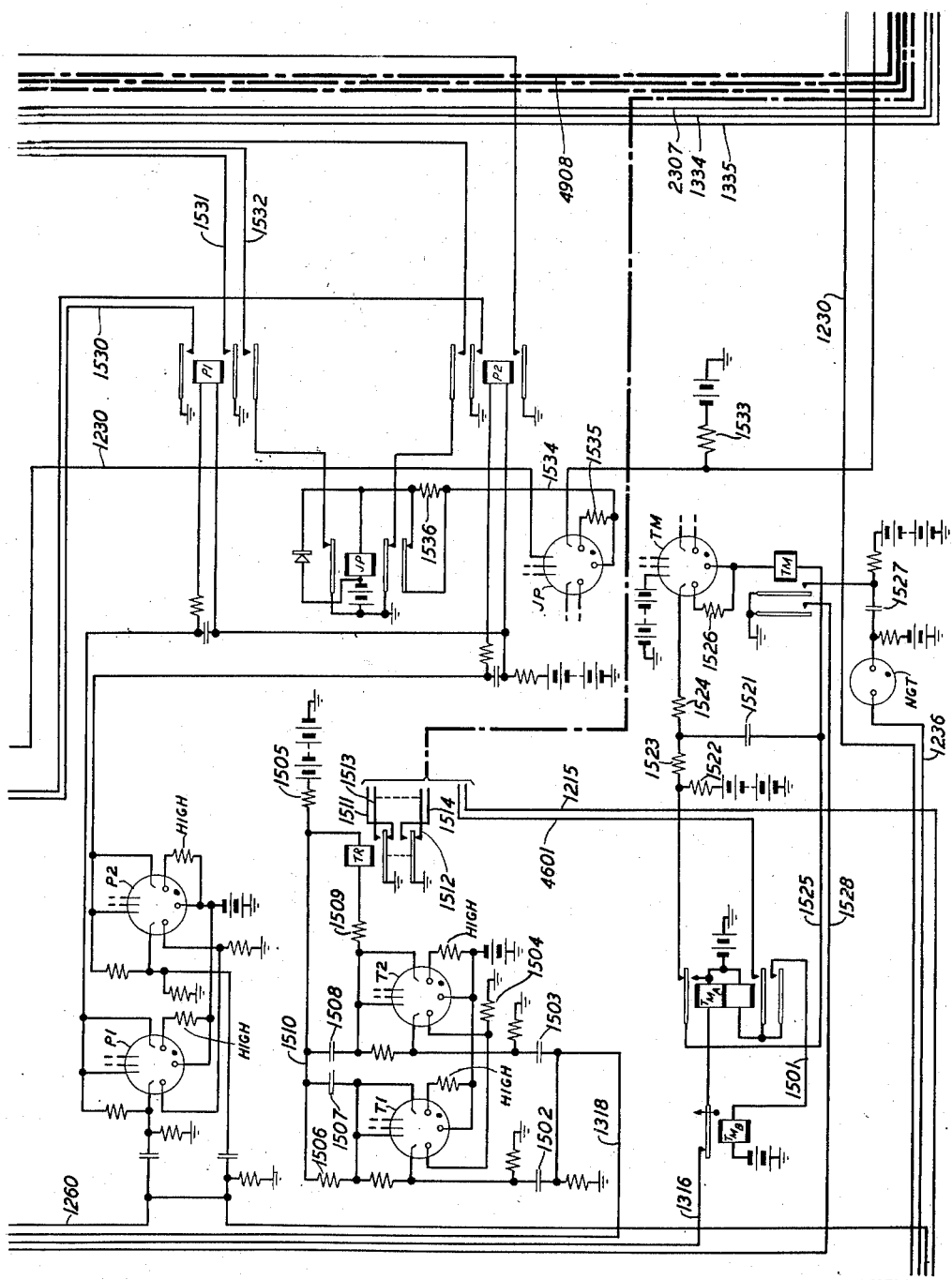

Relay NGCA(46), in operating, connects ground through its Nos. 20 and 21 contacts to conductor 4601 which is cabled to Fig. 15, through the inner lower front contact and through the winding of operated relay TMA(15) to battery, thereby providing a locking path for relay TMA(15). This ground also extends through the outer lower front contact of relay TMA(15), conductor 1501, winding of relay TMB(15), and to battery, thereby operating relay TMB(15).

Relay NGCB(47), in operating, connects the windings of the tens translator relays T16(47), T27(47), T38(47), T49(47), and T50(47) through the Nos. 18, 17, 16, 15, and 14 contacts, respectively, of relay NGCB(47), to the main cathodes of the tens storing tubes T16(38), T27(38), T38(38), T49(38), and T50(38), respectively. With the assumed tens digit "3" stored in the tens storing tubes, and with, therefore, tube T38(38) conducting as previously described, the main cathode of tube T38(38) is at or above ground potential. This potential is conducted through conductor 3833, No. 16 contact of relay NGCB(47), conductor 4703, winding of tens translator relay T38(47) and to negative battery. Relay T38(47) will therefore be operated. In a similar fashion, whichever of the tens storing tubes is conducting as a result of the registration of a tens digit, upon the operation of relay NGCB(47), the correspondingly designated one of the tens translator relays T16(47) to T50(47) will be operated. In a similar manner, relay NGCB(47), in operating, will connect the windings of the units translator relays U16(47), U27(47), U38(47), U49(47), and U50(47) through the Nos. 25, 24, 23, 22, and 21 contacts, respectively, of relay NGCB(47) to the main cathodes of the units storing tubes U16(38), U27(38), U38(38), U49(38) and U50(38), respectively. Thus, with the assumed units digit "6" stored in the units storing tubes, tubes U16(38) and UA5(38) will be conducting. The ground potential, or the potential positive relative to ground, at the main cathode of tube U16(38), will be transmitted over conductor 3834, No. 25 contact of relay NGCB (47), conductor 4704, winding of relay U16(47), to negative battery. Relay U16(47) will thereby be operated. Conduction in tube UA5(38) will result in the operation of relay UA5(38) as above described.

Relay NGCA(46), in operating, connects ground through its No. 5 contact, conductor 4602, No. 4 contact of relay ID(40), conductor 4008, No. 2 contact of relay VAC(40), conductor 4009, winding of relay HST (40) to negative battery. Relay HST(40), in operating connects positive battery through resistor 4012, winding of relay IB(40), conductor 4013, resistor 4014, middle upper front contact of relay HST(40) and to conductor 4015. Since the digit "6" has been assumed to have been stored in the units storing tubes and since, therefore, relay UA5(38) is operated, this positive voltage will be connected through the front contact of relay UA5(38), conductor 3835, No. 26 contact of relay NGCB(47), conductor 4705 and to the front contacts of the units translator relays U16(47) to U50(47), inclusive. Since relay U16(47) is operated as above described, the positive voltage will be passed through the outer upper front contact of that relay to the "6" conductor 4706. It may be noted that had a digit less than "6" been registered in the units storing tubes, relay UA5(38) would have been released, and the positive potential would have been extended through the back contact of relay UA5(38), conductor 3836, No. 27 contact of relay NGCB(47), conductor 4707, and to the inner upper front contacts of the units translator relay.

The positive potential on the "6" conductor 4706 is conducted to the number-group cross-connection terminals of Fig. 49 where a connection is made between conductor 4706 and the units lead of all those line tubes in the system which have a "6" as the units digit of their designating or subscriber's number. For example, "6" conductor 4706 is cross-connected in Fig. 49 to the subscriber's units lead 4906 which is carried via cables 4907 and 4908 to Fig. 11. This positive potential on conductor 4906 is then applied to the right-hand main or "units" anode of the subscriber's line tube L1(11). It may be noted that in a one-thousand line office, ninety-nine other line tubes would be designated by a number of which the units digit is (6), and therefore ninety-nine other line tubes would have this positive potential applied to their right-hand main or "units" anodes.

Negative battery is connected through the winding of relay BY(40), conductor 4016, resistor 3837, and to the armature of relay TA5(38). Since the digit "3" is stored in the tens storing tubes, relay TA5(38) is not operated, and, therefore, this negative voltage is conducted through the back contact of relay TA5(38), conductor 3838, No. 20 contact of relay NGCB (47), and through conductor 4708 to the contacts of the tens translator relays. Since relay T38(47) is operated as above described, the negative voltage will be conducted through the inner upper front contact of that relay to the "3" tens conductor 4713 which is cross-connected in Fig. 49 to the tens leads of all those line tubes in the system which have a "3" as the tens digit of their designating or subscriber's number. For example, the tens "3" conductor 4713 is cross-connected in Fig. 49 to conductor 4909 which extends to Fig. 11 via cables 4907 and 4908. The negative potential on conductor 4909 is connected through resistor 1101 to the right-hand control or "tens" cathode of tube L1(11). In a similar manner, a suitable negative voltage is applied to the right-hand control or "tens" cathodes of all the other line tubes which also have "3" as the tens digit of their designation.

Relay HST(40), in operating, connects ground through its outer upper front contact to conductor 4018, capacitor 4019, winding of relay HP(40), outer upper back contact of relay HP(40) and to negative battery. Relay HP(40) will thereby operate in the charging path of capacitor 4019. Relay HP(40), in operating, connects negative battery through its outer upper front contact to conductor 4016 thereby short circuiting the winding of relay BY(40) and applying full negative battery to the right-hand control or "tens" cathode of the line tubes having the assumed number as their tens digit. Relay HP(40), in operating, also connects positive battery through its inner upper front contact to conductor 4013 thereby short circuiting the winding of relay IB(40) and applying full positive battery to the right-hand main or "units" anode of the line tubes having the assumed number as their units digit.

It will be recalled that one of the hundreds storing tubes which is conducting, assumed to be tube H27(38), has conduction therethrough limited by resistor 3820 in the main anode circuit thereof. Relay HP(40), in operating, connects full positive battery through its inner upper front contact and through conductor 4020 to the main anodes of the hundreds counting tubes, and, thus, full positive battery is applied to the main anode of tube H27(38). The increased conduction through hundreds storing tube H27(38) as a result of this increased potential at the main anode thereof causes the voltage at the main cathode thereof to rise to approximately 50-volts positive. This rise in potential is applied over conductor 3840, inner upper back contact of unoperated relay HA5(38), conductor 3841, No. 13 contact of relay NGCB(47), conductor 4714 through resistor 4715 to ground and through conductor 4714 to the "2" hundreds terminal in Fig. 49. By means of the cross-connection terminals in Fig. 49, this positive potential is applied to the "hundreds" leads of all the line tubes in the system having "2" as the hundreds digit of their designating number. Thus, the positive potential is applied to the hundreds lead 4910 which is carried via cables 4907 and 4908 to Fig. 11, where the positive potential is applied through resistor 1102 to the right-hand control or "hundreds" anode of subscriber's line tube L1(11). It may be noted that this positive potential is also applied through the cross-connections at Fig. 49 to conductor 4911 which is carried via cables 4912 and 4908 to Fig. 10 where the positive potential on conductor 4911 is applied through resistor 1001 to the right-hand control or "hundreds" anode of line tube L3(10) which also has "2" as the hundreds digit of its designating number. It also may be noted that had hundreds storing tube HA5(38) been operated as well as tube H27(38), relay HA5(38) would have been operated and the rise in cathode potential of tube H27(38) would have been applied through conductor 3840, through the inner upper front contact of relay HA5(38), conductor 3842, No. 8 contact of relay NGCB(47) and to conductor 4715 which is connected to the "7" hundreds terminal in Fig. 49.

Relay HP(40), in operating, also interrupts, at its outer upper back contact, its own energizing circuit, and therefore, after a short interval, releases. The positive potential applied to the right-hand control or "hundreds" anodes of those line tubes having a "2" as their hundreds digit will therefore be a square top pulse of short duration which is sufficient to fire the particular line tube having the proper hundreds, tens and units digits. It may be noted that relay HP(40), in releasing, restores the previously traced energizing path for itself. Relay HP(40) will not reoperate, however, since capacitor 4019 has become fully charged during the operating time of relay HP(40) over a path from ground, outer upper front contact of relay HST(40), conductor 4018, capacitor 4019, resistor 4021, outer upper front contact of relay HP(40) and to negative battery. It may be noted that when relay HST(40) releases as will be described, capacitor 4019 will be discharged. Relay HP(40), in releasing, removes the short-circuits from relays IB(40) and BY(40).

When relay HST(40) is operated, a circuit is completed from ground on off-normal ground conductor 3913, No. 7 contact of relay RT(49), conductor 4022, back contact of unoperated relay IB(40), conductor 4023, inner upper front contact of relay HST(40), conductor 4024, winding of relay VAC(40), and to negative battery. Relay VAC(40) is thereby energized but is slow to operate. If the called line is not vacant, relay IB(40) will be operated as will be described immediately hereinafter. The operation of relay IB(40) in that event will interrupt the above traced energizing path for relay VAC(40) and relay VAC(40) will not operate. If the line is vacant, relay IB(40) will not be operated and relay VAC(40) will be allowed to operate to indicate that the line is vacant.

With a suitable positive voltage applied through relay IB(40) to the main anodes of all those line tubes having a "6" as their units digit, with a suitable negative voltage applied through the winding of relay BY(40) to the right-hand control cathodes of all those line tubes having a "3" as their tens digit, and with a positive pulse applied to the right-hand control anodes of all those line tubes having a "2" as their hundreds digit, presuming a 1000-line office, only ten line tubes will undergo a discharge across their right-hand control gaps and only one of these ten will have a proper potential applied to its right-hand main anode so that a first transfer will occur whereby conduction will exist therein between the right-hand main anode and the right-hand control cathode of that tube. This tube will be the one designated "236" which, in the drawing, is tube L1(11). If this line is idle, the main cathode of line tube L1(11) will be at full negative voltage, such as, it may be assumed, at negative 48 volts. In this event, a second transfer will immediately occur whereby conduction will exist between the right-hand main anode and the main cathode of tube L1(11). Since relay IB(40) is in the right-hand main anode circuit, that relay will be operated. After this second transfer has occurred, line tube LI(11) may also still conduct between the right-hand main anode and the right-hand control cathode, but insufficient current will flow to operate relay BY(40). If the line is busy, the main cathode of tube LI(11) will be connected over the sleeve lead to ground through retardation coil 2818 in the junctor as above described. Therefore, in this circumstance, the second transfer will not occur in tube LI(11) and conduction will continue to exist between the right-hand main anode and the right-hand control cathode thereof. Since relay BY(40) is in the right-hand control cathode circuit, under a busy condition both relays IB(40) and BY(40) will operate. The functioning of the system when the called line is busy will be discussed hereinafter, it being presently presumed that the line is idle.

Relay IB(40), in operating, closes a path from ground on off-normal ground conductor 3913, No. 7 contact of relay RT(40), conductor 4022, front (left-hand) contact of relay IB(40), conductor 4025, back (left-hand) contact of relay BY(40), conductor 4026, winding of relay ID(40) and to negative battery. Relay ID(40) is thereby operated and locks over a path from negative battery, winding of relay ID(40), conductor 4026, No. 1 contact of relay VAC(40), conductor 4027, No. 1 contact of relay ID(40), and to ground on off-normal ground conductor 3913.

ESTABLISHING PATH TO CALLED LINE

Relay ID(40), in operating, removes, at its No. 5 contact, the ground which was employed to operate relay MA(12) as above described. Relay MA(12), in releasing, connects positive 135-volt battery through the inner upper back contact of relay RLS(12), conductor 1213, back contact of relay MA(12), conductor 1214, No. 4 contact of relay C(12), conductor 1215, back contact and upper winding of relay LS(5), to conductor 525 which is connected to the left-hand main anode of tube LI(11) as well as to the left-hand main anodes of the other line tubes in the same horizontal group. It may be noted that relay MA(12), in releasing, also connects positive battery through the winding of relay LS(4) to the left main anodes of the line tubes in the upper horizontal group and to the left-hand main anodes of the line tubes in line-link frame No. 2 but since the called line has been assumed to be in the lower horizontal group of the line-link frame shown in detail, these latter paths are of no present importance. Relay ID(40), in operating, also interrupts the previously traced energizing path for relay HST(40), which releases. Relay HST(40), in releasing, interrupts the previously traced circuit, including the winding of relay IB(40), for supplying positive battery to the right-hand main anode of the called subscriber's line tube LI(11). Therefore, positive battery is removed from the right-hand main anode of tube LI(11) and relay IB(40) is released.

With positive battery applied to the left-hand main anode of line tube LI(11) as above described, a third transfer will occur whereby conduction will exist between the left-hand main anode of line tube LI(11) and the main cathode of that tube. Thus a condition exists similar to that when the subscriber initiates a call, and the apparatus functions in a similar manner. Conduction through tube LI(11) causes relay LS(5) to be operated which removes the shunt from around resistors 526 and 527 to reduce the current through the line tube to a low value to prevent the operation of hold magnet HOLDA(11). As before, relay LS(5), in operating, closes positive battery through a time delay network to the left-hand control anodes of the timing tube TO(14) for a purpose to be hereinafter described. Relay LS(5) locks on its primary winding in series with the winding of relay PHS(5). Relay PHS(5), in operating, connects ground through retardation coil 506 and resistor 505 to the right-hand control cathodes of the primary select tubes PS0(5) to PS9(5). Relay PHS(5), in operating, also connects positive 100-volt battery through resistor 1207, middle upper back contact of relay RLS(12), conductor 1208, No. 4 contact of relay C1(12), conductor 1219, resistor 1250, conductor 1251 which is cabled to Fig. 5, resistor 528, outer upper front contact of relay PHS(5), conductor 412, and to the right-hand control anodes of the frame lockout tubes FR0(12) and FR0(14) associated with this line-link frame. With relay C(12) and C1(12) operated, tube FR0(12) fires. Conduction through tube FR0(12) causes the operation of relay FR(5), as before, since that relay is in the main cathode circuit of tube FR0(12). Relay FR(5), in operating, closes a circuit over which positive 135-volt main anode battery is supplied through the winding of relay STC(5) to the main anodes of all the primary select tubes PS0(4) to PS9(4) and PS0(5) to PS9(5) in line-link frame No. 0. Conduction through tube FR0(12) also causes the operation of relay OS(12). It will be recalled that in the case of an originating call the operation of relay OS(12) connected positive 100-volt battery through the idle junctors to the right-hand control anodes of the several primary-select tubes PS0(4) to PS9(4) and PS0(5) to PS9(5). However, in the present case of a terminating call, relay OS(12), in operating, performs no useful function since the positive 100-volt battery has been removed from its armature by the operation of relay OT(12) as previously described.

Relay ID(40), in operating, also connects battery through the selected junctor to the tertiary switch select magnets, associated with that junctor, in each of the line-link frames. These paths may be traced from negative battery, resistor 4028, No. 9 contact of relay ID(40), conductor 4029, cross-point 2102 of the register connector, conductor 2105 which is cabled to Fig. 28 through junctor 1A(28) and to Fig. 24, and through the winding of select magnet SEL1A(24) in the tertiary switch which is a part of line-link frame No. 0 to ground, and, in parallel therewith, through the winding of select magnet SEL1A(25) in the tertiary switch which is a part of line-link frame No. 2 shown in part in Fig. 19. It is to be understood that the tertiary switch select magnets associated with junctor 1A(28) in other line-link frames, not shown, will also be operated at this time. Select magnet SEL1A(24), in operating, operates relay TST(24) over a path from negative battery, resistor 2401, conductor 2402, front contact of select magnet SEL1A(24), conductor 2403, winding of relay TST(24) and to ground. Similarly, select magnet SEL1A(25) operates relay TST(25) over a path from negative battery, resistor 2501, conductor 2502, front contact of select magnet SEL1A(25), conductor 2503, winding of relay TST(25) and to ground.

Positive 100-volt battery is connected through resistor 1207, middle upper back contact of relay RLS(12), conductor 1208, No. 4 contact of relay C1(12), conductor 1219, through resistor 1220 to conductor 1221, and through resistor 1253 to conductor 1254. Conductor 1221 is cabled to Fig. 24 where it is connected to certain of the armatures of relay TST(24). Conductor 1254 is cabled to Fig. 25 where it is connected to certain of the armatures of relay TST(25). When relay TST(24) operates, the positive 100-volt battery on conductor 1221 is extended through its inner lower front contact to conductor 2405, through the back contacts of the unoperated hold magnets of Fig. 24 and to the right-hand control anodes of the associated terminating-secondary select tubes of Figs. 16 and 17. For example, the positive 100-volt potential on conductor 2405 is extended through the outer back contact of tertiary hold magnet HOLDA(24), assuming that hold magnet to be unoperated, resistor 2406, conductor 2407 which is cabled to Fig. 16, resistor 1606, and to the right-hand control anode of terminating-secondary select tube TSS9(16). If tertiary hold magnet HOLDB(24) is unoperated, the potential on conductor 2405 is also extended through the outer back contact of that hold magnet, resistor 2408, conductor 2409 which is cabled to Fig. 16, resistor 1607 and to the right-hand control anode of terminating-secondary select tube TSS5(16). Similarly, if hold magnets HOLDC(24) and HOLDD(24) are unoperated, positive 100-volt battery will be applied to the right-hand control anodes of terminating-secondary select tubes TSS9(17) and TSS5(17). Similarly, this potential will be applied through the back contacts of those unoperated hold magnets (not shown) intermediate hold magnets HOLDA(24) and HOLDB(24) to the control anodes of tubes TSS6(16) to TSS8(16), respectively (not shown), and will be applied through the back contacts of those unoperated hold magnets (not shown) intermediate hold magnets HOLDC(24) and HOLDD(24) to the control anodes of tubes TSS6(17) to TSS8(17), respectively (not shown). The positive 100-volt potential on conductor 1254 is extended, upon the operation of relay TST(25), through the back contacts of all unoperated hold magnets in Fig. 25 to the right-hand control anodes of the associated terminating-secondary select tubes in line-link frame No. 2(19) in a similar manner. It may be noted that had junctor 1B(29) been employed in the call rather than the assumed junctor 1A(28), tertiary select magnets SEL1B(24) and SEL1B(25) would have been operated to operate the same relays TST(24) and TST(25) whereby the positive potential would have been applied to the same terminating-secondary select tubes as above described. If junctor 2A(29) or junctor 2B(29) had been utilized, tertiary select magnets SEL2A(26) and SEL2A(27) or tertiary select magnets SEL2B(26) and SEL2B(27) would have been operated to operate relays TST(26) and TST(27). Relay TST(26), in operating, would have connected, in a similar fashion to that above described, positive 100-volt battery through the back contacts of all those unoperated hold magnets HOLDA(26) to HOLDB(26), inclusive, and to the right-hand control anodes of terminating-secondary select tubes TSS4(16) to TSS0(16), respectively. Similarly, relay TST(26) would have connected positive 100-volt battery through the back contacts of all those unoperated hold magnets HOLDC(26) to HOLDD(26), inclusive, and to the right-hand control anodes of terminating-secondary select tubes TSS4(17) to TSS0(17), respectively. In a similar manner, relay TST(27), in operating, would have connected positive battery through the back contacts of all those unoperated hold magnets shown or indicated in Fig. 27 to the right-hand control anodes of the associated terminating-secondary select tubes in line link frame No. 2(19).

The operation of the TST relays also causes marking potentials to be applied to the control anodes of the several primary select tubes. For example, relay TST(24), in operating, connects the positive 100-volt potential on conductor 1221 through its outer upper front contact to conductor 2410 whereby this potential is extended through the inner back contact of hold magnet HOLDA(24), if that magnet be unoperated, to conductor 2909 and also through the inner back contact of hold magnet HOLDB(24), if that magnet be unoperated, to the same conductor 2909 and also through the back contacts of those unoperated tertiary hold magnets intermediate hold magnets HOLDA(24) and HOLDB(24) to conductor 2909. The positive potential on conductor 2909 is extended through the back contacts of the unoperated originating-secondary hold magnets to the control anodes of certain of the primary select tubes as described above in relation to an originating call. For example, the positive 100-volt potential on conductor 2909 is conducted through the back contact of originating-secondary hold magnet HOLDA(18), if that magnet be unoperated, over conductor 1802, and to the right-hand control anode of primary select tube PS9(5). Similarly, the positive 100-volt potential on conductor 2909 is conducted through the back contacts of those unoperated hold magnets (not shown) which are intermediate hold magnets HOLDA(18) and HOLDB(18) to the right-hand control anodes of the associated primary select tubes PS5(4) to PS8(4), inclusive, and PS5(5) to PS8(5), inclusive, none of which are shown. It may be noted that this positive 100-volt potential will not be connected to the right-hand control anode of tube PS9(4) since originating-secondary hold magnet HOLDB(18) was operated during the originating phase of this call as above described.

Relay TST(24), in operating, also connects the positive 100-volt potential on conductor 1221 through its inner upper front contact to conductor 2411 whereby this potential is extended through the inner back contact of hold magnet HOLDC(24), if that magnet be unoperated, to conductor 2925, and also through the inner back contact of hold magnet HOLDD(24), if that magnet be unoperated, and also through the back contacts of those unoperated tertiary hold magnets intermediate hold magnets HOLDC(24) and HOLDD(24) to conductor 2925. The positive potential on conductor 2925 is extended, in a fashion similar to that above described, through the back contacts of all those unoperated hold magnets HOLDC(18) to HOLDD(18), inclusive, to the right-hand control anodes of primary select tubes PS0(4) to PS4(4) and PS0(5) to PS4(5), respectively.

Relay TST(25) in operating, connects the positive 100-volt potential on conductor 1254 through the back contacts of those unoperated tertiary hold magnets shown or indicated in Fig. 25 to the control anodes of the associated primary select tubes in line-link frame No. 2(19) in a manner similar to that above described.

It may be noted that had junctor 1B(29) been employed, the same relays TST(24) and TST(25)

would have been operated and the same results as above described would have obtained. If junctors 2A(29) or 2B(29) had been used, relays TST(26) and TST(27) would have been operated to connect the positive potential through the back contacts of the unoperated tertiary hold magnets in Figs. 26 and 27 to the same conductors 2909, 2925, 2910 and 2926, respectively, as above and the positive 100-volt potential would thereby have been applied to the right-hand control anodes of all of the primary select tubes associated with unoperated originating-secondary hold magnets in all line-link frames as above described. It will therefore be seen that by the application of suitable positive potentials to the control anodes of the primary select tubes and to the control anodes of the terminating-secondary select tubes through the off-normal contacts of the idle tertiary and secondary hold magnets, all available primary-secondary-tertiary paths are marked.

The main anodes of all of the primary select tubes in line-link frame No. 0 are connected to positive battery through the winding of relay STC(5) as above described. The right-hand control cathodes of the primary select tubes PS0(5) to PS9(5) are connected in lock-out to ground through inductor 506, resistor 505 and through the middle upper front contact of operated relay PHS(5). Therefore, one of the primary select tubes PS0(5) to PS9(5) will undergo a control gap discharge and a first transfer. It will be assumed that primary select tube PS9(5) first fires and transfers thereby locking out the remaining primary select tubes of Fig. 5. As described in the originating phase of this call, the main cathode of primary select tube PS9(5) is connected to negative battery through the windings of select magnets SEL9(10) and SEL9(11), through the winding of relay SHS1(18), and through the back contact of relay CR(5). Primary select tube PS9(5) will therefore undergo a second transfer whereby conduction will exist therein between the main anode and the main cathode thereof. Relay SHS1(18), in the main cathode circuit of tube PS9(5), will be operated and will close ground through inductor 1806, resistor 1807 and through its front contact to conductor 1808 and thence to the right-hand control cathodes of terminating-secondary select tubes TSS0(16) to TSS9(16), inclusive. The main anodes of these tubes are connected to positive battery through resistor 1601 as before described. Since a positive potential is applied to the right-hand control anodes of tubes TSS5(16) to TSS9(16) as above described, one of those tubes will discharge and transfer, in lock-out. It will be assumed that terminating-secondary select tube TSS5(16) discharges and transfers. Since the main cathode of that tube is connected to negative battery through the winding of select magnet SEL5(16), tube TSS5(16) will undergo a second transfer and select magnet SEL5(16) will be operated. It may be noted in regard to the above discussion that although a suitable potential is applied to the control anodes of the terminating-secondary select tubes TSS5(17) to TSS9(17), no control cathode potential is applied thereto unless relay SHS2(18) is operated. It may also be noted that although a suitable potential is applied to the control cathodes of originating-secondary select tubes OSS0A(18) to OSS9A(18), no suitable control anode potential is applied thereto since relay OT(12) is operated as above described.

Full conduction through primary select tube PS9(5) also causes the operation of primary select magnets SEL9(10) and SEL9(11). Select magnet SEL9(10), in operating, operates relay GP(5), as in an originating call. Relay GP(5), in operating, completes a circuit from ground, outer lower front contacts of relays TST(24) and TST(25), conductor 2412 to Fig. 5, inner upper front contact of relay GP(5), winding of traffic register TR1(5) and to battery. The traffic register is thereby operated to record the fact that the equipment has been used in the completion of a terminating call.

As was described in the originating phase of this call, select magnet SEL9(10), in operating, operates relay CS(5) which places a shunt around the high resistance 527 to increase the current flow through the line tube L1(11) whereby primary hold magnet HOLDA(11) will be operated to close cross-point 1103 and to operate relay LO1(11). Relay CS(5), in operating, also extends ground through its No. 12 contact, conductor 528, front contact of select magnet SEL9(11) and to sleeve conductor 1104. This ground is conducted through the closed cross-point 1103, conductor 1105, winding of hold magnet HOLDA(11) and to battery to lock that hold magnet operated. The ground on sleeve conductor 1104 operates originating-secondary hold magnet HOLDA(18) and terminating-secondary hold magnet HOLDA(16) as in an originating call. Hold magnet HOLDA(18), in operating, opens its back contact so that the path therethrough will be busy to subsequent calls. Terminating hold magnet HOLDA(16) in operating, closes cross-point 1608 whereby the ground on sleeve conductor 1104 is extended to sleeve conductor 1609 which is cabled to Fig. 24 and connected through the winding of tertiary hold magnet HOLDB(24) to battery. Hold magnet HOLDB(24) in operating, closes cross-point 2413 and thereby extends the ground on conductor 1609 to sleeve conductor 1815 which is cabled to junctor 1A(28).

It will now be seen that the called subscriber's tip and ring conductors are connected through operated cross-point 1103 in the primary switch, operated cross-point 1608 in the terminating-secondary switch, and through operated cross-point 2413 in the tertiary switch to the right-hand side of junctor 1A(28). The called subscriber's tip conductor 2832 then extends through the No. 3 contact of relay RF(28), No. 3 contact of relay TK(28), conductor 2845, upper winding of supervisory relay CS(29), and to ground. The called subscriber's ring conductor 2833 is extended through the No. 7 contact of relay RF(28), No. 12 contact of relay TK(28), conductor 2846, lower winding of supervisory relay CS(28), and to negative battery.

Upon the operation of tertiary hold magnet HOLDB(24) and the resultant closure of cross-point 2413, positive 100-volt battery is connected through resistor 2415, conductor 2416, cross-point 2413, conductor 2417 which is cabled to Fig. 28, No. 8 contact of relay BY(28), conductor 2835 which is cabled to Fig. 21, through the operated register-connector cross-point 2102, conductor 2106, No. 7 contact of operated relay ID(40), conductor 4030, resistor 3927, and through resistor 3928 to ground whereby a positive potential is applied to the right-hand control anode of tube VCK(39). The right-hand control cathode of tube VCK(39) is connected to ground through resistor 3929. Positive 135-volt battery is connected through the winding of relay CK(39), resistor 3930, conductor 3931, No. 9 contact of operated relay SR(37), and through conductor 3780 to the left-hand main anode of tube VCK(39). Negative battery is connected through resistor 3932, No. 4 contact of relay TK0(39), conductor 3933, No. 5 contact of relay T(42), No. 3 contact of relay OPR(42), conductor 4206, No. 7 contact of relay RC(39), conductor 3934, and through resistor 3935 to ground whereby a negative potential is applied to the main cathode of tube VCK(39). Tube VCK(39) will therefore undergo a control-gap discharge and first and second transfers and relay CK(39) will be operated. Relay CK(39), in operating, connects ground through the No. 2 contact of operated relay ON1(39), conductor 3936, resistor 3937, outer lower front contact of relay CK(39) to conductor 3931, thereby locking relay CK(39) operated and extinguishing tube VCK(39). Relay CK(39), in operating also interrupts, at its outer upper back contact, the circuit by means of which capacitor 3909 was connected to the winding of relay SR(37), thereby making relay SR(37) less slow to release. Relay CK(39), in operating, also interrupts, at its inner lower back contact, the previously traced energizing path for relay DC1(30) and that relay releases.

Considering again the effects of full conduction in primary select tube PS9(5), it will be recalled that the main anode circuit of that tube included the winding of relay STC(5), and therefore as a result of conduction through this circuit, relay STC(5) will be operated. Relay STC(5), in operating, causes tube CR(5) to be rendered conductive as described in the originating phase of this call, and relay CR(5) will thereby be operated to reduce the current flow through primary select tube PS9(5), as hereinbefore described. Relay STC(5), in operating, also closes ground through its front contact to conductor 518, No. 3 contact of relay C(12), conductor 1255, winding of relay STC(12) to battery, thereby operating relay STC(12).

Figure 39:
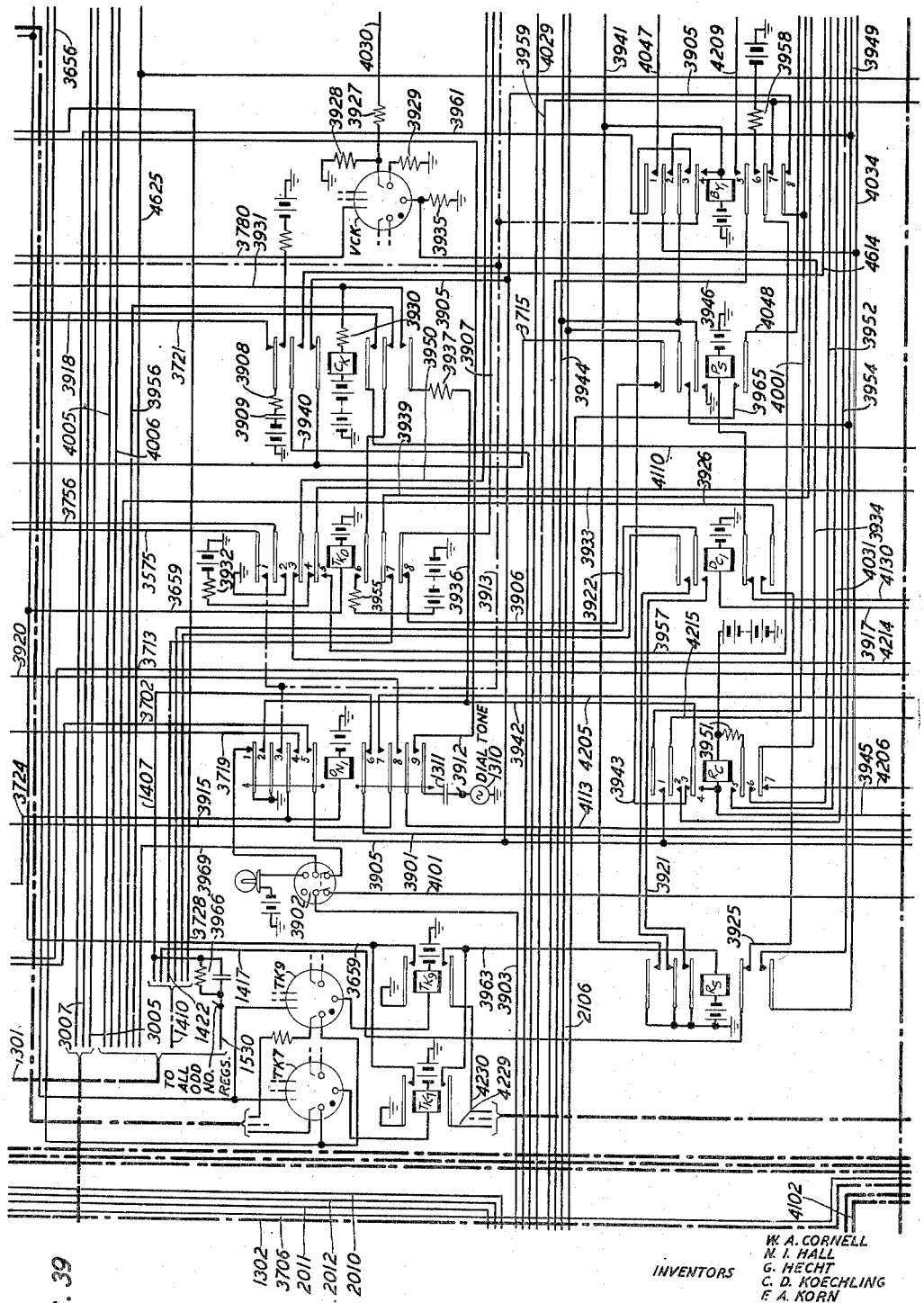
Figure 40:
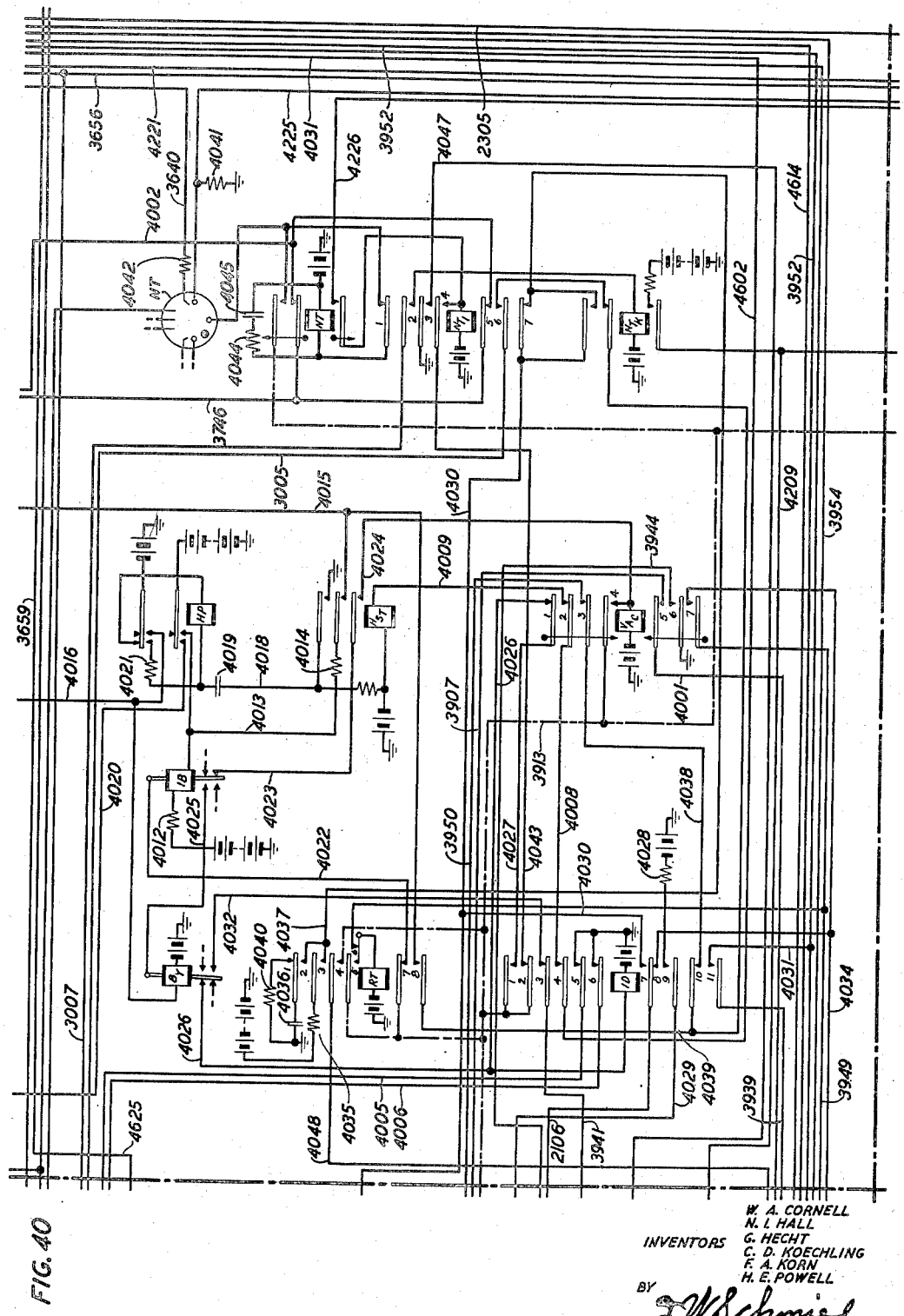
Figure 46:
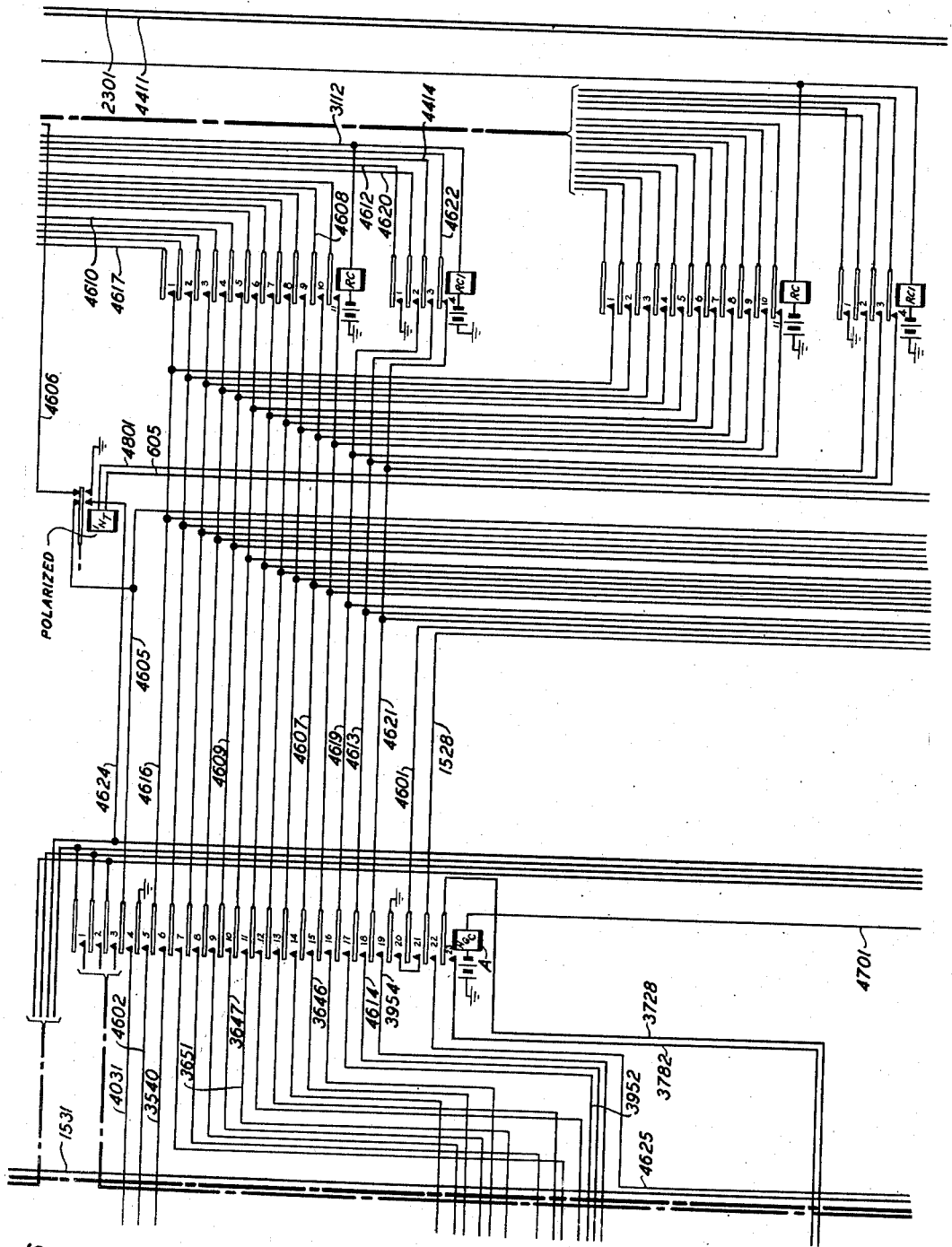
Figure 47:
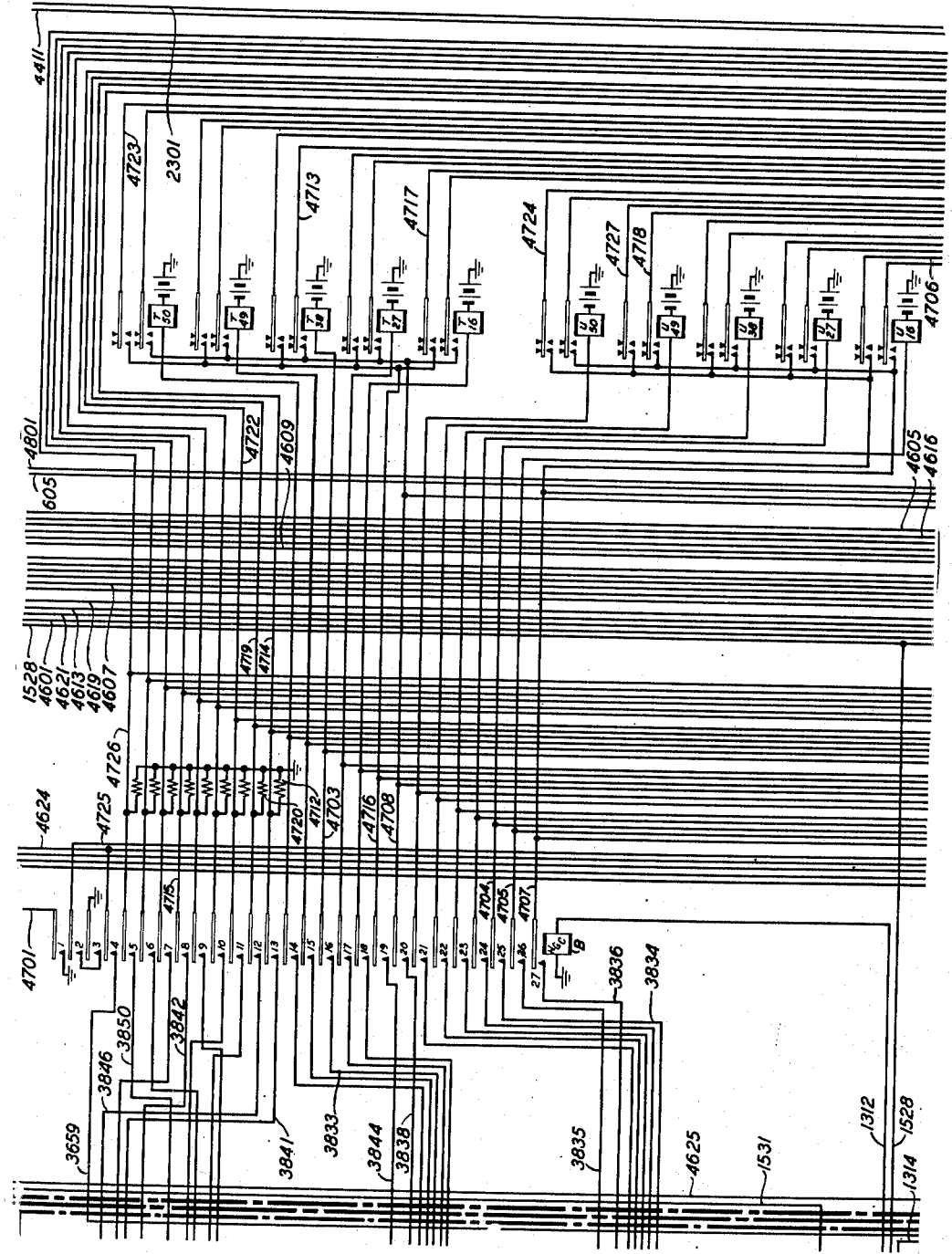
Figure 48:
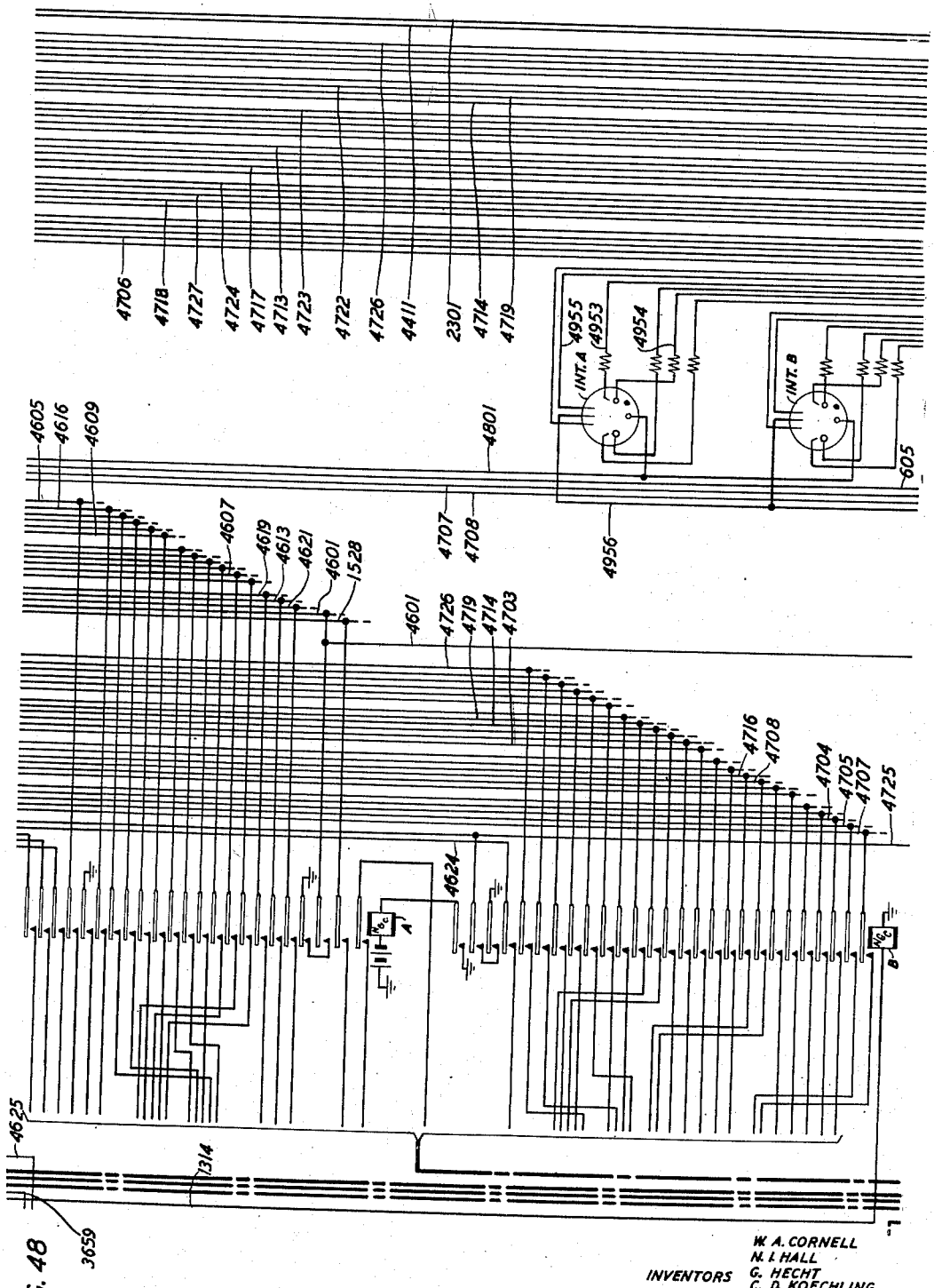

Relay STC(12), in operating, connects positive 100-volt battery through resistor 1207, middle upper back contact of relay RLS(12), conductor 1208, outer upper front contact of operated relay OT(12), conductor 1246, outer upper front contact of relay STC(12), conductor 1256, No. 6 contact of relay C1(12), conductor 1257, resistor 1421, conductor 1422 which is carried via cables 1410 and 1301 to Fig. 39, No. 7 contact of relay TK0(39), conductor 3939, No. 11 contact of operated relay ID(40), conductor 4031 which extends to Fig. 46, No. 4 contact of relay NGCA(46), conductor 4605, through the back contact and armature of relay INT(46) to conductor 4606, resistor 4401, conductor 4402, No. 2 contact of relay ON(44), conductor 4403, right-hand closed contact of switch SW(44), conductor 4404, back contact of relay RL(44), conductor 4405 which is cabled to Fig. 31, resistor 3103, and to the left-hand control anode of the ringing-connector select tube SM1(31). The positive 100-volt battery on conductor 4606 is also extended through similar relays in all other idle ringing circuits and to the control anodes of the other associated ringing-connector select tubes. For example, this voltage on conductor 4606 is also extended through ringing circuit No. 2(43), if that circuit be idle, conductor 4301 which is cabled to Fig. 31, resistor 3104, and to the left-hand control anode of ringing-connector select tube SM2(31). The left-hand control cathodes of the ringing-connector select tubes SM1(31) to SM2(31) are connected, in common, to ground via conductor 3105, through resistor 3106 and retardation coil 3107. The left-hand main anodes of the tubes SM1(31) to SM2(31) are connected, in common, to conductor 3108, resistor 3109, conductor 1230 which extends to Fig. 12, No. 7 contact of relay C1(12), conductor 1213, inner upper back contact of relay RLS(12), and to positive 135-volt battery. One of the tubes SM1(31) to SM2(31) will therefore fire and undergo a first transfer to lock out the remaining ringing connector select tubes. Let it be assumed that tube SM1(31) first discharges. The main cathode of that tube is connected to negative battery through resistor 3111 and the winding of ringing-connector select magnet SEL1(31). Tube SM1(31) will therefore undergo a second transfer and select magnet SEL1(31) will be operated. It may be noted that when any one of the register-connector select tubes discharges and undergoes a first transfer, the consequent rise in control cathode potential is sufficient to extinguish any control-gap discharges which may have occurred in the remaining register-connector select tubes.

Select magnet SEL1(31), in operating, connects ground through its front contact to conductor 3112, through the windings of ringing connector relays RC(46) and RC1(46), in parallel, and to battery, thereby operating these relays.

It will be recalled that the fourth or ringing-code digit of the called subscriber's number was not only counted on the counting-chain tubes of Fig. 36, but was also stored therein. Upon the operation of ringing-connector relay RC(46), the information stored in the counting-chain tubes of Fig. 36 is transmitted to the ringing-code tubes of Fig. 45. It has been assumed that the ringing-code digit of the present called subscriber's number is "2" whereby counting-chain tube R27(36) is conducting, and the main cathode of that tube is at a potential positive relative to ground. This positive potential is transmitted through conductor 3641, No. 3 contact of unoperated relay RA5(36), conductor 3646, No. 15 contact of relay NGCA(46), conductor 4607, No. 10 contact of relay RC(46), conductor 4608, through resistor 4501 to ground, whereby a positive potential is applied through resistor 4502 to the left-hand control anode of ringing-code tube R2(45). Since none of the other counting-chain tubes R16(36) to R50(36), inclusive, are conducting, the main cathodes of those remaining tubes are at approximately negative 48 volts and a negative potential will be applied through the contacts of relay RC(46) to the left-hand control anodes of the ringing-code tubes R1(45), R3(45), R4(45) and R5(45), with relay RA5(36) in an unoperated condition. It may be noted that relay RA5(36) performs a translating function whereby if the ringing code digit had been, for example, "7" so that tubes R27(36) and RA5(36) had been conducting and relay RA5(36) had been operated, the rise in main-cathode potential of tube R27(36) would have been transmitted over conductor 3641, through the No. 4 contact of operated relay RA5(36), conductor 3647, No. 10 contact of relay NGCA(46), conductor 4609, No. 5 contact of relay RC(46), conductor 4610, and through resistor 4503 to ground whereby a positive potential would have been applied through resistor 4504 to the left-hand control anode of ringing-code tube R7(45).

The left-hand control cathode of ringing-code tube R2(45) is connected to negative battery through the network comprising resistors 4505 and 4506 and capacitor 4507. Therefore, a discharge will occur across the left-hand control gap of ringing-code tube R2(45).

Relay RC1(46), in operating, completes a circuit for the operation of the ringing-connector hold magnet over a path from ground, upper back contact of relay TP(44), conductor 4412, lower back contact of relay PB(44), conductor 4413, No. 3 contact of unoperated relay H(44), conductor 4414 which extends to Fig. 46, No. 3 contact of relay RC1(46), conductor 4613, No. 18 contact of relay NGCA(46), conductor 4614 which extends to Fig. 39, middle upper front contact of operated relay CK(39), conductor 3940, through the operated register-connector crosspoint 2102, conductor 2107 which is cabled to Fig. 31, winding of ringing-connector hold magnet HOLDA(31), and to battery. Hold magnet HOLDA(31), in operating, operates the ringing-connector cross-point 3113, thereby extending the ground on conductor 2107 through that crosspoint to conductor 3114 which is cabled to Fig. 44. The ground on conductor 3114 is extended through the winding of relay RL(44) to battery, thereby operating that relay which interrupts the previously traced control-anode circuit of ringing-connector select tube SM1(31) and extinguishes the control-gap discharge in that tube.

Relay RC1(46), in operating, also connects ground through the No. 1 contact of that relay, conductor 4612, through the lower winding of relay ON(44), and to battery. Relay ON(44), in operating, connects 135-volt positive battery through its No. 8 contact to conductor 4406, resistor 4508, and to the left-hand main anode of ringing code tube R2(45). Tube R2(45) will therefore undergo a first transfer whereby conduction will exist between the left-hand main anode and the left-hand control cathode thereof. Since the main cathode of tube R2(45) is connected to negative battery through conductor 4511, resistor 4512, conductor 4513 and the winding of relay R(44), tube R2(45) will undergo a second transfer whereby conduction will exist between the left-hand main anode and the main cathode thereof. Due to the presence of resistor 4508, of relatively high value, in the circuit of the left-hand main anode, insufficient current will flow to operate relay R(44), but the tube will continue to sustain after the register is disconnected, to be described hereinafter, so that the ringing code is recorded in the ringing circuit.

Relay ON(44), in operating, interrupts, at its No. 2 contact, the previously traced circuit over which positive battery was supplied to the control anode of the ringing-connector select tube, thus preventing future selection of this ringing circuit while it is busy. Relay ON(44) also connects ground through its No. 1 contact to ringing circuit off-normal ground conductor 4408. Relay ON(44), in operating, also connects ground through its No. 3 contact to conductor 4409, upper back contact of relay TR(34), conductor 3455, through the winding of the ringing-interrupter start relay ST1(34), to battery, whereby relay ST1(34) is operated for a purpose to be described hereinafter. The operation of relay ON(44) also completes a circuit from negative battery, winding of relay PA(44), lower back contact of relay PA(44), conductor 4410, No. 7 contact of relay ON(44), and to conductor 4411 which extends to Fig. 23 which represents part of the common release and time out circuit, for a purpose to be described hereinafter.

Relay ON(44), in operating, also extends the ground on conductor 3114 through the No. 3 contact of unoperated relay SR(44), conductor 4415, No. 6 contact of relay ON(44), conductor 4416, winding of relay H(44), to negative battery, thereby operating relay H(44). When relay H(44) operates, ground is connected through the upper back contact of relay TP(44), conductor 4412, No. 4 contact of relay PB(44), conductor 4413, No. 4 contact of operated relay H(44), to conductor 4415. The ground on conductor 4415 is extended through the No. 6 contact of relay ON(44), conductor 4416, winding of relay H(44) and to battery, thereby locking relay H(44) operated. The ground on conductor 4415 is also extended through the No. 3 contact of unoperated relay SR(44), conductor 3114, ringing-connector cross-point 3113, conductor 2107, winding of hold magnet HOLDA(31), and to battery. It may be seen hereinafter that this locking path for hold magnet HOLDA(31) is transient, but will be relied on for the present for clarity of description.

It will be recalled that with relay CO(28) operated, the calling subscriber's ring conductor was extended through a back contact of ringing-connector hold magnet HOLDA(31) and through the lower winding of relay L(37) in the register, to battery. When, therefore, the ringing connector is connected to the junctor upon the operation of hold magnet HOLDA(31), the calling subscriber's tip and ring conductors are extended to the ringing connector, and relay L(37) is released. The release of relay L(37) interrupts the energizing path for relay SR(37). Relay SR(37) releases normally since capacitor 3909 has been disconnected from its winding by the operation of relay CK(39) as above described. Relay SR(37), in releasing, removes main-anode battery from all of the tubes shown in Figs. 35 to 38, inclusive, removes the charging battery from capacitor 3750 by means of which a potential was applied to the left-hand control anode of tube RA1(37), and also removes the positive battery from the windings of relay AD(37) and that relay releases. The removal of main-anode battery extinguishes any of those tubes in Figs. 35 to 38 which were conducting and removes the "keep-alive" potential from those tubes therein which are provided with keep-alive circuits. The extinguishing of tube RA1(37) releases relay RA1(37). The removal of main-anode battery extinguishes all conducting tubes in the counting chain and all conducting tubes of the hundreds, tens and units storing tubes, which, in the assumed case, are tubes R27(36), H27(38), T38(38), U16(38), and UA5(38). The extinguishing of tube UA5(38) releases relay UA5(38).

Relay SR(37), in releasing, also connects ground through its No. 3 contact to conductor 3782 which extends to Fig. 46, No. 23 contact of relay NGCA(46), to conductor 3728 which extends to Fig. 39 where it is carried via cables 1410 and 1301 to Fig. 14, through resistor 1412 and to positive battery. Therefore, ground is connected to the right-hand electrode of capacitor 1413 whereby gas diode RR1(14) becomes conductive to render tube RL(12) conductive as described previously in the operation of the common release and time-out circuit during the originating phase of this call. Relay RLS(12) is operated as above described to remove positive 135-volt, positive 100-volt, and positive 50-volt batteries from the circuits through its contacts as before described. The interruption of these circuits extinguishes the called subscriber's line tube LI(11); causes the release of relays LS(5), PHS(5), STC(5), slow-to-release relay GP(5), STC(12) and CR(5); extinguishes primary select tube PS9(4) which releases relay SHSI(18) and primary select magnets SEL9(8) and SEL9(9) which, in turn, release relays CS(5); extinguishes terminating-secondary select tube TSS5(16) which releases terminating-secondary select magnet SEL5(16), extinguishes ringing-connector select tube SMI(31) which releases ringing-connector select magnet SELI(31) which, in turn releases relays RC(46) and RC1(46); extinguishes register-connector select tube SMI(20) which releases register-connector select magnet SELI(20) which releases select magnet SELI(21); extinguishes frame lock-out tube FRO(12) which releases relay FR(5); releases relay OS(12); extinguishes tube LOI(13) which releases relay LOI(13) which, in turn, releases the number-group connector relays NGCA(46) and NGCB(47), the latter of which releases the operated one of the tens connector relays T16(47) to T50(47) and the operated one of the units connector relays U16(47) to U50(47); and releases relay OT(12). As previously described, relay RLS(12) then releases. It will be recalled that in accordance with the nature of cross-bar switches of suitable type as hereinbefore described, after the release of the select magnet, the closed cross-points are maintained operated by the energized hold magnets. It may be noted that if another register is awaiting the use of the number group, relay DC1 in that register will be operated to connect ground to the winding of relay OT(12) whereby relay OT(12) will not be released, and, upon the subsequent release of relay RLS(12), this other register will proceed to establish a terminating connection as above described, in preference to an incoming call. If no other register is waiting, relay OT(12) releases to restore those circuits to normal.

Relay SR(37), in releasing, interrupts the locking path to release relay ON(37). Relay ON(37), in releasing, interrupts, at its No. 7 contact, the operating path for relay CO(28) in the junctor, and that relay, in releasing, reconnects the calling subscriber's tip and ring conductors through the windings of supervisory relay S(28) whereby that relay is reoperated. The interruption of the operating path for relay CO(28) also interrupts the operating path for register-connector hold magnets HOLDA(20) and HOLDA(21), and those hold magnets release, opening cross-points 2009 and 2102. The opening of register-connector cross-point 2102 releases tertiary select magnets SELIA(24) and SELIA(25) which release relays TST(24) and TST(25). Relay ON(37), in releasing, also interrupts, at its No. 8 contact, the locking path for class-of-service relay FR(42), and that relay is released. Relay ON(37), in releasing, also releases relay ONI(39). Relay ONI(39), in releasing, interrupts previously traced circuits to release relays DC(37), CK(39), ID(40), and TMA(41).

It may therefore be seen that when the ringing-connector hold magnet is operated to indicate to the circuits that a path to the called subscriber has been selected and established and that the ringing circuit has received the necessary ringing-code-digit information, the register, the register connector, the number group and the line link circuits are all restored to normal whereby another call may be originated or terminated while ringing proceeds.

When relay S(28) is operated as a result of being reconnected to the calling subscriber's line, ground is connected through the No. 3 contact of operated relay SR(28), conductor 2820, upper front contact of relay S(28) to conductor 2813 which is connected both through the No. 1 contact of relay RF(28) and through the No. 1 contact of relay DL(28) to conductor 2814, through the winding of relay SR(28) and to battery, thereby providing a locking path for relay SR(28). It may be noted that relay SR(28) is slow to release so that it will not release in the interval between the release of relay CO(28) and the operation of relay S(28).

RINGING CALLED SUBSCRIBER

As above indicated, relay ON(44), in operating, operates relay ST1(34) which starts the functioning of the ringing-interrupter circuit shown in detail in Figs. 32 and 33. Relay ST1(34), in operating, connects negative battery through its No. 4 contact, conductor 3401, through the windings of relays T1(33) and T2(33), in parallel, conductor 3301, inner lower back contact of relay TR(34) and to ground, thereby operating relays T1(33) and T2(33). Relay ST1(34), in operating, also connects positive 135-volt battery through its No. 1 contact to conductor 3402. This positive potential on conductor 3402 is extended through resistor 3302, and through conductor 3303 to the main anodes and "keep-alive" control anodes of the counting chain tubes V1(33) to V8(33), inclusive. The positive potential on conductor 3402 is also extended through the voltage divider comprising resistors 3201 and 3202 whereby the resulting voltage will be applied to the upper electrode of capacitor 3203. Since the lower electrode of capacitor 3203 is connected to ground through resistor 3204, that capacitor will charge, with the utilized parameters, to about positive 40 volts. The positive potential on conductor 3402 is also conducted through resistor 3205, conductor 3206, and through resistor 3207 to the main anode and to the "keep-alive" control anodes of tube P5(32) and through the voltage divider comprising resistors 3208 and 3209 to the upper control anode of the tube P5(32). The positive potential on conductor 3206 is also extended through the winding of relay Z(32), resistor 3210, to the "keep-alive" control and main anodes of tube P4(32), and through the voltage divider comprising resistors 3211 and 3212 to the upper control anode of tube P4(32). The positive voltage on conductor 3402 is, in a similar fashion, also conducted through resistor 3216, conductor 3217, resistor 3218, to conductor 3219 where it is applied to the "keep-alive" control anode and main anode of tube P3(32) and through the voltage divider comprising resistors 3220 and 3221 to the upper control anode of tube P3(32). The potential on conductor 3217 is also conducted through the winding of relay X(32), resistor 3225, conductor 3226 to the "keep-alive" control and main anodes of tube P2(32) and through the voltage divider comprising resistors 3227 and 3228 to the upper control anode of tube P2(32). It may be noted that although the upper control cathodes of tubes P4(32) and P2(32) are connected to ground through resistor 3215 and resistor 3229, respectively, the values of the voltage-divider resistances are such that tubes P2(32) and P4(32) do not conduct at this time. The main cathodes of tubes P2(32), P3(32), P4(32) and P5(32) are connected to negative battery, and the "keep-alive" control cathodes of these tubes are connected to negative battery through individual high resistances. The positive potential on conductor 3402 is also extended through variable resistor 3230, resistor 3231 and to capacitor 3232, the other electrode of which is connected to ground. As capacitor 3232 charges, the rising potential is applied to the plate of gas diode P1(32).

Prior to the operation of relay ST1(34), the upper control cathode of tube P3(32) is connected to ground through resistor 3233 and network 3234, the upper control cathode of tube P5(32) is connected to ground through resistor 3233, conductor 3235 and network 3236, and the upper electrode of capacitor 3237 is connected to ground through resistor 3233. Since the lower electrode of capacitor 3237 is connected to positive battery through resistor 3238, that capacitor will be charged. Upon the operation of relay ST1(34), negative battery is connected through the No. 3 contact of relay ST1(34), conductor 3405, to the lower electrode of capacitor 3237 thereby lowering the potential on both sides of that capacitor and applying a negative pulse to the upper control cathodes of tubes P3(32) and P5(32). These tubes will therefore discharge and transfer so that conduction exists between the main anode and main cathode thereof.

The cathode of gas diode P1(32) is connected to negative battery through resistor 3239. Therefore, when capacitor 3232 has charged to a sufficient potential, gas diode P1(32) will undergo a discharge and capacitor 3232 will discharge through the diode and resistor 3239 to negative battery. When the voltage across gas diode P1(32) falls below sustaining voltage, the diode is extinguished and capacitor 3232 again begins to charge through resistors 3230 and 3231. The parameters of this oscillating circuit are preferably arranged whereby a discharge occurs across the gap of gas diode P1(32) one-hundred and twenty times per minute.

When gas diode P1(32) discharges, its rise in cathode potential resulting therefrom is transmitted over conductor 3240 and through capacitor 3241 to the upper control anode of tube P2(32) and through capacitor 3244 to the upper control anode of tube P3(32). Since tube P3(32) is conducting as before described, the potential at its main anode has dropped to a value of approximately 10 volts whereby the potential at the upper control anode of that tube is at approximately 5 volts positive relative to ground due to the voltage divider comprising resistors 3220 and 3221. The upper control gap of tube P3(32) will therefore not be fired by the application of the potential through capacitor 3244. Since tube P2(32) is not conducting, its main anode is at full 135 volts positive and the upper control anode of that tube is at approximately 60 volts positive since it is connected to the main anode through the voltage divider comprising resistors 3227 and 3228 as above described. Tube P2(32) therefore discharges and undergoes first and second transfers whereby conduction exists across its main gap. As a result of this conduction, the main anode of tube P2(32) drops an appreciable amount, to approximately 10 volts. Since the main anodes of tubes P2(32) and P3(32) are interconnected through capacitors 3242 and 3243, the drop in voltage on the main anode of tube P2(32) causes the anode voltage of tube P3(32) to fall below the sustaining value thereof, and tube P3(32) is extinguished. Since the winding of relay X(32) is in the main-anode circuit of tube P2(32) as above described, relay X(32) will be operated while tube P2(32) is conducting.

At the next discharge through tube P1(32) one-half second later, a positive pulse will again be applied through capacitors 3241 and 3244 to the upper control anodes of tubes P2(32) and P3(32), respectively. Since tube P2(32) is conducting, the pulse will have no effect on that tube as before described. The pulse on the control anode of tube P3(32) will cause that tube to discharge and transfer, extinguishing tube P2(32) and thereby releasing relay X(32). It may therefore be seen that gas tubes P2(32) and P3(32) and relay X(32) comprise a 60 interruptions per minute interrupter under control of gas diode P1(32), with relay X(32) being operated and released during alternate one-half second intervals.

During the time that relay X(32) is operated, negative battery is connected through resistor 3248, conductor 3249, through capacitor 3250, resistor 3251, and to ground. Capacitor 3250 thereby becomes charged. When relay X(32) releases, ground is connected through its outer back contact to conductor 3249 thereby raising the voltage on both sides of capacitor 3250 and transmitting a positive pulse through capacitors 3252 and 3253 to the upper control anodes of tubes P4(32) and P5(32), respectively. Since tube P5(32) is conducting, the pulse is of no effect thereon in view of the considerations hereinbefore discussed in relation to tube P3(32). The application of this positive pulse to the control anode of tube P4(32) creates a discharge in that tube, and first and second transfers immediately occur. Conduction through tube P4(32) causes a drop in main anode potential of that tube, and, since the main anodes of tubes P4(32) and P5(32) are interconnected through capacitors 3254 and 3255, the main-anode voltage of tube P5(32) is dropped below the value at which tube P5(32) will sustain, and tube P5(32) will be extinguished. Since relay Z(32) is in the main-anode circuit of tube P4(32) as before described, that relay will be operated when tube P4(32) becomes conductive.

When relay X(32) again operates one-half second later, capacitor 3250 will again be charged. At the next release of relay X(32), capacitor 3250 will again apply a positive pulse through capacitors 3252 and 3253 to the upper control anodes of tubes P4(32) and P5(32), respectively. The positive pulse on the upper control anode of tube P5(32) will cause that tube to discharge and transfer, extinguishing tube P4(32) and thereby releasing relay Z(32). It may therefore be seen that gas tubes P4(32) and P5(32) and relay Z(32) comprise a 30-interruptions per minute interrupter under control of relay X(32), with relay Z(32) being operated and released during alternate one-second intervals.

Cold cathode gas tubes V1(33) to V8(33), inclusive, constitute a counting chain that is advanced each time relay X(32) is operated. With certain exceptions which will be noted in the ensuing description, the circuit of the counting chain comprising tubes V1(33) to V8(33) is similar to that of the counting chain comprising tubes RI6(36) to R50(36), hereinbefore described, and commutation occurs in a similar manner. The upper control cathodes of tubes VI(33) to V8(33) are connected to ground through individual networks. For example, the upper control cathode of tube VI(33) is connected to ground through the network comprising resistors 3306 and 3307 and capacitor 3308. The lower control or "keep-alive" cathodes, through a high resistance, and the main cathodes of tubes VI(33) to V8(33) are connected to negative battery through parallel paths comprising a capacitor in one branch and a resistor and a comparably designated relay in the other branch. For example, the lower control cathode of tube VI(33) is connected through high resistance 3309, and the main cathode of that tube is also connected, to negative battery through capacitor 3310, and in parallel therewith, to negative battery through resistor 3311 and the winding of relay I(33). The upper control anodes of tubes VI(33) to V2(33) are connected to pulse input lead 3315 through individual capacitors and individual networks. For example, the upper control anode of tube VI(33) is connected to pulse input lead 3315 through the network comprising resistors 3316 and 3317 and capacitor 3318 and through the individual capacitor 3319. Each tube VI(33) to V8(33) is linked to the next succeeding tube, as for example, tube VI(33) is linked to tube V2(33) by the main cathode of tube VI(33) being connected through resistor 3320 and through network 3321 to the upper control anode of tube V2(33). It may be noted that the main cathode of tube V8(33) is connected through resistor 3322 and through the network comprising capacitor 3318 and resistors 3316 and 3317 to the upper control anode of tube VI(33), whereby recycling may occur.

Upon the initial seizure of the ringing interrupter and the consequent operation of relay STI(34) as hereinbefore described, positive 135-volt battery will momentarily be connected through the Nos. 1 and 2 continuity contacts of relay STI(34) to conductor 3406 and through resistor 3323 to the upper control cathode of tube V8(33), and that tube will discharge and transfer. As capacitor 3324 becomes charged, the main cathode potential of tube V8(33) will rise, and this rising potential will be applied over the above-traced path to the upper control anode of tube VI(33). The upper control anodes of the remaining tubes will remain at approximately 48 volts negative. When relay X(32) operates as above described, the positive 135-volt potential on conductor 3402 is extended through the inner front contact of relay X(32) to the upper electrode of capacitor 3203 which has been charged to approximately 40 volts as above described. As a result, a positive pulse will be transmitted over pulse-input lead 3315, and through the individual capacitors and networks to the upper control anodes of the counting chain tubes VI(33) to V8(33). Since the upper control anode of tube VI(33) is the only one with a suitable positive bias previously applied thereto as above described, tube VI(33) only will discharge and transfer. Since the main cathode of tube V8(33) has risen to a value which may be positive relative to ground, the additional potential drop across the common main-anode resistor 3302 will reduce the potential difference across the main gap of tube V8(33) to a point below sustaining, and tube V8(33) will be extinguished. As capacitor 3310 becomes charged, the main-cathode potential of tube VI(33) will rise, and the upper control anode of tube V2(33) will be positively biased thereby. Therefore, when relay X(32) has released for one-half second and again operates to apply a positive pulse to pulse-input lead 3315, tube V2(33) will be fired, extinguishing tube VI(33), and priming tube V3(33). Thus, each operation of relay X(32) will cause the next succeeding tube in the counting chain to fire and commutate. As each of the tubes VI(33) to V8(33) fires, it operates its associated relay I(33) to 8(33), respectively.

The cooperative operation of the code ringing interrupter shown in Figs. 32 and 33 and the code ringing tubes of Fig. 45 may best be seen by reference to Fig. 50 of the drawings. In the preferred embodiment disclosed, a full ringing cycle has been arranged to occupy eight seconds, after which the ringing cycle repeats. This cycle, for convenience of discussion, has been divided into half-second intervals, numbered 1 to 16. As above described, relay X(32) is operated for one-half second, released for one-half second and so on so that it is operated during the odd-numbered intervals and released during the even-numbered intervals. Relays Z(32) operates each alternate time that relay X(32) releases, and therefore relay Z(32) is operated during the second and third intervals, released during the fourth and fifth intervals and so on. When relay X(32) is released, the positive 135-volt potential on conductor 3402 is extended through the inner back contacts of relay X(32) to conductors 3261 and 3263, and therefore a positive potential is on these conductors during the even-numbered intervals as shown in Fig. 50. During the time that relay X(32) is operated and relay Z(32) is released, the positive 135-volt potential on conductor 3402 is connected through the inner front contact of relay X(32), conductor 3265, back contact of relay Z(32) to conductor 3264, and therefore that conductor has positive battery connected thereto during the first, fifth, ninth, and thirteenth intervals as shown in Fig. 50. During the time that both relays X(32) and Z(32) are operated, the positive potential on conductor 3402 is connected through the inner front contact of relay X(32), conductor 3265, front contact of relay Z(32) to conductor 3262, and therefore conductor 3262 has positive battery connected thereto during the third, seventh, eleventh and fifteenth half-second intervals as shown in Fig. 50.

As above described, relay I(33) is operated during the time that relay X(32) is operated at the beginning of the cycle, and continues to be operated during the release time of relay X(32), after which relay I(33) is released. Relay 2(33) is operated during the time that relay X(32) is operated and released on its second cycle, i. e., during the third and fourth half-second intervals. Relay 3(33) is operated during the fifth and sixth intervals, and so on. The armatures of relay I(33) are connected to conductors 3264 and 3261. While relay I(33) is operated during the first and second intervals, positive battery is connected to conductor 3264 during the first interval, and this potential is conducted through the No. 1 contact of relay I(33), through resistor 3345, No. 1 contact of operated relay TI(33) and to conductor 3331, as is represented in Fig. 50. During the second interval, while relay I(33) remains operated, positive potential is connected to conductor 3261, and this potential is extended through the No. 2 contact of relay 1(33), resistor 3346, No. 2 contact of relay T1(33), and to conductor 3332 as shown in Fig. 50. By referring to the chart of Fig. 50, it may be seen that conductors 3331 to 3340 receive one or more one-half second pulses of positive voltage as a result of the conjoint functioning of relays X(32), Z(32) and relays 1(33) to 6(33), inclusive. It may be noted that certain of the front contacts of the relays 1(33) to 6(33) are cross-connected whereby certain of the conductors 3331 to 3340 receive more than one pulse per cycle. For example, conductor 3337 receives a positive pulse of one-half second duration during the eighth interval through the No. 3 contact of relay 4(33), which is operated during the seventh and eighth intervals, and over conductor 3263 which is supplied with positive potential during the eighth interval. Conductor 3337 also receives a pulse during the ninth interval through the No. 1 contact of relay 5(33), which is operated during the ninth and tenth intervals, and over conductor 3264 which is supplied with positive potential during the ninth interval. Conductor 3337 also receives a pulse throughout the tenth interval through the No. 2 contact of operated relay 5(33) and over conductor 3263 which is supplied with positive potential during the tenth interval.

It will be recalled that although conduction exists across the main gap of the selected one of the code ringing tubes R1(45) to R0(45), and although relay R(44) is in the main-cathode circuit of each of those tubes, relay R(44) did not operate since the impedance in the circuit of the left-hand main anodes of the ringing tubes is such that insufficient current flows to meet the perate requirements of relay R(44). However, when the positive potential on one of the conductors 3334 to 3340 is connected to one of the other main anodes of that one of the code ringing tubes which is previously conducting, conduction will also occur between that other main anode and the main cathode of that tube, and sufficient current will flow to operate relay R(44). For example, the center main anode of tube R1(45) is connected to conductor 3334 and therefore, as per Fig. 50, a suitable positive potential is applied to that main anode during the fourth, fifth and sixth intervals, and, as a result of the increased conduction through the tube, relay R(44) will be operated during that period. The right-hand main anode of tube R1(45) is connected to conductor 3336 and therefore has a suitable positive potential applied to it during the seventh interval, the increased conduction therefore continues through the seventh interval, and relay R(44) therefore remains operated for a two-second period during the fourth to seventh intervals, inclusive. If tube R6(45) or R7(45) had been previously conducting, since the center main anode of each of those tubes is connected to conductor 3335 and since the right-hand main anode of each of those tubes is connected to conductor 3337, relay R(44) would have been operated during the fourth, sixth, eighth, ninth, and tenth intervals, as shown in Fig. 50. In addition, the right-hand control anode of tube R7(45) is also employed in the function of a main anode, being connected to conductor 3340. Therefore, if tube R7(45) had been conducting, relay R(44) would also have been operated during the twelfth interval as shown in the chart of Fig. 50.

It was previously assumed that the called subscriber's number was "232-2" and that therefore code ringing tube R2(45) was conducting. The center main anode of that tube is connected to conductor 3335. Therefore, increased current will flow to operate relay R(44) during the fourth and sixth intervals, representing code "2," and causing the bell of the subscriber's station to emit two "short" rings, as will be seen hereinafter. Other details of the ringing circuit including the effects of an odd-numbered code, twenty-party codes, and the revertive signal will be discussed hereinafter in connection with subsequent calls.

It may be noted that an alternative method of operation of the ringing tubes R1(45) to R0(45) may be employed. For example, in the case of ringing tube R2(45), the parameters, of the circuits may be arranged so that no second transfer of discharge will occur in the selected tube until positive battery is connected to the middle main anode thereof by the ringing-interrupter circuit. Prior to the application of that positive potential a discharge will occur between the left-hand main anode and the left-hand control cathode of that tube whereby the selected tube is marked so that the register may be released. Upon application of the positive potential to the middle main anode of the selected ringing tube R2(45), the discharge will transfer so that conduction will occur both between the left-hand main anode and the main cathode of the selected tube and between the middle main anode and the main cathode of the selected tube. Conduction across the latter path causes the operation of relay R(44) as above described. At the removal of positive battery from the middle main anode of tube R2(45), conduction continues between the left-hand main anode and the main cathode of that tube but the current flow is insufficient to maintain relay R(44) operated.

When relay H(44) operates, as above described, ground on off-normal ground conductor 4408 is connected through the No. 7 contact of relay H(44), conductor 4418, No. 2 contact of relay RC(44), conductor 4419 which is cabled to Fig. 31, through the operated cross-point 3113 of the ringing connector, conductor 3116 which is cabled to Fig. 28, through the winding of relay RF(28), and to negative battery. The "ring front" ringing control relay RF(28) in the junctor is thereby operated. The operation of relay RF(28) completes a locking circuit for relay ON(44) which may be traced from ground through the No. 6 contact of relay ON1A(28), conductor 2837, No. 10 contact of relay RF(28), conductor 2838 which is cabled to Fig. 31, through the operated cross-point 3113, conductor 3121 which is cabled to Fig. 44, No. 1 contact of relay H(44), conductor 4420, No. 4 contact of relay ON(44), upper winding of relay ON(44), and to battery. When relay RF(28) is operated, the called subscriber's tip conductor 2832 is connected through the No. 4 contact of relay RF(28) to conductor 2829, and the called subscriber's ring conductor 2833 is connected through the No. 6 contact of relay RF(28) to conductor 2830. The calling subscriber's tip and ring conductors are also connected to conductors 2829 and 2830 through individual capacitors: the calling subscriber's tip conductor 1817 is connected through capacitor 2839, conductor 2840, Nos. 2 and 4 contacts of relay RF(28), and to conductor 2829; the calling subscriber's ring conductor 1818 is connected through capacitor 2841, conductor 2842, No. 8 contact of relay RF(28) to conductor 2830. Tip and ring conductors 2829 and 2830 are cabled to Fig. 31, extend through the front contact of hold magnet HOLDA(31) to conductors 3117 and 3118, respectively, through the operated ringing connector cross-point 3113 to conductors 3119 and 3120, respectively, which are cabled to Fig. 44, and to inductors 4421 and 4422, respectively.

When relay H(44) operates, relay SR(44) is operated over a path from battery, winding of relay SR(44), conductor 4423, No. 6 contact of relay H(44), conductor 4424, lower back contact of relay TP(44), conductor 4425, outer upper back contact of relay PB(44), and to ground. When relay SR(44) operates, the tip conductor is extended through inductor 4421, No. 1 contact of relay SR(44), conductor 4426, No. 2 contact of relay H(44), conductor 4427, inner upper back contact of relay RA(44), conductor 4428, upper back contact of relay DR(44), conductor 4429, upper winding of relay TP(44), and to ground. Upon the operation of relay SR(44), the ring conductor is extended through inductor 4422, No. 5 contact of relay SR(44), conductor 4430, No. 5 contact of relay H(44), conductor 4431, inner lower back contact of relay RA(44), conductor 4432, lower back contact of relay DR(44), conductor 4433, lower winding of relay TP(44), and to negative battery. It may be noted that relay TP(44) does not operate at this time since the calling subscriber's line is connected through the windings thereof through capacitors 2839 and 2841 as above described, and the called subscriber's switch-hook contacts have not as yet been closed.

Relay SR(44), in operating, connects ground through its No. 4 contact to conductor 3114 to lock the ringing connector hold magnet HOLDA(31) operated. When relay SR(44) is operated, a circuit is completed from ground on off-normal ground conductor 4408, No. 4 contact of pick-up relay PU(44), lower winding of relay PU(44), conductor 4436, outer lower back contact of relay TN(44), conductor 4437, No. 5 contact of relay ON(44), conductor 4438, No. 6 contact of relay SR(44), resistor 4439, and to conductor 3331. It may be noted, by reference to Fig. 50 that positive 135-volt battery is connected to conductor 3331 for one-half second during the first interval of each ringing cycle. Therefore, at the beginning of the first ringing cycle to commence after relay SR(44) operates, relay PU(44) will be operated. Relay PU(44), in operating, interrupts its own energizing circuit at its No. 4 contact, but locks operated through its upper winding and through its No. 5 contact to off-normal ground.

Relay PU(44), in operating, closes a circuit from battery, winding of relay RA(44), conductor 4440, No. 1 contact of relay PU(44), outer lower back contact of relay RS(44), conductor 4441, outer upper front contact of relay R(44) and to ground. Therefore, relay RA(44) will follow the operations of relay R(44) in response to the ringing code as above described, i. e., with the assumed code, both relays R(44) and RA(44) will be operated for one-half second during the fourth interval of each ringing cycle and for one-half second during the sixth interval of each ringing cycle. When relay R(44) and RA(44) operate, ringing current is connected from alternator 4442 through conductor 4443, resistor 4444, outer upper front contact of relay RA(44), conductor 4445, No. 3 contact of relay RV(44), No. 4 contact of relay R(44), conductor 4461, inner upper front contact of relay RA(44), and to tip conductor 4427. Ringing ground is connected through the No. 2 contact of relay RS(44), conductor 4446, No. 8 contact of relay RV(44), conductor 4447, inner lower front contact of relay RA(44), and to ring conductor 4431. Therefore, the called subscriber's bell will be energized during the one-half second interval and the calling subscriber will receive audible ringing induction. Relay RA(44), in operating, also operates slow-to-release relay DR(44) over a path from ground, outer lower front contact of relay RA(44), conductor 4448, winding of relay DR(44), and to negative battery. After relay RA(44) releases and before slow-to-release relay DR(44) has released, the tip conductor is momentarily connected to ground through the upper front contact of relay DR(44) and the ring conductor is momentarily connected to negative battery through resistor 4449 and the lower front contact of relay DR(44). This momentary application of potentials of opposite polarity to that of the silent-interval battery and silent-interval ground discharges the line so that when relay DR(44) releases and reconnects the tip and ring conductors to the windings of relay TP(44), relay TP(44) will not be falsely operated to trip ringing.

The ringing cycles repeat and the called subscriber continues to be signaled until one of three events occurs; until the calling party hangs up, until the circuits time out, or until the called party answers.

If the calling party hangs up on failure of the called party to answer, relay ON1A(28) is released, as will be seen hereinafter, thereby releasing relay ON(44). Relay ON(44), in releasing, releases relay H(44), removes ground from the off-normal ground lead to release any relays locked to that ground, removes positive 135-volt battery from the ringing code tubes of Fig. 45 whereby any of those tubes which are conducting will be extinguished, and interrupts the energizing circuit for the ringing interrupter start relay ST1(34). Relay H(44), in releasing, opens the tip and ring conductors, releases relay RF(28) in the junctor, and releases relay SR(44). Relay SR(44), in releasing, removes the holding ground from the ringing connector hold magnet, thereby releasing the ringing connector and the ringing circuits. Relay ST1(34) does not immediately release upon the interruption of its energizing path since it is locked over a path including conductor 3401, No. 6 contact of relay T2(33), right-hand back contact of relay 8(33), and to ground. Therefore, the ringing interrupter continues to operate until tube V8(33) fires to operate relay 8(33) which releases relay ST1(34). Relay ST1(34), in releasing, removes positive and negative battery from the circuits thereby extinguishing all tubes and releasing all relays in the ringing interrupter and restoring that circuit to its normal idle condition.

The junctor is released and the connection is broken down as will be described hereinafter.

Ringing will also cease if the called subscriber fails to answer, and if the calling subscriber fails to disconnect within a predetermined time, after which time-out occurs. Referring to Fig. 23, the circuit comprising relays TL1(23), TL2(23) and TL3(23) operates continuously, sending out timed signals on leads 2301 and 4411. When battery is initially connected to the circuits, relay TL1(23) operates from ground through the inner lower back contact of relay TL3(23), winding of relay TL1(23), and to battery. Relay TL1(23), in operating, closes a circuit from ground through the inner lower back contact of relay TL3(23), lower front contact of relay TL1(23), winding of relay TL2(23), and to battery. Relay TL2(23) is slow to operate, preferably requiring two to four minutes to operate. Relay TL2(23), in operating, operates relay TL3(23) over an obvious circuit. Relay TL3(23), in operating, interrupts the energizing circuits for slow-to-release relay TL1(23) and for relay TL2(23), allowing these relays to release, and connects ground through its outer lower front contact to conductor 2301 which extends to Fig. 44. Relay TL2(23), in releasing, releases slow-to-release relay TL3(23). Relay TL3(23), in releasing, removes the ground from conductor 2301 and connects ground through its inner upper back contact, through the upper back contact of relay TL1(23) to conductor 4411 which extends to Fig. 44. Relay TL3(23), in releasing, again closes the energizing circuit for relay TL1(23) and the cycle repeats. It may be noted that relays TL1(23) and TL3(23) are slow to release to provide sufficient time for relay TL2(23) to fully restore to normal.

When relay ON(44) is operated upon the seizure of the ringing circuit, conductor 4411 is extended through the No. 7 contact of that relay, conductor 4410, lower back contact of relay PA(44), winding of relay PA(44), and to battery, as above described. When the circuit of Fig. 23 connects ground to lead 4411, which occurs at two- to four-minute intervals as above described, relay PA(44) is operated. Relay PA(44) locks to off-normal ground conductor 4408 through its lower front contact, and connects conductor 2301 through its upper front contact, through the No. 2 contact of relay PB(44), winding of relay PB(44), and to battery. At the end of the timing cycle of the circuit of Fig. 23, ground is connected to conductor 2301 as above described and relay PB(44) is operated. Relay PB(44) locks through its No. 3 contact to off-normal ground and releases relays H(44) and SR(44). Relay H(44), in releasing, releases relay ON(44), and the ringing circuit, ringing interrupter, and ringing connector are restored to normal as above described. It may be noted that if ground has just been removed from lead 4410 by the timing circuit of Fig. 23 when relay ON(44) operates, approximately four to eight minutes will elapse before relay PB(44) is operated. If relay ON(44) operates during the time that conductor 4410 is grounded, approximately two to four minutes will elapse before relay PB(44) is operated to release the circuits.

Ringing will also be interrupted when the called subscriber answers. If the called subscriber closes his switch-hook contacts during a silent interval, the windings of relay TP(44) will be connected to the tip and ring conductors and relay TP(44) will be operated. If the called subscriber answers during a ringing interval, at the end of the interval relays RA(44) and DR(44) will release to reconnect the tip and ring conductors through the windings of relay TP(44), and relay TP(44) will then be operated to trip ringing. Relay TP(44), in operating, releases relays H(44) and SR(44). Relay SR(44), in releasing, releases the ringing connector hold magnet HOLDA(31) thereby releasing the ringing connector. Relay SR(44) also releases relay RL(44) to reconnect the lead to the left-hand control anode of the ringing connector select tube SM1(31) so that the ringing circuit may be seized on a new call. Relay H(44), in releasing, opens the line so that relay TP(44) is released, and releases relays ON(44) and RF(28). Relay ON(44), in releasing, removes ground from off-normal ground conductor 4408 to release all remaining operated relays in the ringing circuit, thereby restoring the ringing circuit to normal. Relay ON(44), in releasing, also releases ringing interrupter start relay ST1(34) to restore the ringing interrupter to normal as above described.

Relay RF(28), in releasing, reconnects the called subscriber's tip conductor 2832 through the No. 3 contact of relay RF(28), No. 3 contact of relay TK(28), conductor 2845, upper winding of relay CS(28), and to ground; and reconnects the called subscriber's ring conductor 2833 through the No. 7 contact of relay RF(28), No. 12 contact of relay TK(28), conductor 2846, lower winding of relay CS(28), and to negative battery. The called subscriber's supervisory relay CS(28) is thereby operated and talking battery is provided for the called subscriber. The talking circuit is completed by virtue of the called subscriber's extended tip and ring conductors 2845 and 2846 being connected to the calling subscriber's extended ring and tip conductors 2818 and 2817 through capacitors 2847 and 2848.

Relay CS(28), in operating, completes a circuit from negative battery, through the lower winding and No. 6 contact of relay DL(28), conductor 2849, lower front contact of relay CS(28), conductor 2850, to the main cathode of tube DL(28), and through resistor 2851 to the left-hand control cathode of tube DL(28). The operation of relay CS(28) also removes the shunting ground circuit comprising ground, upper contact of relay CS(28), conductor 2852, No. 2 contact of relay DL(28), conductor 2853, resistor 2854, to the upper electrode of capacitor 2855, thereby permitting capacitor 2855 to charge over a path from positive battery, resistor 2856, No. 2 contact of relay SR(28), conductor 2853, resistor 2854, capacitor 2855, and to ground, thereby applying a rising potential through resistor 2857 to the left-hand control anode of tube DL(28). After a suitable interval, such as two seconds, the voltage on the control anode of tube DL(28) will rise to break down the control gap. Since the right-hand main anode of tube DL(28) is connected to positive battery through resistor 2858, first and second transfers will immediately occur and relay DL(28) will be operated. Relay DL(28) locks operated through its lower winding, its No. 7 contact, its upper winding, and to ground through the No. 4 contact of relay SR(28). The opening of the No. 6 contact of relay DL(28) extinguishes tube DL(28). If, during the charging time of capacitor 2855, the called subscriber should replace his receiver on the switchhook, or otherwise open the switchhook contacts, relay CS(28) will be released and capacitor 2855 will discharge through the upper front contact of relay CS(28) to ground. Therefore, it may be noted that relay DL(28) will not be operated until the switchhook contacts are closed continuously for the full delay time. Relay DL(28), in operating, prepares the junctor for timed release upon disconnection and also performs certain functions in regard to charging as will hereinafter be described. The circuits remain in this condition for the duration of the call.

DISCONNECTION

If the called party is the first of the two parties to hang up, relay CS(28), in the junctor, releases and initiates junctor time-out. When relay CS(28) releases, a circuit is completed from ground, upper back contact of relay CS(28), conductor 2852, No. 3 contact of operated relay DL(28), conductor 2859, heater resistance element 2860 of thermal relay RLS(28), and to negative battery. After a suitable interval, as from two to five seconds, the bimetallic element 2861 closes the contact of relay RLS(28) which completes a circuit from ground, No. 4 contact of relay SR(28), No. 4 contact of relay DL(28), contact of thermal relay RLS(28), conductor 3116, winding of relay RF(28) and to battery, whereby relay RF(28) is operated. Relay RF(28), in operating, opens the called subscriber's tip and ring conductors to prevent relay CS(28) from being reoperated, and releases relay SR(28). The release of relay SR(28) releases relay DL(28) which interrupts the heating circuit for thermal relay RLS(28) permitting that relay to release. Relay SR(28), in releasing also interrupts the locking path of relay ON1A(28) which releases to restore the junctor to normal. Relay SR(28), in releasing, also removes the ground through retardation coil 2818 from the sleeve lead thereby releasing the utilized hold magnets in both the originating and terminating links. The calling party, if he has not as yet disconnected, is placed on permanent signal lock-out as will be described hereinafter. If the calling subscriber disconnects first, relay S(28) is released which releases relay SR(28). Relay SR(28), released, functions as above described to break down the established connection, to release relay DL(28), and to release relay ON1A(28) which restores the junctor to its normal idle condition. If the called subscriber has not as yet hung up, he is placed on permanent signal lock-out.

RINGING INTERRUPTER TRANSFER CIRCUIT

Referring to Fig. 23, it will be recalled that relay TL3(23) is operated for a brief time at two to four-minute intervals. At the first operation of relay TL3(23), ground is connected through the outer upper front contact of relay TL3(23), conductor 2302, upper back contact of relay W(23), winding of relay W(23), resistor 2303 and to battery, whereby relay W(23) is operated. Relay W(23) locks through its upper front contact. Relay Z(23) is not operated at this time since its winding is shunted by an obvious circuit including the inner lower back contact of relay Z(23). When relay TL3(23) releases a short interval later, the shunt around the winding of relay Z(23) is removed, and relay Z(23) is operated from ground through the upper front contact of relay W(23), winding of relay Z(23), resistor 2304, and to battery. With relay Z(23) operated, conductor 2305 is not grounded. When relay TL3(23) again operates for a brief time two to four minutes later, ground is connected through the outer upper front contact of that relay, conductor 2302, inner lower front contact of relay Z(23), conductor 2306, winding of relay W(23), upper front contact of relay W(23), and to ground, whereby relay W(23) is released. Relay Z(23) remains operated from ground on conductor 2302 and through the upper back contact of relay W(23) until relay TL3(23) releases. With relay Z(23) released, conductor 2305 is grounded. When relay TL3(23) next operates two to four minutes later the cycle is repeated whereby conductor 2305 is alternately grounded and opened at two to four-minute intervals. It may be noted that conductor 2307 is also alternately grounded and opened at this same rate for a purpose hereinafter to be described.

Conductor 2305 extends to Fig. 34. When conductor 2305 is not connected to ground, relays C0(34) and TR(34) are unoperated, as was assumed in the above description, whereby the starting ground from the ringing circuit operated relay ST1(34) and ringing interrupter No. 1 (shown in detail) is employed as above described. It may be noted that when relay T2(33) is operated immediately after the seizure of ringing interrupter No. 1, a circuit is completed from the winding of relay C0(34), conductor 2305, No. 8 contact of relay T2(33), conductor 3347, upper back contact of relay C0(34), to the other side of the winding of relay C0(34), thus shunting relay C0(34) so that a ground on conductor 2305 will not operate relay C0(34) to cause a transfer to ringing interrupter No. 2(34) while ringing interrupter No. 1 is in operation. With the ringing interrupters idle, when conductor 2305 is grounded, this ground is conducted through the winding of relay C0(34), resistor 3407 and to negative battery whereby relay C0(34) is operated. Relay C0(34), in operating, connects ground through its outer lower front contact, conductor 3408, outer lower back contact of relay AL2(34), conductor 3409, lower back contacts of switches 1ST(34) and 2ST(34), conductor 3410, winding of relay TR(34), and to battery, thereby operating relay TR(34). If, when the ringing transfer circuit is in this condition, ground is connected from one of the ringing circuits through the ringing interrupter start lead 4409, this ground is now conducted through the upper front contact of operated relay TR(34), winding of relay ST2(34), and to battery, whereby ringing interrupter No. 2(34) is employed instead of ringing interrupter No. 1. To prevent transfers during the use of interrupter No. 2, relay C0(34) locks operated over a path including its inner lower front contact, conductor 3411, through operated contacts of relay T2 (not shown) in ringing interrupter No. 2, conductor 3412, and to ground. It may therefore be seen that the ringing transfer circuit serves to distribute the working load between the ringing interrupter circuits.

Assuming again that relays C0(34) and TR(34) are released when ground is connected to conductor 4409 so that ringing interrupter No. 1 is employed, when relay ST1(34) is operated, positive battery is connected through the No. 1 contact of that relay, conductor 3402, to the main anode of tube AL1(34) and through resistor 3413, capacitor 3414, and to ground. Capacitor 3414 commences to charge and the rising potential thereon is applied through resistor 3415 to the right-hand control anode of tube AL1(34). Relay ST1(34), in operating, also fires tube V8(33) which operates relay 8(33) as above described. Relay 8(33), in operating, connects ground through its left-hand front contact, conductor 3348, right-hand back contact of switch CK(34), conductor 3416, No. 10 contact of relay T1(33), No. 1 contact of relay T2(33), conductor 3349, back contact of relay CK(34), conductor 3417, outer lower back contact of relay TR(34), resistor 3418 and to the upper electrode of capacitor 3414 whereby that capacitor is discharged. Relay 8(33), in operating, also connects ground through its right-hand front contact, conductor 3450, No. 7 contact of relay T2(34), conductor 3451, winding of relay CK(34), to negative battery. Relay CK(34) operates to interrupt the previously traced discharging path for capacitor 3414, but is sufficiently slow to operate so that capacitor 3414 may become fully discharged. If relay ST1(34) operates, but, by some malfunctioning, tube V8(33) or relay 8(33) fails to operate, capacitor 3414 will continue to charge and tube AL1(34) will be fired as will hereinafter be described.

At the first operation of relay X(32), tube V1(33) is fired, tube V8(33) is extinguished and relay 8(33) is released as above described. Relay 8(33), in releasing, releases relay CK(34) and interrupts the previously traced discharging path for capacitor 3414. As the counting chain tubes V1(33) to V8(33) are progressively rendered conductive by the successive operations of relay X(32), tube V8(33) will again be rendered conductive to operate relay 8(33) which discharges capacitor 3414. The cycles thus repeat with capacitor 3414 never becoming sufficiently charged in normal operation to fire tube AL1(34). If for any reason tube V8(34) does not refire within a suitable interval, such as, for example, ten to fifteen seconds, the charge on capacitor 3414 will rise to a sufficient value to cause tube AL1(34) to undergo a discharge from its right-hand control anode, right-hand control cathode, resistors 3421 and 3422, conductor 3423, winding of relay AL1(34) and to negative battery. The main cathode of tube AL1(34) is also connected to negative battery through resistor 3422, conductor 3423, and through the winding of relay AL1(34), and the main anode is connected to positive battery as above described. Tube AL1(34) will therefore undergo first and second transfers and relay AL1(34) will be operated. Relay AL1(34) locks through its No. 4 contact, conductor 3424, and through the lower back contact of switch RT(34) to ground, and lights, through its No. 3 contact, alarm lamp AL1(34). Relay AL1(34), in operating, connects ground through its No. 1 contact to conductor 1334, and connects ground through its No. 2 contact to conductor 3426 whereby, if relay AL2(34) becomes operated, ground will be connected to conductor 3427. Conductors 1334 and 3427 are cabled to the alarm circuit of Fig. 22 for a purpose hereinafter to be described. Relay AL1(34), in operating, also connects ground through its No. 5 contact to conductor 3408 whereby relay TR(34) is operated as above described. Relay TR(34), in operating, transfers the ringing interrupter start lead 4499 from the winding of relay ST1(34) to the winding of relay ST2(34), thereby operating the latter relay. Relay TR(34), in operating, also interrupts the energizing paths for relays T1(33) and T2(33), allowing them to release, and connects ground through its inner lower front contact to the corresponding relays T1 and T2 in ringing interrupter No. 2 (34). Relay TR(34), in operating, also transfers lead 3417 from the time delay network associated with tube AL1(34) and connects it to the corresponding network associated with tube AL2(34). Relay T2(33), in releasing, allows relay ST1(34) to release thereby permitting ringing interrupter No. 1 to become idle. The release of relay T2(34) also removes the shunt from the winding of relay C0(34) as above described to allow that relay to operate the next time ground is connected to conductor 2305. Relay ST2(34), in operating, starts the functioning of ringing interrupter No. 2(34) with that interrupter being associated with alarm tube AL2(34). Since relay TR(34) is locked to relay AL1(34), ringing interrupter No. 2 will continue to be used until switch RT(34) is operated. Similarly, malfunctioning of code ringing interrupter No. 2 will cause relay AL2(34) to be operated which will cause a transfer to ringing interrupter No. 1 and will also ground conductor 1334. If both relays AL1(34) and AL2(34) become operated, conductor 3427, which extends to the alarm circuit (Fig. 22), will be grounded.

It is to be understood that although individual batteries have been shown in the ringing interrupter and transfer circuits for purposes of clarity, the batteries associated with the fuses at the right of Fig. 34 represent the battery supply for all ringing interrupters. If any of the fuses at the right of Fig. 34 are operated, relay F1(34) or relay F2(34) is operated, depending on whether the operated fuse is associated with ringing interrupter No. 1 or ringing interrupter No. 2. If relay F1(34) is operated, ground is connected through its inner lower front contact to operate relay AL1(34). If relay F2(34) is operated, ground is connected through its lower front contact to operate relay AL2(34). Relay AL1(34) or AL2(34), in operating, functions as above described to transfer the circuits and to ground conductor 1334, and, if both relays operate concurrently, to ground conductor 3427. If relay F1(34) operates, negative battery is connected through resistor 3429 and through its outer lower front contact to conductor 1339. If relay F2(34) operates, negative battery is connected through resistor 3430 and through its upper front contact to conductor 1339. Conductor 1339 is cabled to the alarm circuit (Fig. 22) for a purpose hereinafter to be described.

Revertive call

Provision is made for associating up to twenty parties with a single line, with means for distinctively ringing each of these parties. For example, the line represented as terminating at the portion of the primary switch shown at the middle of Fig. 9 is such a multiparty line. Three subscriber's stations have been represented, viz., 347-4, 347-7, and 364-1, although it is to be understood that up to seventeen more such stations may be associated with this same line. Ten of these stations will be given designations having common hundreds, tens and units digits and individual ringing-code digits, viz., 347-1 to 347-0, inclusive. The remaining ten of these stations will be similarly designated with a common hundreds digit which is the same as for the other ten stations, a common tens digit which must be different than that for the other ten stations, a common units digit, and individual ringing-code digits, viz., 364-1 to 364-0. A line tube is associated with each of these groups of ten subscriber's stations, as, for example, line tube L2(9) is associated with those subscriber's stations having the designation 347-x, and line tube L3(9) is associated with those stations having the designation 364-x. One of the groups of ten subscribers is signaled by the regular ringing codes 1 to 10 as shown in Fig. 50. The other group of ten subscribers is signaled by ringing codes 11 to 20 which are as the regular ringing codes except that they are preceded by a "short" preliminary ring during the second ringing interval. It will be assumed that those subscriber's stations designated 347-x will receive codes 1 to 10, and those designated 364-x will receive codes 11 to 20.

Let it be assumed that the subscriber designated 347-4 desires to call the subscriber designated 364-1. Subscriber 347-4 will lift the receiver or remove the handset from its cradle, and, presuming the line is idle, will be connected through the primary and secondary switches to a junctor, assumed to be junctor IA(28), and through the register-connector to the register, assumed to be the register shown in detail, in a manner similar to that described on the previous call. The calling subscriber will then receive the dial tone and will dial the number 364-1. As previously described, the hundreds digit will be counted and then stored in the hundreds storing tubes, tube H38(38) being discharged to record the digit "3." The tens digit will then be counted and then stored in the tens storing tubes, tubes T16(38) and TA5(38) being discharged to record the digit "6." It will be recalled that in order to store the tens digit, negative battery is connected through the outer lower contact of relay RA1(37), through the No. 6 contact of operated relay P2(35) to conductor 3515 whereby a negative potential is applied to the left-hand control cathodes of the tens storing tubes T16(38) to TA5(38), inclusive. This negative voltage on conductor 3515 is at this same time applied through resistor 3529 to the right-hand control cathode of the "pre-tens" tube PRE-TA(35), and, it may be noted, also to the right-hand control cathodes of additional "pretens" tubes such as PRE-TB(35) and PRE-TC(35). At this same time, the tens digit is also stored momentarily in the counting chain of Fig. 36, whereby the main cathode of one of the tubes R16(36) to R50(36) is at a positive potential relative to ground since that tube is conducting. The main cathodes of the counting chain tubes R16(36) to R50(36) are connected through front or back contacts of relay RA5(36), depending on whether the digit counted is above or below "5," and extend to the cross-connection terminal strip 3649. A suitable cross connection is made between terminal strips 3649 and 3650 in accordance with which, if any, digits are to be used as the tens digit of the second group of ten subscriber's designations in a twenty-party line. For example, since it is desired that there be a preliminary ring preceding the code rings of those subscribers designated 364-x, the conductor at terminal strip 3649 associated with the digit "6" is cross-connected to one of the conductors at terminal strip 3650. With the digit "6" momentarily recorded in the counting chain, relay RA5(36) will be operated, and the positive main cathode potential of conducting tube R16(36) is connected via conductor 3649, through the No. 6 contact of relay RA5(36) to conductor 3651 which is cross-connected to one of the conductors at terminal strip 3650, as, for example, conductor 3652. The positive potential on conductor 3652 is applied through the No. 5 contact of operated relay P2(35), conductor 3530, resistor 3531, and to the right-hand control anode of "pre-tens" tube PRE-TA(35). It may be noted that this potential could have been applied to any of the "pre-tens" tubes shown, or to any additional such tubes, as many as ten "pre-tens" tubes being associable with any one "pre-hundreds" tube such as PRE-H(35). Positive 135-volt battery is supplied through the No. 8 contact of operated relay SR(37), conductor 3746, and to the main anode of "pre-hundreds" tube PRE-H(35), and through resistor 3532 to the main anode of tube PRE-TA(35) as well as to the main anodes of the other "pre-tens" tubes. The main cathodes of the "pre-tens" tubes and of the "pre-hundreds" tube are connected to negative battery through resistor 3533. Therefore, tube PRE-TA(35) will undergo a control-gap discharge and first and second transfers. It may be noted that this will occur during each originating call in which the digit "6" is the tens digit. It should be further noted that the "pre-tens" tube would not have fired had the calling party dialed 347-x since on a call to a subscriber's station so designated, no preliminary ring is required. After firing, the main cathode of tube PRE-TA(35) rises to ground potential or above, and this bias voltage is applied through resistors 3534 and 3535 to the left-hand control cathode of tube PRE-H(35).

The units digit "4" is then counted and stored by the discharge of tube U49(38), and the ringing-code digit "1" is then counted and stored in the counting chain by the discharge of tube R16(36).

During the time following the receipt of the fourth or ringing-code digit, relay RA1(37) is operated as above described, releasing relay RA(37) and operating relay DC1(39). As before, the operation of relay DC1(39) results in the operation of relay OT(12) which causes relay RLS(12) in the common release and time out circuit to operate to extinguish the tubes in the line and line link frame. When relay RLS(12) has released, one of the tubes LO1(13) to LO2(13) fires in lock-out. It will be assumed that tube LO1(13) fires thereby operating relay LO1(13). As above described, relay LO1(13), in operating, operates relay MA(12) to remove main-anode battery from the line tubes and operates number-group connector relay NGCB(47) which operates relay NGCA(46). Relay NGCA(46) in operating, operates relay HST(40). Relay HST(40) in operating, operates relay HP(40) for a short interval, and completes an energizing path for slow-to-operate relay VAC(40) through the back contact of unoperated relay IB(40), as described in reference to the previous call. Since tube T16(38) is conducting and relay TA5(38) is operated to register the tens digit "6" and since tube U49(38) is conducting to register the units digit "4," the operation of relay NGCB(47) completes circuits for the operation of relays T16(47) and U49(47). With these relays operated, negative battery is connected through the front contact of relay TA5(38), conductor 3844, No. 19 contact of relay NGCB(47), conductor 4716, outer upper front contact of relay T16(47), conductor 4717 and to the cross-connection terminals of Fig. 49 where it is cross-connected to conductors associated with the "tens" or control cathodes of all those line tubes having the number "6" as the tens digit of their designations. Thus, the negative voltage on conductor 4717 is applied through conductor 4917 which is carried via cables 4918 and 4908 to Fig. 9, through resistor 930 to the right-hand control or "tens" cathode of line tube L3(9). Positive 135-volt battery is connected, as before described, through the back contact of relay UA5(38), conductor 3936, No. 27 contact of relay NGCB(47), conductor 4707, inner upper front contact of relay U49(47), and to conductor 4718 to Fig. 49 where it is cross-connected to conductors associated with the right-hand main or "units" anode of all those line tubes having the number "4" as the units digit of their designations. Thus, the positive voltage on conductor 4718 is applied through conductor 4919, which is cabled to Fig. 9, to the right-hand main anode of line tube L3(9). As was hereinbefore described, during the momentary operation of relay HP(40), full 135-volt battery is connected to the left-hand main anodes of the hundreds storing tubes and the resulting increased conduction through tube H33(36) causes a momentary rise in the potential at the main cathode of that tube. This positive potential is extended through conductor 3845, through the outer upper back contact of relay HA5(38), to conductor 3846. Since it has been assumed that multiparty lines shall have the number "3" as the hundreds digit of their designation, conductor 3846 is cross-connected to conductor 3847 over which the positive pulse is applied through the No. 1 contact of relay DC(37), which is operated as before described, conductor 3784, and through capacitor 3536 and resistor 3535 to the left-hand control anode of "pre-hundreds" tube PRE-H(35). It may be noted that a different hundreds digit could have been selected for use with multiparty lines by suitable cross-connection at the cross-connection terminal strips in Fig. 38. It may be further noted that although ten "pre-tens" tubes may be associated with each "pre-hundreds" tube, other "pre-hundreds" tubes may be added, each having an additional ten "pre-tens" tubes associable therewith.

The application of this positive pulse to the left-hand control anode of tube PRE-H(35) causes a control-gap discharge in that tube since the left-hand control cathode thereof is connected to negative battery through the network comprising resistors 3537 and 3538 and capacitor 3539. First and second transfers will immediately occur in the "pre-hundreds" tube, and the conjoint rise in main cathode potentials of the "pre-hundreds" tube and of the "pre-tens" tube will raise the potential on conductor 3540 to approximately 50 volts positive, for a purpose hereinafter to be explained.

The positive potential momentarily appearing on conductor 3846 is also applied through the No. 12 contact of relay NGCB(47), conductor 4719, is divided to ground through resistor 4720, and extends over conductor 4719 to the cross-connection terminals of Fig. 49. This potential is there connected to conductors extending to the right-hand control or "hundreds" anodes of all those line tubes having the number "3" as the hundreds digit of their designation. Thus, the positive pulse on conductor 4719 is applied through the cross-connection terminals to conductors 4920 and 4921 which are cabled to Fig. 9, through resistors 931 and 932, respectively, to the right-hand control or "hundreds" anodes of line tubes L3(9) and L2(9), respectively. Thus line tube L3(9) is the only line tube in the office which will have suitable potentials applied to all three of its terminating electrodes.

Line tube L3(9) will undergo a discharge across its right-hand control gap, and this discharge will immediately transfer whereby conduction will exist between the right-hand main anode and the right-hand control cathode of that tube. If the line were idle, the main cathode of line tube L3(9) would be at a potential negative relative to that of the right-hand control cathode and a second transfer would immediately occur as hereinbefore described. However, since the calling party is also on this line, the line is in effect busy and will test such by virtue of the fact that ground is connected from the junctor over the sleeve conductor and to the main cathodes of both line tubes L2(9) and L3(9), as before described. Therefore, a second transfer will not occur, and conduction will continue across the first transfer path.

When relay HP(40) releases, the shunts around the windings of relays BY(40) and IB(40) are removed, whereby current flows from positive battery, through the winding of relay IB(40), right-hand main anode of line tube L3(9), right-hand control cathode of tube L3(9), winding of relay BY(40), and to negative battery, thereby operating relays IB(40) and BY(40). Relay IB(40) is thereby operated to interrupt the energizing circuit for relay VAC(40) before that relay has had sufficient time to operate, and thus no vacant line indication is given. Relays IB(40) and BY(40), in operating, complete a circuit from negative battery, winding of relay BY(39), conductor 3941, No. 3 contact of unoperated relay ID(40), conductor 4032, right-hand contact of operated relay BY(40), conductor 4025, left-hand contact of operated relay IB(40), conductor 4022, No. 7 contact of relay RT(40), to ground on off-normal ground conductor 3913. Relay BYI(39) operates, locks through its No. 4 contact to ground on off-normal ground conductor 3913, and closes a circuit from ground through the No. 2 contact of operated relay ONI(39), conductor 3942, No. 3 contact of relay RC(39), conductor 3943, No. 3 contact of operated relay BYI(39), conductor 3944, through the operated cross-point of the register connector, conductor 2110 which is cabled to the junctor (Fig. 28), winding of relay BY(28), and to battery. Relay BY(28), in operating, connects ground through its No. 1 contact to conductor 4499 which will serve to start the ringing interrupter circuit as hereinbefore described.

Since the busy indication may be due to a reverting call, a revertive test is made. Therefore, relay BYI(49), in operating, also completes a circuit from positive 135-volt battery through the winding of relay RC(39) to conductor 3945 which extends to Fig. 42. Since the calling party's class-of-service is "flat-rate non-restricted," relay FR(42) will be operated as hereinbefore described. The battery on conductor 3945 will therefore be extended through the inner lower front contact of operated relay FR(42), conductor 4299, No. 5 contact of operated relay BYI(39), conductor 3946, through the operated cross point of the ringing connector, conductor 2876 which is cabled to Fig. 28, No. 2 contact of operated relay BY(28), to the left-hand main anode of tube VF(28). Relay BY(28), in operating, also completes a circuit from ground through its No. 7 contact, conductor 2835 which is cabled to Fig. 21, through the operated cross-point of the register connector, conductor 2106, No. 8 contact of relay ID(40), conductor 4034, No. 2 contact of operated relay BYI(39), conductor 3948, No. 6 contact and winding of relay RT(40), and to battery. Relay RT(40) operates and locks through its No. 5 contact to ground on off-normal ground conductor 3913. Relay RT(40), in operating, completes a charging path for capacitor 4036 over a path from positive battery, resistor 4035, Nos. 3 and 2 contacts of relay RT(40), capacitor 4036, and to ground. It may be noted that capacitor 4036 is normally discharged, when relay RT(40) is released, through resistor 4040. As capacitor 4036 charges, the rising potential is applied over conductor 4037, No. 7 contact of relay NTI(40), conductor 4039, resistor 3927 and to ground through resistor 3928 whereby a rising positive potential is applied to the right-hand control anode of tube VCK(39). The time constant of the circuit is such that tube VCK(39) is not discharged for a time sufficient for a revertive test to be made.

It will be noted that capacitor 4210 is normally positively charged from positive 135-volt battery, resistor 4211, which has a high value of resistance, capacitor 4210, to ground. Therefore, when relay RT(40) operates, a positive pulse is transmitted through resistor 4212, conductor 4213, outer lower front contact of relay FR(42), conductor 4214 which extends to Fig. 39, No. 3 contact of relay TKO(39), conductor 3950, No. 3 contact of relay VAC(40), conductor 4038, No. 10 contact of relay ID(40), conductor 4039, No. 8 contact of operated relay RT(40), to conductor 4015 which is extended via the number group circuit to the right-hand main or "units" anode of line tube L3(9). Therefore, a high positive pulse is applied to the main anode of the subscriber's line tube, and a second transfer will occur whereby conduction will momentarily exist between the right-hand main anode and the main cathode of tube L3(9), thereby momentarily raising the main cathode potential of tube L3(9) to approximately 50 volts positive. This positive pulse will be transmitted over the sleeve lead, through the originating secondary switch, and to the junctor. If the called subscriber's station and the calling subscriber's station are on the same line, i. e., if it is a reverting call, as has been assumed, this positive pulse will be received at the junctor which has previously been seized by the calling party. Since junctor 1A(28) has been assumed to have been seized on this call, the positive pulse on the sleeve conductor 1815 will be transmitted through the No. 7 contact of relay SR(28), and a major portion of that pulse will pass by the network comprising inductor 2818 and capacitor 2862 and will be applied, through resistor 2863 to the left-hand control anode of tube VF(28). Since the left-hand control cathode of that tube is connected to negative battery through the network comprising resistors 2864 and 2865 and capacitor 2866, and since the main cathode of that tube is connected to negative battery through resistor 2867, a control-gap discharge and first and second transfers will immediately occur whereby conduction will exist between the left-hand main anode and the main cathode of tube VF(28). It may be noted that the firing of this tube is aided by the presence of a "keep-alive" circuit including the right-hand control electrodes of the tube. It may also be noted that had this not been a revertive call, the called subscriber's line would have been associated with a different junctor and the positive pulse would have been applied to the left-hand control anode of the VF tube in that junctor, but no transfers would have occurred in that tube since there would be no supply of main anode battery.

Since relay RC(39) is in the circuit of the left-hand main anode of tube VF(28), relay RC(39) will operate and will lock through its No. 4 contact, conductor 3942, No. 2 contact of relay ON1(39) and to ground. This ground will also extinguish tube VF(28). Relay RC(39), in operating, interrupts the previously traced energizing path for relay BY(28) to release that relay. Relay RC(39), in operating, also connects positive battery through resistor 3951, through its No. 5 contact, conductor 4031, No. 4 contact of relay NGCA(46), conductor 4605, back contacts and armature of relay INT(46), conductor 4606, resistor 4401, conductor 4402, No. 2 contact of unoperated relay ON(44), conductor 4403, right-hand contacts of switch SW(44), conductor 4404, back contact of relay RL(44), conductor 4405 which is cabled to Fig. 31, resistor 3103, and to the left-hand control anode of ringing connector select tube SM1(31). Similarly, positive battery is connected through the corresponding portions of other idle ringing circuits to the left-hand control anodes of their associated ringing-connector select tubes. One of these tubes will fire in lock-out as previously explained, and it will be again assumed that tube SM1(31) fires, operating ringing-connector select magnet SEL1(31). Select magnet SEL1(31), in operating, operates ringing connector relays RC(46) and RC1(46) as before described.

Relay RC1(46), in operating, operates the ringing circuit off-normal relay ON(44) which connects ground to off-normal ground conductor 4408 and to conductor 4409 which holds the ringing-interrupter start relay operated, and connects the winding of relay PA(44) to the timing circuit of Fig. 28 as hereinbefore explained. Relay ON(44), in operating, also interrupts the circuit over which battery is connected to the control anode of the ringing-connector select tube SM1(31), and connects positive 135-volt battery through its No. 8 contact to conductor 4406 whereby it is applied to the left-hand control anode of tube RV(45), through resistor 4508 to the left-hand main anodes of the even-numbered ringing code tubes R2(45), R4(45), R6(45), R8(45) and R0(45), through resistor 4514 to the left-hand main anode of tube PRE(45), and through resistor 4515 to conductor 4516 whereby it is applied to the left-hand main anodes of the odd-numbered ringing-code tubes R1(45), R3(45), R5(45), R7(45), and R9(45) and through the outer lower back contact of relay RV(44) and conductor 4454 to the left-hand control cathode of tube RV(45).

Since conductor 3540 is at a positive potential due to the conjoint conduction of the "pre-hundreds" tube PRE-H(35) and of the "pre-tens" tube PRE-TA(35), upon the operation of relay RC(46), this potential is applied through the No. 6 contact of relay NGCA(46), conductor 4616, No. 1 contact of relay RC(46), conductor 4617 and through resistor 4517 to ground whereby a positive voltage is applied through resistor 4518 to the left-hand control anode of tube PRE(45). The left-hand control cathode of tube PRE(45) is connected to negative battery through the network comprising resistors 4519 and 4520 and capacitor 4521. The main cathode of tube PRE(45) is connected, in parallel with the main cathodes of the other ringing code tubes, to negative battery through resistor 4512 and the winding of relay R(44). Therefore tube PRE(45) will undergo a control-gap discharge and first and second transfers, but, as before, relay R(44) will not be operated due to the presence of the current-limiting resistor 4514.

Since the ringing-code digit "1" is stored in the counting chain, upon the operation of relay RC(46), ringing-code tube R1(45) will discharge and undergo first and second transfers in a manner similar to that previously described, but relay R(44) will still not be operated due to the presence of current-limiting resistor 4515 in the circuit of the left-hand main anode of tube R1(45). However, the potential drop across resistor 4515 is sufficient to cause the left-hand control gap of tube RV(45) to break down. With the left-hand control anode of that tube supplied with positive 135-volts and since the main cathode of that tube is connected to negative battery over a path including resistor 4523, conductor 4524, No. 5 contact and winding of relay RV(44), a transfer will occur in tube RV(45) whereby conduction will exist therein between the left-hand control anode and the main cathode thereof. It may be noted that tube RV(45) will discharge and transfer in this fashion when any of the odd-numbered ringing-code tubes RI(45), R3(45), R5(45), R7(45) or R9(45) are rendered conductive, but will not be discharged if an even-numbered ringing-code tube is conducting. Conduction in tube RV(45) will cause the operation of relay RV(44) which locks to off-normal ground through its No. 6 contact, and interrupts the previously traced circuits of the main and left-hand control cathodes of tube RV(45), thereby extinguishing that tube. Relay RV(44), in operating, also reverses certain ringing connections as will be described hereinafter.

Since the operation of the ringing interrupter has been started as above described, positive 135-volt battery is systematically applied to the several conductors 3331 to 3340 as hereinbefore described and as represented in the chart of Fig. 50. Since the middle-main anode of conducting ringing code tube RI(45) is connected to conductor 3334 and since the right-hand main anode of tube RI(45) is connected to conductor 3336, increased conduction will occur through that tube, and relay R(44) will be operated in response thereto, during the fourth, fifth, sixth, and seventh half-second intervals, i. e., a single "long" ring. Since the middle-main anode of conducting tube PRE(45) is connected to conductor 3332, increased conduction will exist through that tube during the second half-second interval and relay R(44) will therefore also be operated during that interval. This additional "pre" pulse is the short ring preceding the code which distinguishes the "pre" codes 11 to 20 from the normal codes 1 to 10, as shown in Fig. 50

During the time that the above revertive test is being made, capacitor 4036 in the control-anode circuit of tube VCK(39) is charging as hereinbefore mentioned. The time constant of this circuit is arranged to be longer than the time required to operate relay RC(39) if that relay is to operate at all. It may be noted that if the result of the revertive test is affirmative, i. e., if it is indeed a revertive call, relay RC(39) is operated, whereas if the result is negative, relay RC(39) will not be operated. It has been assumed that this is a revertive call, and relay RC(39) has been operated as above described.

After a suitable delay interval, capacitor 4036 becomes sufficiently charged to cause tube VCK(39) to discharge across its right-hand control gap. As previously described, the left-hand main anode of tube VCK(39) is connected to positive battery through a front contact of relay SR(37) and through the winding of relay CK(39). It will be recalled that on the previous call with the called line assumed to be idle, relay RC(39) was not operated and the main cathode of tube VCK(39) was connected to negative battery through a back contact of relay TKO(39). In the case of a revertive call, however, with relay RC(39) operated, the main cathode of tube VCK(39) is connected via conductor 3934, through the No. 6 contact of operated relay RC(39), conductor 3952 which extends to Fig. 46, No. 17 contact of relay NGCA(46), conductor 4619, No. 2 contact of relay RCI(46), conductor 4620, winding of relay RC(44), and to negative battery. Therefore, tube VCK(39) will undergo first and second transfers whereby relays CK(39) and RC(44) will be operated. Relay RC(44), in operating, locks to off-normal ground through its No. 4 contact, and completes a circuit from negative battery, winding of relay TN(44), conductor 4456, No. 6 contact of relay RC(44), conductor 4612, No. 1 contact of relay RCI(46) and to ground, whereby relay TN(44) is operated for a purpose hereinafter to be described.

Relay CK(39) locks operated, extinguishes tube VCK(39), releases relay DCI(39), removes capacitor 3909 from the winding of relay SR(37) so that relay will not be slow-to-release, and discharges capacitor 3909, as described hereinfore. As in the first call described, relay CK(39), in operating, operates the ringing-connector hold magnet over a path from ground through the upper back contact of relay TP(44), and, in this case, also from ground through the inner upper front contact of relay TN(44), conductor 4412, No. 4 contact of relay PB(44), conductor 4413, No. 3 contact of relay H(44), conductor 4414, No. 3 contact of relay RCI(46), conductor 4613, No. 18 contact of relay NGCA(46), conductor 4614, middle upper front contact of relay CK(39), conductor 3940, through the operated cross-point 2102 of the register connector, conductor 2107, winding of ringing-connector hold magnet HOLDA(31) and to battery. As previously described, hold magnet HOLDA(31), in operating, closes ringing-connector cross-point 3113 thereby extending the ground on conductor 2107 through this cross-point to conductor 3114, and, in parallel, through the winding of relay RL(44) to battery, and through the No. 3 contact of relay SR(44), conductor 4415, No. 6 contact of relay ON(44), conductor 4416, winding of relay H(44), and to battery. Relay H(44), in operating, connects ground through the upper back contact of relay TP(44) and through the inner upper front contact of relay TN(44), conductor 4412, No. 4 contact of relay PB(44), conductor 4413, No. 4 contact of relay H(44), and to conductor 4415 whereby relay H(44) is locked operated and whereby, temporarily, this ground is extended through the No. 3 contact of relay SR(44) to conductor 3114 to lock both the ringing-connector hold magnet HOLDA(31) and relay RL(44) operated. Relay H(44), in operating, also completes a circuit from ground on off-normal ground conductor 4408 through its No. 7 contact, conductor 4418, No. 3 contact of operated relay RC(44), to conductor 3121. This ground is extended, over one path, through the No. 1 contact of relay H(44), conductor 4420, No. 4 contact and upper winding of relay ON(44), and to battery whereby relay ON(44) is locked operated. The ground on conductor 3121 is also extended through the operated ringing-connector cross-point 3113, conductor 2838, No. 11 contact of unoperated relay RF(28), conductor 2869, lower winding of relay C9(28) and to battery, thereby locking relay C9(28) operated.

As described above in relation to the first call, the operation of the ringing-connector hold magnet HOLDA(31) also interrupts, at its back contacts, the circuit from the calling subscriber's tip conductor to ground through winding 3717 of the repeat coil in the register, and the circuit from the calling subscriber's ring conductor to negative battery through winding 3718 of the repeat coil and through the lower winding of relay L(37), and relay L(37) is thereby released.

Upon the release of relay L(37), relays SR(37), ON(37) and ONI(39) release in cascade as described in relation to the previous call. Relay SR(37), in releasing, removes main-anode battery to extinguish those tubes in the register which are conducting, including tubes RA1(37), any "pre" tubes in the register which are conducting, i. e., tubes PRE-H(35) and PRE-TA(35) under the assumed conditions, and the counting chain tubes and digit-storing tubes of Figs. 36 and 37, whereby relay RA1(37), and, under the assumed called number, relay TA5(38) are released. The removal of main-anode battery also allows relay AD(37) to release. As in the previous call, relay SR(37), in releasing, also connects ground through to the common release and time-out circuit to fire gas diode RR1(14) which fires tube RL(12) which causes relay RLS(12) to be momentarily operated. Relay RLS(12), in operating, removes the positive 50-, 100-, and 135-volt batteries from the line and line-link circuit to extinguish line tube L3(9) thereby releasing relays BY(40) and IB(40), and removes main-anode battery from tube LO1(13) extinguishing that tube, which releases relay LO1(13). Relay LO1(13), in releasing, releases number-group connector relay NGCB(47) which releases relay NGCA(46), thereby releasing relay HST(40) and the number group circuit. Relay RLS(12), in operating, also removes main-anode battery from the ringing-connector select tube SM1(31) which is extinguished and releases ringing-connector select magnet SEL1(31). It may be noted that since the ringing-connector hold magnet HOLDA(31) is operated, the ringing-connector operated cross-point remains closed. Select magnet SEL1(31), in releasing, releases relays RC(46) and RC1(46), but it may be noted that relay TN(44) is not released thereby since it is locked operated as will hereinafter be described. Ground is also removed from relay OT(12), and that relay releases unless another register is waiting to terminate a call as previously described. Upon the release of relay RLS(12), the office is again ready to handle another originating or terminating call.

Relay ON(37), in releasing, as in the previous call, interrupts the energizing circuit for relay C0(28) and for the register-connector hold magnets HOLDA(20) and HOLDA(21) and these hold magnets release to release the register connector, but relay C0(28) is locked operated as above described. Relay ON(37), in releasing, also releases the class-of-service relay FR(42) as in the previous call.

Relay ON1(39), in releasing, removes off-normal ground from the register circuit, releasing relays TMA(41), DC(37), and CK(39) as in the previous call. Relay ON1(39) also releases relays BY1(39), RC(39) and RT(40). Thus the register is restored to normal and is in condition to be employed in the completion of further calls.

Returning to a consideration of the ringing circuit, relay H(44), in operating, operates relay SR(44) over the previously traced path through back contacts of relays TP(44) and PB(44) to ground and also, in this case, through the outer upper front contact of relay TN(44) to ground. Relay SR(44), in operating, connects ground through its No. 4 contact to lock relay RL(44) and ringing-connector hold magnet HOLDA(31) operated as in the previous call. With relay C0(28) in the junctor locked operated as above described, upon the operation of relay SR(44), the calling and called subscribers' common line is extended to the ringing circuit. The common tip and ring conductors 1817 and 1818 are extended through the outer upper front contact and through the inner lower front contact, respectively, of relay C0(28), to conductors 2827 and 2828, through the Nos. 5 and 9 contacts, respectively, of unoperated relay RF(28), to conductors 2829 and 2830, through the inner front and outer front contacts, respectively of hold magnet HOLDA(31), to conductors 3117 and 3118 through the operated ringing-connector cross-point 3115, to conductors 3119 and 3120 which are cabled to Fig. 44, through inductors 4421 and 4422, respectively, through the Nos. 1 and 5 contacts of relay SR(44), to conductors 4426 and 4430, through the Nos. 2 and 5 contacts, respectively, of relay H(44), to conductors 4427 and 4431, through the inner upper back and the inner lower back contacts, respectively, of relay RA(44) to conductors 4428 and 4432, through the back contacts of relay DR(44) to conductors 4429 and 4433, and through the windings of relay TP(44) to ground and negative battery, respectively. Since the calling subscriber is on this line as well as the called subscriber, the line is closed and relay TP(44) will immediately operate. Relay TP(44), in operating, closes ground through its upper front contact to conductor 4458, No. 3 contact of relay PU(44), conductor 4459, Nos. 5 and 6 contacts of relay RC(44), conductor 4455, winding of relay TN(44) and to battery, thereby locking relay TN(44) operated under the control of relays TP(44) and PU(44). It may be noted that, in point of time, these operations actually occur prior to the time that relay RC1(46) is released, as above described, whereby relay TN(44) is locked operated before relay RC1(46) releases to interrupt the energizing circuit therefor. With relay TN(44) operated, the subscribers' ring conductor 4433 is extended through capacitor 4460, through the inner lower front contact of relay TN(44), and to conductor 3357. It will be recalled that relay X(32) is operated and released during alternate half-second intervals. Therefore ground is connected through the outer right-hand front contacts of relay X(32) to conductors 3267 and 3268 during alternate half-second intervals. The ground on these conductors is extended through the Nos. 3 and 4 contacts of relay T2(33) to conductors 3353 and 3356. Conductor 3353 is connected to alternator BT1(33) which is arranged to generate an alternating current of a suitable audible frequency. Thus, an audible tone is transmitted to various points in the system via conductor 3357 at half-second intervals when any of the ringing interrupters are operating. This tone, recognized by the subscribers as the "busy tone," is therefore transmitted over the subscribers' line on a revertive call as an indication to the calling subscriber to hang up so that ringing may proceed. The intermittent ground applied to conductor 3356 is used as a "busy tone" on a trunk call as will be described hereinafter.

When the calling subscriber hangs up to open his switch-hook contacts, relay TP(44) is released which releases slow-to-release relay TN(44). When relay TN(44) releases, busy tone is removed from the subscribers' line, and the winding of the pick-up relay PU(44) is connected to conductor 3331 through the outer lower back contact of relay TN(44) as on the previous call. During the first half-second interval of the next succeeding ringing cycle, positive battery is connected to conductor 3331 which operates relay PU(44) as shown in Fig. 50. Relay PU(44) locks to off-normal ground, and connects the winding of relay RA(44) through the No. 5 contact of unoperated relay RS(44) and to ground through the No. 2 contact of relay R(44), whereby relay RA(44) will be operated each time relay R(44) operates as hereinbefore described. It may be noted that relay DR(44) follows relay RA(44) as in the previously described call. Since ringing code No. 11 is to be transmitted, relay R(44) is operated during the second half-second interval to transmit a "pre" pulse and during the fourth, fifth, sixth and seventh intervals to transmit a single "long" ring as above described. Relay RA(44) will therefore be operated during these same intervals. It will be recalled that "reversing" relay RV(44) is operated when an odd-numbered code is to be transmitted, and is released when an even-numbered code is to be transmitted. With relay RV(44) unoperated, as in the previous call, ringing voltage is connected to the subscribers' tip conductor and ringing ground is connected to the subscribers' ring conductor, as hereinbefore described. Since the assumed code is an odd-numbered code whereby tube RV(45) was rendered conductive to operate relay RV(44), these connections are reversed. During the periods when relays R(44) and RA(44) are operated, the subscribers' tip conductor 4427 is connected through the inner upper front contact of relay RA(44), conductor 4461, No. 7 contact of operated relay RV(44), conductor 4446, No. 2 contact of relay RS(44), to ground; and the subscribers' ring conductor 4431 is connected through the inner lower front contact of relay RA(44), conductor 4447, No. 6 contact of relay R(44), No. 4 contact of operated relay RV(44), conductor 4445, outer upper front contact of relay RA(44), resistor 4444, conductor 4443, and to the ringing alternator 4442. Therefore, in odd-numbered codes, ringing voltage is connected to the tip conductor and ringing ground is connected to the ring conductor.

Assuming that grounded ringers are provided, if the ringers of both the calling and called subscribers are connected to the same side of the line, both subscribers will receive the code signal. However if the ringers of the calling and called parties are connected to opposite sides of the line, i. e., in this case, if the calling subscriber's ringer is connected to the tip conductor while the called subscriber's ringer is connected to the ring conductor, the calling subscriber would receive no signal and would not be notified that the line was being rung nor would there be an indication that the called subscriber had answered. Therefore, a revertive signal, comprising a short ring during the third and eleventh half-second interval of each cycle, is transmitted over the opposite conductor, in this case, over the tip conductor. The ringing interrupter applies positive battery to conductor 3333 for one-half second during the third interval, and again during the eleventh interval. This potential on conductor 3333 is connected through resistor 4463, No. 1 contact of relay RC(44), conductor 4464, upper back contact of relay GL(44), conductor 4465, No. 7 contact of relay R(44), conductor 4466, No. 2 contact of relay PU(44), winding of relay RS(44), and to ground. Therefore, on a revertive call, relay RS(44) is operated during the third and eleventh intervals. As may be noted in Fig. 50, no regular codes are transmitted during these intervals, and therefore relay R(44) is released while relay RS(44) is operated. A circuit is therefore completed from negative battery, winding of relay RA(44), conductor 4440, No. 1 contact of relay PU(44), No. 4 contact of relay RS(44), conductor 4467, to ground through the No. 1 contact of relay R(44) whereby relay RA(44) follows relay RS(44). In order that the revertive signal may be transmitted over the opposite side of the line from that over which the ringing voltage is applied, the subscribers' tip conductor, which normally, in an odd-numbered code, is connected to ground through the No. 2 contact of relay RS(44), is, upon the operation of relay RS(44), extended through the No. 3 contact of relay RS(44) to the source of ringing voltage 4442. In an even-numbered code where the ringing voltage is normally applied to the tip conductor, relay RS(44), in operating, causes ringing voltage to be applied to the ring conductor during the third and eleventh half-second intervals. It may be noted that during the time during which the revertive signal is being transmtited over one side of the line, the opposite side of the line is interrupted, and is not connected to ground. In the case of grounded ringers, there is no necessity of having the opposite side of the line grounded during these intervals; and in the case of a line in which the ringers are bridged, there is no necessity of a revertive signal being sent since all parties thereon receive all rings, and, in fact, the transmission of a revertive signal on lines having bridged ringers would be undesirable since it would cause a variation of the regular code. It may further be noted that the revertive signal is also omitted on a revertive call to a grounded line, i. e., a line comprising a single conductor and a return path through ground. As above indicated, the energizing path for relay RS(44) includes the upper back contact of relay GL(44). When a call originates on a grounded line, class-of-service relay GL(42) in the register is operated as above described. If an affirmative answer is obtained from the revertive test whereby relay RC(39) is operated, ground is connected through the inner upper front contact of relay GL(42), conductor 4215, No. 2 contact of relay RC(39), conductor 3954 which extends to Fig. 46, No. 19, contact of relay NGCA(46), conductor 4621, No. 4 contact of relay RC1(46), conductor 4622 which extends to Fig. 44, winding of relay GL(44) and to battery. Relay GL(44) operates, locks to ground on off-normal ground conductor 4408, and interrupts, at its upper back contact, the previously traced energizing path for relay RS(44) whereby a revertive signal will not be transmitted.

Since under the assumed conditions the calling and called subscribers are provided with grounded ringers, and since the called subscriber's code is odd while the calling subscriber's code is an even-numbered code, the called subscriber will be signaled by a short ring followed by a long ring, and the calling subscriber will receive a revertive signal. This ringing continues until one of three events occur: until the ringing circuit times out as above described; until the calling subscriber releases the circuits because of a failure of the called subscriber to answer; or until the call is completed.

If the calling subscriber decides to cease attempting to signal the called subscriber, he lifts his receiver for a brief interval and then returns it to the switch-hook. If the receiver is removed from the cradle to close the switch-hook contacts while relays RA(44) and DR(44) are released, or otherwise when those relays do release, relay TP(44) will be operated to trip ringing. Similarly, if the called subscriber answers, the line will also be closed to operate relay TP(44) to trip ringing, in which case the calling subscriber will remove his receiver from its cradle and proceed with the conversation. In either case and as hereinbefore described, relay TP(44), in operating, releases relay H(44), which, in turn, releases relay TP(44). Relay H(44), in releasing, releases relays SR(44), ON(44), and C0(28). Relay SR(44), in releasing, releases relay RL(44) and also releases the ringing-connector hold magnet HOLDA(31). Relay ON(44), in releasing, extinguishes the tubes of Fig. 45, releases the remaining operated relays in the ringing circuit, and removes ground from the ringing-interrupter start lead 4409 whereby the ringing interrupter will become idle as hereinbefore described. Then the ringing connector, the ringing circuit and the ringing interrupter restore to their normal conditions and may be utilized in a subsequent call.

With relay C0(28) released, talking battery is connected to the common calling and called line through the windings of supervisory relay S(28). This condition continues until the line is opened. If the called subscriber has answered and a conversation has ensued, the line is not opened until both parties have hung up. If the called subscriber has not answered, and the calling party has lifted his receiver to release the circuits, the line is opened when that subscriber returns his receiver to its cradle. Upon the opening of the line, relay S(28) releases releasing relays SR(28) and ON(28) to restore the junctor to normal which releases the primary and secondary switches to restore all circuits used on this call to normal, as hereinbefore described, in preparation for subsequent calls.

*Called line busy*

Let it be assumed that the subscriber designated 593–4 (Fig. 10) desires to call the subscribed designated 236–2 (Fig. 11). Let it also be assumed that the calling party has subscribed to a class-of-service known as "flat-rate restricted"; and let it further be assumed for the purposes of this call that the called subscriber's line is busy. Subscriber 593–4 will lift the receiver or remove the handset from its cradle and will thereby be connected through the primary and originating secondary switches to a junctor, assumed to be junctor 1A(28), and through the register-connector to the register, assumed to be the register shown in detail, in a manner similar to that previously described. However, since this line has a "flat-rate restricted" class-of-service, when relay ON(37) in the register operates to operate relay CSC(5), the middle main anode of the calling subscriber's line tube Ll(10) is connected via conductor 1002, through the No. 5 contacts of operated relays CS(5) and CSC(5), conductor 530 which is cabled to Fig. 42, winding of relay CL5(42), resistor 4717, and to positive 135-volt battery. Line tube Ll(10) will therefore momentarily transfer and relay CL5(42) will be operated. With relay CL5(42) operated, ground is connected through the No. 8 contact of relay ON(37), conductor 4204, resistor 4218, conductor 4219, and to the No. 2 contact of relay CL5(42) thereby locking that relay operated and extinguishing the transferred conduction from the center main anode of tube Ll(10). The ground on conductor 4219 is also extended through the No. 6 contact of relay CL5(42), winding of relay FR(42), resistor 4202, to battery, thereby operating relay FR(42) which locks to the ground on conductor 4204 through its inner upper front contact and resistor 4203. It will be assumed that the restrictions in the calling party's service do not include the present called party, and therefore relay CL5(42) has no function in this call other than that above described.

The operations will then proceed as described in the above two calls, with the calling subscriber receiving dial tone, dialing the digits "236–2," the counting and storing of these digits in the register, and the placing of the suitable potentials on the hundreds, tens, and units electrodes of the several line tubes, with line tube Ll(11) being the only one thereof that has the proper potentials applied to all three of its terminating-control electrodes. As in the above-described revertive call, the called line will test busy by virtue of the fact that the main cathode of tube Ll(11) will be at ground potential, relays IB(40) and BY(40) will be operated to operate relay BYl(39), relay BYl(39) will operate relay BY(28) in the junctor, and relay BY(28) will ground conductor 4409 to start the ringing interrupter and will operate relay RT(40). Relay RT(40), in operating, starts the charging of capacitor 4036 whereby a rising potential is applied to the right-hand control anode of tube VCK(39), and proceeds with the revertive test as above described. Since the calling and called subscribers are not on the same line, i. e., since the call is not a revertive call, a negative result will be obtained from the revertive test and relay RC(39) will not be operated. When the requisite delay interval has elapsed while capacitor 4036 charges, tube VCK(39) will fire to operate relay CK(39), but it may be noted that relay RC(44) will not be operated since relay RC(39) is not operated. Relay CK(39), in operating, locks to ground through its outer lower front contact and through the No. 2 contact of relay ONl(39), extinguishes tube VCK(39), releases relay DCl(39), and removes capacitor 3909 from the winding of relay SR(37) as before described. With relay BYl(39) operated and with relay RC(39) unoperated, the only path over which ground is connected to the upper winding of relay C0(28) to energize that relay is through the inner upper back contact of relay CK(39). Therefore, when relay CK(28) operates, this energizing path for relay C0(28) is interrupted. Since this is not a revertive call, relay RC(44) in the ringing circuit remains unoperated, and therefore the lower or hold winding of relay C0(28) is not energized, and relay C0(28) will release. The removal of ground from the upper winding of relay C0(28) also removes ground from the path through the inner upper front contact of relay C0(28) to the winding of the ringing-connector hold magnets HOLDA(20) and HOLDA(21) and those hold magnets will release.

Relay C0(28), in releasing, connects the calling subscriber's line through the windings of relay S(28) whereby that relay is operated. Relay C0(28), in releasing, also completes a locking path for relay BY(28) which may be traced from negative battery, winding of relay BY(28), No. 4 contact of relay BY(28), conductor 2870, outer lower back contact of relay C0(28), conductor 2871, No. 1 contact of relay SR(28), and to ground. Relay C0(28), in releasing, also completes a path over which busy tone is transmitted to the calling subscriber over a path from the calling subscriber's ring conductor 1818, inner lower back contact of relay C0(28), conductor 2818, No. 5 contact of relay DL(28), conductor 2872, capacitor 2873, No. 6 contact of operated relay BY(28), and to conductor 3357 which is supplied with busy tone from the ringing interrupter as hereinbefore described. The junctor will remain in this condition until the calling subscriber disconnects.

With the register-connector hold magnets released to release the register connector, relay L(37) is released to release relays SR(37), ON(37) and ON1(39) in cascade. Relay SR(37), in releasing, closes ground to the common release and time-out circuit which serves to extinguish line tube LI(11), to restore the common release circuit to normal, and to release the number group circuit as hereinbefore described. Relay SR(37) also removes main anode battery from the tubes in the register, and with the release of relays ON(37) and ON1(39) and of the relays held operated thereby, the register is returned to normal for use on subsequent calls.

When the calling subscriber hangs up, relay S(28) releases to release relay SR(28) which releases relay ON1A(28) and the hold magnets in the primary and secondary switches to restore the circuits to normal as described above in relation to the revertive call.

Called line vacant

As above discussed in regard to the first call described, the busy idle vacant test is initiated by the number group connector relay NGCA(46) operating relay HST(40) through back contacts of relays ID(40) and VAC(40). In addition to the functions performed in relation to the idle and busy tests, as described above, relay HST(40), in operating, also completes a circuit from ground on off-normal ground conductor 3913, No. 7 contact of relay RT(40), conductor 4022, armature and back contact of unoperated relay IB(40), conductor 4023, inner upper front contact of relay HST(40), conductor 4024, winding of relay VAC(40), and to negative battery. As before indicated, relay VAC(40) is slow to operate whereby if the called line is either idle or busy, relay IB(40) will operate prior to the operation of relay VAC(40) whereby the energizing circuit for relay VAC(40) will be interrupted. If, however, the line is vacant, in which case there will be no line tube having the dialed designation, relay IB(40) cannot operate, and, after the requisite interval, relay VAC(40) will operate. Relay VAC(40), in operating, locks through its No. 4 contact to ground through off-normal ground conductor 3913, interrupts at its No. 1 contact the locking path for relay ID(40) to prevent that relay from being locked operated, interrupts at its No. 2 contact the previously traced energizing path for relay HST(40) to release that relay, and completes a circuit from ground through its No. 6 contact, conductor 3944, register-connector operated cross-point 2102, conductor 2110 which is cabled to Fig. 28, winding of relay BY(28) and to battery whereby relay BY(28) is operated. Relay BY(28), in operating, returns ground to the register to operate relay RT(40) as in the revertive call above described. Relay RT(40) locks operated and applies a rising potential from capacitor 4036 to the right-hand control anode of tube VCK(39) as previously described. Tube VCK(39) fires to operate relay CK(39) which locks operated and extinguishes tube VCK(39). Since relay VAC(40) is operated, the only path over which ground is extended to the upper winding of relay CO(28) and to the register-connector holds magnets HOLDA(20) and HOLDA(21) is through the inner upper back contact of relay CK(39), and therefore, upon the operation of relay CK(39), relay CO(28) is released and the register connector is restored to normal. The junctor is thus in the same condition as in a busy call. The release of the register connector restores the register to normal which signals the common release circuit, and that circuit releases the number group circuit and restores itself to normal as previously described. When the calling subscriber receives busy tone and disconnects, the junctor and switch train is restored to normal as described in relation to the busy and revertive calls.

Call to private branch exchange trunk group

Private branch exchanges may be operated with the system herein disclosed by the provision of certain additional equipment in the number group, by slight modification of the line equipment, and by associating a plurality of the lines in the office (which then serve as private branch exchange trunks) with a private branch exchange switchboard. For each private branch exchange, a tube and relay combination, such as tube PX(49) and relay PX(49) must be provided in the number group. In each line circuit to be associated with a private branch exchange, an additional contact must be provided on the individual lock-out relay in that line, such as the outer right-hand contact of relay LO2(8). In the present disclosure, one private branch exchange switchboard P. B. X(8) has been disclosed, with three private branch exchange trunks extending thereto, i. e., the line including line tube L2(8), the line including line tube L1(9), and the line including line tube L2(11), although it is to be understood that additional lines may readily be associated with this private branch exchange, and that additional private branch exchange systems may be provided. The three private branch exchange trunks have been designated "400–1," "401–1," and "402–1" of which the former is here assumed to be the listed private branch exchange number. The designation of any one of the P. B. X lines may be used as the P. B. X number, or, if preferred, a different unused line designation may be used. It may be noted, as will be seen hereinafter, that there is no necessary relationship between the numbers assigned to the several private branch exchange trunks, and consecutive designations have been employed only for purposes of clarity.

Let it be assumed that the subscriber designated 236–2 (Fig. 11) desires to communicate with a party who may be reached through the private branch exchange switchboard P. B. X(8). Although the designations of the other private branch exchange trunks may be listed for night connections, as will be described hereinafter, the listed number which the calling subscriber will dial is 400–1. Let it further be assumed that the calling party 236–2 has subscribed to a class of service known as "message rate restricted," i. e., the calling subscriber is limited as to which parties he may call on a non-toll basis, and he is charged for the calls made on a message rate basis.

As described in detail hereinbefore, the calling subscriber initiates the call by lifting the receiver to close the switchhook contacts, relay L1(11) is operated, and the control circuits function to connect the calling subscriber's line through the primary and originating secondary switches to a junctor, assumed to be junctor 1A(28), and through the operated cross-points, assumed to be cross-points 2009 and 2102, of the register connector to the register, assumed to be the register shown in detail. However, since this line has a "message rate restricted" class of service, when relay ON(37) in the register operates to operate relay CSC(5) as hereinbefore described, the center-main anode of the calling subscriber's line tube L1(11) is connected to positive 135-volt battery over a circuit including the winding of relay CL2(42). Line tube L1(11) will therefore momentarily transfer and relay CL2(42) will be operated. In a manner similar to that described above in relation to the busy call, relay CL2(42), in operating, locks to ground, extinguishes the transferred conduction through the center-main anode of tube L1(11), and operates relay IMR(42) which also locks to ground. It will be assumed that the restrictions in the calling party's service do not include the present called party, and therefore relay CL2(42) has no function in this call other than that above described.

The operations then proceed as above described with the common release circuit extinguishing tube L1(11) so that further calls may be placed, the register transmitting dial tone, and the digits "400–1" being dialed, counted and stored in the register. As before, at the conclusion of the fourth digit, relay RA1(37) is operated to operate relay DC1(39) which calls in the common release circuit, and operates relay OT(12) therein. If the release circuit is idle, relay OT(12) conditions this circuit for a terminating call, and if the common release circuit is busy on another originating or terminating call, relay OT(12) performs this conditioning when the common release circuit becomes idle as hereinbefore described. When the common release circuit has operated, one of the lock-out tubes operates in lockout to permit only one register to seize the number group. When lock-out tube LO1(13), associated with the presently used register, operates, relay LO1(13) is operated which operates relay MA(12). Relay MA(12), in operating, removes main-anode battery from the line tubes to make certain that those tubes are extinguished as hereinbefore described, and also, in each call, interrupts that path over which main-anode battery is supplied to the PX tube, in the number group, associated with each private branch exchange, i. e., the path from positive 135-volt battery, inner upper back contact of relay RLS(12), conductor 1213, back contact of relay MA(12), conductor 1214, No. 4 contact of relay C(12), conductor 1215 which extends through Fig. 14 to Fig. 15 and is there cabled to Fig. 49, through the network comprising resistor 4924 and capacitor 4925, winding of relay PX(49), and to the center-main anode of tube PX(49). Therefore, when relay MA(12) is operated, it is insured that all of the PX tubes are extinguished.

Relay LO1(13), in operating, also operates number group connector relay NGCB(47) which operates relay NGCA(46) as above described. Relay NGCB(47), in operating, connects the cathodes of the tens and units storing tubes to the corresponding tens and units relays in Fig. 47 thereby operating one of those relays in each group, i. e., since the registered tens and units digits are both "0," relays T50(47) and U50(47) will be operated. Relay NGCA(46), in operating, operates relay HST(40) which momentarily operates relay HP(40) as above described. Relay HP(40) momentarily connects full 135-volt battery to the main anodes of the hundreds storing tubes, thereby causing a positive pulse to be transmitted from the main cathode of that hundreds tube which is conducting, and through the operated contacts of relay NGCB(47) to the proper hundreds conductor in the number group. With the assumed hundreds digit "4," therefore, a positive pulse will be transmitted over the "4" hundreds conductor 4722 to the number group. While relay HP(40) is operated, full negative battery is connected, and after relay HP(40) is released negative battery is connected through the winding of relay BY(40), through the operated contact of relay T50(47) to the proper tens conductor, in this case the "0" tens conductor 4723 to the number group. While relay HP(40) is operated, full positive battery is connected, and after relay HP(40) is released, positive battery is connected through the winding of relay IB(40), through a front contact of operated relay HST(40) through the operated contact of relay U50(47) to the proper units conductor, in this case the "0" units conductor 4724 to the number group.

At the cross-connection terminals (Fig. 49) in the number group, instead of connecting conductors 4724, 4723, and 4722 to conductors 4926, 4927 and 4928, which extend to the terminating units, tens and hundreds electrodes of tube L2(8) as would normally be done, these conductors are cross-connected to the corresponding electrodes of tube PX(49). Thus, the units conductor 4724 is connected to conductor 4929 which extends to the right-hand main or units anode of tube PX(49); the tens conductor 4723 is connected to conductor 4930 which extends through resistor 4931 to the right-hand control or tens cathode of tube PX(49); and the hundreds conductor 4722 is connected to conductor 4932 which extends through resistor 4933 to the right-hand control or hundreds anode of tube PX(49). Therefore, a positive 135-volt potential is connected to the right-hand main anode of all those line tubes and of all those PX tubes having a "0" as the units digit of their designation, a negative potential is connected to the right-hand control cathode of all those line tubes and of all those PX tubes having a "0" as the tens digit of their designation, and a positive pulse is applied to the right-hand control anode of all of those line tubes and of all those PX tubes having a "4" as the hundreds digit of their designation. Since line tube L2(8) is not cross-connected in Fig. 49, tube PX(49) is the only tube in the system which will both undergo a control gap discharge and a first transfer whereby conduction will exist between the right-hand main anode and the right-hand control cathode thereof.

It will be recalled that when any line is busy under an established connection, the hold magnet and the lock-out relay in that line circuit are operated. Thus, if the private branch exchange trunk 400–1 is busy, hold magnet HOLDB(8) and lock-out relay LO2(8) will be operated. Similarly, if private branch exchange trunks 401–1 and 402–1 are also busy, hold magnets LO1(9) and LO2(11) will also be operated. In the event that this condition exists, that is, if all trunks are busy, a circuit is completed from ground, Nos. 3 and 2 contacts of relay NGCB(47), conductor 4725, back contact of relay PX(49), conductor 4934 which is cabled to Fig. 11 and then extends to Fig. 8, outer right-hand front contact of operated relay LO2(8), conductor 816, outer right-hand front contact of operated relay LO1(9), conductor 935, outer right-hand front contact of operated relay LO2(11), conductor 1109 which is cabled to Fig. 49, and to the main cathode of tube PX(49). It may be noted that if all the trunks associated with the called private branch exchange are busy, the above-traced path will also extend through front contacts of lock-out relays in all other line circuits (not shown) which are associated with that private branch exchange. It may further be noted that as long as any one or more of the trunks associated with the called private branch exchange are idle, this path is not completed and the main cathode of tube PX(49) is connected to negative battery through resistor 4935.

Assuming that all the trunks associated with the called private branch exchange are busy, whereby the main cathode of tube PX(49) is at ground potential, a second transfer will not occur in tube PX(49), and relays BY(40) and IB(40) will be operated as described above in regard to a busy call and in regard to a revertive call. It may be noted, however, that a revertive test is not made on message rate lines since these lines are necessarily single party lines whereby a revertive call is not possible. As indicated hereinbefore, the revertive test pulse from capacitor 4210 must be transmitted through front contacts of either the grounded line class-of-service relay GL(42), or the flat rate class-of-service relay FR(42), and since neither of these relays is operated on a message rate call, the revertive test will not be made. Therefore, the operations will proceed as on a busy call as hereinbefore described.

If one or more of the trunks associated with the called private branch exchange are idle, the main cathode of tube PX(49) is at a suitable negative potential as above described, and a second transfer will occur whereby conduction will exist between the right-hand main anode and the main cathode of tube PX(49). Therefore, as on the idle line call previously described, when relay HP(40) releases, only relay IB(40) operates thereby completing a path for the operation of relay ID(40). Relay ID(40) in operating, as discussed above in relation to the first call described, fires the ringing-connector select tube SM1(31), releases relay HST(40), and releases relay MA(12). Relay MA(12), in releasing reconnects main anode battery to the several line tubes, including the application of main anode battery through the winding of relay LS(4) to the left-hand main anode of line tube L2(8) and of line tube L1(9), and through the winding of relay LS(5) to the left-hand main anode of line tube L2(11). Relay MA(12), in releasing, also reconnects main anode battery to the middle main anode of tube PX(49) over a circuit including the network comprising resistor 4924 and capacitor 4925, and through the winding of relay PX(49) as previously described. Prior to the release of relay HST(40), there is a sufficient potential drop across the winding of relay IB(40) and across resistor 4014 in the circuit of the right-hand main anode of tube PX(49) that upon the application of main anode battery to the middle main anode of tube PX(49), a third transfer will occur whereby conduction will exist from the middle main anode to the main cathode of tube PX(49), and relay PX(49) will thereby be operated.

Relay PX(49), in operating, removes the ground on conductor 4725 from conductor 4934, and applies the positive 135-volt main anode battery on conductor 1215 through resistor 4936, through the front contact of relay PX(49) to conductor 4934 which is cabled to Fig. 11 and then extends to Fig. 8 where it is connected to the outer right-hand armature of relay LO2(8). If this private branch exchange trunk is idle, the potential on conductor 4934 will be extended through the outer right-hand back contact of relay LO2(8), resistor 817 and to the left-hand control anode of line tube L2(8). However, if this line circuit is busy whereby relay LO2(8) is operated, the potential on conductor 4934 will be transmitted through the outer right-hand front contact of relay LO2(8), conductor 816, and to the outer right-hand armature of relay LO1(9) which is a part of the private branch exchange trunk circuit designated 401-1. If this trunk is idle, the positive potential on conductor 816 will be extended through the outer right-hand back contact of relay LO1(9), resistor 936, and to the left-hand control anode of tube L1(9). However, if this line is also busy, the positive potential on conductor 816 will be transmitted through the outer right-hand front contact of relay LO1(9), conductor 935, to the outer right-hand armature of relay LO2(11) which is a part of the line circuit designated 402-1. If all the previous private branch exchange trunk circuits are busy, it must be assumed that this circuit is idle in that the previously made busy test indicated that at least one of the trunks was idle. Therefore, the positive potential on conductor 935 is applied through the outer right-hand back contact of relay LO2(11) and through resistor 1110 to the left-hand control anode of line tube L2(11). It may be seen that in this fashion, private branch exchange trunk hunting is accomplished, with the dialing of the private branch exchange number resulting in the call being completed to the private branch exchange switchboard if any one of the trunks leading thereto is idle.

The application of this positive potential to the left-hand control anode of line tube L2(11) will cause this tube to undergo a control gap discharge and first and second transfers, after which the apparatus functions as in the terminating phases of the first-described call above, establishing a connection from the called private branch exchange through the primary, secondary, and tertiary switches, through the junctor, and through the secondary and primary switches to the calling subscriber. The register, register connector, and number group are restored to normal for use in subsequent calls. The ringing connector, ringing interrupter, and ringing circuit function as previously described to signal the called private branch exchange and to transmit audible ringing induction to the calling subscriber.

When the operator at the private branch exchange switchboard answers, the ringing circuit, ringing interrupter, and ringing connector are restored to normal as hereinbefore described, relay RF(28) in the junctor is released, and the parties are interconnected so that conversation may ensue, the calling subscriber being supplied talking battery through the windings of supervisory relay S(28), and the called private branch exchange switchboard being supplied talking battery through the windings of supervisory relay CS(28). As discussed in regard to the first-described call, after a suitable interval tube DL(28) is fired which operates relay DL(28). Relay DL(28), in operating, extinguishes tube DL(28), and prepares the junctor for timed release. Relay DL(28), in operating, also completes a circuit from negative battery, resistor 2874, No. 9 contact of relay BY(28), conductor 2875, No. 8 contact of operated relay DL(28), conductor 2876 which is cabled to Fig. 18, through the operated cross-point of the originating secondary switch, assumed to be cross-point 1821, conductor 1822, through operated cross-point 1103 of the primary switch, conductor 1111, winding of message register MRA(11), and to ground, thereby operating the calling subscriber's message register for charging purposes. It may be noted that non-message rate lines are not provided with message registers, that the energizing circuit for the message register is only completed when the path between the parties is fully established and conversation has ensued, that the energizing path for the message register includes a back contact of relay BY(28) so that the message register cannot be operated if the called subscriber's line is busy, and that the corresponding conductor, in this case conductor 2877, to the called subscriber is opened at the No. 9 contact of relay DL(28) whereby the called subscriber's message register will not be operated, if that subscriber be provided with such.

The circuits continue in this condition until the conversation is terminated and the parties hang up, at which time the connection is broken down and the junctor restored to normal as described hereinbefore. It may be noted that upon the release of relay DL(28), the energizing path for the calling subscriber's message register MRA(11) is interrupted whereby that message register may release.

It may be noted that the terminating control electrodes, i. e., the right-hand main anode and the right-hand control gap electrodes of the line tubes L1(9) and L2(11) are cross-connected to the proper hundreds, tens, and units conductors in Fig. 49 in the normal fashion. Therefore, if either 401-1 or 402-1 is dialed, the connection to the private branch exchange switchboard will be established as on a regular call, with the busy-idle-vacant test being made in the normal fashion, and with no successive hunting of the trunks occurring if the called line is busy. The additional trunks (not shown) to this private branch exchange may be similarly connected. By virtue of this provision, the trunks designated 401-1 and 402-1, and other private branch exchange trunks, may be set up as night listings, these trunks being associated at the private branch exchange switchboard with selected lines in the private branch exchange during the night or other period during which the private branch exchange switchboard is not manned.

*Outgoing trunk call to zero operator*

Since the subject system is designated to be fully automatic and unattended, an operator may be reached only via a trunk to the district master office represented at the upper right in Fig. 7. Let it be assumed that a party at the post-payment coin station 518-9 (Fig. 7), desiring assistance, desiring to place an outgoing tandem call, or for some other reason, calls the operator by dialing "0." When the calling party lifts the receiver 701 from its hook 702, the switchhook contacts 703 are closed and a circuit is completed from negative battery, winding of relay L4(9), outer left-hand back contact of hold magnet HOLDC(9), conductor 937, No. 8 contact of relay D(7), conductor 704, switchhook contacts 703, coin contacts 705, conductor 706, No. 2 contact of relay D(7), conductor 707, and through the middle left-hand back contact of hold magnet HOLDC(9) to ground. The operation of relay L4(9) fires tube L4(9) and the operations proceed as hereinbefore described whereby the calling party's line is connected through the primary and secondary switches to a junctor, assumed to be junctor 1A(28), and through the register-connector to a register, assumed to be the register shown in detail. However, since the party is calling from a post-payment coin line, when the register is seized and thereby operates relay CSC(4) as before described, the center main anode of line tube L4(9) is connected to positive battery through the winding of relay CL3(42) whereby tube L4(9) undergoes an additional transfer and relay CL3(42) is operated. Relay CL3(42) locks operated, extinguishes the last-mentioned transfer in tube L4(9), and operates relay CN(42) which locks, all in a manner similar to that hereinbefore described. Since a call to zero operator is not restricted in any class-of-service, relay CL3(42) performs no other function than that above described in this call.

Upon seizure, the register causes the operation of the common release circuit which prepares the line and line link circuit for handling other calls as hereinbefore described. The register transmits dial tone to the calling subscriber, and the subscriber dials the digit "0." The register functions as before described with relay RA(37) operating and the ten pulses representing the digit "0" being counted on the counting chain of Fig. 36, tubes R50(36) and RA5(36) thereof being discharged. Preliminary pulse absorbing is accomplished as above discussed, and when the digit "0" is received in the register, relay AD(37) will be operated since more than one pulse was received. As previously described, relay P1(35) is operated at the first pulse of the first digit, and upon the operation of relay RA1(37) during the delay following the receipt of this first digit, negative battery is connected through front contacts of relays RA1(37), AD(37) and P1(35) to conductor 3506 whereby a negative potential is applied to the left-hand control cathodes of the hundreds storing tubes H16(38) to HA5(38), and tubes H50(38) and HA5(38) therein are fired to store the hundreds digit "0." Since relay RA5(36) is operated as a result of the conduction through tube RA5(36), the negative potential on conductor 3506 is also extended through the No. 11 contact of operated relay RA5(36), and through resistor 3654 to ground whereby a negative potential is applied through resistor 3655 to conductor 3656. The negative potential on conductor 3656 is applied to the left-hand control cathodes of trunk tubes TK7(39), TK9(39) and other similar trunk tubes (not shown) for a purpose hereinafter to be described. The negative potential on conductor 3656 is also applied through the No. 9 contact of relay OPR(42), through conductor 4221, and through resistor 3653 to ground whereby a negative potential is applied to the right-hand control cathode of tube TK0(36). Main anode battery is supplied to tube TK0(36), and also to tubes TK7(39) to TK9(39) and to tube NT(40), through resistor 3657 and conductor 4002 which is supplied with positive 135-volt battery through the contacts of relay SR(37) as hereinbefore described. With tube R50(36) conducting, the main cathode of that tube will rise in potential, and this potential is applied through conductor 3638 and through resistor 3658 to the right-hand control anode of tube TK0(36). Tube TK0(36) will undergo a discharge across its right-hand control gap and a first transfer. Negative battery is connected to the main cathode of tube TK0(36) through the winding of relay TK0(39) and through conductor 3659. Therefore tube TK0(36) will undergo a second transfer and relay TK0(39) will be operated.

Relay TK0(39), in operating, connects ground through its No. 2 contact, conductor 3756, winding of relay RA1(37) to battery, and therefore when tube RA1(37) is extinguished upon the operation of relay EX(37) as hereinbefore described, relay RA1(37) will not release. Consequently, the register cannot be further advanced and any further digits which might be dialed are not recorded. Relay TK0(39), in operating, also connects ground on off-normal ground conductor 3913, through its No. 1 contact, conductor 3575, to the winding of relay DC(37) and to battery. Relay DC(37) operates and locks to ground on off-normal ground conductor 3913 through its No. 6 contact. Relay DC(37), in operating, operates relay DC1(39) over a path including a back contact of relay CK(39) as hereinbefore described. As before, relay DC1(39) in operating, calls in the common release circuit, and operates relay OT(12) therein. If the release circuit is idle, relay OT(12) conditions this circuit for a terminating call, and if the common release circuit is busy on another originating or terminating call, relay OT(12) performs this conditioning when the common release circuit becomes idle as hereinbefore described. When the common release circuit has operated, one of the lock-out tubes operates to permit only one register to seize the number group. When lock-out tube LO1(13), associated with the presently used register, operates, relay LO1(13) is operated which operates relay MA(12). Relay MA(12), in operating, removes main anode battery from the line tubes to insure that those tubes are extinguished as hereinbefore described.

Figure 13:
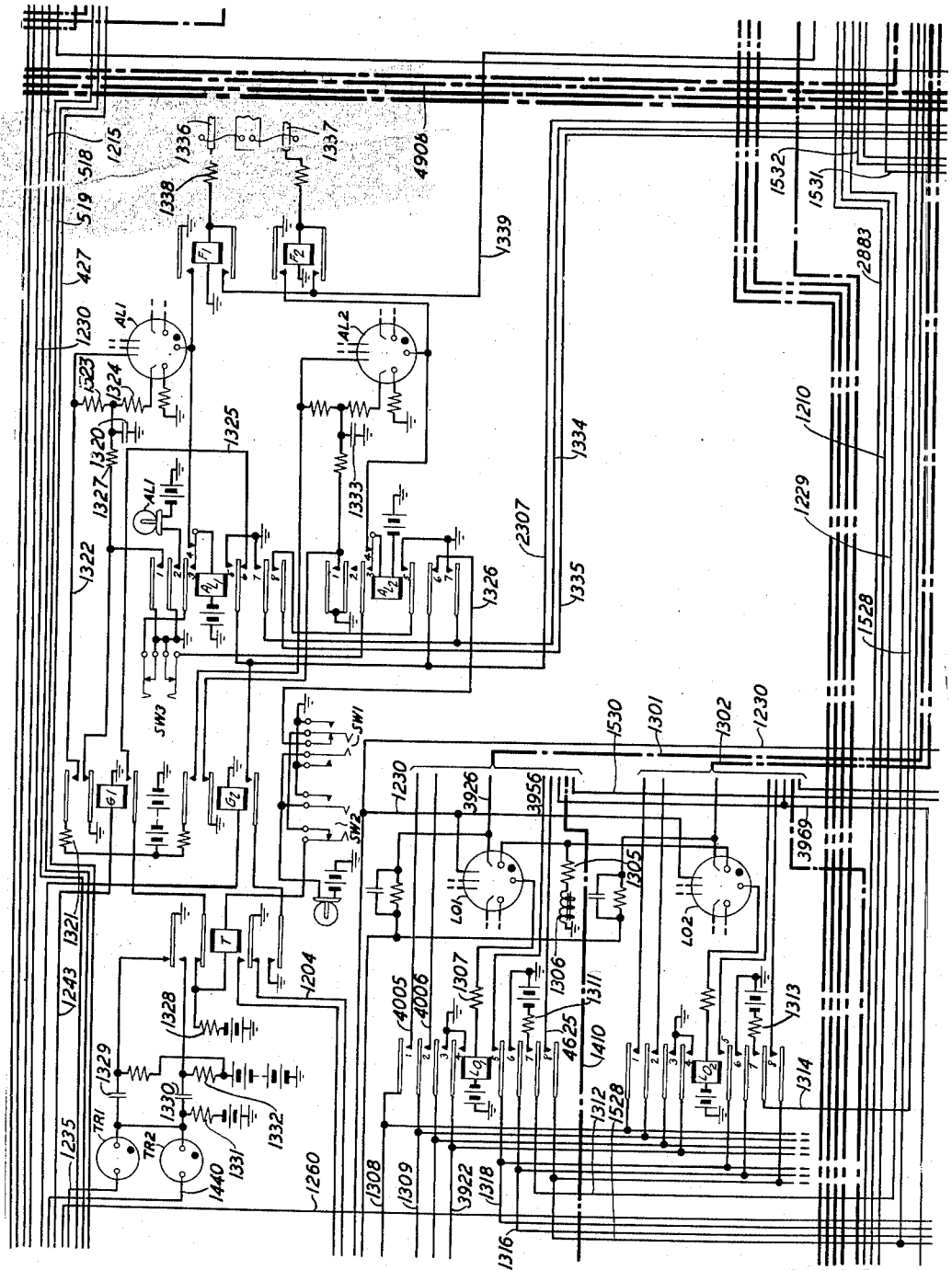

Relay LO1(13), in operating, also completes a circuit from positive battery, resistor 3955, No. 6 contact of operated relay TK0(39), middle lower back contact of relay CK(39), conductor 3956 which is cabled to Fig. 13, No. 5 contact of relay LO1(13), and to conductor 1318 whereby a positive potential is applied through capacitors 1502 and 1503 to the left-hand control anodes of tubes T1(15) and T2(15), respectively. It may be noted that a similar circuit would exist if relay LO2(13), or any other similar relay, had been operated. The left-hand control cathodes of tubes T1(15) and T2(15) are connected to ground through resistor 1504. The main cathodes of these tubes are connected to negative battery. The main anode of tube T1(15) is connected to positive battery through the series resistor 1505 and through the parallel paths including resistor 1506 and capacitor 1507. The main anode of tube T2(15) is connected to positive battery through the series resistor 1505 and through the parallel paths including capacitor 1508 and resistor 1509 and the winding of relay TR(15). Thus, tubes T1(15) and T2(15) are arranged as a conventional gas tube parallel control circuit adapted for the particular tubes employed. As may be readily seen, if tube T1(15) is conducting, capacitor 1507 will charge, its lower electrode becoming negative. Upon the application of a potential to the left-hand control anodes of the tubes as above described, tube T2(15) will undergo a control gap discharge and first and second transfers whereby, since capacitor 1508 cannot charge instantaneously, the potential on conductor 1510 will be lowered. The parameters of the circuit are such that the de-ionization time of tube T1(15) is less than the time required for capacitor 1507 to discharge through resistor 1506 and for capacitor 1508 to charge, so tube T1(15) will be extinguished. Tube T2(15), in firing, operates relay TR(15). It may be noted that these tubes are provided with "keep-alive" circuits as hereinbefore described. Let it be assumed that prior to the operation of relay LO1(13) on this call, tube T2(15) was conducting whereby upon the operation of relay LO1(13), tube T1(15) will be rendered conductive, tube T2(15) will be extinguished, and relay TR(15) will be in an unoperated condition, as depicted. With relay TR(15) released, ground is connected through its back contacts to conductors 1511 and 1512, and to other conductors not shown, which are cabled to Fig. 49, through resistors 4937 and 4938, respectively, to the right-hand control anodes of tubes TGB1(49), TGB2(49), respectively, and to other tubes which may be provided. It may be noted that upon the operation of relay TR(15) upon the next call to a trunk, ground will be connected through the front contacts of that relay to conductors 1513 and 1514, and to other similar conductors, through resistors 4939 and 4940, and through other similar resistors, to the right-hand control anodes of tubes TGA1(49) and TGA2(49), respectively, and to other similar tubes. In this manner, trunk rotation is obtained, as will be seen from the ensuing description.

Relay LO1(13), in operating, also operates relay TMA(15), and upon the subsequent operation of the number-group connector relays, relay TMA(15) is locked operated and relay TMB(15) is operated, as described in the first call, for the purpose of initiating time out as will be hereinafter described.

Relay LO1(13), in operating, also operates the number group connector relay NGCB(47) which operates relay NGCA(46) as before described. Relay NGCA(46), in operating, operates relay HST(40) which momentarily operates relay HP(40) as above described. While relay HP(40) is operated, positive 135-volt battery is connected through its inner upper front contact, conductor 4013, resistor 4014, middle upper front contact of relay HST(40), conductor 4015, back contact of relay UA5(38), conductor 3836, No. 27 contact of relay NGCB(47), to conductor 4707. Normally, as above described, this potential is then extended through contacts of the units relays U16(47) to U50(47) to the number-group cross-connection terminals, but since no digit is stored in the units storing tubes on this call, none of these units relays is operated. The potential on conductor 4707 is, however, applied to the right-hand main anodes of tubes TGA1(49), TGB1(49), TGA2(49), TGB2(49), and to the main anodes of other similar pairs of tubes not shown. It will be recalled that when relay HP(40) subsequently releases, this main anode battery is supplied through resistor 4012 and the winding of relay IB(40).

When relay HP(40) is operated, negative battery is connected through its outer upper front contact, conductor 4016, resistor 3837, back contact of relay TA5(38), conductor 3838, No. 20 contact of relay NGCB(47), to conductor 4708. Since no tens digit is stored in the register, none of the relays T16(47) to T50(47) will be operated. The negative potential on conductor 4708 is, however, applied through resistors 4941, 4942, 4943 and 4944 to the right-hand control cathodes of tubes TGA1(49), TGB1(49), TGA2(49), and TGB2(49), respectively, and through similar resistors to the right-hand control cathodes of other similar tubes which may be provided. It will be recalled that upon the release of relay HP(40), this negative battery is supplied through the winding of relay BY(40).

Relay HP(40), in operating, also shunts resistor 3820 as before described thereby increasing the current flow through tube H50(38), and causing a rise in the main cathode potential of that tube. This momentary rise in potential is transmitted through conductor 3849, inner lower front contact of operated relay HA5(38), conductor 3850, No. 5 contact of relay NGCB(47), to conductor 4726, which is the "0" hundreds conductor and extends to the cross-connection terminal strip of Fig. 49. Since the digit "0" is not available for use as the hundreds digit of a subscriber's number, only conductor 4947 is cross-connected to conductor 4726. The positive potential thereby momentarily applied to conductor 4726 is applied through resistors 4948 and 4949 to the right-hand control anodes of tubes TGAI(49) and TGBI(49). However, as above described, ground is applied to one of these control anodes by the trunk preference circuit in the common release circuit. Therefore, one of these tubes, assumed to be tube TGBI(49) has been disabled. Tube TGAI(49), however, will undergo a control gap discharge and a first transfer.

Referring now to Figs. 6 and 7, a plurality of "0" operator trunks may be provided, of which trunk No. 0 has been shown in detail in Fig. 6 and at the left in Fig. 7, and of which trunk No. 5 has been shown in part at the middle portion of Fig. 7. Other similar trunks may be provided and connected into the system in a manner similar to that disclosed. As will hereinafter be seen, if a trunk is not engaged in a call, relay ON therein will be unoperated, and negative battery will be connected therethrough to the main cathodes of the trunk-group tubes TGAI(49) and TGBI(49). Thus if trunk No. 0 is idle, relay ON(6) will be unoperated, and negative battery will be connected through resistors 601 and 602 to conductors 603 and 604, respectively, through the inner upper back and outer lower back contacts of relay ON(6), to conductors 605 and 606, respectively, which are cabled to Fig. 49, and to the main cathodes of trunk-group tubes TGAI(49) and TGBI(49), respectively. Similarly, if trunk No. 5 (Fig. 7) is idle, negative battery will be connected through resistors 601 and 602 to conductors 603 and 604, respectively, extensions of which are cabled to Fig. 7, through the inner upper back and outer lower back contacts of relay ON(7) to conductors 605 and 606 which extend to the main cathodes of the trunk-group tubes as before described. In a similar fashion negative battery is also connected to these main cathodes through the back contacts of the ON relay in each additional idle trunk. It may therefore be seen that as long as any one of the trunk circuits associated with the trunk group including tubes TGAI(49) and TGBI(49) is idle, negative battery is connected to the main cathodes of these trunk-group tubes; whereas if all of these trunk circuits are busy so that all of the ON relays therein are operated, all of the above-traced circuits from negative battery to the main cathodes of the trunk-group tubes will be interrupted.

Assuming that all of the trunks in trunk group No. 1 are busy whereby no negative potential is applied to the main cathode of trunk-group tube TGAI(49), a second transfer will not occur in that tube, and conduction will continue to exist between the right-hand main anode and the right-hand control cathode thereof. Therefore, with relay HP(40) released, relays BY(40) and IB(40) will both be operated as on a regular busy condition as hereinbefore described. Relays BY(40) and IB(40), in operating, operate relay BYI(39) which operates relay BY(28) which, in turn, operates relay RT(40) as hereinbefore described. Relay RT(40), in operating, causes a rising voltage to be applied to the right-hand control anode of tube VCK(39) from capacitor 4036. However, a revertive test is not made on a busy call to an "0" operator's trunk since the revertive test lead is opened at the No. 3 contact of operated relay TK0(39). When capacitor 4036 becomes sufficiently charged, tube VCK(39) will undergo a control-gap discharge and a first transfer. The main cathode of tube VCK(39), under these conditions, is connected via conductor 3934, No. 7 contact of unoperated relay RC(39), conductor 4206, No. 3 contact of relay OPR(42), No. 5 contact of relay T(42), conductor 3933, No. 5 contact of operated relay TK0(39), conductor 3957, No. 6 contact of operated relay BYI(39), resistor 3958, and to negative battery. Therefore tube VCK(39) will undergo a second transfer, and relay CK(39) will be operated. Relay CK(39), in operating, locks to off-normal ground and extinguishes tube VCK(39) as before explained.

With relay TK0(39) operated, the only path over which ground is extended to energize relay C0(28) and the register-connector hold magnets HOLDA(20) and HOLDA(21) is through the inner upper back contact of relay CK(39), and therefore, upon the operation of relay CK(39), relay C0(28) will be released as will the register-connector hold magnets. Therefore, the register connector, the register, and the number group will be released and restored to normal, busy tone will be sent to the calling subscriber, and, upon the replacing of the calling subscriber's receiver 701 upon its hook 702, the connection will be broken down and the circuits restored to normal as hereinbefore described.

Assuming, however, that one or more of the trunk circuits associated with trunk group No. 1 is idle whereby negative battery is applied to the main cathode of tube TGAI(49), tube TGAI(49) will undergo a second transfer whereby conduction will exist across the main gap thereof and relay IB(40) only will be operated as on a regular idle line. Relay IB(40), in operating, operates relay ID(40) which locks to off-normal ground.

Relay ID(40), in operating, removes, at its No. 5 contact, the ground which was employed to operate relay MA(12) as above described. Relay MA(12), in releasing connects positive 135-volt battery through to conductor 1215, whereby this potential is supplied to the line tubes as hereinbefore described. Conductor 1215 also extends to Fig. 49, where the positive potential on that conductor is applied through the windings of relays TGAI(49) and TGBI(49) to the middle main anodes of tubes TGAI(49) and TGBI(49), respectively. The conduction in tube TGAI(49) therefore transfers to the middle main anode and relay TGAI(49) is operated. Relay TGAI(49), in operating, extends this positive potential to conductors 4950 and 4951 which are cabled to Figs. 6 and 7. The positive potential on conductor 4950 is applied to the main anodes of all of the trunk tubes such as T0(6) and T5(7). In addition, the positive potential on conductor 4950 is applied through resistor 607 to ground through the parallel paths comprising resistor 608 and capacitor 609, whereby a rising potential is applied to the left-hand control anode of tube T0(6); through resistor 610 to ground through the parallel paths comprising resistor 611 and capacitor 612, whereby a rising potential is applied to the right-hand control anode of tube T0(6); through resistor 708 to ground through the parallel paths comprising resistor 709 and capacitor 710, whereby a rising potential is applied to the left-hand control anode of tube T5(7); through resistor 711 to ground through the parallel paths comprising resistor 712 and capacitor 713, whereby a rising potential is applied to the right-hand control anode of tube T5(7); and, in a similar manner, to the trunk tubes in other trunk circuits (not shown) in trunk group No. 1. It may be noted at this time that had trunk-group tube TGB1(49) fired, this potential would have been applied over conductor 4950 in the same manner.

Assuming trunks Nos. 0 and 5 in trunk group No. 1 are both idle, the positive potential on conductor 4951 is extended through the middle-upper back contact of relay ON(6), and through resistor 613 to ground through the parallel paths comprising resistor 611 and capacitor 612 whereby an additional charging potential is applied to capacitor 612. Similarly, the positive potential on conductor 4951 is extended through the middle upper back contact of relay ON(7), and through resistor 714 to ground through the parallel paths comprising resistor 712 and capacitor 713 whereby an additional charging potential is applied to capacitor 713. An additional charging potential is also applied to the capacitors at the right-hand control anodes of all other trunk tubes associated with idle trunks in trunk group No. 1.

The time constants of the networks associated with the right-hand control anodes of the several trunk tubes are preferably arranged to differ one from the other, whereby those tubes are given an order of preference depending upon which network has the lowest time constant. Thus, the values of the resistors and capacitors may be selected so that the time constant of the network associated with the right-hand control anode of tube T0(6) is relatively short, that of the network associated with the right-hand control anode of tube T5(7) relatively long, and with the time constant of the networks associated with the right-hand control anodes of the trunk tubes associated with other trunks in this same trunk group differing one from the other in a range intermediate those of tube T0(6) and T5(7), whereby tube T0(6) is given first preference and tube T5(7) is given last preference.

On the next call, and on alternate calls thereafter, tube TGB1(49) will be fired and relay TGB1(49) will be energized as hereinbefore explained. With relay TGB1(49) operated, positive potential is connected to the networks associated with the left-hand control anodes of those trunk tubes associated with idle trunks in trunk group No. 1. The time constants of the networks associated with the left-hand control anodes of the several trunk tubes may likewise be selected to give a desired sequence of preferences, preferably arranged so that preference is given in a direction opposite to that previously described, i. e., with tube T5(7) being given first preference and tube T0(6) being given last preference. If desired, it may be arranged that trunk hunting will occur over a portion of the trunks in opposite directions with the remainder of the trunks being given uniform time constants whereby they will be selected with no definite preference if all of the preferred trunks are busy. As shown, trunk No. 0 appears on line link frame No. 2 (Fig. 19). It is desirable to distribute the trunks in any trunk group throughout the several frames to distribute the traffic for a more efficient use of the equipment. It may be desirable to arrange the trunk hunting in both directions so that first preference will be given to a trunk on one frame in one direction and so that first preference will be given to a trunk in another frame in the other direction. The most suitable arrangement of preferences will be determinable for the particular requirements by one skilled in the art. The system is flexible in this manner and may readily be varied to meet different requirements and differing traffic conditions.

It will be noted that none of the trunk tubes within the trunk group have any individual main-anode impedance and that all of the control cathodes of the several trunk tubes are connected to ground via conductor 614 and through the common resistor 615. Assuming either that trunk No. 0 (Fig. 6) is the only idle trunk in this trunk group, or that trunk No. 0 has the highest preference of any of the idle trunks, tube T0(6) will undergo a control-gap discharge across the right-hand control gap, under the assumed conditions, and will then undergo a first transfer in lock-out so that no additional trunk tube can fire on this call.

Since the main cathode of tube T0(6) is connected to negative battery via conductor 620 and through the winding of relay ON(6), tube T0(6) will undergo a second transfer and relay ON(6) will be operated. Relay ON(6), in operating, makes this trunk circuit busy to future calls whereby the trunk-group tubes will test busy if there are no other idle trunks as hereinbefore described. Relay ON(6), in operating, also completes a path from ground through the lower back contact of jack T(6), conductor 622, middle lower back contact of relay B(6), conductor 623, outer upper front contact of relay ON(6), winding of relay CC(6) and to battery, thereby operating relay CC(6). Relay CC(6) is a class cut-in relay, and, in operating, completes a path for the operation of the proper class-of-service relay in the trunk circuit. If the call is from a single party message rate line, ground will be connected through a front contact of operated relay IMR(42) in the register to operate relay MR(6) in the trunk circuit; if the call is from another trunk, ground will be connected through a front contact of operated relay T(42) or of operated relay OPR(42) in the register to operate relay TDM(6) in the trunk circuit; and if the call is from a post-payment coin line, as assumed, ground is connected through the outer lower front contact of operated relay CN(42) in the register, conductor 4222 which is cabled to Fig. 46, No. 2 contact of relay NGCA(46), conductor 4623 which is cabled to Fig. 6, No. 4 contact of relay CC(6), conductor 624, winding of relay CN(6) and to battery whereby relay CN(6) is operated.

Relay CC(6), in operating, also connects ground through its No. 1 contact, conductor 625, winding of relay OC(6) and to battery to operate relay OC(6). With the call originating either from a coin line or from a message-rate line, relay OC(6), in operating, completes a circuit from battery, winding of relay CS(6), outer upper front contact of relay CN(6), or MR(6), conductor 626, No. 7 contact of relay OC(6), conductor 627, No. 4 contact of relay TKI(7), and to ground, and thus, on this call, relay CS(6) will be operated. Relay OC(6), in operating, also connects ground through its No. 9 contact to the start lead 4409 to start the ringing-interrupter circuit as hereinbefore described.

Conduction across the main gap of tube T0(6) will also cause a rise of potential at the main cathode thereof, and this potential is applied via conductor 620 which is cabled to Fig. 8, through resistor 819 to the right-hand control anode of line tube LI(8) in the associated line circuit. The right-hand control cathode of tube LI(8) is connected to negative battery through resistor 820, the main cathode of that tube is connected to negative battery through the winding of primary hold magnet HOLDA(8), and the left-hand main anode of that tube is connected to positive 135-volt battery over a circuit including the winding of relay LS(4) and the back contact of released relay MA(12) as hereinbefore traced. Therefore, tube LI(8) undergoes a control-gap discharge and first and second transfers whereby relay LS(4) is operated.

While the above-described events were taking place, relay ID(40), in operating, has also released relay HST(40) which released relay IB(40), and has also connected negative battery through resistor 4028 and through the No. 9 contact of relay ID(40), through the register connector, through junctor IA(28), and through the windings of tertiary select magnets SELIA(24) and SELIA(25) to ground, to operate those select magnets as hereinbefore described. Therefore with line tube LI(8) conducting to operate relay LS(4) and with the tertiary select magnets operated, the operations proceed as described in detail in regard to the terminating phase of the first call described above whereby the line from the called trunk is extended through the primary, secondary and tertiary switches to junctor IA(28). In addition to these previously described operations, on a call to an operator's trunk, when the primary hold magnet HOLDA(8) is operated to operate relay LOI(8), the ground on the sleeve conductor is extended through the outer left-hand front contact of relay LOI(8), conductor 821 which is cabled to Fig. 6, No. 7 contact of relay NTI(6), conductor 621 which is cabled to Fig. 23, winding of relay T0(23) and to battery. Relay T0(23) is thereby operated to prevent intrusion by the alarm transmitting circuit as will be described hereinafter.

When the crosspoints of the tertiary switch are closed, positive battery is connected through junctor IA(28), through the register connector, and through the No. 7 contact of operated relay ID(40) to the right-hand control anode of tube VCK(39), as hereinbefore described. The main anode of tube VCK(39) is connected to positive battery through the winding of relay CK(39), and with relay TK0(39) operated, the main cathode of tube VCK(39) is connected via conductor 3934, No. 7 contact of relay RC(39), conductor 4206, No. 3 contact of relay OPR(42), No. 5 contact of relay T(42), conductor 3933, No. 5 contact of operated relay TK0(39), conductor 3957, No. 7 contact of unoperated relay BYI(39), conductor 3959, operated crosspoint 2009 of the register connector, conductor 2015 which is cabled to Fig. 28, winding of relay TK(28) and to negative battery. Therefore tube VCK(39) will undergo a control-gap discharge and first and second transfers and relay TK(28) will be operated. Relay TK(28), in operating, locks through its No. 1 contact, conductor 2878, No. 2 contact of operated relay ONIA(28) and to ground, and in so doing, increases the current in tube VCK(39) to operate relay CK(39) which locks and extinguishes tube VCK(39) as hereinbefore explained.

Since relay TK0(39) is operated, relay CK(39), in operating, also interrupts, at its inner upper back contact, the only path over which ground is supplied to the upper winding of relay C0(28) and to the register-connector hold magnets, thereby releasing hold magnets HOLDA(20) and HOLDA(21). Relay C0(28) is locked on its lower winding as will be described immediately hereinafter, and therefore does not release at this time. When the register-connector crosspoints are opened upon the release of the register-connector hold magnets, relay L(37) is released and the register is restored to normal which causes the common release circuit to function to restore itself and the number group circuits to normal as hereinbefore described in detail, with the addition that the removal of main-anode battery also extinguishes tubes TGAI(49) and T0(6).

Relay TK(28), in operating, also applies ground through its No. 2 contact, conductor 2869, lower winding of relay C0(28) and to negative battery, thereby locking relay C0(28) operated. Relay TK(28), in operating, also opens the circuit for relay SR(28), but that relay is slow to release whereby time is provided for the trunk circuit to extend ground back to hold relay ONIA(28) and the several hold magnets operated as will be described immediately hereinafter. With both relay TK(28) and C0(28) operated, the calling subscriber's line is connected through to a supervisory relay in the trunk circuit. Thus, the calling subscriber's tip conductor 1817 and ring conductor 1818 are connected through the outer upper front and inner lower front contacts of relay C0(28) to conductors 2827 and 2828, respectively, through the No. 5 and No. 9 contacts of relay RF(28) to conductors 2829 and 2830, respectively, through the Nos. 4 and 11 contacts, respectively, of relay TK(28), through the Nos. 3 and 7 contacts, respectively, of relay RF(28) to conductors 2832 and 2833, respectively, through the operated crosspoint, assumed to be crosspoint 2413, of the tertiary switch to conductors 2418 and 2419, respectively, through operated crosspoint 1610 of the terminating secondary switch to conductors 927 and 928, respectively, through the operated crosspoint 801 of the primary switch to conductors 822 and 823, respectively, through the No. 1 and No. 4 contacts of relay NTI(6) to conductors 628 and 629, respectively, through the windings of repeat coil 630 to conductors 631 and 632, respectively, through the No. 2 and No. 5 contacts of relay IC(6) to conductors 633 and 634, respectively, and through the windings of relay A(6) to ground and battery, respectively. Since the calling subscriber's loop is closed, relay A(6) is operated.

Relay A(6), in operating, operates relay B(6) over a path from ground through its inner upper front contact, conductor 639, No. 2 contact of relay OC(6), conductor 640, winding of relay B(6) and to battery. Relay B(6), in operating, closes ground through its No. 4 contact, retard coil 641, and to conductor 621 to hold relay T0(23) operated over the previously traced path. The ground on conductor 621 is also extended through the No. 7 contact of relay NTI(6), conductor 821, outer left-hand front contact of operated relay LOI(8), and via the sleeve conductor through the primary, terminating-secondary and tertiary switches, through the junctor and through the originating-secondary and primary switches to hold relay ONIA(28) and the hold magnets of all of these switches operated. Relay B(6), in operating, also extends ground through its No. 1 contact to conductor 642 to lock relay OC(6) operated and to lock the class-of-service relay, here relay CN(6), operated. Relay B(6), in operating, also interrupts, at its No. 3 contact, the energizing path for relay CC(6) whereby relay CC(6) releases.

Relay A(6), in operating, also closes ground through its lower front contact to conductor 643 to operate relay AI(7). Prior to the operation of relay AI(7), the tip conductor 715 of the trunk to the master office is connected through repeat coil 630, upper back contact of relay AI(7), upper winding of relay TK(7) and to ground; and the ring conductor 716 of the trunk to the master office is connected through repeat coil 630, inner lower back contact of relay AI(7), lower winding of relay TK(7) and to negative battery. Upon the operation of relay AI(7), these polarities are reversed to signal the operator in any of a number of well-known manners, such as the use of a high-resistance polar relay at the master office or other annunciator system.

During the time the operator is being signaled, audible ringing induction is supplied to the calling subscriber to indicate that a signal is being transmitted. It will be noted that since relay TK9(39) was operated on this call, the ringing connector is not operated and the ringing circuit is not utilized on this type of call. However, the ringing interrupter was set into operation as above described by the grounding of the start lead 4409. Assuming that relay STI(34) operated, positive battery is connected through the No. 1 contact thereof, conductor 3402, resistor 3358, to the upper control anode of tube V9(33). Since the upper control cathode of that tube is connected to ground through resistor 3359, tube V9(33) undergoes a control-gap discharge which continues as long as the ringing interrupter continues to operate. The main cathode of that tube is connected to negative battery through resistor 3360 and the winding of relay RI(33). The two main anodes of tube V9(33) are connected through resistors 3361 and 3362 to conductors 3363 and 3364 which are connected to receive positive voltage from the interrupter circuits at the same time that voltage is applied to conductors 3334 and 3336. Thus, as shown in Fig. 50, positive battery is connected to the main anodes of tubes V9(33) during the fourth, fifth, sixth, and seventh half-second intervals of each ringing cycle, and during those intervals the conduction in tube V9(33) will transfer to operate relay RI(33) during that time. Therefore, for a two-second period during each ringing cycle, ringing voltage from alternator 3365 is connected through resistor 3366, front contact of relay RI(33), conductor 3367, No. 5 contact of operated relay T2(33), conductor 3368 which is cabled to the trunk circuits, as, in the assumed case, to trunk circuit No. 0, No. 6 contact of relay OC(6), capacitor 644, conductor 645, No. 3 contact of relay TKI(7), and over conductor 717 to repeat coil 630 whereby audible ringing induction is transmitted over the calling subscriber's line.

When the operator answers, the resistance between the trunk tip and ring conductors is reduced and relay TK(7) is operated, which, in turn, operates relay TKI(7) over an obvious circuit. Relay TKI(7), in operating, interrupts the previously traced audible ringing induction path, and also completes a circuit from alternator 647, inner upper front contact of operated relay CN(6), conductor 649, front contact of relay CS(6), capacitor 651, No. 6 contact of relay TKI(7), and to the trunk ring conductor 716. It may be noted that had relay MR(6) been operated, alternator 648 would have been connected to the trunk ring conductor to give a tonal indication that a message-rate line was calling. Relay TKI(7), in operating, also interrupts the previously traced energizing path for slow-to-release relay CS(6), which releases after a short interval. Therefore, but a short spurt of tone is transmitted to the operator to indicate the class of service of the calling line. It may be noted that if the operator fails to recognize the tone she may cause the operation to be repeated by pulling down and replugging.

The operator communicates with the calling subscriber, and if that subscriber desires to make a toll call, places that call and charges the calling party by requesting that he deposit the requisite amount in the coin box, the deposit thereof being indicated to the operator audibly in the conventional fashion.

With relay OC(6) operated, relay B(6) is held operated under the control of both the operator and calling subscriber. The calling subscriber may therefore flash the operator, operating and releasing relays A(6) and AI(7), the latter relay reversing the polarity of the trunk to signal the operator. During the time that relay A(6) is released, relay B(6) is held operated by relay TK(7).

Since relay B(6) is held operated under the control of both the calling party and the operator, if the operator disconnects first only relays TK(7) and TKI(7) will be released until the calling subscriber disconnects. If the calling subscriber disconnects first only relays A(6) and AI(7) will be released, the remaining relays being released upon disconnection by the operator. Assuming the calling party first disconnects, relay A(6) is released to release relay AI(7) which reverses the polarity to give the operator a disconnect signal. When the operator then disconnects, relays TK(7), TKI(7) and B(6) are released. Relay B(6), in releasing, releases relays OC(6), CN(6) and ON(6), and removes ground from the sleeve lead to release all hold magnets and to release relay ONIA(28) which releases the junctor. Relay OC(6), in releasing, removes ground from the start lead 4409 thereby restoring the ringing interrupter to normal. Thus all circuits are restored to normal. If the operator disconnects first, relays TK(7) and TKI(7) are released. When the calling party then disconnects, relays A(6), AI(7), and B(6) are released which causes all circuits to restore to their normal idle condition as above described.

Call to intercept

In the event that a subscriber's designation is changed, it is frequently desirable to place his former number on intercept for a suitable period during which time a call to the former number will result in the calling party being connected to an operator whereby that party may be informed of the changed designation.

Let it be assumed that the number 369-x is to be placed on intercept. A plurality of intercept terminals appear at terminal strip 4952, and the intercept conductors extending from these terminals are connected, in groups of three, to the proper terminating electrodes of intercept tubes such as tubes INTA(48) and INTB(48). Since each of these tubes is effectively bilateral, each tube will provide for two numbers to be placed on intercept, and a suitable number of these tubes may be provided in accordance with the requirements of the office. The hundreds, tens and units conductors representing the number to be intercepted are cross-connected to the intercept terminals in Fig. 49. Thus, to intercept the number 369-x, the "3" hundreds conductor 4719 is cross-connected to conductor 4953 which extends through a resistor to the right-hand control anode of intercept tube INTA(48); the "6" tens conductor 4717 is cross-connected to conductor 4954 which extends through a resistor to the right-hand control cathode of tube INTA(48); and the "9" units conductor 4727 is cross-connected to conductor 4955 which extends to the right-hand main anode of tube INTA(48). The main cathode of tube INTA(48), as well as of the other intercept tubes, is connected via conductor 4801, winding of relay INT(46), conductor 605, to which the main cathode of trunk group tube TGAI(49) is also connected, and through a back contact of all of the trunk circuit ON relays associated with idle trunk circuits, and to negative battery as described in detail on the outgoing trunk call discussed immediately hereinbefore.

Thus if the designation 369-x is dialed, counted and stored in the register, the intercept tube INTA(48) is tested in a manner similar to that in which the trunk group tube TGAI(49) was tested. If all trunks in this trunk group are busy, no negative battery is connected to the main cathode of tube INTA(48), and a busy indication is transmitted to the calling subscriber as described on the preceding call. If one or more of the trunk circuits are idle, tube INTA(48) undergoes a second transfer to indicate that fact to the register and relay ID(40) therein is operated. Relay ID(40), in operating, causes relay MA(12) in the common release circuit to release, as hereinbefore described, thereby extending positive 135-volt battery via conductor 1215, through the winding of relay TGAI(49), conductor 4956, and to the center main anode of tube INTA(48). Tube INTA(48) therefore undergoes an additional transfer operating relay TGAI(49) which causes an idle trunk to an operator to be selected as hereinbefore described.

Tube INTA(48), in firing, also operates relay INT(46) which opens its back contacts to prevent the ringing connector select tubes from being fired and thereby prevents the functioning of the ringing circuit which is not utilized on a call to an operator. Relay INT(46), in operating, also connects ground through its front contacts to conductor 4624, No. 4 contact of relay NGCB(47), conductor 3659, winding of relay TK0(39) and to battery, whereby relay TK0(39) is operated and functions as on the last above-described call. The ground on conductor 4624 is also extended to the idle trunk selected, assumed to be trunk No. 0 (Fig. 6), through the No. 3 contact of the operated class cut-in relay CC(6), conductor 646, winding of the intercept class-of-service relay INT(6), and to battery. Relay INT(6) operates and subsequently locks to relay B(6). It may be noted that if the call has originated from a coin line or a message rate line or from another trunk, an additional class-of-service relay may also be operated as hereinbefore described.

The establishing of the connection to the operator then proceeds as described on the immediately preceding call, the subscriber is informed of the change of number, and is directed to hang up and replace the call, employing the new designation. The circuits are restored to normal upon disconnect as described above.

*Incoming trunk call from operator*

Let it be assumed that for service or other reasons the operator at the district master office (Fig. 7) desires to establish a connection to one of the subscribers, such as to the station designated 593-4 at the left of Fig. 10. When the operator seizes the trunk, a low resistance bridge is closed on the tip and ring conductors operating relay TK(7). Relay TK(7), in operating, operates relay TKI(7) and completes a path from ground through its upper front contact, conductor 721, No. 1 contact of relay OC(6), conductor 646, winding of relay B(6) and to battery whereby relay B(6) is operated. Relay B(6), in operating, applies ground through its No. 4 contact and through retardation coil 641 to the sleeve lead 621 as hereinbefore explained, and also completes a circuit from ground at the lower back contact of jack T(6), conductor 622, No. 2 contact of relay B(6), conductor 620, winding of relay ON(6) and to battery. Relay ON(6), in operating, makes the trunk circuit busy to outgoing calls as hereinbefore explained. Relay TKI(7), in operating, connects ground through its No. 1 contact and through the outer lower back contact of relay A1(7) and over conductor 722 to the alarm circuit to indicate a permanent signal on the trunk if relay A1(7) fails to be operated within the specified time as will be hereinafter explained. It may be noted that ground is also connected to the alarm circuit through the No. 2 contact of relay TKI(7) and via conductor 723 for a purpose to be described hereinafter. Relay TKI(7), in operating, also connects ground through its No. 5 contact, conductor 724, No. 3 contact of relay OC(6), conductor 659, outer upper back contact of relay INT(6), conductor 660, winding of relay IC(6) and to battery, thereby operating relay IC(6).

As noted in the previously discussed outgoing trunk call, the tip and ring conductors extending, when the connection is established, from the junctor to the trunk circuit appear in the trunk circuit as conductors 822 and 823. Normally, these conductors extend through the windings of the repeat coil 630 and through the windings of supervisory relay A(6). Upon the operation of the incoming call relay IC(6), however, a pulsing bridge is prepared whereby pulses may subsequently be transmitted to the local register under control of pulsing relay TK(7). Thus the tip conductor 822 is connected through the No. 1 contact of relay NTI(6), conductor 628, winding of repeat coil 630, conductor 631, No. 3 contact of operated relay IC(6), winding of relay C(6), conductor 661, lower front contact of pulsing relay TK(7), conductor 725, No. 4 contact of operated relay IC(6), conductor 632, winding of repeat coil 630, conductor 629, No. 4 contact of relay NTI(6) and to the ring conductor 823. Relay IC(6), in operating, also extends ground through its No. 1 contact to conductor 662 which is cabled to Fig. 8, through the outer left-hand back contact of unoperated hold magnet HOLDA(8), winding of relay LI(8) and to battery, thereby operating the line relay LI(8).

Upon the operation of relay LI(8), the system functions as hereinbefore described in detail to establish a connection from trunk circuit No. 0 through the primary and originating secondary switches to a junctor, assumed to be junctor IA(28), and through the register connector to a register, assumed to be the register shown in detail. However, since this is a call from an operator, when relay ON(37) in the register operates to operate relay CSC(4), as hereinbefore described, the center main anode of the trunk line tube LI(8) is connected via conductor 824, through the No. 10 contacts of operated relays CS(4) and CSC(4), conductor 426 which is cabled to Fig. 42, winding of relay OPR(42), conductor 4223, resistor 4202 and to positive 135-volt battery. Line tube LI(8) will therefore momentarily transfer and relay OPR(42) will be operated. Relay OPR(42) locks operated through its No. 5 contact, resistor 4203, conductor 4204 which extends to Fig. 37, No. 8 contact of relay ON(37) and to ground. This ground therefore also serves to extinguish the last-mentioned transfer in trunk line tube LI(8).

With the register seized, the tip and ring conductors, which are connected to a pulsing bridge in the trunk circuit as above described, are extended to the register where the tip conductor, appearing as conductor 2012, is connected to ground through winding 3717 of the repeat coil, and where the ring conductor, appearing as conductor 2011, is connected through winding 3718 of the repeat coil, through the lower winding of the register pulsing relay L(37) and to negative battery. Since this loop is closed through a front contact of operated relay TK(7), relays L(37) and C(6) will be operated. Relay C(6), in operating, extends ground through its upper front contact to lock relay IC(6) operated and extends ground through its lower front contact, conductor 646, winding of relay INT(6) and to battery, thereby operating relay INT(6). Relay INT(6) locks operated through its lower front contact, conductor 642, No. 1 contact of operated relay B(6), and to ground.

Dial tone is transmitted to the operator and she dials the desired number. Relay TK(7) follows the dial pulses, opening and closing the loop to the register. Relays TKI(7) and B(6) are slow to release and do not follow the dial pulses but remain operated. Relay C(6) may or may not follow the dial pulses, but in either case relay IC(6) remains operated since it is slow to release.

Since the loop circuit is being opened and closed in accordance with the received dial pulses, relay L(37) is operated and released similarly, the register functions to count and store the designation "593-4," the common release circuit functions and calls in the number group, and, in accordance with the registered number, tube LI(10) is selected and tested in accordance with the previously described busy-idle-vacant test.

If the called line tests busy, relays IB(40) and BY(40) operate to operate relay BYI(39). Relay BYI(39), in operating, operates relay BY(28) in the junctor which returns ground to operate relay RT(40). It may be noted that no revertive test is required on a call from an operator, and none is made since neither relay GL(42) nor relay FR(42) is operated. Relay RT(40), in operating, applies a rising positive potential to the right-hand control anode of tube VCK(39), which, after a suitable interval, undergoes a control gap discharge. The main anode of tube VCK(39) is connected to positive battery through the winding of relay CK(39), and, with relay OPR(42) operated, the main cathode of tube VCK(39) is connected to negative battery over a path including conductor 3934, No. 7 contact of relay RC(39), conductor 4206, No. 4 contact of operated relay OPR(42), conductor 3959, through the operated cross-points 2009 of the register connector, conductor 2015 which is cabled to Fig. 28, winding of relay TK(28) and to battery. Tube VCK(39) therefore undergoes first and second transfers and relays CK(39) and TK(28) are operated. Relay TK(28), in operating, locks relay C0(28) operated, and relay CK(39), in operating, interrupts the energizing paths for the register connector hold magnets which release and release the register connector as hereinbefore described. The register then returns to normal which causes the common release circuit to function to release the number group.

When the register is dismissed, the junctor is cut through releasing relays C(6) and IC(6) as will be described immediately hereinafter. An interrupted ground on conductor 3356 from the ringing interrupter, as hereinbefore described, is then connected through the No. 5 contact of relay BY(28), conductor 2879, No. 13 contact of relay TK(28), conductor 2828, inner lower front contact of operated relay C0(28) to the ring conductor which, with relay IC(6) released, extends through the lower winding of relay A(6) to negative battery. Relay A(6) therefore follows the interruptions of ground thereby operating relay AI(7) in accordance with the interruptions. Relay AI(7), in operating and releasing, reverses the tip and ring of the trunk to give a flashing busy signal to the operator. The operator then disconnects at which time the circuits restore to normal as hereinafter described.

If line tube LI(10) tests idle, relays IB(40) and ID(40) operate as previously described and the circuits function as a result thereof in the manner hereinbefore described including the establishment of a metallic connection to the called party's line. When the cross-points of the tertiary switch are closed, tube VCK(39) is fired which operates relay CK(39) and TK(28) over the above-traced path. Relay TK(28) locks to ground through a contact of relay ONIA(28) and locks relays C0(28) operated. Relay CK(39), in operating, closes the ringing connector hold magnet circuit and releases the register connector. The register connector, in releasing, interrupts the paths of the tip and ring conductors from the trunk circuit to relay L(37) in the register thereby releasing relays L(37) and C(6), the latter of which releases relay IC(6). The register restores to normal as hereinbefore described.

Relay TK(28), in operating, also releases relay SR(28) but relay ONIA(28) and the hold magnets are held operated by a ground on the sleeve lead from the trunk circuit as explained perviously. The ringing circuit and ringing interrupter function as hereinbefore described including the operation of relay RF(28) and the supplying of audible ringing induction through capacitors 2839 and 2841 to the calling party, in this case to the operator.

When the called subscriber answers, ringing is tripped, the ringing circuit, ringing interrupter and ringing connector are restored to normal, and relay RF(28) is released. Upon the release of relay RF(28), the called subscriber's tip and ring conductors are extended through the primary, terminating secondary and tertiary switches to the junctor where they appear as conductors 2832 and 2833, through the Nos. 3 and 7 contacts of relay RF(28), through the Nos. 4 and 11 contacts, respectively, of relay TK(28) to conductors 2829 and 2830, respectively, through the Nos. 5 and 9 contacts, respectively, of relay RF(28) to conductors 2827 and 2828, through the outer upper front and inner lower front contacts, respectively, of operated relay C0(28) to conductors 1817 and 1818, respectively, through the originating secondary and primary switches to the trunk circuit where they appear as conductors 822 and 823, through the Nos. 1 and 4 contacts of relay NT1(6) to conductors 628 and 629, respectively, through the windings of repeat coil 630 to conductors 631 and 632, respectively, through the Nos. 2 and 5 contacts of released relay IC(6) to conductors 633 and 634, respectively, and through the windings of supervisory relay A(6) to ground and battery, respectively. Thus the operator and the called party may communicate through the repeat coil 630.

On an incoming trunk call, since relay B(6) is held operated only under the control of relay TK(7), the release of the trunk is under the control of the operator only. If the called subscriber disconnects first, relay A(6) will be released which will release relay A1(7) to reverse the trunk to signal the operator. When the operator then disconnects, relay TK(7) is released to release relays TK1(7) and B(6). Relay B(6), in releasing, opens the sleeve to release all of the switches employed in this call and to release relay ON1A(28) thereby releasing the junctor. Relay ON(6) is released to restore the trunk circuit to normal. If the operator disconnects first, the release of the cross-bar switches causes relay A(6) to release which releases relay A1(7). The circuits are restored to normal and the called subscriber is placed in lock-out.

Incoming tandem call

The present system may be employed as a tandem switching point through which, for example, an operator at the district master office may contact a subscriber in another office. Desiring to do so, the operator establishes a connection to the junctor and register as on the preceding call. In order to obtain access to an outgoing trunk, she will then dial a single preselected digit, here assumed to be the digit "7." The circuits then function as on the previously described outgoing trunk call to zero operator except that instead of tube TK0(36) being fired, the rise in main cathode potential of the register counting tube R27(36) is applied via conductor 3641 to the left-hand control anode of tube TK7(39). Since suitable potentials are applied to the left-hand control cathode and main anode of tube TK7(39) as hereinbefore described, this tube will undergo a control gap discharge and a first transfer, and, since the main cathode thereof is connected to negative battery through the winding of relay TK7(39), this tube will also undergo a second transfer whereby relay TK7(39) will be operated. Relay TK7(39), in operating, connects ground through its upper front contact to conductor 3659 to operate relay TK0(39). The circuits thereafter function as described on the previous outgoing trunk call except that since the hundreds digit is recorded by conduction in tubes H27(38) and HA5(38), the rising main-cathode potential will be applied to the "7" hundreds conductor 4715 which is cross-connected in Fig. 49 to the left-hand control anodes of trunk group tubes TGA2(49) and TGB2(49). The idle-busy-vacant test is then performed on one of these tubes, assume tube TGA2(49), in a manner similar to that before described in detail. The trunks associated with this trunk group are represented in Fig. 19, and these trunks may, as before mentioned, appear in either line-link frame No. 0 or in line-link frame No. 2 or in other provided line-link frames. Thus, trunk No. 0 of this trunk group has been represented as appearing in line-link frame No. 2 and trunk No. 4 of this trunk group has been represented as appearing in line-link frame No. 0 in the line circuit including line tube L2(10). Trunk hunting proceeds as before described and one of the trunks, assume trunk No. 4(19), is selected. The operations thereafter proceed as described on the previous outgoing trunk call except that upon the operation of the class cut-in relay in the outgoing trunk No. 4(19) relay TDM therein is operated since the class-of-service relay OPR(42) is operated as in the incoming trunk call from operator described immediately hereinbefore.

As on the previously described incoming trunk call, when the junctor is cut through by the register, relay C(6) is released. However, before relay IC(6) can release, the tip and ring conductors will be connected through the winding of the A relay in the outgoing trunk No. 4(19) to ground and battery, respectively, and relay C(6) will immediately reoperate to hold relay IC(6) operated. Dial tone will then be received from the distant called office, and the operator may then dial a further number into the register in that distant office. When the called distant operator or called distant subscriber answers, relays TK and TK1 in the outgoing trunk No. 4(19) will be operated, and since relay TDM therein is operated, negative battery will be connected through the lower front contact of relay TK1 therein, through the inner upper front contact of relay INT therein, through the upper front contact of relay TDM therein, through the No. 4 contact of the outgoing call relay OC therein and to a lead which is extended through the cross-bar switches to the incoming trunk No. 0(6) where it appears as conductor 663, through the No. 3 contact of unoperated relay OC(6), conductor 664, and through the windings of marginal relay NT(6) and of relay S(6) to ground. Relay NT(6) will not operate on this condition but relay S(6) will be operated. Relay S(6), in operating, completes a circuit from ground through the upper back contact of relay NT(6), front contact of relay S(6), conductor 643, winding of relay A1(7) and to battery. Relay A1(7) thereby operates to reverse the incoming trunk to give answer supervision.

Both the incoming and the outgoing trunk circuits are held under the control of the originating operator. When that operator disconnects, relays TK(7), TK1(7), B(6) and ON(6) release. Relay TK(7), in releasing, interrupts, at its lower front contact, the loop over which relay C(6) and relay A(6) in the outgoing trunk are held operated and the outgoing trunk is released. Relay C(6), in releasing, releases relay IC(6), and relay B(6) in releasing, releases the cross-bar switches and the junctor as hereinbefore described in detail. Relay S(6) releases when the switches are released and releases relay A1(7) whereby the circuits are restored to normal.

Busy verification test

Let it be assumed that the subscriber at station 239-1 (Fig. 19) has attempted to contact the subscriber at station 236-2 (Fig. 11) a number of times and has received busy tone on each attempt, a condition which, to the subscriber, appears unreasonable. The subscriber at station 239-1 then calls zero operator as hereinbefore described, and reports the difficulty. Without disturbing this connection, the operator seizes another trunk, assumed to be trunk No. 0 shown in Figs. 6 and 7, and a connection is established to an idle junctor, assumed to be junctor IA(28) and to an idle register, assumed to be the register shown in detail, in the manner previously described for an incoming call from operator. The class-of-service relay OPR(42) is operated as described before. In order for the operator to verify a busy line condition, she must preface the listed number with a preassigned digit, here assumed to be the digit "6." Relays TK(7) and L(37) follow the pulses representing this digit and the register responds, as hereinbefore described, to count these pulses, with the result that counting chain tubes RI6(36) and RA5(36) are fired and relay RA5(36) is operated. When relay RAI(37) is operated during the inter-digital period, negative battery is connected through the upper front contact of relay PI(35) and to conductor 3506 whereby a negative potential is applied to the left-hand control cathodes of the hundreds storing tubes HI6(38) to HA5(38) as hereinbefore described. The counted hundreds digit "6" will thereby be stored in tubes HI6(38) and HA5(38) in the manner previously explained. This negative potential on conductor 3506 is also applied through the No. 11 contact of operated relay RA5(36), resistor 3655, conductor 3656, through the No. 8 contact of operated relay OPR(42), conductor 4225 and through resistor 4041 to ground whereby a negative potential is applied to the right-hand control cathode of tube NT(40). With tube RI6(36) conducting, the rise of main cathode potential thereof is applied via conductor 3640 and through resistor 4042 to the right-hand control anode of tube NT(40). Tube NT(40) will therefore undergo a control gap discharge and a first transfer since the main anode thereof is connected to a source of positive voltage as hereinbefore mentioned. Since the main cathode of tube NT(40) is connected to negative battery through the No. 1 contact of relay NTI(40) and through the winding of relay NT(40), that tube will undergo a second transfer and relay NT(40) will be operated. Relay NT(40) locks operated through the No. 1 contact of relay NTI(40) and through its outer upper front contact to ground on off-normal ground conductor 3913. Relay NT(40), in operating, completes a circuit from ground through the No. 2 contact of relay OPR(42), conductor 4226, inner lower front contact of relay NT(40), winding of relay NTI(40) and to battery. Relay NTI(40) operates and locks to ground on off-normal ground conductor 3913 through the No. 2 contact of relay ID(40), conductor 4043 and through its No. 4 contact. Relay NTI(40), in operating, also releases relay NT(40), but that relay is slow to release by virtue of the shunting network comprising resistor 4044 and capacitor 4045, and during the period that both relay NTI(40) and relay NT(40) are operated, the previously traced circuits over which positive main-anode battery is supplied via conductors 3746 and 4002 to the main anodes of all the register tubes shown in Figs. 35 to 40 are interrupted. Therefore, the counting and storing tubes and other tubes in the register are extinguished. When relay NT(40) fully releases, the path over which main-anode battery is supplied to the tubes is reestablished and the register is in the same condition as it was before any dial pulses were received except that relay NTI(40) is operated. It should be noted that the release time of tube NT(40) must be sufficiently long to allow the tubes to be extinguished, but must be sufficiently short so that the main-anode circuits are restored before the pulses representing the first digit of the called subscriber's number are received.

The operator then dials the designation "236-2," that number is counted and stored in the register, the common release circuit is operated, the number group is called in, and the busy-idle-vacant test is performed as on a normal call to a line. If the line has become idle before the verification call is made, the operation of relay ID(40) interrupts, at its No. 2 contact, the previously traced locking path for relay NTI(40), which releases, and the call is completed in the regular manner. The operator may then complete a connection between the calling and called subscriber through the district master office, or, preferably, will direct the calling subscriber to hang up and reinitiate the call, in that manner avoiding the use of two trunk circuits on an intraoffice call.

It will be assumed, however, that the called line is busy. Let it be assumed that the subscriber at the station designated 463-1 (Fig. 19) and the subscriber at station 236-2 (Fig. 11) are conversing, with the latter being the calling party. Let it be further assumed that, as a representative path, these parties are interconnected via the primary switch cross-point 1113, originating secondary switch cross-point 1823, through junctor 2B(29), through the tertiary switch cross-point 2701, through the terminating secondary switch cross-point 1901, and through the primary switch cross-point 1902. With junctor 2B(29) in use, relay SR2B(29) therein is operated and ground is extended through inductor 2936 and through the front contact of relay SR2B(29) to hold the above-mentioned cross-points operated, and this same ground is connected to the main cathode of line tube LI(11) whereby that tube will test busy as hereinbefore described.

When line tube LI(11) tests busy, relays BY(40) ant IB(40) are operated to operate relay BYI(39) which locks operated as hereinbefore described. Relay BYI(39), in operating, operates relay BY(28) in junctor IA(28) which starts the ringing interrupter and operates relay RT(40) as before described. Relay RT(40) locks operated and starts the charging of capacitor 4036, but it may be noted, this rising potential is not applied to the right-hand control anode of tube VCK(39) at this time since the circuit therebetween is interrupted at the No. 7 contact of operated relay NTI(40).

Assuming that the busy verification circuit of Fig. 30 is idle, upon the operation of relay BYI(39) a circuit is completed from ground through the No. 3 contact of relay NTI(40), conductor 4047, No. 1 contact of relay BYI(39), conductor 3961 which is cabled to Fig. 30, No. 5 contact of relay VSI(30), outer lower back contact of relay EC(30), upper winding of relay C(30) and to battery whereby relay C(30) is operated. Relay C(30), in operating, connects positive battery through the winding of relay ST(30), through the outer upper front contact of relay C(30), conductor 3001 and to the middle main anodes of the VF tubes in each of the junctors. Thus, the positive potential on conductor 3001 is connected to the middle main anode of tube VF2B(29) as well as to the corresponding VF tubes in the other junctors. Relay C(30), in operating, also connects capacitor 3002, which is positively charged through high resistance 3003, through low resistance 3004, through its lower front contact, through conductor 3005 which is cabled to Fig. 39, through the No. 6 contact of relay NTI(40), through the inner upper back contact of relay NTK(40), conductor 4039, No. 8 contact of operated relay RT(40) and to conductor 4015. Thus, while positive battery is normally supplied to the right-hand main or units anode of the tested line tube over a path including resistor 4012, winding of relay IB(40), resistor 4014 and conductor 4015, in the busy verification test a high voltage pulse is applied directly to conductor 4015, over the proper units conductor, through the number group and to the right-hand main anode of the tested line tube, in this case line tube LI(11). Increased conduction will therefore exist between the right-hand main anode and the right-hand control cathode of line tube LI(11), the increased potential drop across resistor 1101 will raise the potential of the right-hand control cathode of that tube to a potential positive relative to that of the main cathode, and tube LI(11) will momentarily undergo a second transfer whereby conduction will exist therein across the main gap. This conduction will raise the potential at the main cathode of tube LI(11), and this pulse will be transmitted through the primary and secondary switches, through the front contact of relay SR2B(29) and to ground through the network comprising capacitor 2937 and inductor 2936 whereby a positive pulse will be applied to the left-hand control anode of tube VF2B(29) in junctor 2B(29) with which the called line is associated. It will be recognized that this pulse is applied in a manner similar to that in which the positive pulse was applied during the revertive test. Since the left-hand control cathode and the main cathode of tube VF2B(29) are both supplied with negative battery, at the receipt of the pulse at the left-hand control anode thereof, tube VF2B(29) will undergo a control gap discharge and first and second transfers whereby relay ST(30) will be operated. It may be noted that the rise in main-cathode potential of tube VF2B(29) is applied via conductor 2938, through a back contact of unoperated relay BY2B(29), conductor 2939 which is cabled to Fig. 30, and to terminal No. 42 in switch bank VS2(30) of the selector switch. It may also be noted that the main cathode of the VF tube in junctor 2A(29) is connected to terminal No. 23 in switch bank VS2(30), that the main cathode of tube VF1B(29) is connected to terminal No. 20 of selector switch bank VS1(30), and that the main cathode of tube VF(28) in junctor 1A(28) is connected to terminal No. 1 of selector switch bank VS1(30). The main cathodes of the VF tubes in additional junctors may be similarly connected to other terminals on these switch banks.

Relay ST(30), in operating, completes a locking path for relay C(30) from negative battery, lower winding of relay C(30), No. 5 contact of relay ST(30), conductor 3006, No. 2 contact of relay VS1(30) and to ground. Relay ST(30), in operating, also completes a circuit from ground through the inner upper front contact of relay C(30), No. 4 contact of relay ST(30), No. 6 contact of relay VS1(30), conductor 3007 which is cabled to Fig. 39, No. 2 contact of operated relay NTI(40), winding of relay NTK(40) and to battery whereby relay NTK(40) is operated. Relay NTK(40), in operating, completes a circuit from positive 135-volt battery through its lower front contact, conductor 4209, No. 5 contact of relay BY1(39), conductor 3946, through the operated cross-point 2009 of the register connector, conductor 2876 which is cabled to Fig. 28 and thence to Fig. 18, through the operated originating secondary switch cross-point 1814 to conductor 1825, through the primary switch operated cross-point 801 to conductor 663 which is cabled to Fig. 6, No. 3 contact of relay OC(6), conductor 664, and through the windings of relays NT(6) and S(6) to ground. Since a positive 135-volt potential is supplied over this circuit, both relay S(6) and marginal relay NT(6) will operate. Relay NT(6), in operating, applies ground through its upper front contact to conductor 665, winding of relay NTI(6) and to battery. Relay NTI(6) operates and locks to ground through its No. 5 contact and through the No. 1 contact of relay B(6).

It will be recalled that prior to the operation of relay NTI(6), the trunk tip conductor 628 was extended through the No. 1 contact of relay NTI(6) and through the primary switches to the junctor and register, the trunk ring conductor 629 was extended through the No. 4 contact of relay NTI(6) to the junctor and register, and the sleeve conductor 621 was also extended through the No. 7 contact of relay NTI(6) and to the junctor. Upon the operation of relay NTI(6), the trunk tip conductor 628 is extended through the No. 2 contact of relay NTI(6) to conductor 666, the trunk ring conductor 629 is extended through its No. 3 contact to conductor 667, and the trunk sleeve conductor 621 is extended through its No. 6 contact to conductor 668, and these three conductors are cabled to Fig. 30. Therefore, upon the operation of relay NTI(6) the previously established path through the winding of relays C(6) and L(37) is interrupted and these relays will release, the release of relay C(6) releasing relay IC(6).

In the meantime, relay NTK(40), in operating, has also reestablished, through its outer upper front contact, the path from capacitor 4036 to the right-hand control anode of tube VCK(39). Since relay RT(40) was previously operated, capacitor 4036 will have become completely or very nearly charged, tube VCK(39) will fire and relays TK(28) and CK(39) will be operated as hereinbefore described. Relay TK(28), in operating, locks relays BY(28) and CO(28) operated, and interrupts the operating circuit for relay SR(28) which starts to release.

With relay L(37) released, slow-to-release relay SR(37) will start to release, and upon the operation of relay CK(39) which removes capacitor 3909 from the winding of relay SR(37), relay SR(37) will immediately release. Relay CK(39), in operating, also extinguishes tube VCK(39), releases relay DC1(39), and interrupts the ground through the upper winding of relay CO(28) and through the register connector hold magnets whereby the register connector is restored to normal. Relays SR(37), ON(37) and ON1(39) release in cascade restoring the register circuit to normal, and signaling the common release circuit to restore the line tubes and to restore the common release circuit and the number group circuit to normal as hereinbefore described.

When relay SR(28) in the junctor releases, ground is removed from the sleeve conductor thereby releasing the originating secondary and primary switches in the path from the junctor to the trunk circuit and also releasing relay ON1A(28). Relay ON1A(28), in releasing, releases relay TK(28) which releases relay C0(28) thereby restoring the junctor 1A(28) to normal. Thus, the circuits utilized in the incoming call from the zero operator are now released, and the line from the trunk circuit is extended to the busy verification circuit of Fig. 30 whereby it may be extended through the busy verification circuit to the junctor associated with the called line to establish a monitoring connection as will be described immediately hereinafter.

Returning now to a consideration of the busy verification circuit of Fig. 30, when relay ST(30) is operated as a result of the initiation of conduction through the VF tube of any one of the junctors, ground is connected through the No. 1 contact of relay ST(30), conductor 3008, No. 3 contact of relay VS(30), conductor 3009, back contact of relay JH(30), and through the back contact and winding of stepping magnet STP(30). Since the energizing path for this stepping magnet is through its own back contact, the brushes of the selector switch will be progressively stepped around the arcs of their individual banks in the normal manner. It may be noted that the brushes associated with selector banks VR1(30), VT1(30) and VS1(30) are staggered 180 degrees relative to the brushes associated with banks VR2(30), VT2(30) and VS2(30) so that the entire array of terminals will be searched in one complete rotation. Employing a conventional selector switch as shown, the tip, ring and sleeve conductors of lines associated with twenty junctors may be associated with banks VR1(30), VT1(30) and VS1(30), and lines associated with another twenty junctors may be associated with the terminals of banks VR2(30), VT2(30) and VS2(30). The capacity may be expanded in an obvious manner if desired.

As the stepping magnet is operated, the brushes travel over the terminals in, as shown, a counter-clockwise direction whereby the terminals are searched sequentially. The brushes associated with the sleeve banks VS1(30) and VS2(30) actually perform the searching, seeking that terminal to which a positive potential is applied from the main cathode of that one of the junctor VF tubes which is conducting. If the brush at bank VS1(30) contacts the terminal to which the sought potential is applied, that potential is extended through the brush, conductor 3010, outer lower back contact of relay HC1(30), conductor 3011, through the No. 1 contact of relay VS1(30) and through the No. 4 contact of relay VS(30) in parallel, conductor 3012, winding of marginal relay JH(30) and to negative battery. Relay JH(30) is fast operating and will operate on the application of this potential. Relay JH(30), in operating, interrupts the energizing path for the stepping magnet STP(30) whereby the selector switch ceases its traverse of the terminals. However, as here assumed, the main cathode of the called party's junctor is not associated with any of the terminals 1 to 20, and therefore under that assumption, the sought terminal will not be found on bank VS1(30).

When the brush associated with bank VS1(30) contacts its terminal No. 22 a circuit is completed from ground through the outer upper back contact of relay EC(30), conductor 3016, winding of polarized relay HC(30), resistor 3017, conductor 3018, No. 22 terminal and brush of bank VS1(30) and over the previously traced path through the winding of relay JH(30) to negative battery. Relay HC(30) is operated, but relay JH(30) does not operate since it is marginal and the circuit therefor at this time includes the winding of relay HC(30) and resistor 3017. Relay HC(30), in operating, locks through its lower left-hand (front) contact and armature to negative battery and completes a circuit from negative battery, through its armature and upper left-hand (front) contact, winding of relay HC1(30) and to ground whereby relay HC1(30) is operated. Relay HC1(30), in operating, transfers the lead from the winding of relay JH(30) through its outer lower front contact to the brush associated with bank VS2(30).

The stepping therefore continues until the brush contacts the No. 42 terminal of selector bank VS2(30) which has a positive potential applied to it from junctor 2B(29) as hereinbefore described. This potential is therefore extended through the brush, through the outer lower front contact of relay HC1(30) and over the previously traced path to operate relay JH(30).

Relay JH(30), in operating, completes a circuit from ground through the No. 1 contact of relay ST(30), conductor 3008, No. 3 contact of relay VS(30), conductor 3009, front contact of relay JH(30), conductor 3019, No. 3 contact of relay ST(30), conductor 3020, winding of relay VS(30) and to battery. Relay VS(30) operates and locks through its No. 2 contact to the sleeve conductor 668 which extends to ground in the trunk circuit as hereinbefore described. Relay VS(30), in operating, closes ground through its No. 5 contact to operate relay VS1(30) which locks to ground through its No. 4 contact and the inner upper back contact of relay EC(30). Relay VS(30), in operating, also connects the tip conductor 666 from the trunk circuit through capacitor 3021, No. 1 contact of relay VS(30), conductor 3022 and to the brushes of banks VT1(30) and VT2(30). Since the sought terminal has been found to be terminal No. 42, the brushes of banks VT2(30) and VR2(30) are also on this terminal. Therefore the tip conductor is extended through the No. 42 terminal of bank VT2(30), to conductor 3023 which is connected, in junctor 2B(29), to the tip conductor of the line over which subscribers at stations 236-2 and 463-1 are conversing, as hereinbefore assumed. Relay VS(30), in operating, connects the ring conductor 667 from the trunk circuit through capacitor 3024, No. 6 contact of relay VS(30), conductor 3025, brush and No. 42 terminal of bank VR2(30), and to conductor 3026 which is connected in junctor 2B(29) to the ring conductor of the busy line. Thus a monitoring connection is established.

Relay VS1(30), in operating, acts as an off-normal relay to prevent the seizure of the busy verification circuit by another register, interrupts the energizing circuit to release relay JH(30), and interrupts the locking circuit to release relay C(30). Relay C(30), in releasing, releases relay ST(30) and extinguishes the VF tube in the busy junctor, here tube VF2B(29). The operator may thus monitor the conversation, and report to the subscriber who requested the busy verification test that the party he desires to call is presently engaged in conversation. The circuits remain in the above-described condition until the operator disconnects.

If for any reason the switch should fail to find a terminal marked or for any reason not stop on a junctor terminal, the switch will continue to step until the brush associated with bank VS2(30) contacts its No. 43 terminal, i. e., until the switch restores to its normal condition as shown. At this time a circuit is established from ground through the middle lower front contact of relay HCI(30) to operate relay JH(30) which operates relay VS(30) as though the switch had stopped on a junctor terminal. Relay VS(30) locks to the incoming trunk and operates relay VSI(30). Relay VSI(30), in operating, releases relay C(30) which releases relay ST(30) as before. Relay VS(30), in operating, also completes a circuit from the ringing circuit which is generating a busy tone signal and applying it to conductor 3357, upper front contact of relay HCI(30), capacitor 3029, conductor 3030, No. 43 terminal and brush of bank VR2(30), conductor 3025, No. 6 contact of relay VS(30), capacitor 3024, and the ring conductor 667 which extends to the trunk circuit as hereinbefore described. An indication is thereby given the operator that the connection has not been established, and she will disconnect and reattempt to establish the monitoring circuit.

When the operator disconnects, either after having monitored the call or after receiving the above-described busy signal, relay TK(7) releases which releases relay TKI(7) and relay B(6). Relay TKI(7), in releasing, releases relay IC(6). Relay B(6), in releasing, releases relay ON(6) and interrupts the locking circuit for relay NTI(6) which releases. Relay B(6), in releasing, also removes ground from the trunk circuit sleeve conductor 668 which releases relay VS(30) in the busy verification circuit.

If the monitoring connection was successfully established, the release of relay VS(30) completes a path from ground through the No. 3 contacts of relays VSI(30) and VS(30), conductor 3009, back contact of relay JH(30) and to the stepping magnet whereby the selector switch will be stepped to its normal position, as shown, and relay JH(30) will be operated to stop the switch as before described.

With the stepping switch restored to normal as described in the last paragraph or under the previously described failure to find the marked terminal, and with relay VS(30) released and relay JH(30) operated, a circuit is completed from ground through the No. 3 contact of relay VSI(30), No. 3 contact of relay VS(30), conductor 3009, front contact of relay JH(30), conductor 3019, No. 2 contact of unoperated relay ST(30), No. 7 contact of operated relay VSI(30), winding of relay EC(30) and to battery. Relay EC(30) operates and locks through its inner lower front contact, conductor 3031, inner lower front contact of relay HCI(30) and to ground. Relay EC(30), in operating, releases relays HC(30) and VSI(30). Relay HC(30), in releasing, releases relay HCI(30) which, in turn, releases relay EC(30) to restore the busy verification circuit to normal.

The connection between the complaining subscriber and zero operator is released when these parties disconnect as was described in detail in regard to the outgoing call to zero operator.

*Call from post-payment coin station*

Let it be assumed that a party desires to place a call from the post-payment coin station designated 518-8 (Fig. 7) to the subscriber's station designated 239-1 which appears in line-link frame No. 2 (Fig. 19). When receiver 701 is removed from its hook 702, the contacts 703 are closed and the circuits function to establish a connection to the junctor, assumed to be junctor IA(28) and to a register, assumed to be the register shown in detail, as hereinbefore described. Class-of-service relays CL3(42) and CN(42) are operated and locked operated as was described in the outgoing trunk call to zero operator which was assumed to have been placed from this post-payment coin station. The called number 239-1 is then dialed, the line is tested, the connection is established, and the called party is signaled as hereinbefore described in detail. When the called subscriber answers, ringing is tripped, the called subscriber's line is connected through the windings of relay CS(28) operating that relay, and, after a suitable short interval, relay DL(28) is operated and locked operated as hereinbefore mentioned in regard to the first-described call.

Relay DL(28), in operating, completes a path from negative battery through resistor 2874, No. 9 contact of relay BY(28), conductor 2875, No. 8 contact of relay DL(28), conductor 2876 which is cabled to Fig. 18, operated cross-point 1814 of the originating secondary switch, conductor 1825 which extends to Fig. 9, operated cross-point 941 of the primary switch, conductor 942, winding of relay A(7) in the auxiliary line circuit for the post-payment coin station, and to ground, whereby relay A(7) is operated. Relay A(7), in operating, completes a path from negative battery, back contact of relay E(7), conductor 726, front contact of relay A(7), conductor 727, No. 10 contact of relay D(7), conductor 728, winding of relay F(7) and to ground, whereby relay F(7) is operated. Relay F(7), in operating, closes ground through its front contact to conductor 732 and through the winding of relay B(7) to battery and through the No. 1 contact of relay D(7), winding of relay C(7) and to battery whereby relays B(7) and C(7) are operated. Relay B(7), in operating, closes a holding bridge across the tip and ring conductors comprising a path from tip conductor 707, No. 1 contact of relay L(7), No. 3 contact of relay B(7), resistor 733 and to the ring conductor 937. Relay B(7), in operating, also completes a circuit from negative battery, back contact of relay E(7), conductor 726, front contact of relay A(7), conductor 727, No. 4 contact of relay B(7), conductor 734, winding of relay D(7) and to ground. Relay D(7) operates and locks over a path including its No. 5 contact, conductor 727, front contact of relay A(7), conductor 726, back contact of relay E(7) and to battery.

Prior to the operation of relay D(7), it will be recalled, the calling and called subscribers were interconnected. Upon the operation of relay D(7), this connection is broken. The circuits to the called subscriber are maintained by virtue of the previously described bridge including resistor 733. The calling subscriber's tip conductor 706 is extended through the No. 3 contact of operated relay D(7) and to negative battery through the winding of relay C(7). The calling subscriber's ring conductor 704 is extended through the No. 9 contact of relay D(7), conductor 728 and to ground through the winding of relay F(7) and also through the No. 4 contact of relay D(7), capacitor 735 and to the tone generator 736 whereby a tone is transmitted to the calling party as an indication that a coin should be deposited.

When the subscriber deposits a coin, means are provided momentarily to increase the resistance of the subscriber's loop. This may be accomplished in any well-known manner, and is represented in Fig. 7 as being accomplished by a system in which the falling coin strikes a lever arm 738 which momentarily breaks the normally closed contacts 705 whereby the loop is closed only through resistor 737. Under this condition, relay F(7) remains operated, but relay C(7), being marginal, releases. Relay C(7), in releasing completes a circuit from negative battery, No. 6 contact of relay D(7), conductor 739, back contact of relay C(7), conductor 740, No. 2 contact of relay B(7), winding of relay E(7), conductor 741, through the operated crosspoints 941 of the primary switch to the sleeve lead 922 and to ground in the junctor. Relay E(7) thereby operates and is locked operated over a path from negative battery through its front contact and winding, conductor 741 and to ground on the sleeve lead as in the operating path. Relay E(7), in operating, removes battery from conductor 729 thereby releasing relays F(7) and D(7). Relay F(7), in releasing, releases relay B(7) which removes the line bridge comprising resistor 733. Relay D(7), in releasing, removes the tone from the calling subscriber's line and reestablishes the connection between the calling and called subscriber's line whereby the transmission path is restored to its original condition and the subscribers may communicate with each other.

Upon disconnection at the termination of the conversation, the circuits are restored to normal as hereinbefore described with the additions that upon the removal of ground from conductor 741 relay E(7) releases and upon the removal of battery from conductor 942 relay A(7) releases and the auxiliary line circuit for this post-payment coin station is restored to normal.

Provision is made to prevent a switchhook "fumble" or an opening of the line in any other fashion from being the equivalent of the insertion of a coin. If, at the time the coin is to be deposited, the line is momentarily opened, both relays F(7) and C(7) will release instead of only marginal relay C(7) as above described. Relay F(7), in releasing, releases relay B(7), which, in releasing, completes a circuit from negative battery, No. 6 contact of relay D(7), conductor 739, back contact of relay C(7), conductor 740, No. 1 contact of released relay B(7), winding of relay L(7) and to ground on sleeve conductor 741. Relay L(7) operates and locks operated over a path from negative battery through its No. 2 contact and winding to ground on sleeve conductor 741. It may be noted that during the transient period between the release of relay C(7) and the release of relay B(7), an operating path is momentarily completed for relay E(7), but this relay is slow to operate and is not operated during this interval. The release of relay B(7) interrupts this energizing path.

Relay L(7), in operating, connects negative battery through its No. 3 contact, conductor 734, winding of relay D(7) and to ground to hold relay D(7) operated. Relay L(7), in operating, also interrupts, at its No. 1 contact, the circuit by means of which resistor 733 was bridged across the line. The line is thereby opened releasing relay S(28) whereby the junctor and the line switches are released and restored to normal. The release of these connections removes battery from conductor 942 releasing relay A(7) and removes sleeve ground from conductor 741 releasing relay L(7) thus restoring this auxiliary line circuit to normal. If the calling subscriber desires to reestablish the connection, he must disconnect and then reinitiate the call.

Restricted service

Let it be assumed that the party at the station designated 236-2 (Fig. 11) desires to communicate with a subscriber who may be reached through one of the trunk circuits of Fig. 19. Such a call may be placed by dialing the trunk group digit, as, in this case, the digit "7," and, after the connection is established to the distant office and dial tone again received emanating from that office, dialing the called subscriber's number. However, the party at the station designated 236-2 has subscribed to a class of service known as "message rate restricted," i. e., he is charged in accordance with the number of calls made and is restricted as to what calls he may make. It will be assumed that the restrictions imposed on the calling subscriber's service do not permit the placing of a call through the trunks in the "7" trunk group.

When the calling subscriber lifts his receiver a connection is established to a junctor, assumed to be junctor IA(28) and to a register, assumed to be the register shown in detail, as in a normal call except that the class-of-service relays CL2(42) and IMR(42) are operated and locked operated in a manner similar to that described in detail hereinbefore. The digit "7" is then dialed and the circuits function as on the previously described incoming tandem call, with tube TK7(39) being rendered conductive to operate relay TK7(39). Relay TK7(39) in operating, operates relay TK8(39) as before described, and, in addition, completes a circuit from ground through the No. 3 contact of the operated class-of-service relay CL2(42), conductor 4228 which is cross-connected to conductor 4229 which is cabled to Fig. 39, lower front contact of relay TK7(39), conductor 3963, winding of relay RS(39) and to battery thereby operating restricted service relay RS(39). It will be noted that a plurality of conductors extend from a plurality of contacts of each of the CL-(42) class-of-service relays and these conductors may be cross-connected as desired to the conductors extending through the lower front contacts of the trunk group relays TK7(39), TK9(39) or of other similar relays which may be provided for other trunk groups. Thus, any subscriber's service may be restricted so that calls may not be placed through trunk group "7" by cross-connections in Fig. 42 to conductor 4229 and so that calls may not be placed through trunk group "9" by cross-connecting one of the conductors from that subscriber's CL-(42) relay to conductor 4230, and, in either case, relay RS(39) will be operated. It will be noted that since none of the grounded conductors from the class-of-service relay CL2(42) are cross-connected to conductor 4230, the present subscriber 236-2 may call a party reached through trunk group "9" without restriction.

Relay RS(39), in operating, interrupts the previously traced circuits by means of which relay OT(12) or OT(13) was operated and by means of which a potential was applied to the right-hand control anode of the lock-out tube LOI(13) so that the common release circuit will not be called in to cause a seizure of the number group circuit. Relay RS(39), in operating, also closes ground through its outer upper front contact to conductor 3941 to operate relay BYI(39) which locks operated. The apparatus now operates the same as on any call to a trunk with all trunks within that trunk group busy, as was described in detail in regard to the outgoing trunk call to zero operator. Thus, relay BYI(39) operates relay BY(28) which causes the operation of relay RT(40). A revertive test is not made since the revertive test lead is open at the No. 3 contact of operated relay TK9(39) as before described. Relay RT(40), in operating, fires tube VCK(39) which operates relay CK(39). Relay CK(39), in operating, locks operated, extinguishes tube VCK(39), and releases relay CO(28) and the register connector hold magnets. Therefore, the register connector and the register will be restored to normal, busy tone will be transmitted to the calling subscriber, and, upon the replacing of the calling subscriber's receiver upon its hook, the connection will be broken down and the circuits restored to normal as hereinbefore described.

*Time-out and miscellaneous circuits*

LINE-LINK TIME-OUT

If the subscriber's line is not connected to a register or if a register is unable to complete the connection so that the control circuits are released within a predetermined time, line-link time-out occurs. It will be recalled that each time a line and line-link circuit operates to commence setting up an originating or terminating call, the relay LS associated with the utilized horizontal group is operated, and when the function is completed, relay LS is released. While this relay is operated, positive 135-volt battery is connected to a line-link time-out circuit in the common release and time-out circuits. Thus, assuming relay LS(4) has been operated, positive 135-volt battery is connected through the front contact of that relay, resistor 410, conductor 427, and to ground through resistor 1427 and through resistor 1428 and capacitor 1429 whereby capacitor 1429 commences to charge. It may be noted that a charging potential is applied to capacitor 1429 at any time that an LS relay is operated in any of the line-link frames. The rising potential on capacitor 1429 is applied through resistor 1430 to the left-hand control anode of tube T0(14), the left-hand control cathode of which is connected to ground through resistor 1431. If the call is completed within the given time interval, relay LS will release to remove the charging potential from capacitor 1429 and that capacitor will discharge through varistor 1432 and resistor 1427. However, if the call is not completed within the predetermined time, tube T0(14) will undergo a control gap discharge. Since the main anode of tube T0(14) is connected to a source of suitable positive potential through resistor 1433 and via conductor 1230, and since the main cathode of tube T0(14) is connected to negative battery through the winding of relay R(14), tube T0(14) will undergo first and second transfers and relay R(14) will be operated. Relay R(14), in operating, connects ground through its outer right-hand front contact and through low resistance element 1434 to discharge capacitor 1429. Relay R(14), in operating, also applies ground through its inner right-hand front contact, conductor 1435 and to the right-hand electrode of capacitor 1436 whereby gas diode FT(14) is fired in the same manner and with the same result as tube RRI(14) as previously described. Thus, assuming relays C(12) and CI(12) are operated, tube RL(12) is discharged momentarily to operate relay RLS(12) which removes battery from the line and line-link circuits to release those circuits and also removes battery from the main anode of tube T0(14) to extinguish that tube. After a suitable interval, relay RLS(12) releases, restoring the voltages, and thereby permitting the line and line-link circuits to handle the same or another call.

REGISTER TIME-OUT

As described in detail in reference to the first-described call, register time-out is initiated when relay ONI(39) operates and at the end of each digit, whereby if dialing does not commence, if dialing is not completed, or if only a series of preliminary digits "1" are dialed, register time-out will occur. In each of these cases, time-out is initiated by the applying of a rising voltage to one of the control anodes of tube TM(41), and, after a suitable interval controlled by the time constants of the networks associated with these control anodes, tube TM(41) will undergo a control gap discharge and first and second transfers whereby relay TM(41) is operated.

Relay TM(41), in operating, completes a circuit from ground on off-normal ground conductor 3913, outer left-hand back contact of relay NGT(41), No. 4 contact of operated relay TM(41), conductor 4130, inner lower back contact of relay DCI(39), winding of relay PS(39) and to battery. Relay PS(39), in operating, interrupts, at its outer upper back contact, one of the paths over which ground is supplied to operate relay C0(28) and the register connector hold magnets as hereinbefore traced. Relay PS(39), in operating, also closes ground through its inner upper front contact, conductor 3944, through the operated cross-point 2102 of the register connector, conductor 2110 which is cabled to Fig. 28, winding of relay BY(28) and to battery. Relay BY(28) locks operated and returns ground to operate relay RT(40) as hereinbefore described. It may be noted that since the number group connector relays have not been operated, the revertive pulse will not be transmitted. Relay RT(40), in operating, completes a charging circuit for capacitor 4036 whereby a rising potential is applied to the right-hand control anode of tube VCK(39), and closes ground from off-normal ground conductor 3913 through its No. 4 contact, conductor 4048, lower front contact of operated relay PS(39), conductor 3965, through the operated cross-point 2102 of the register connector, conductor 2111 which is cabled to Fig. 28, lower winding of relay DL(28) and to battery. Relay DL(28) operates and locks from negative battery, through its lower winding, through its No. 7 contact, through its upper winding, and through the No. 4 contact of relay SR(28) to ground. Relay DL(28), in operating, completes a circuit from ground through the upper back contact of relay CS(28), conductor 2852, No. 3 contact of relay DL(28), conductor 2859, heating element 2860 of the thermal delay relay RLS(28) and to battery whereby element 2860 begins to heat.

In the meantime, the potential at the right-hand control anode of tube VCK(39) will have risen to a sufficient value to fire tube VCK(39) which will cause the operation of relay CK(39). Relay CK(39) locks operated, extinguishes tube VCK(39), and, since relay PS(39) is operated, interrupts, at its inner upper back contact, the only remaining path over which ground is supplied to the winding of relay CO(28) and to the register connector hold magnets HOLDA(20) and HOLDA(21) thereby releasing that relay and those hold magnets. The release of the register connector and the restoration thereof to normal releases the register which restores to normal as hereinbefore described in detail, with the addition that upon the release of relay TMA(41), tube TM(41) is extinguished releasing relay TM(41) which, in turn, releases relay PS(39).

After a suitable interval during which element 2860 is heating, relay RLS(28) will operate after which the junctor is released as hereinbefore described in detail in reference to the first-described call, i. e., relay RLS(28) operates relay RF(28) which releases relay SR(28). Relay SR(28), in releasing, releases relay DL(28) which allows relay RLS(28) to release, and removes ground from the sleeve lead to release the primary and secondary switches and to release relay ON1A(28) which restores the junctor to normal. The subscriber's line circuit is then placed on permanent signal lock-out, as will be described hereinafter.

Register time-out is also initiated, as mentioned in the discussion of the first-described call, when relay STI(37) is operated upon the seizure of the register. The operation of relay STI(37), it will be recalled, closed ground to conductor 3710 to operate relays TMA(41) and TMB(41) which created a charging circuit for capacitor 4104. If for any reason tip and ring fail to close, or if for any other reason relay STI(37) fails to release within the requisite interval, tube TM(41) will discharge operating relay TM(41). Relay TM(41), in operating, completes a path from ground through the outer upper front contact of relay STI(37), conductor 3786 which is cabled to Fig. 41, No. 5 contact of relay TM(41), conductor 3721 which is cabled to Fig. 37, resistor 3722, winding of relay SR(37) and to battery thereby operating relay SR(37). Relay SR(37), in operating, interrupts, at its No. 2 contact, the locking path for relay STI(37) and relay STI(37) releases. Relay STI(37), in releasing, releases relays TMA(41) and TMB(41). Relay TMA(41), in releasing, extinguishes tube TM(41) which releases relay TM(41). Relay STI(37), in releasing, also completes a path for the operation of relay ON1(39) as hereinbefore described. Relay ON1(39), in operating, completes a path from ground through the front contact of one of the operated class-of-service relays in Fig. 42 to the common release circuit to dismiss that circuit as was described in detail in the first-discussed call. Relay STI(37), in releasing, also interrupts, at its outer upper front contact, the previously traced energizing path for relay SR(37) releasing that relay, and relays ON(37) and ONI(39) are thereby released in the same fashion as on a normal disconnect, restoring the register to normal, releasing the register connector, and releasing the junctor which restores to normal as hereinbefore described.

NUMBER GROUP TIME-OUT

It will be recalled that when a register is in condition to terminate a call, the common release circuit is signaled, and the LO relay therein associated with the signaling register is operated in order that the number group may be seized. As previously indicated, when any of the LO relays (Fig. 13) operate, ground is connected through their No. 6 contacts, conductor 1316, back contact of relay TMB(15), upper winding of relay TMA(15) and to battery whereby relay TMA(15) is operated. Relay TMA(15), in operating, interrupts, at its upper back contact, the shunt around capacitor 1521 and connects negative battery to conductor 1525 whereby capacitor 1521 will commence to charge from positive battery, resistors 1522 and 1523 and to the negative potential on conductor 1525. The rising potential on capacitor 1521 is applied through resistor 1524 to the left-hand control anode of tube TM(15). The negative battery on conductor 1525 is also applied through the winding of relay TM(15) to the main cathode of tube TM(15) and through resistor 1526 to the left-hand control cathode of that tube. As previously described, when the number group connector relays NGCA(46) or NGCA(48) operate, ground is applied to conductor 4601. This ground is extended through the inner lower front contact of relay TMA(15), and through the lower winding to lock that relay operated. This ground is also extended through the inner lower front and outer lower front contacts of relay TMA(15), conductor 1501, winding of relay TMB(15) and to battery whereby relay TMB(15) is operated.

If the number group connector relays release within the requisite time, relays TMA(15) and TMB(15) are released, the shunt is restored to discharge capacitor 1521, and this time-out circuit restores to normal. If, however, the number group connector relays do not release within the required time, tube TM(15) will undergo a control gap discharge and first and second transfers and relay TM(15) will be operated.

Relay TM(15), in operating, connects ground through its outer front contact to conductor 1528. Assuming the register shown in detail is being utilized on the subject call, the ground on conductor 1528 is extended over a first path comprising conductor 1528, No. 22 contact of relay NGCA(46), conductor 4625, right-hand winding of relay NGT(41) and to battery, and over an additional path comprising conductor 1528, No. 8 contact of relay LOI(13), conductor 4625, right-hand winding of relay NGT(41) and to battery. Relay NGT(41) operates and locks operated over a path from negative battery, through its left-hand winding and inner left-hand front contact, and to ground on off-normal ground conductor 3913.

Since prior to the operation of relay NGT(41) relay TMA(41) is operated from ground on off-normal ground conductor 3813 and through the right-hand back contact of relay TMB(41), capacitor 4117 is being charged from positive battery, resistor 4120, back contact of unoperated relay NGT(41), conductor 4121, resistor 4122, through capacitor 4117 and to negative battery through the upper front contact of relay TMA(41). The time constant of this circuit is relatively large as hereinbefore mentioned. Upon the operation of relay NGT(41), resistor 4131 is substituted for resistor 4120 in this charging path. Resistor 4131 is preferably of a considerably lower value of resistance than resistor 4120, and therefore, upon the operation of relay NGT(41) capacitor 4117 is charged at a more rapid rate. Relay NGT(41), in operating, also interrupts the previously traced energizing path for relay DC1(39) and that relay is released. Relay NGT(41), in operating, also interrupts, at its middle left-hand contact, one of the previously traced paths over which ground is supplied to the winding of relay C0(28) and to the register connector hold magnets. When tube TM(41) is fired, relay TM(41) is operated. Relay TM(41), in operating, interrupts the other path over which ground is supplied to relay C0(28) and to the register connector hold magnets HOLDA(20) and HOLDA(21) and that relay and those hold magnets release.

The release and restoration to normal of the register connector releases the register which, with the exception of the circuits of Fig. 41, restores to normal as described in detail hereinbefore. Upon the release of relay TMA(41), tube TM(41) is extinguished, releasing relay TM(41).

In the meantime, relay TM(15), in operating, also connects ground through its inner front contact to the right-hand electrode of capacitor 1527 whereby gas diode NGT(15) is fired in the same manner and with similar results as was previously described in relation to gas diode RR1(14) and in relation to gas diode FT(14), that is, to operate relay RLS(12) to release the common release and line and line-link circuits. The operation of relay RLS(12) also extinguishes lock-out tube LO1(13) releasing relay LO1(13). Relay LO1(13), in releasing, releases relay NGCB(47) which releases relay NGCA(46) to release the number group circuit. The conjoint release of relays LO1(13), and NGCA(46) and ON1(39) releases relay NGT(41) so that the register is completely restored to normal. Relay NGCA(46), in releasing, also removes ground from conductor 4601 to release relays TMA(15) and TMB(15). Relay TMA(15), in releasing, closes a discharge path for capacitor 1521, and extinguishes tube TM(15) whereby relay TM(15) is released.

When the calling subscriber disconnects, the junctor and line switches release and restore to normal as hereinbefore described in detail.

COMMON-RELEASE TRANSFER CIRCUIT

As hereinbefore described, the timing circuit of Fig. 23 alternately connects ground to and removes ground from conductor 2307 at suitable intervals, viz., at four- to eight-minute intervals. It has been assumed hereinbefore that ground was not connected to conductor 2307 whereby the circuits at the upper portion of Fig. 13 are in the shown unoperated condition. It will be recalled that, as shown, relays C(12) and C1(12) were assumed to be operated from ground through the inner lower back contact of relay T(13). Under these conditions, upon the initiation of the originating or terminating phase of a call, negative battery is connected through the inner upper front contact of relay STC(12) or through the outer upper front contact of relay OT(12) to conductor 1243, winding of relay G1(13) and to ground whereby relay G1(13) is operated. Relay G1(13), in operating, removes ground at its inner upper back contact from the upper electrode of capacitor 1320, and connects positive 135-volt battery through resistor 1321, through its outer upper front contact, through conductor 1322 to the main anode of tube AL1(13) and through resistor 1323 to the upper electrode of capacitor 1320. Capacitor 1320 thereby commences to charge, applying a rising potential through resistor 1324 to the left-hand control anode of tube AL1(13). Relay G1(13), in operating, also completes a shunting path around the winding of relay T(13) which may be traced from the winding and inner upper back contact of relay T(13), lower front contact of relay G1(13), conductor 1325, No. 6 contact of relay AL1(13), conductor 2307, No. 6 contact of relay AL2(13), conductor 1326, through back contacts of switches SW1(13) and SW2(13), and back to the winding of relay T(13). This shunting path prevents relay T(13) from being operated if conductor 2307 is grounded at this time. When the call is completed, relay G1(13) is released, interrupting the charging path for capacitor 1320 and reestablishing the discharging path for that capacitor to ground through resistor 1327, and removing the shunt around the winding of relay T(13). If conductor 2307 is grounded while the circuits are in this condition, this ground is extended through the No. 6 contact of relay AL2(13), conductor 1326, through back contacts of switches SW1(13) and SW2(13), winding of relay T(13), resistor 1328 and to battery whereby T(13) is operated.

With relays C(12) and C1(12) operated, the two conductors 1438 and 1439, to which the windings of relay C(14) and C1(14) are connected in parallel, are interconnected through the No. 9 contact of relay C1(12) and through the No. 8 contact of relay C(12) so that relays C(14) and C1(14) are shunted. When relay T(13) operates, the energizing path for relays C(12) and C1(12) is interrupted, and when those relays release, the shunting path for relays C(14) and C1(14) is removed and those relays operate from ground through the inner lower front contact of relay T(13).

Prior to the operation of relay T(13), the right-hand electrodes of gas diodes TR1(13) and TR2(13) and the left-hand electrodes of capacitors 1329 and 1330 are connected to negative 48-volt battery through resistor 1331. Since the right-hand electrode of capacitor 1329 is connected to ground through the outer upper back contact of relay T(13), that capacitor is charged to approximately 48 volts negative; and since the right-hand electrode of capacitor 1330 is connected to positive 135-volt battery through resistor 1332, that capacitor is charged to approximately positive 180 volts. Upon the operation of relay T(13), the connections to the right-hand electrodes of these capacitors are effectively reversed whereby a pulse of approximately negative 180 bolts is applied to the right-hand electrodes of the gas diodes TR1(13) and TR2(13). The left-hand electrode of tube TR1(13) is connected via conductor 1235 to ground through resistor 1234, and the left-hand electrode of tube TR2(13) is connected via conductor 1440 to ground through resistor 1441. Therefore, both gas diodes TR1(13) and TR2(13) will be fired and the potentials at the right-hand control cathodes of tubes RL(12) and RL(14) will be reduced whereby both of those tubes will fire in the manner hereinbefore described in detail. Tubes RL(12) and RL(14), in discharging, momentarily operate relays RLS(12) and RLS(14) as hereinbefore described to remove the positive 135-volt, positive 100-volt, and positive 50-volt batteries (shown in Figs. 12 and 14) from the contacts of relays C(12) and C1(12) and C(14) and C1(14) while the former relays release and the latter relays operate. As soon as relay RLS(14) releases, the office is ready to handle a call using that portion of the common release circuit shown in Fig. 14 rather than the equivalent portion represented in Fig. 12.

When relay STC(14) or relay OT(14) is operated on a call while the circuits are in this transferred condition, relay G2(13) is operated which completes a circuit from ground through the outer lower front contact of relay T(13), lower front contact of relay G2(13), conductor 2307, No. 6 contact of relay AL2(13), conductor 1326, back contacts of switches SW1(13) and SW2(13), winding of relay T(13) and to battery, thus locking relay T(13) operated so that it cannot release if the timing circuit of Fig. 23 removes ground from conductor 2307 at this time. Relay G2(13), in operating, also applies main anode battery to tube AL2(13), and stops timing by removing charging battery and closing a discharge path for capacitor 1333.

Assuming now that relay G1(13) is operated whereby capacitor 1320 is charging. If for any reason relay G1(13) is not released within a given time interval, tube AL1(13) will undergo a control-gap discharge. Since the main cathode of tube AL1(13) is connected to negative battery through the winding and No. 4 contact of relay AL1(13), tube AL1(13) will undergo first and second transfers and relay AL1(13) will be operated. Relay AL1(13) locks operated to ground through its No. 3 contact and through the upper back contact of switch SW3(13). Relay AL1(13), in operating, removes negative battery from the main cathode of tube AL1(13) thereby extinguishing that tube, and connects ground through its No. 1 contact and through resistor 1327 to discharge capacitor 1320. Relay AL1(13), in operating, also lights lamp AL1(13), connects ground through its No. 7 contact to conductor 1334, and extends conductor 1335 through its No. 8 contact to the No. 5 contact of relay AL2(13) for purposes hereinafter to be described. Relay AL1(13), in operating, also connects ground through its No. 5 contact to conductor 2307 whereby relay T(13) is operated to transfer the common release circuits as above described. Under this condition, the circuit of Fig. 14 is locked in service and so remains even when ground is removed from conductor 2307 by the timing circuit of Fig. 23.

If Fig. 14 is in service when the trouble condition occurs, tube AL2(13) is discharged to operate relay AL2(13) to cause a transfer to the circuits of Fig. 12 by opening conductor 2307 to release relay T(13).

It may be noted that if a trouble condition has caused either relay AL1(13) or relay AL2(13) to be operated, and a subsequent trouble condition occurs whereby the other of these relays is also operated, ground is connected through the No. 5 contact of relay AL2(13), through the No. 8 contact of relay AL1(13) and to conductor 1335 for a purpose hereinafter to be described.

The fuses associated with the main batteries of Fig. 12 are associated with alarm bar 1336, and the fuses associated with the main batteries of Fig. 14 are associated with alarm bar 1337. If a fuse associated with alarm bar 1336 operates, battery is connected through resistor 1338, winding of relay F1(13) and to ground whereby relay F1(13) is operated. Relay F1(13), in operating, connects ground through its upper front contact, through the No. 4 contact and winding of relay AL1(13) and to battery, thereby operating relay AL1(13) to transfer the circuits as above described. Relay F1(13), in operating, also connects battery through its lower front contact to conductor 1339 for a purpose hereinafter to be described. It may be noted that a corresponding result obtains if a fuse associated with fuse alarm bar 1337 operates.

PREFERENCE CIRCUIT

The circuits associated with the preference tubes P1(15) and P2(15) are substantially identical with those associated with tubes T1(15) and T2(15) hereinbefore described with the exception that each of the tubes P1(15) and P2(15) is provided with an associated relay in its main anode circuit. Assuming tube P1(15) to be conducting, relay P1(15) will be operated. With relay P1(15) operated, ground is connected through its upper front contact to conductor 1530 which is cabled to Fig. 39 and there multipled to all other odd-numbered registers, through the network 3966, and to conductor 1407 which is extended to the left-hand control anode of register-connector select tube SM1(20) as hereinbefore traced. Similarly, ground is conducted through the other idle odd-numbered register-connector select tubes. Thus, with relay P1(15) operated, when a register is to be seized the potential applied to the control anodes of the register-connector select tubes associated with odd-numbered registers is lower than that applied to the control anodes of the register-connector select tubes associated with even-numbered registers, thereby giving the latter registers preference.

Relay P1(15), in operating, also connects ground through its inner lower front contact to conductor 1531 which is extended to Fig. 44 and there multipled to all odd-numbered ringing circuits, through network 4469 and to conductor 4402 which is extended through the ringing circuit and to the left-hand control anode of ringing connector select tube SM1(31), as hereinbefore traced. Similarly, this ground is conducted through the other idle odd-numbered ringing circuits to the control anodes of their associated ringing-connector select tubes. Thus, with relay P1(15) operated, when a ringing connector is to be seized the potential applied to the control anodes of the ringing-connector select tubes associated with odd-numbered ringing circuits is lower than that applied to the control anodes of the ringing-connector select tubes associated with even-numbered ringing circuits, thereby giving the latter ringing circuits preference.

Relay P1(15), in operating, also connects ground through the upper back contact of relay JP(15) and through its outer lower front contact to conductor 1532 which is extended to Fig. 29, through network 2943 and to conductor 2804 which is extended to the right-hand control anodes of all the primary-select tubes associated with idle paths and with junctor subgroup No. 1, i. e., with all paths idle, to the right-hand control anodes of primary-select tubes PS5(5) to PS9(5) and PS5(4) to PS9(4) and to the similarly designated tubes in all other line-link frames. Thus, when an originating path is to be established, with tube P1(15) operated, those paths associated with the junctors in junctor subgroup No. 1 will be given a lower preference than those paths associated with the junctors in junctor subgroup No. 2. It may be noted that this preference is in addition to the preference determinative upon the number of busy junctors in a subgroup as hereinbefore described in detail.

When an originating call is placed whereby either relay STC(12) or relay STC(14) is operated, the opposite tube, here tube P2(15), will be fired. Thus, assuming relay STC(12) operates, positive 100-volt battery is extended through resistor 1207, middle upper back contact of relay RLS(12), conductor 1208, outer upper back contact of relay OT(12), conductor 1209, middle upper front contact of relay STC(12), resistor 1259, conductor 1260 which is extended to Fig. 15, and to the left-hand control anodes of tubes P1(15) and P2(15). Tube P2(15), in discharging, operates relay P2(15), and extinguishes tube P1(15) which releases relay P1(15), as described in relation to tubes T1(15) and T2(15). Relay P2(15), in operating, performs the same function as did relay P1(15) as above described except that in this case the ground is applied through the even-numbered registers, through the even-numbered ringing circuits, and through junctor subgroup No. 2 whereby these equipments are given a lower preference. Thus, preference is given to these groups of circuits alternately on successive originating calls.

The above-described junctor subgroup preference feature may be cancelled when a predetermined number of junctors become busy. It will be recalled that when a junctor is seized, the ON relay therein is operated. Thus, when junctor 1A(28) is seized, relay ON1A(28) is operated, and positive 135-volt battery is applied through resistor 2880, through the No. 1 contact of relay ON1A(28) and to conductor 2881. Similarly, when any of the other provided junctors is seized, positive battery is connected through a corresponding resistor to conductor 2881. This voltage on conductor 2881 is connected through resistor 1533 to negative battery and ground. Thus, with all junctors idle, a negative potential is applied to the right-hand control anode of tube JP(15), and as additional junctors become busy, an incrementally increasing positive potential is applied to this control anode. By varying the resistance of resistor 2880 and of the corresponding resistors in the other junctors, or by varying the value of resistor 1533, the potential applied to the right-hand control anode of tube JP(15) may be controlled so that a sufficient potential to fire the tube is applied only when a definite chosen number of junctors is busy. The main cathode of tube JP(15) is connected to conductor 1534, and the right-hand control cathode thereof is connected through resistor 1535 to conductor 1534, outer lower back contact and winding of relay JP(15), and to negative battery. The main anode of tube JP(15) is connected to main anode supply conductor 1230 which is connected to main anode battery through a back contact of relay RLS(12) or RLS(14) as hereinbefore traced. When the predetermined number of junctors becomes busy, tube JP(15) undergoes a control-gap discharge and first and second transfers whereby relay JP(15) is operated. Relay JP(15), in operating, removes the shunt around resistor 1536 thereby reducing current flow through tube JP(15). Relay JP(15), in operating, also interrupts, at its upper back and inner lower back contacts, the circuits over which ground was supplied through the outer lower front contact of relay P1(15) or through the outer upper front contact of relay P2(15) to establish the junctor subgroup preference as above described, thereby eliminating this preference feature. Each operation of relay RLS(12) or RLS(14) in the common-release circuit removes positive battery from conductor 1230 thereby extinguishing tube JP(15) and releasing relay JP(15). If there are still sufficient junctors busy when main anode voltage is restored to conductor 1230, tube JP(15) will refire to reoperate relay JP(15) to cancel the junctor subgroup preference. If sufficient junctors are not busy, i. e., if additional junctors have become idle, tube JP(15) will remain extinguished until the predetermined number of junctors again becomes busy.

GROUP BUSY CIRCUIT

It will be recalled that on an originating call the calling subscriber must be connected to an idle register and to an idle junctor. If there are no idle junctors or if there are no idle registers, a call cannot be initiated at that time, and therefore provision is made to prevent the initiation of any additional originating calls and to prepare the office to handle terminating calls during this period.

If junctor 1A(28) is idle, ground is connected through the No. 3 contact of unoperated relay ON1A(28), conductor 2882, through a back contact of switch MB1A(28), and to conductor 2883. Similarly, ground is connected to conductor 2883 from any other of the junctors during the time in which they are idle. Therefore, as long as one or more of the junctors are idle, conductor 2883 is grounded. The ground on conductor 2883 is conducted through the windings of junctor-busy relays JB(12) and JB1(12) and to battery, whereby these relays become operated as shown. In the event that all junctors become busy, the ground is removed from conductor 2883 and relays JB(12) and JB1(12) release. Relays JB(12) and JB1(12), in releasing, perform identical functions in the two portions of the common release circuit shown in Figs. 12 and 14. Thus, if that portion of the circuit shown in Fig. 12 has been rendered operative by the operation of relays C(12) and C1(12), relay JB(12), in releasing, extends ground through its back contact, conductor 1261, No. 2 contact of relay C1(12), conductor 1241, winding of relay OT(12), inner back contact of relay STC(12) and to negative battery thereby operating relay OT(12). The operating of relay OT(12) prepares the office to handle a terminating call and prevents the starting of any more originating calls as hereinbefore described. Similarly, if relays C(14) and C1(14) are operated, or otherwise when these relays operate, relay JB1(12), in releasing, applies ground over a similar path to operate relay OT(14). When any one or more junctors becomes idle, relays JB(12) and JB1(12) are reoperated. If the common-release circuit of Fig. 12 or of Fig. 14 is not then engaged in completing a terminating call, relay OT(12) or OT(14) will release, or otherwise when the present terminating call is completed, relay OT(12) or OT(14) will release, and the office may again accept originating calls.

Similarly, if one or more registers are idle, relays RB(12) and RB1(12) are operated as shown. Thus, assuming the register shown in detail to be idle, ground is connected through the outer upper back contact of relay ON1(39), through the right-hand contacts of switch 3992, to conductor 3969 which extends to Fig. 12, through the windings of relays RB(12) and RB1(12) and to negative battery. If all of the provided registers become busy, this ground is removed from conductor 3969 and relays RB(12) and RB1(12) are released. Relay RB(12), in releasing, applies ground through its back contact to conductor 1261 to operate relay OT(12) in the same fashion as did relay JB(12) in releasing, or, if the circuit of Fig. 14 is operative instead at this time relay RB1(12), in releasing, operates relay OT(14) as did relay JB1(12). If any one or more registers becomes idle, relays RB(12) and RB1(12) are operated and the office may handle further originating calls. It will be noted that there must be at least one idle register and at least one idle junctor available or this group-busy circuit will be operative to prevent additional originating calls as above described.

It will also be noted that each time relay JB(12) and relay JB1(12) are released, busy register BR1(12) is operated to record the condition, and that each time relay RB(12) and RB1(12) are released, busy register BR2(12) is operated.

*Alarm circuit*

When any of a number of trouble conditions occur, some of which have previously been mentioned, the alarm circuit of Figs. 22 and 23 is responsive thereto to register the condition and to initiate a call to the district master office over an idle trunk to indicate to an operator that a trouble condition exists. The circuits are also arranged whereby the operator may dial an alarm checking terminal to ascertain the class of alarm, i. e., whether there is a major alarm, a permanent signal alarm, a minor alarm, or whether, by the time the operator dials, the alarm condition has been rectified so that there is no trouble. Provision is also made whereby after the operator has ascertained the class of alarm, an alarm of more importance will cause the alarm circuit to again signal the operator.

MINOR ALARMS

A minor alarm is one in which there is a permanent signal on a trunk, or where one of the circuits of Fig. 12 or Fig. 14 of the common release circuit is locked out, or where one of the ringing interrupters is locked out.

As mentioned in the discussion of the incoming trunk call from an operator, if a trunk becomes shorted or if for any reason relay TK therein becomes operated and the call is not completed, a signal is transmitted to the alarm circuit. Thus, referring to trunk No. 0 in Figs. 6 and 7, with relays TK(7) and TK1(7) operated, ground is connected through the No. 1 contact of relay TK1(7), outer lower back contact of relay A1(7), conductor 722 which is cabled to Fig. 23, winding of relay ST(23) and to battery, whereby relay ST(23) is operated. For the purposes of this discussion, it will be assumed that this ground on conductor 722 is transmitted from trunk No. 5 (Fig. 7) and that trunk No. 0 (Figs. 6 and 7) is idle. It will be recalled that relays TL1(23), TL2(23) and TL3(23) function to transmit ground over conductors 2301 and 4411 at timed intervals. At the end of one of the timing cycles of these relays, for a brief interval both relays TL1(23) and TL3(23) are released, and ground is then connected through the inner upper back contact of relay TL3(23), upper back contact of relay TL1(23), conductor 4411, lower front contact of relay ST(23), back contact and winding of relay PA(23) and to battery. Relay PA(23) operates and locks through its inner lower front contact, conductor 2308, upper front contact of relay ST(23) and to ground. From two to four minutes later, relay TL3(23) operates to connect ground to conductor 2301. If relay A1 (not shown) in trunk No. 5(7) operates within that time, as is normally the case, to indicate that an incoming trunk call has been completed, or if relay TK1 (not shown) in trunk No. 5(7) releases, relay ST(23) will release to release relay PA(23) and the alarm circuit will be restored to normal. However, if relay A1 has not released, when ground is applied to conductor 2301, that ground will be extended through the outer lower front contact of relay PA(23), conductor 2309, lower winding of relay MN(22) and to negative battery. Relay MN(22) operates and locks from negative battery, through its upper winding and inner upper front contact, conductor 2308, and to ground through the upper front contact of relay ST(23). Relay MN(22), in operating, extends the ground from the trunk circuit on conductor 722 through its outer lower front contact, conductor 2201, lamp D(22) and to battery to light that alarm lamp. Relay MN(22), in operating, also connects ground through its inner lower front contact, conductor 2202, winding of relay MN1(22) and to battery to operate relay MN1(22). If ground is removed from conductor 722 at this time, either upon the operation of relay A1 in trunk No. 5(7) or upon the release of relay TK1 therein, relay ST(23) is released which, in turn, releases relays PA(23), MN(22) and MN1(22), lamp D(22) is extinguished, and the alarm circuit is restored to normal.

If the alarm condition continues, relay MN1(22), in operating, completes a circuit from ground through the outer upper back contact of relay OD(22), outer upper front contact of relay MN1(22), and to conductor 4409 which is cabled to Fig. 34 and is the start lead for the ringing interrupter circuits as hereinbefore described. The ringing interrupter, in functioning, transmits busy tone over conductor 3357 as hereinbefore described, resistor 2212, capacitor 2211, conductor 2210, outer upper front contact of relay MN(22), outer upper back contact of relay PS1(22), conductor 2213, inner lower back contact of relay MJ(22), and to conductor 2214, whereby upon the subsequent operation of relay RS(22) as will be described, busy tone is connected to conductor 2215 at the alarm checking terminal. Relay MN1(22), in operating, also connects ground through the inner upper back contact of relay OD(22) and through its middle upper front contact to conductor 2203, and connects ground through the outer lower back contact of relay OD(22) and through its inner upper front contact to conductor 2204.

For purposes of clarity, only trunks No. 0 (Figs. 6 and 7) and No. 5 (Fig. 7) have been shown as alarm transmitting trunks, although additional trunks may be used therefor as will be readily apparent to one skilled in the art. Assuming for the moment that such additional trunks are provided and that it is one of these additional trunks that is on permanent signal, and also assuming for the moment that both trunks No. 0 (Figs. 6 and 7) and No. 5 (Fig. 7) are idle, the ground on conductor 2203 will be extended through the middle left-hand contact of relay TC0(23), conductor 2310, left-hand back contact of relay T5(23), conductor 2311, winding of relay TC5(23) and to battery. Simultaneously the ground on conductor 2204 will be extended through the middle left-hand back contact of relay TC5(23), conductor 2312, left-hand back contact of relay T0(23), conductor 2313, winding of relay TC0(23), and to battery. Whichever of these relays first operates will interrupt, at its middle left-hand back contact, the energizing path for the other, and will lock to ground through the middle left-hand contact of that other relay.

It was initially assumed, however, that the permanent signal exists on trunk No. 5(7), and since relay TK therein is operated, relay B therein will be operated and ground will be connected to the sleeve conductor to operate relay T5(23) as hereinbefore described. Therefore the energizing path for relay TC5(23) from ground on conductor 2203 will be interrupted at the left-hand back contact of operated relay T5(23), and relay TC0(23) will be operated, locking through its inner left-hand front contact, conductor 2312, middle left-hand back contact of relay TC5(23) and to ground on conductor 2204.

Relay TC0(23), in operating, closes tip conductor 628 to ring conductor 629 through the winding of repeat coil 2314 and connects ground to conductor 625. The ground on conductor 625 operates relay OC(6), and the bridge across the tip and ring conductors operates relay A(6) as in a normal outgoing call. Relay A(6), in operating, operates relay AI(7) to reverse the trunk to signal the operator and operates relay B(6). Relay B(6), in operating, locks relay OC(6) operated, operates relay ON(6) to make this trunk test busy, and grounds the sleeve lead 621 to operate relay T0(23). When the operator answers the signal, relay TK(7) operates which holds relay B(6) operated and operates relay TKI(7). Relay TKI(7), in operating, closes ground through its No. 2 contact to conductor 723, through the outer right-hand front contact of relay TC0(23), conductor 2320, No. 3 contact of relay OA(22), conductor 2205, winding of relay OA(22), resistor 2206 and to battery whereby relay OA(22) is operated. Relay OA(22) locks operated through its No. 4 contact, conductor 2207, lower front contact of relay MNI(22), conductor 2208, inner lower back contact of relay PSI(22), conductor 2209 and to ground through the upper back contact of relay MJ(22). It may be noted that relay OD(22) does not operate from the ground on conductor 2205 since the winding thereof is shunted by ground on conductor 2320 through its No. 5 contact.

Relay OA(22), in operating, completes a circuit from ground, primary winding of repeat coil 2314, conductor 2321, middle upper back contact of relay OD(22), No. 1 contact of relay OA(22), conductor 2210, capacitor 2211, resistor 2212 and to conductor 3357 which is connected to a source of busy tone in the ringing interrupter as hereinbefore described. Busy tone is thereby supplied to the operator; she recognizes this as an alarm indication and disconnects.

When the operator disconnects, relays TK(7) and TKI(7) release, thereby removing ground from conductor 2320, the shunt around the winding of relay OD(22) is removed, and relay OD(22) is operated. Relay OD(22), in operating, interrupts the previously traced holding path for relay TC0(23) to release that relay. Relay TC0(23), in releasing, releases relay A(6) whereupon trunk circuit No. 0 (Figs. 6 and 7) is released and restored to normal as on a regular outgoing call. If there are no other alarm conditions recorded at this time, the operation of relay OD(22) will also remove ground from the ringing interrupter start lead 4409 releasing the ringing interrupter. The alarm circuits will then remain in this condition until the subject alarm condition is retired or until an alarm condition of greater importance occurs. Normally, the operator will immediately dial the alarm checking terminal to ascertain the class of alarm, as will be described hereinafter.

The other minor alarm condition occurs where one of the circuits of Fig. 12 or Fig. 14 of the common release circuit is locked out, or where one of the ringing interrupters is locked out. As hereinbefore described in detail, in either event ground will be connected to conductor 1334 through a front contact of one of the relays ALI(13), AL2(13), ALI(34), or AL2(34). This ground is extended to battery through the upper winding of relay MN(22) thereby operating that relay. If no other alarm conditions presently exist, the operation of relay MN(22) will cause a sequence of operations to occur exactly as above described whereby the operator will be signaled that an alarm condition exists, and whereby, after the operator disconnects, the alarm circuit will continue to register the condition either until the subject alarm condition is retired or until an alarm of greater importance occurs. If, however, either of the previously described minor alarm conditions occurs after the other has been registered and an indication thereof transmitted to the operator, no further indication will be transmitted to the operator. It may be noted, however, that relay MN(22) will be held operated both from ground through front contact of relay ST(23) and from ground on conductor 1334 whereby both minor alarm conditions must be retired before the alarm circuit will restore to normal.

PERMANENT SIGNAL ALARM

Although circumstances in individual installations may lead one skilled in the art to modify the order of relative importance of the several types of alarm herein discussed, it will be assumed that an alarm arising from an excessive number of subscribers' lines going to permanent signal is of greater importance than the minor alarm conditions above described.

As hereinbefore described in detail, when for any reason the register times out, the junctor is signaled to remove ground from the sleeve lead. When this ground is removed, the junctor is restored to normal and the hold magnets of the primary and secondary line switches are released.

Let it now be assumed that the subscriber at station 236-2 (Fig. 11) has failed to dial or has failed to dial a complete designation, or for some other reason the register and junctor with which this line was associated has timed-out. When sleeve ground is removed, primary hold magnet HOLDA(11) will be released, releasing slow-to-release relay LOI(11). With the primary hold magnet released and with the subscriber's switchhook contacts closed, a circuit is completed from battery, winding of relay LI(11), outer left-hand back contact of hold magnet HOLDA(11), through the subscriber's loop, middle left-hand back contact of hold magnet HOLDA(11) and to ground. Relay LI(11) will therefore operate before relay LOI(11) has released. Therefore a circuit will be completed from negative battery, winding and right-hand front contact of relay LOI(11), left-hand front contact of relay LI(11), and to conductor 1115. It may be noted that conductor 1115 extends to the left-hand front contacts of all of the L relays of all of the lines in all line-link frames, so that negative battery is connected, in parallel, to conductor 1115 through the winding of the LO relay in each of the lines which goes to permanent signal lock-out. It may also be noted that since each of these paths extends through a front contact of the associated L relay, if the subscriber disconnects, the associated L relay will be released, and the line will no longer be on permanent signal lock-out.

Conductor 1115 extends to Fig. 22 and thence to ground over two parallel paths, viz, over a first path comprising resistor 2219, and over a second path comprising variable resistor 2220, back contacts of switch SW(22), through winding 2221 of the sensitive voltmeter-type relay SR(22) and resistor 2222 in parallel, outer lower back contact of relay A(22), and to ground. The parameters of these circuits are preferably arranged so that the deflection of the pointer of the sensitive relay SR(22) is proportional to the number of LO relays which are operated. It will be observed that by proper adjustment of variable resistor 2220, full scale deflection of the sensitive relay SR(22) may be obtained with any desired number of LO relays operated. Assume that the parameters are adjusted whereby when four lines go to permanent signal lock-out, the sensitive relay SR(22) will be deflected to full scale. Thus whenever four or more lines go to permanent signal lock-out, relay SR(22) will fully deflect thereby closing its contact and completing a circuit from ground through that contact, winding of relay A(22) and to battery. Relay A(22), in operating, interrupts the circuit of the operating winding of relay SR(22), but that relay does not release at this time since the needle and front contact thereof are maintained in contact magnetically in any well-known fashion. Relay A(22), in operating, also connects ground through its lower front contact to operate relay B(22); relay B(22), in operating, connects ground through its front contact to operate relay C(22); and relay C(22), in operating, connects ground through its front contact to operate relay PS1(22).

If the alarm transmitting circuit is normal, i. e., if no prior alarm has been transmitted, relay PS1(22), in operating, connects ground to conductor 2201 to light alarm lamp D(22), completes a circuit from ground through the outer upper back contact of relay OD(22), through its outer lower front contact and to ringing interrupter start lead 4409 as in the case of a minor alarm, and completes a circuit from dial tone source DT(22), resistor 2227, capacitor 2228, through its outer upper front contact, conductor 2213, inner lower back contact of relay MJ(22), and to conductor 2214 whereby upon the subsequent operation of relay RS(22), dial tone will be connected to conductor 2215 at the alarm checking terminal. Relay PS1(22), in operating, also completes a circuit from ground through the upper back contact of relay MJ(22), conductor 2209, inner lower front contact of relay PS1(22), conductor 2229, No. 5 contact of relay OA(22), conductor 2230, winding of relay PS2(22) and to negative battery. Relay PS2(22) operates and locks through its lower front contact to ground on conductor 2229.

Continuing on the assumption that no previous minor alarm has been transmitted, relay PS2(22), in operating, closes ground through its inner upper front contact, conductor 2202, winding of relay MN1(22) and to battery. Relay MN1(22) operates and the circuits thereafter operate to transmit an alarm to the operator as described in the case of a minor alarm, except that in this case the locking ground for relays OA(22) and OD(22) is supplied to conductor 2207 through the outer upper front contact of relay PS2(22).

If, however, a previous minor alarm has been transmitted to the operator as above described, relays MN(22), MN1(22), OA(22) and OD(22) will be operated, lamp D(22) will be lit, and busy tone will be connected to the alarm checking terminal. Under this condition, when relay PS1(22) operates, an additional ground is applied to lamp D(22), and an additional ground is applied to ringing interrupter start lead 4409 to insure that these indications and functions will continue even if the minor alarm condition is retired. At the same time that relay PS1(22) connects dial tone through its outer upper front contact to the alarm checking terminal, it interrupts, at its outer upper back contact, the previously traced circuit over which busy tone was connected to the alarm checking terminal to indicate a minor alarm. Relay PS1(22), in operating, also, under this condition, interrupts, at its inner lower back contact, the locking path for relays OA(22) and OD(22) whereby those relays are released. Upon the release of relay OA(22), the previously traced energizing path for relay PS2(22) is established and relay PS2(22) is operated. Since relay MN1(22) is already operated, upon the release of relays OA(22) and OD(22), an alarm is transmitted to the operator as before described. It may be noted that if the number of permanent signals decreases during this period, no change in the circuit takes place until the alarm checking terminal is dialed, as will be described hereinafter.

MAJOR ALARM

A major alarm is transmitted whenever a fuse in any part of the system operates, whenever a failure occurs in both ringing interrupters, whenever a failure occurs in both Fig. 12 and Fig. 14 of the common release circuit, and whenever the ringing supply voltage is interrupted.

As hereinbefore described, whenever one of the fuses shown in Fig. 13 operates, either relay F1(13) or relay F2(13) is operated to connect negative battery to conductor 1339. Similarly, whenever one of the fuses shown in Fig. 34 operates, either relay F1(34) or F2(34) operates to connect negative battery to conductor 1339. Conductor 1339 extends to Fig. 23, winding of relay F(23) and to ground whereby relay F(23) will be operated. Additionally, if any of the fuses associated with the alarm circuits operate, either relay F(23) or relay F1(23) will be operated. When either relay F(23) or F1(23) is operated, ground is connected through the inner upper front contact thereof, conductor 2322, lamp C(22) and to battery, whereby lamp C(22) is lit to indicate the condition which gave rise to the alarm. Either relay F(23) or F1(23), in operating, also connects ground through its outer upper front contact to conductor 2323, winding of relay MJ(22) and to battery whereby relay MJ(22) is operated.

As hereinbefore indicated, alternator 4442 (Fig. 44) supplies ringing voltage for the system. This alternator has also been represented in Fig. 23 for purposes of clarity. The output of alternator 4442, in addition to being supplied to the ringing circuits, is connected through the winding of polarized relay NV(23). Relay NV(23), in operating, connects ground through its armature and front contact to battery through the winding of relay NV1(23) whereby that relay is normally operated as shown. Relay NV(23) operates and releases to follow the alternating voltage supplied by alternator 4442, but relay NV1(23) remains operated during the release periods of relay NV(23) by virtue of the presence of the shunting capacitor 2224 which renders relay NVI(23) slow to release. If, for any reason, the ringing voltage is interrupted, relay NVI(23) releases. Relay NVI(23), in releasing, applies ground through its lower back contact to light an alarm lamp, and connects ground through its upper back contact to conductor 2323 to operate relay MJ(22).

As hereinbefore described, if both circuits of the common release circuit become inoperative, both relays AL1(13) and AL2(13) are operated whereby ground is connected to conductor 1335. This ground on conductor 1335 is extended through the lower winding of relay PG(22) to battery whereby relay PG(22) is operated. If both of the ringing interrupters become disabled, both relays AL1(34) and AL2(34) are operated whereby ground is connected to conductor 3427, as before described. This ground on conductor 3427 is extended through the upper winding of relay PG(22) and to battery whereby relay PG(22) is operated. Relay PG(22), in operating, connects ground through its outer upper front contact, conductor 2323, winding of relay MJ(22) and to battery whereby relay MJ(22) is operated Additionally, if the ground is transmitted from the common release circuits via conductor 1335, this ground is extended through the middle upper front contact of relay PG(22) to light lamp A(22); if the ground is transmitted from the ringing interrupters via conductor 3427, this ground is extended through the inner upper front contact of relay PG(22) to light lamp B(22).

If the alarm circuit is normal, i. e., if no previous minor or permanent signal alarms have been transmitted, relay MJ(22), in operating as a result of any of the above-described conditions, opens at its inner lower back contact the circuit over which busy or dial tone is transmitted on an alarm of lesser importance, and completes a circuit from ground at the outer upper back contact of relay OD(22), outer lower front contact of relay MJ(22), to ringing-interrupter start lead 4409. It may be noted that if the ringing interrupters are both disabled, the grounding of conductor 4409 may be ineffective to start the ringing interrupters to transmit busy tone to the operator as a signal that she should dial the alarm checking terminal. The operator should therefore be instructed to dial the alarm checking terminal even though no busy tone is received. Relay MJ(22), in operating, also connects ground through its upper front contact, conductor 2232, No. 2 contact of relay OA(22), conductor 2233, winding of relay MJ1(22) and to battery. Relay MJ1(22) operates, and locks through its lower front contact to ground on conductor 2232. Relay MJ1(22), in operating, closes ground through its inner upper front contact, conductor 2202, winding of relay MN1(22) and to battery. Relay MN1(22) operates and the circuits thereafter function to transmit an alarm to the operator as described previously, except that in this case the locking ground for relays OA(22) and OD(22) is supplied to conductor 2207 through the outer upper front contact of relay MJ1(22).

If the alarm transmitting circuit is not normal, i. e., if a major alarm condition develops after a minor or permanent signal alarm has been transmitted to the district master office, relay MJ(22), in operating, grounds conductor 4409 and interrupts the circuits over which tones representing lesser alarms were applied to the alarm checking terminal, as before. If the previously transmitted alarm was a minor alarm, relay MJ(22), in operating, interrupts, at its upper back contact, the locking paths for relays OA(22) and OD(22) whereby those relays are released. If the previously transmitted alarm was a permanent signal alarm or both a minor alarm and a permanent signal alarm, relay MJ(22) in operating, interrupts, at its upper back contact, the locking circuit for relay PS2(22) whereby that relay is released. Relay PS2(22), in releasing, interrupts, at its outer upper front contact, the locking path for relays OA(22) and OD(22) whereby those relays are released. If the previously transmitted alarm was solely a permanent signal alarm, relay PS2(22), in releasing, will release relay MN1(22). Relay OA(22), in releasing, establishes the previously traced energizing path for relay MJ1(22) and that relay operates and locks. Relay MJ1(22), in operating, either operates relay MN1(22) or locks that relay operated depending on the prior alarm, and connects ground through its outer upper front contact to conductor 2207 to act as a locking ground for relays OA(22) and OD(22) when those relays are subsequently operated. The alarm is then transmitted to the operator as before described.

It may be noted that since the operation of relay MJ(22) opens the circuit to the tip conductor 2215 of the alarm checking terminal so that no tone may be applied thereto, a major alarm will supersede a prior minor alarm or permanent signal alarm. It may be further noted that when all of the trouble conditions giving rise to a major alarm are retired, relay MJ(22) will be released as a result of the release of relay PG(22), relay F(23) or relay F1(23) and the major alarm circuit will be restored to normal.

ALARM CHECKING TERMINAL

When the operator is signaled and receives an indication that a trouble condition exists, she disconnects to restore the trunk circuit to normal as hereinbefore described. She will then dial the alarm checking terminal, which will here be assumed to be designated by the number 211–1. The connection is established as on a normal incoming trunk call from operator as hereinbefore described in detail. When the junctor connects ground to the sleeve lead 1003 to maintain hold magnet HOLDC(10) operated, that ground is also extended to Fig. 22, through the winding of relay SL(22) and to battery, whereby relay SL(22) is operated. Relay SL(22), in operating, applies ground through its inner lower front contact to conductor 2308 to lock relay MN(22) operated if that relay is operated, and applies ground through its middle lower front contact to conductor 4409 to start the ringing interrupter. As may be noted by reference to Fig. 50, the ringing interrupter connects positive 135-volt battery to conductor 3331 during the first half-second interval of each ringing cycle. This potential is, at this time also applied through resistor 3370, conductor 3371 which is cabled to Fig. 22, middle upper front contact of relay SL(22), conductor 2237, lower back contact and winding of relay PU(22) and to ground. Relay PU(22) operates and locks operated through its lower front contact, conductor 2238, inner upper front contact of relay SL(22), resistor 2239, and to positive battery. Relay PU(22), in operating, connects the alarm checking terminal tip conductor 2215 through the outer lower back contact of relay RS(22), inner upper front contact of relay PU(22), resistor 2240, and to the alarm checking terminal ring conductor 2241, thereby tripping ringing. It may be noted, however, that relay SL(22) continues to apply ground to conductor 4409 so that the ringing interrupter continues to function.

It will be observed, by reference to Fig. 50, that the ringing interrupter connects positive 135-volt battery to conductor 3333 during the third and eleventh half-second intervals of each ringing cycle. When this positive potential is applied to conductor 3333, it is also applied through resistor 3372, conductor 3373 which is cabled to Fig. 22, outer upper front contact of relay PU(22), inner lower back contact and winding of relay RS(22) and to ground. Relay RS(22) operates and locks operated through its inner lower front contact, conductor 2238, inner upper front contact of relay SL(22) and to positive battery through resistor 2239. Relay RS(22), in operating, completes the previously traced connection from the tone lead 2214 to the alarm checking terminal tip conductor 2215.

If the alarm condition is major, relay MJ(22) will be operated as above described, the tone lead 2214 will be opened, and no tone will be transmitted to the operator. It may be noted that the operator may not be able to establish a connection to the alarm checking terminal if both common release circuits are disabled. It may be further noted that if the alarm checking terminal is reached and relay SL(22) is operated, relays PU(22) and RS(22) may not be operated if both ringing-interrupter circuits are disabled. In either case no tone will be transmitted to the operator, indicating a major alarm condition.

If the alarm condition is a permanent signal alarm, relay PSI(22) will be operated, and, upon the operation of relay RS(22), dial tone will be transmitted to the operator as above described. However, relay SL(22), in operating, also completes a circuit from ground through its outer lower front contact, conductor 2244, upper front contact of relay A(22), upper back contact of relay D(22), reset winding 2245 of sensitive relay SR(22) and to battery. The flux generated by the current flow through winding 2245 opposes the action of the magnet holding the sensitive relay SR(22) operated, and therefore, that relay is reset in the well-known manner. Relay SR(22), in releasing, releases slow-to-release relay A(22) which releases slow-to-release relay B(22) which releases slow-to-release relay C(22). Relay A(22), in releasing, completes a circuit from ground through the outer lower front contact of relay SL(22), conductor 2244, upper back contact of relay A(22), winding of relay D(22) and to battery. Relay D(22) operates and locks to ground on conductor 2244 through its lower front contact. The release of relay A(22) and the operation of relay D(22) opens the circuit of the reset winding 2245.

Relay A(22), in releasing, also recloses the previously traced circuit for the main or operating winding 2221 of sensitive relay SR(22), and relay SR(22) will then be deflected in proportion to the number of permanent signals then on the line. If this relay again deflects to full scale to close its contact, relay A(22) is again operated to close the energizing path for relay B(22) which closes the energizing path for relay C(22). Since all of these relays A(22), B(22) and C(22) are slow to release, if relay A(22) is reoperated in this manner, relay C(22) will not have released and dial tone will be continuously transmitted to the operator. However, if the number of permanent signals has decreased between the time the alarm was transmitted to the operator and the time the operator dials the alarm checking terminal, relay SR(22) will not be fully deflected, relay C(22) is permitted to release, and the energizing path for relay PSI(22) is thereby interrupted. Relay PSI(22), in releasing, interrupts the circuit over which dial tone is transmitted to the operator. Therefore, if the operator, after dialing the alarm checking terminal, receives dial tone which shortly thereafter is interrupted, she is informed that the previous permanent signal alarm condition has now been retired. It may be noted that if a minor alarm exists concurrently, the release of relay PSI(22) will reestablish the circuit over which busy tone is transmitted to the operator to indicate that a minor alarm condition exists.

If only a minor alarm condition is present, relay MN(22) will be operated and busy tone will be transmitted to the operator.

If by the time the operator dials, the previous alarm condition has been retired, a "no alarm" condition will be indicated by the transmitting of audible ringing tone to the operator. Relay SL(22), in operating, connects positive battery through resistor 2246, through its outer upper front contact, and to the right-hand control anode of tube R2(22). The right-hand control cathode of that tube is grounded through resistor 2247, the main cathode thereof is connected to negative battery through the winding of relay R2(22), and the main anode thereof is connected through resistor 2248, conductor 3375 which extends to Fig. 33, resistor 3374, and to conductor 3335. As will be observed by reference to Fig. 50, the ringing interrupter applies positive 135-volt battery to conductor 3335 during the fourth and sixth half-second intervals of each ringing cycle. Therefore, tube R2(22) will undergo a control gap discharge, and will transfer to operate relay R2(22) during these intervals, i. e., relay R2(22) will be operated in accordance with ringing code No. 2, although it is to be understood that other ringing codes may be used. Relay R2(22), in operating, connects the source of audible ringing tone 2249 through resistor 2250, inner upper front contact of relay R2(22), capacitor 2251, conductor 2252, outer upper back contact of relay MN(22), outer upper back contact of relay PSI(22), conductor 2213, inner lower back contact of relay MJ(22), conductor 2214, outer lower front contact of relay RS(22), and to tip conductor 2215 whereby ringing code No. 2 is transmitted to the operator.

When the operator disconnects, the trunk circuit, junctor, and closed line switches will be released as on a normal incoming trunk call from operator, and relay SL(22) will be released. Upon the release of relay SL(22), the control gap of tube R2(22) will be extinguished, and relays PU(22), RS(22), and D(22) will be released. However, the other alarm relays in the alarm circuit will remain operated until the condition or conditions giving rise to the alarm are corrected.

It is to be understood that although for clarity of description the values of certain of the voltages, resistances and time constants have been given, definite ringing codes have been listed, and only a limited number of each major item of equipment has been shown, these are but exemplary. It is further to be understood that the above-described arrangements are but illustrative of the application of the principles of the invention. Numerous other arrangements may be devised by those skilled in the art without departing from the spirit and scope of the invention.

What is claimed is:

1. In a communication system, a plurality of switches, a terminal, a multielement electron discharge device individual to said terminal, means for transmitting signals designating said terminal, apparatus responsive to said signals for creating a discharge across certain of the elements of said device, means controlled by said apparatus for causing a transfer of said discharge to certain other of the elements of said device, and apparatus responsive to a discharge across said certain other of the elements of said device for controlling the establishment of an electrically conductive path from said terminal through said switches.

2. In a communication system, a plurality of switches, a plurality of terminals, a multielement electron discharge device individual to each of said terminals, means for initiating a discharge across certain of the elements in any one of said devices, means responsive to said discharge for controlling the establishment of an electrically conductive path from the terminal associated with said any one of said devices through a portion of said switches, means for transmitting signals designating any other one of said terminals, apparatus responsive to said signals for initiating a discharge across certain of the elements of the device individual to said other one of said terminals, and means controlled by said apparatus for causing said discharge to transfer to certain other of the elements of said other one of said devices for controlling the establishment of an electrically conductive path from said other one of said terminals through another portion of said switches whereby said one of said terminals and said other one of said terminals are electrically interconnected.

3. In a telephone switching system, a plurality of telephone lines, a plurality of switches operable selectively to interconnect any two of said lines, a multielement gaseous discharge device individual to each of said lines, means for initiating a discharge across certain of the elements of one of said devices associated with any one of said lines, means responsive to said discharge for controlling the establishment of an electrically conductive path from said one of said lines through a portion of said switches, means for transmitting signals designating any other one of said lines, apparatus responsive to said signals for initiating a discharge across certain of the elements of the one of said devices associated with said other one of said lines, means controlled by said apparatus for causing said discharge to transfer to certain other of the elements of said other one of said devices, and apparatus responsive to a discharge across said certain other of the elements of said other one of said devices for controlling the establishment of an electrically conductive path from said other one of said lines through another portion of said switches whereby a communication path is established between said one of said lines and said other one of said lines.

4. In a telephone switching system, a plurality of subscribers' lines, a plurality of switches, a plurality of junctors, a multielement gaseous discharge device individual to each of said lines, means for initiating a discharge across certain of the elements of one of said devices associated with any one of said lines, means responsive to said discharge for controlling the establishment of an electrically conductive path from said one of said lines through a portion of said switches to one of said junctors, means for transmitting signals designating any other one of said lines, apparatus responsive to said signals for initiating a discharge across certain of the elements of the one of said devices associated with said other one of said lines, means controlled by said apparatus for causing said discharge to transfer to certain other of the elements of said other one of said devices, and apparatus responsive to a discharge across said certain other of the elements of said other one of said devices for controlling the establishment of an electrically conductive path from said other one of said lines through another portion of said switches to said one of said junctors whereby a communication path is established between said one of said lines and said other one of said lines.

5. In a communication system, a switching station, a plurality of terminals connected thereto, a multielement electron discharge device individual to each of said terminals, means for transmitting signals designating any one of said terminals, and apparatus responsive to said signals for selecting the one of said devices individual to the designated one of said terminals comprising means for applying discharge-sustaining potentials to two different elements in each of the devices in two different groups of said devices having some of said devices in common, and means for applying a discharge-initiating potential to another element of each of the devices in another group of said devices having one of said devices in common with said other two groups of said devices.

6. A telephone switching system comprising a switching station, a plurality of subscribers' stations connected thereto, a multielement gaseous discharge tube individual to each of said subscribers' stations, means for transmitting signals designating any one of said subscribers' stations, and apparatus for selecting the one of said tubes individual to the designated one of said subscribers' stations comprising means for applying discharge-sustaining potentials to two different electrodes in two different groups of said tubes having some tubes in common and means for applying a discharge-initiating potential to other electrodes of still another group of tubes having at least one tube in common with said other two groups of tubes.

7. In a telephone switching system, a switching station, a plurality of subscribers' stations connected thereto, a multi-electrode gaseous discharge tube individual to each of said subscribers' stations, means for transmitting signals designating any one of said subscribers' stations, and apparatus responsive to said signals for selecting the one of said tubes individual to the designated one of said subscribers' stations comprising means for applying a potential to one electrode of each tube in a first group of tubes, means for applying a potential to another electrode of each tube in a second group of tubes, some of said tubes being common to both said first and said second groups, and means for applying a potential to another electrode of each tube in a third group of tubes, said third group of tubes having one tube in common with said first and said second groups of tubes.

8. In a telephone switching system, a switching station, a plurality of subscribers' stations connected thereto and each identified by a multi-digit designation, a multielement gaseous discharge tube individual to each of said subscribers' stations, means for transmitting signals designating any one of said subscribers' stations, and apparatus responsive to said signals for selecting the one of said tubes individual to the designated station comprising means for applying a potential to one electrode of each of said tubes individual to stations having the selected first digit as the first digit of their designations, means for applying a potential to another electrode of each of said tubes individual to stations having the selected second digit as the second digit of their designations, and means for applying a potential to another electrode of each of said tubes individual to stations having the selected digit as the third digit of their designations.

9. In a telephone switching system, a switching station, a plurality of subscribers' stations connected thereto, calls originating from said subscribers' stations being chargeable on a plurality of bases, a multielement electron discharge device individual to each of said stations, apparatus responsive to the initiation of a call from any one of said subscribers' stations for initiating a discharge in the one of said devices individual to said any one of said subscribers' stations, means operable when connected to said discharged one of said devices for registering the basis upon which said any one of said subscribers' stations is to be charged, and apparatus responsive to the initiation of a discharge through any one of said devices for connecting said one of said devices to said means.

10. In a telephone switching system, a switching station, a plurality of subscribers' stations connected thereto, calls originating from said stations being chargeable on a plurality of bases, a multielement electron discharge device individual to each of said subscribers' stations, apparatus responsive to the initiation of a call from any one of said subscribers' stations for initiating a discharge between certain of the elements of the one of said devices individual to said any one of said subscribers' stations, means operable when connected to another element of said discharged one of said devices for registering the basis upon which said any one of said subscribers' stations is to be charged, and apparatus responsive to the initiation of a discharge through any one of said devices for connecting said other element of said one of said devices to said means.

11. In a telephone switching system, a plurality of telephone lines, a multielement electron discharge device individual to each of said lines, switching equipment for selectively interconnecting said lines, means responsive to the initiation of a call from any one of said lines for initiating the discharge in the one of said devices individual to said any one of said lines, and apparatus responsive to the initiation of a discharge through any one of certain ones of said devices for rendering said switching equipment ineffective to connect the line individual to said any one of certain ones of said devices with any of the lines individual to certain other ones of said devices.

12. In a telephone switching system, a plurality of telephone lines, a multielement electron discharge device individual to each of said lines, means responsive to the initiation of a call from any one of said lines for initiating a discharge in the one of said devices individual to said any one of said lines, switching equipment normally controlled by the initiation of a discharge between certain of the elements of the one of said devices individual to said any one of said lines to selectively interconnect said any one of said lines and any other one of said lines, and apparatus responsive to the initiation of a discharge between certain other of the elements of certain ones of any one of said devices for rendering said switching equipment ineffective to establish a connection from any of the lines individual to said any one of certain ones of said devices to any of the lines individual to certain other ones of said devices.

13. In a telephone switching system, a plurality of subscribers' stations, a multielement electron discharge device individual to each of said stations, a plurality of trunks, means responsive to the initiation of a call from any one of said stations for initiating a discharge in the one of said devices individual to said any one of said stations, switching equipment normally controlled by the initiation of a discharge between certain of the elements of the one of said devices individual to said any one of said stations to selectively interconnect said any one of said subscribers' stations and any one of said trunks, and apparatus responsive to the initiation of a discharge between certain other of the elements of any one of certain ones of said devices for rendering said switching equipment ineffective to interconnect the one of said subscribers' stations individual to said any one of certain ones of said devices and any of said trunks.

14. In a communication system, a plurality of telephone lines, a plurality of switches operable selectively to interconnect any two of said lines, a multielement electron discharge device individual to each of said lines, means for transmitting signals designating any one of said lines, apparatus responsive to said signals for preparing the one of said devices individual to the designated one of said lines to undergo a discharge, means effective when a particular potential condition exists on the designated one of said lines for disabling said one of said devices to discharge, and apparatus effective only if said one of said devices undergoes a discharge for operating said switches to establish a connection to the line associated with said selected device.

15. In a communication system, a plurality of telephone lines, a plurality of switches operable selectively to interconnect any two of said lines, a multielement electron discharge device individual to each of said lines, means for transmitting signals designating any one of said lines, apparatus responsive to said signals for preparing the one of said devices individual to the designated one of said lines to undergo a discharge and a transfer of discharge, means effective when a particular potential condition exists on the designated one of said lines for disabling said one of said devices to undergo a transfer of discharge, and apparatus effective only if said one of said devices undergoes a transfer of discharge for operating said switches to establish a connection to the line associated with said selected device.

16. In a communication system, a plurality of telephone lines, a plurality of switches operable selectively to interconnect any two of said lines, a multielement electron discharge device individual to each of said lines, means for transmitting signals designating any one of said lines, apparatus responsive to said signals for preparing the one of said devices indivdual to the designated one of said lines to undergo a discharge and a transfer of discharge, apparatus effective if said discharge fails to occur in said one of said devices for transmitting an indication to said switches that the line associated with said one of said devices is vacant, apparatus effective if said transfer of discharge occurs in said one of said devices for conditioning said switches to establish a connection to the line individual to said one of said devices, and apparatus effective when a particular potential condition exists on the line to which said one of said devices is individual for disabling said one of said devices to undergo said transfer of discharge.

17. In a communication system, a plurality of telephone lines, a plurality of switches operable selectively to interconnect any two of said lines, a multielement electron discharge device individual to each of said lines, means for transmitting signals designating any one of said lines, means responsive to said signals for preparing the one of said devices individual to the designated one of said lines to undergo a discharge and a transfer of discharge, apparatus for rendering said switches inoperative to establish a connection to the designated one of said lines, and means responsive to said transfer of discharge in said selected device for disabling said apparatus.

18. In a communication system, a plurality of telephone lines, a plurality of switches operable selectively to interconnect any two of said lines, a multielement electron discharge device individual to each of said lines, means for transmitting signals designating any one of said lines, means responsive to said signals for preparing the one of said devices individual to the designated one of said lines to undergo a discharge and a plurality of successive transfers of discharge, means responsive to a first transfer of discharge in said one of said devices for rendering said switches inoperative to establish a connection to the designated one of said lines, and means responsive to a second transfer of discharge in said one of said devices for conditioning said switches to establish a connection to the designated one of said lines.

19. In a communication system, a plurality of switches, a terminal, a multielement electron discharge device individual to said terminal, means for transmitting signals designating said terminal, means responsive to said signals for creating a discharge across certain of the elements of said device, apparatus normally applying a potential to said device for causing a transfer of said discharge to certain other of the elements of said device, means responsive to a discharge across said certain other of the elements of said device for controlling the establishment of an electrically conductive path from said terminal through said switches, and means for at times applying a different potential to said device for preventing said transfer of discharge.

20. In a communication system, a plurality of switches, a plurality of terminals, a multielement electron discharge device individual to each of said terminals, means responsive to the initiation of a call from any one of said terminals for initiating a discharge between certain of the elements in the one of said devices individual to said any one of said terminals, means responsive to the initiation of a discharge across said certain of the elements of said any one of said devices for controlling the establishment of an electrically conductive path from the said any one of said terminals through a portion of said switches, means for transmitting signals designating any other one of said terminals, means responsive to said signals for initiating a discharge across certain of the elements of another one of said devices individual to said any other one of said terminals, apparatus normally applying a potential to said another one of said devices for causing a transfer of said discharge to certain other of the elements of said another one of said devices for controlling the establishment of an electrically conductive path from said any other one of said terminals through another portion of said switches whereby said any one of said terminals and said any other one of said terminals are electrically interconnected, and means for at times applying a different potential to said another one of said devices for preventing said transfer of discharge.

21. In a telephone system, a plurality of telephone lines, a plurality of switches operable selectively to interconnect any two of said lines, a multielement electron discharge device individual to each of said lines, means for transmitting signals designating any one of said lines, means for at times applying a discharge-sustaining potential to one of the elements of the one of said devices individual to said any one of said lines, means for at other times applying a non-discharge-sustaining potential to one of the elements of said one of said devices, means for applying discharge-sustaining potentials to certain other of the elements of said one of said devices, and apparatus responsive to a discharge between said certain other of the elements of said one of said devices for rendering said switches inoperative to establish a connection to said any one of said lines, and responsive to a discharge between one of said certain other of the elements and said one of the elements for controlling said switches to establish a connection to said any one of said lines.

22. In a telephone system, a plurality of telephone lines, a plurality of switches operable selectively to interconnect any two of said lines, an electron discharge device individual to each of said lines, each of said devices having an anode, a cathode and a control electrode, means normally applying a discharge-sustaining potential to the cathode of each of said devices, means for transmitting signals designating any one of said lines, means for at times applying a non-discharge-sustaining potential to the cathode of the one of said devices individual thereto, means for applying discharge-sustaining potentials to the control electrode and to the anode of said any one of said devices, and apparatus responsive to a continuing discharge between said control electrode and said anode of said any one of said devices for rendering said switches ineffective to establish a connection to said any one of said lines and responsive to a discharge between said anode and said cathode for rendering said switches operable to establish a connection to said any one of said lines.

23. In a communication system, a switching station, a plurality of terminals connected thereto, a multielement electron discharge device individual to each of said terminals, means for transmitting signals designating any one of said terminals, and apparatus responsive to said signals for selecting the one of said devices individual to said any one of said terminals and for testing the condition of said any one of said terminals comprising means for applying discharge-sustaining potentials to two different elements in each of the devices in two different groups of said devices having some of said devices in common, means for applying a discharge-initiating potential to another element of each of the devices in another group of said devices having at least one of said devices in common with said other two groups of said devices, means for applying a discharge-sustaining potential to an additional element in the selected one of said devices, and apparatus responsive to conduction through said selected one of said devices in a path including said additional element for controlling the establishment of a connection from said selected one of said terminals through said switching station.

24. In a communication system, a plurality of telephone lines, a plurality of switches operable selectively to interconnect any of said lines, a multielement electron discharge device individual to each of said lines, means for transmitting signals designating any one of said lines, apparatus responsive to said signals for selecting and initiating a discharge in the device individual to said any one of said lines, and apparatus effective only if said device undergoes a discharge for operating said switches to interconnect any of said lines with said any one of said lines.

25. In a communication system, a plurality of telephone lines, one or more subscribers' stations individual to each of said lines, a plurality of switches operable selectively to interconnect any of said lines, a multielement electron discharge device individual to each of said lines, means at one of said subscribers' stations for transmitting signals designating any one of said lines, apparatus responsive to said signals for selecting and initiating a discharge in the device individual to said any one of said lines, and apparatus controlled by said device for determining whether said one of said subscribers' stations is connected to said any one of said lines.

26. In a communication system, a plurality of telephone lines, a plurality of switches operable selectively to interconnect any two of said lines, a multielement electron discharge device individual to each of said lines, means connected to one of said lines for transmitting signals designating any one of said lines, means responsive to said signals for selecting the one of said devices individual to said any one of said lines and for preparing said one of said devices to undergo a discharge and a transfer of discharge, means for at times disabling said one of said devices to undergo a transfer of discharge, apparatus effective only if said one of said devices undergoes a transfer of discharge for operating said switches to establish a connection to said any one of said lines, and means controlled by said apparatus for determining whether said one of said lines is the same line as said any one of said lines.

27. In a communication system, a plurality of telephone lines, a plurality of switches operable selectively to interconnect any two of said lines, a multielement electron discharge device individual to each of said lines, means for transmitting signals designating any one of said lines, means responsive to said signals for selecting the one of said devices individual to said any one of said lines and for preparing said one of said devices to undergo a discharge and a transfer of discharge, apparatus effective only if said one of said devices undergoes a transfer of discharge for operating said switches to establish a connection to said any one of said lines, means controlled by said apparatus for causing said one of said devices to undergo a transfer of discharge, and means responsive to said transfer of discharge in said one of said devices for conditioning said switches to establish a connection to said any one of said lines.

28. In a communication system, a plurality of telephone lines, at least one subscriber's station connected to each of said lines, switching apparatus operable selectively to interconnect any of said lines, a multielement gaseous discharge device individual to each of said lines, apparatus at any one of said stations for transmitting signals designating any other one of said stations, apparatus operative in response to said signals for selecting the one of said devices individual to the one of said lines which is connected to said any other one of said stations, means including said one of said devices effective when a particular potential condition exists on said one of said lines for rendering said switching apparatus ineffective to establish a connection between said any one of said stations and said one of said lines, and apparatus operative if said any one of said stations and said any other one of said stations are connected to the same one of said lines for disabling said means.

29. In a communication system, a plurality of telephone lines, at least one subscriber's station individual to each of said lines, switching apparatus operable selectively to interconnect any of said lines, a multielement gaseous discharge device individual to each of said lines, apparatus operative in response to signals transmitted from any one of said stations for selecting any one of said devices and for conditioning the selected device to undergo a discharge and a transfer of discharge, and apparatus responsive to said transfer of discharge occurring in a one of said devices individual to the one of said lines from which said signals were transmitted for conditioning said switching apparatus for establishing a communication path to said designated station.

30. In a communication system, a plurality of telephone lines, at least one subscriber's station individual to each of said lines, switching apparatus operable selectively to interconnect any of said lines, a multielement gaseous discharge device individual to each of said lines, apparatus operative in response to signals transmitted from any one of said stations for selecting any one of said devices and for conditioning the selected device to undergo a discharge and a transfer of discharge, means responsive to a failure of said selected device to undergo a transfer of discharge for rendering said switches inoperative to establish a connection to the line individual to said selected device, apparatus responsive to the functioning of said means for causing said selected device to undergo a transfer of discharge, and means responsive to said transfer of discharge occurring in the one of said devices individual to the one of said lines from which said signals were transmitted for conditioning said switching apparatus for establishing a communication path to said designated station.

31. In a communication system, a plurality of telephone lines, at least one subscriber's station individual to each of said lines, a calling station, a called station, switching apparatus, a multielement gaseous discharge device individual to each of said lines, apparatus operative in response to signals transmitted from said calling station for selecting the one of said devices individual to the one of said lines associated with said called station and for conditioning the selected device to undergo a discharge, and means responsive to said discharge occurring in a one of said devices common to both said calling and called stations for conditioning said switching apparatus for signaling said called station.

32. In a communication system, two telephone lines, a multielement electron discharge device individual to each of said lines, a plurality of junction means, switching apparatus interconnecting said lines through any one of said junction means, an operator's trunk, apparatus responsive to signals transmitted from said trunk for causing one of said devices to transmit an indication to said any one of said junction means, and means responsive to said indication for establishing a connection from said trunk to said any one of said junction means.

33. In a communication system, two telephone lines, a multielement electron discharge device individual to each of said lines, a plurality of junction means, switching apparatus interconnecting said lines through any one of said junction means, an operator's trunk, apparatus responsive to signals transmitted from said trunk for selecting one of said devices and for causing said selected device to transmit an indication to said any one of said junction means, hunting means, means in said any one of said junction means responsive to said indication for transmitting an identifying indication to said hunting means, said hunting means being operative in response to said identifying indication for establishing a connection from said trunk to said lines through said any one of said junction means.

34. In a communication system, two telephone lines, a multielement electron discharge device individual to each of said lines, a plurality of junction means, switching apparatus interconnecting said lines through any one of said junction means, an operator's trunk, apparatus responsive to signals transmitted from said trunk for selecting one of said devices and for conditioning the selected device to undergo a discharge and a transfer of discharge, means responsive to a failure of said selected device to undergo a transfer of discharge for causing said selected device to undergo a transfer of discharge, means in said any one of said junction means responsive to said transfer of discharge for transmitting an identifying indication, and means responsive to said indication for establishing a connection from said trunk to said lines through said any one of said junction means.

35. In a communication system, a plurality of groups of telephone lines, an electron discharge device individual to each of said lines and arranged in lock-out with all of said devices individual to lines within each group of lines, and an electron discharge device individual to each of said groups of lines arranged in lock-out with all of said devices individual to each of said groups of lines.

36. In a communication system, switching apparatus, a plurality of groups of telephone lines, an electron discharge device individual to each of said lines for controlling said switching apparatus, all of said devices associated with lines within each of said groups being arranged in mutual lock-out, and an electron discharge device individual to each of said groups of lines arranged in mutual lock-out with all other of said electron discharge devices individual to each of said groups of lines.

37. In a communication system, switching equipment, a plurality of groups of telephone lines, each of said groups comprising a plurality of telephone lines and a plurality of electron discharge devices individually associated with individual ones of said lines and arranged in mutual lock-out, and a plurality of electron discharge devices individually associated with individual ones of said groups of telephone lines and arranged in mutual lock-out, and apparatus responsive to conduction in one of said devices individual to one of said lines and to conduction in one of said devices individual to one of said groups of lines for controlling said switching equipment.

38. In a communication system, switching apparatus, a plurality of groups of telephone lines, an electron discharge device individual to each of said lines for controlling said switching apparatus, circuit means responsive to conduction in any one of said devices for disabling all others of said devices associated with the lines within the same one of said groups of lines, an electron discharge tube individual to each of said groups of lines, and circuit means responsive to conduction in any one of said tubes for disabling all others of said tubes.

39. In a communication system, switching apparatus, a plurality of groups of telephone lines, an electron discharge device individual to each of said lines, means responsive to conduction in any one of said devices for disabling all others of said devices associated with lines within the same one of said groups of lines, an electron discharge tube individual to each of said groups of lines, means responsive to a discharge in said any one of said devices for initiating a discharge in the one of said tubes individual to the one of said groups of lines including said any one of said devices, circuit means responsive to the initiation of a discharge in said one of said tubes for disabling all others of said tubes individual to others of said groups of said lines, and means responsive to a discharge in said any one of said devices individual to one of said lines and to a discharge in said one of said tubes for controlling said switching apparatus.

40. In a communication system, two identical control circuits, first means for rendering said circuits alternately operative, said first means comprising a start relay for each of said control circuits, a control relay for alternately operating said start relays, means for periodically changing the condition of said control relay, and means for locking said control relay in its then condition while either of said control circuits is in operation, and apparatus responsive to a malfunctioning of either one of said circuits for controlling said first means for rendering the other of said circuits operative and for then disabling said first means.

41. In a communication system, two identical control circuits, first means for rendering said circuits alternately operative, said first means comprising a start relay for each of said control circuits, a control relay for alternately operating said start relays, means for periodically changing the condition of said control relay, and means for locking said control relay in its then condition while either of said control circuits is in operation, and apparatus responsive to a failure of either one of said control circuits to function within a predetermined time interval after being rendered operative for controlling said first means to render the other one of said circuits operative and for then disabling said first means.

42. In a communication system, a plurality of telephone lines, switching equipment operable to establish a connection to any one of said lines, an electron discharge device individual to each of said lines, an electron discharge device common to said lines, means for transmitting signals designating any one of said lines, apparatus responsive to said signals for selecting and testing said device common to said lines thereby selecting and testing said lines as a group, and means responsive to the selection of said device common to said lines for selecting one of said devices individual to an idle one of said lines and for initiating a discharge therein, and apparatus responsive to said discharge for controlling said switching equipment to establish a connection to the one of said lines individual to said one of said devices.

43. In a communication system, a plurality of telephone lines, an electron discharge device individual to each of said lines, an electron discharge device common to said lines, means for transmitting signals designating any one of said lines, apparatus responsive to said signals for selecting said device common to said lines and for preparing that device to undergo a discharge and a transfer of discharge, and means associated with said devices individual to each of said lines and effective when a particular potential condition exists on all of said lines for disabling said device common to said lines from undergoing a transfer of discharge.

44. In a communication system, a plurality of telephone lines, switching equipment operable to establish a connection to any one of said lines, an electron discharge device individual to each of said lines, an electron discharge device common to said lines, apparatus for transmitting signals designating a certain one of said lines, apparatus responsive to said signals for selecting said device common to said lines and for preparing that device to undergo a discharge and a transfer of discharge, means individual to each of said lines and effective when a particular potential condition exists on the associated line, circuit means controlled by all of said means for disabling said device common to said lines from undergoing a transfer of discharge, and apparatus effective upon a failure of said device common to said lines to undergo a transfer of discharge for disabling said switching equipment to establish a connection to any of said lines.

45. In a communication system, a plurality of telephone lines, switching equipment operable to establish a connection to any one of said lines, an electron discharge device individual to each of said lines, an electron discharge tube common to said lines, means for transmitting signals designating a first one of said lines, apparatus responsive to said signals for selecting said tube common to said lines and for preparing that tube to undergo a discharge and a transfer of discharge, means responsive to a transfer of discharge in said tube for discharging a selected one of said devices associated with an idle line, and apparatus responsive to the discharge in said selected one of said devices for controlling said switching equipment to establish a connection to the one of said lines associated with said selected one of said devices.

46. In a communication system, a plurality of telephone lines, switching equipment operable to establish a connection to any one of said lines, an electron discharge device individual to each of said lines, an electron discharge tube common to said lines, means for transmitting signals designating one of said lines, apparatus responsive to said signals for selecting said tube common to said lines and for preparing that tube to undergo a discharge and a transfer of discharge, and means responsive to said transfer of discharge for preparing the first in a predetermined sequence of said devices associated with idle ones of said lines to undergo a discharge, and apparatus responsive to the discharge in said first of said devices for controlling said switching equipment to establish a connection to the one of said lines associated with said first one of said devices.

47. In a communication system, a plurality of telephone lines, switching equipment operable to establish a connection to any one of said lines, an electron discharge device individual to each of said lines, an electron discharge tube common to said lines, means for transmitting signals designating one of said lines, apparatus responsive to said signals for selecting said tube common to said lines and for preparing said tube to undergo a discharge and a transfer of discharge, circuit means individual to and responsive to the condition of each of said lines and arranged in a predetermined sequence, means responsive to said transfer of discharge for discharging the one of said devices associated with the first in the predetermined sequence of said circuit means which is associated with an idle line, and apparatus responsive to the discharge in said one of said devices for controlling said switching equipment to establish a connection to the one of said lines associated with said one of said devices.

48. In a communication system, a plurality of trunk circuits, switching equipment operable to establish a connection to any one of said circuits, an electron discharge device individual to each of said circuits, common control means for said circuits, means for transmitting signals designating said circuits, apparatus responsive to said signals for selecting and testing said common control means, said common control means operating in response to the selection thereof to select one of said devices associated with an idle one of said circuits in accordance with a predetermined sequence of preferences and to initiate a discharge in the selected one of said devices, and apparatus responsive to said discharge for controlling said switching equipment to establish a connection to the one of said circuits associated with said selected one of said devices.

49. In a communication system, a plurality of trunk circuits, switching equipment operable to establish a connection to any one of said circuits, an electron discharge device individual to each of said circuits, common control means for said circuits, means for transmitting signals designating said circuits, apparatus responsive to said signals for selecting and testing said common control means, said common control means operating in response to the selection thereof to select one of said devices associated with an idle one of said circuits in accordance with a predetermined sequence of preferences and to initiate a discharge in the selected one of said devices, apparatus responsive to said discharge for controlling said switching equipment to establish a connection to the one of said circuits associated with said selected one of said devices, and means controlling said common control means to vary the sequence of preferences.

50. In a communication system, a plurality of trunk circuits, switching equipment operable to establish a connection to any one of said circuits, an electron discharge device individual to each of said circuits, a pair of electron discharge tubes common to said circuits, means for transmitting signals designating said trunk circuits, apparatus responsive to said signals for selecting and testing said tubes, means disabling said tubes alternately, apparatus responsive to the selection of said tubes when one of said tubes is disabled to select one of said devices associated with an idle one of said circuits in accordance with one predetermined sequence of preferences and to initiate a discharge in the selected one of said devices and responsive to the selection of said tubes when the other of said tubes is disabled to select one of said devices associated with an idle one of said circuits in accordance with a different predetermined sequence of preferences and to initiate a discharge in the selected one of said devices, and apparatus responsive to said discharge for controlling said switching equipment to establish a connection to the one of said circuits associated with the selected one of said devices.

51. In a communication system, a plurality of communication paths, an electron discharge device individual to each of said paths, and selecting means for applying discharge-sustaining potentials to each of said devices associated with idle ones of said communication paths through delay networks individual to each of said devices, said networks having different time delay constants.

52. In a communication system, a plurality of communication paths, an electron discharge device individual to each of said paths, first selecting means for applying discharge-sustaining potentials to each of said devices associated with idle ones of said communication paths through a first series of delay networks individual to each of said devices, said networks having different time delay constants, second selecting means for applying discharge-sustaining potentials to each of said devices associated with idle ones of said communication paths through a second series of delay networks individual to each of said devices, said second series of networks having time-delay constants different than the constants of said first series of networks, and control means rendering said first and said second selecting means alternately operable.

53. In a communication system, a plurality of telephone lines, a plurality of trunk circuits, switching equipment operable selectively to interconnect any of said lines and trunk circuits, and means for intercepting a call directed to any one of said lines and for directing said call to one of said trunk circuits comprising an electron discharge device, means responsive to signals designating said intercepted line for conditioning said device to undergo a discharge, and apparatus responsive to said discharge for controlling said switching equipment to establish a connection to an idle one of said trunk circuits.

54. In a communication system, a plurality of telephone lines, a plurality of trunk circuits, an electron discharge device individual to each of said trunk circuits, switching equipment, and means for intercepting a call directed to any one of said lines and for directing said call to one of said trunk circuits comprising an electron discharge tube common to said trunk circuits, means responsive to signals designating said intercepted line for selecting said tube and for conditioning said tube to undergo a discharge, apparatus responsive to said discharge for selecting an idle one of said trunk circuits and for controlling said switching equipment to establish a connection to said selected one of said trunk circuits.

55. In a communication system, a plurality of switching control circuits, selecting means responsive to the initiation of a call for selecting any one of said circuits, preference means for establishing a preference of selection in favor of certain of said circuits, apparatus operative when a preselected number of said circuits become busy, and means controlled by said apparatus for disabling said preference means.

56. In a communication system, a plurality of telephone lines, a plurality of groups of switching control circuits, each of said circuits operable to establish a connection between any two of said lines, selecting means responsive to the initiation of a call for selecting any idle one of said circuits, preference means for establishing a preference of selection in favor of the circuits in one of said groups, apparatus operative when a preselected number of said circuits become busy, and means controlled by said apparatus for disabling said preference means.

57. In a communication system, a plurality of groups of switching control circuits, selecting means responsive to the initiation of a call for selecting any one of said control circuits, apparatus for determining the number of idle ones of said control circuits in each of said groups, and means controlled by said apparatus for establishing a preference of selection among said groups in accordance with the number of idle ones of said control circuits with each of said groups.

58. In a communication system, a plurality of groups of switching control circuits, selecting means responsive to the initiation of a call for selecting any one of said control circuits, apparatus for determining the number of idle ones of said control circuits in each of said groups, means controlled by said apparatus for establishing a preference of selection among said groups in accordance with the number of idle ones of said control circuits within each of said groups, and additional means for establishing an additional preference for certain of said groups.

59. In a communication system, a plurality of groups of switching control circuits, selecting means responsive to the initiation of a call for selecting any one of said control circuits, apparatus for determining the number of idle ones of said control circuits in each of said groups, means controlled by said apparatus for establishing a preference of selection among said groups in accordance with the number of idle ones of said control circuits within each of said groups, and additional means for establishing an additional preference for each of said groups sequentially.

60. In a communication system, a plurality of groups of switching control circuits, selecting means responsive to the initiation of a call for selecting any one of said control circuits, apparatus for determining the number of idle ones of said control circuits in each of said groups, means controlled by said apparatus for establishing a preference of selection among said groups in accordance with the number of idle ones of said control circuits within each of said groups, additional means for establishing an additional preference for certain of said groups, and means effective when a predetermined number of said circuits become busy for disabling said additional means.

61. In a communication system, a plurality of groups of switching control circuits, selecting means responsive to the initiation of a call for selecting any one of said control circuits, apparatus for determining the number of idle ones of said control circuits in each of said groups, means controlled by said apparatus for establishing a preference of selection among said groups in accordance with the number of idle ones of said control circuits within each of said groups, additional means for establishing an additional preference for each of said groups sequentially, and means effective when a predetermined number of said circuits become busy for disabling said additional means.

62. In a telephone system, a plurality of telephone lines, a register means for identifying any one of said lines, a multielement electron discharge device individual to each of said lines, means for applying a discharge-sustaining potential to one of the elements of each device while the line to which the device is individual is idle, means for applying a potential ineffective to sustain discharge to said one of the elements of each device while the line to which the device is individual is busy, means controlled by said register means for applying discharge-sustaining potentials to certain other elements of the device individual to a line identified by said register to effect discharge between said certain other elements of said device if said line is then busy or to effect discharge between one of said certain other elements and said one element of said device if said line is then idle, apparatus operated by discharge between said certain other elements of said device, and apparatus operated by discharge between said one element and said one of said certain other elements.

WARREN A. CORNELL.
NATHAN I. HALL.
GEORGE HECHT.
CHARLES D. KOECHLING.
FRANKLIN A. KORN.
HAROLD E. POWELL.

References Cited in the file of this patent
UNITED STATES PATENTS

| Number | Name | Date |
|---|---|---|
| 2,091,127 | Taylor | Aug. 24, 1937 |
| 2,195,309 | Holden | Mar. 26, 1940 |
| 2,225,907 | Duguid et al. | Dec. 24, 1940 |
| 2,357,371 | Wolfner | Sept. 5, 1944 |
| 2,409,586 | Powell | Oct. 15, 1946 |
| 2,439,680 | Volz | Apr. 13, 1948 |
| 2,456,970 | MacDonald | Dec. 21, 1948 |
| 2,468,429 | Dehn | Apr. 26, 1949 |
| 2,491,377 | Joel | Dec. 13, 1949 |